Equilibrium diagram of Cu-Mn alloy (A) As annealed
(B) As cold-worked after the annealing
(B'1) As tempered by cooling after heating at 400°C for 1 hour, following the cold-work
(B'2) The same as (B'1) except heating at 450°C for 1 hour
(B'3) The same as (B'1) except heating at 550°C for 1 hour
(B'4) The same as (B'1) except heating at 600°C for 1 hour (A) As annealed
(B) As cold-worked after the annealing
($B_1'$) As tempered by cooling after heating at 400°C for 1 hour, following the cold-work
($B_2'$) The same as ($B_1'$) except heating at 450°C for 1 hour
($B_3'$) The same as ($B_1'$) except heating at 550°C for 1 hour
($B_4'$) The same as ($B_1'$) except heating at 600°C for 1 hour (A) As annealed
(C) As water quenched after the annealing
($C_1'$) As tempered by cooling after heating at 400°C for 1 hour, following the water quenching
($C_2'$) The same as ($C_1'$) except heating at 450°C for 1 hour
($C_3'$) The same as ($C_1'$) except heating at 550°C for 1 hour
($C_4'$) The same as ($C_1'$) except heating at 600°C for 1 hour (A) As annealed
(C) As water quenched after the annealing
($C'_1$) As tempered by cooling after heating at 400 °C for 1 hour, following the water quenching
($C'_2$) The same as ($C'_1$) except heating at 450 °C for 1 hour
($C'_3$) The same as ($C'_1$) except heating at 550 °C for 1 hour
($C'_4$) The same as ($C'_1$) except heating at 600 °C for 1 hour

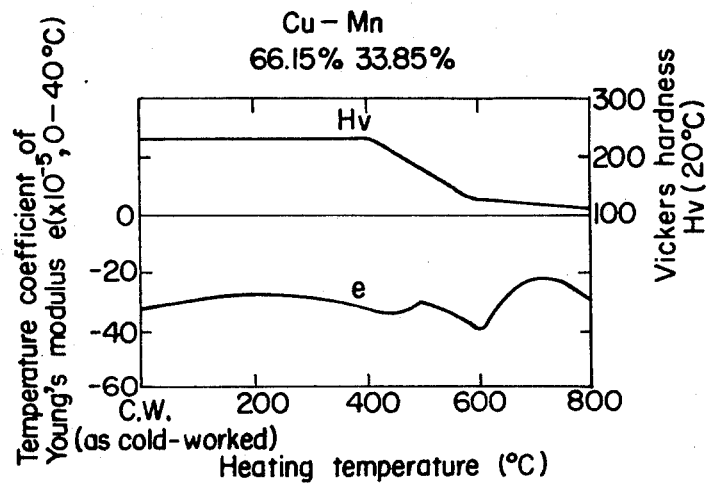
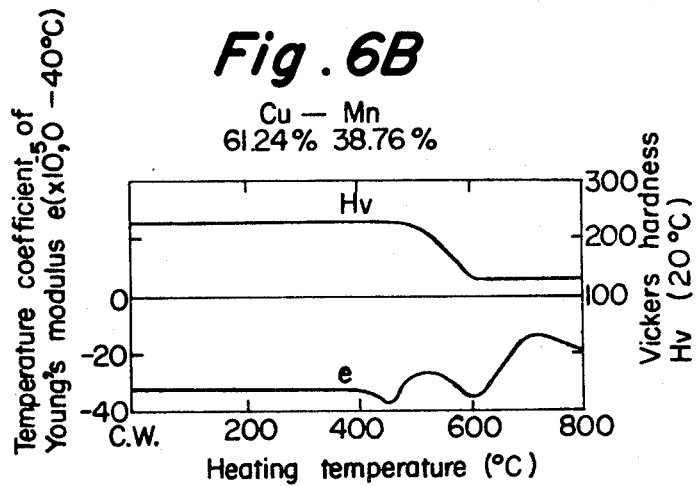

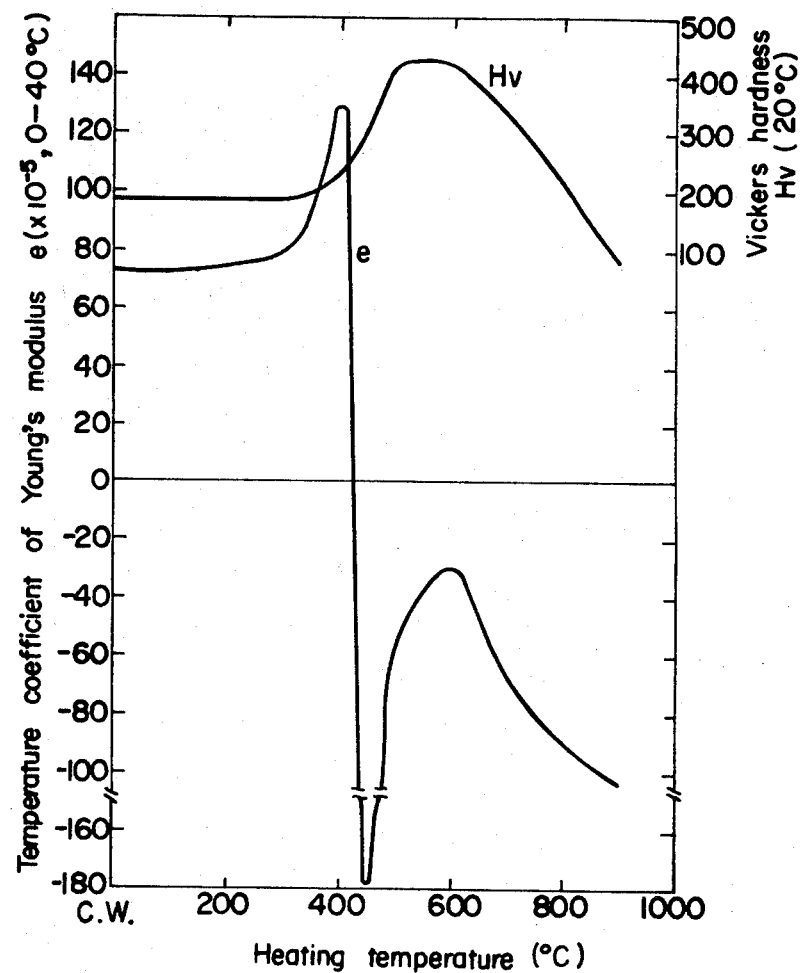

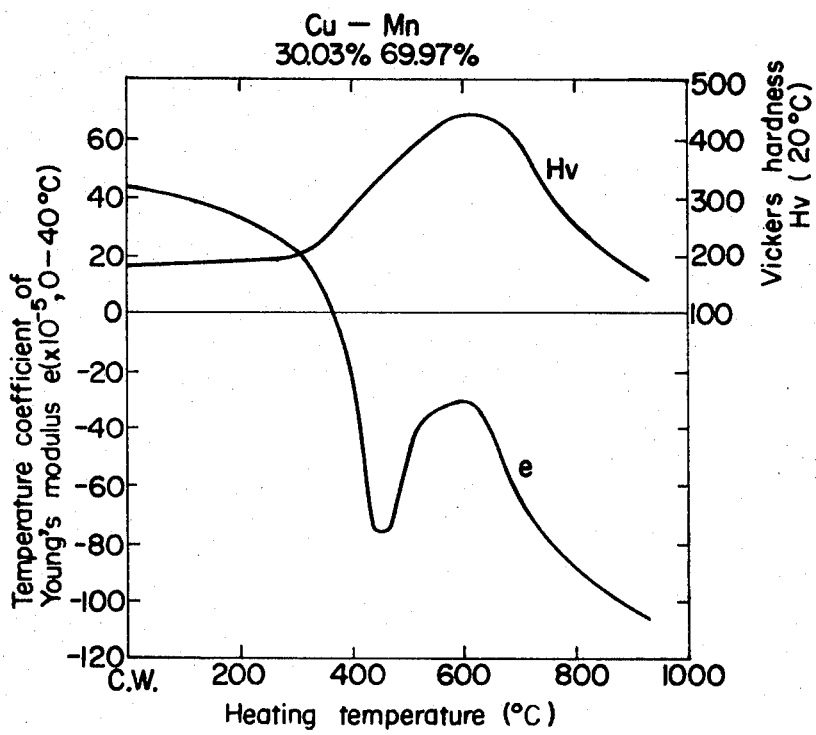

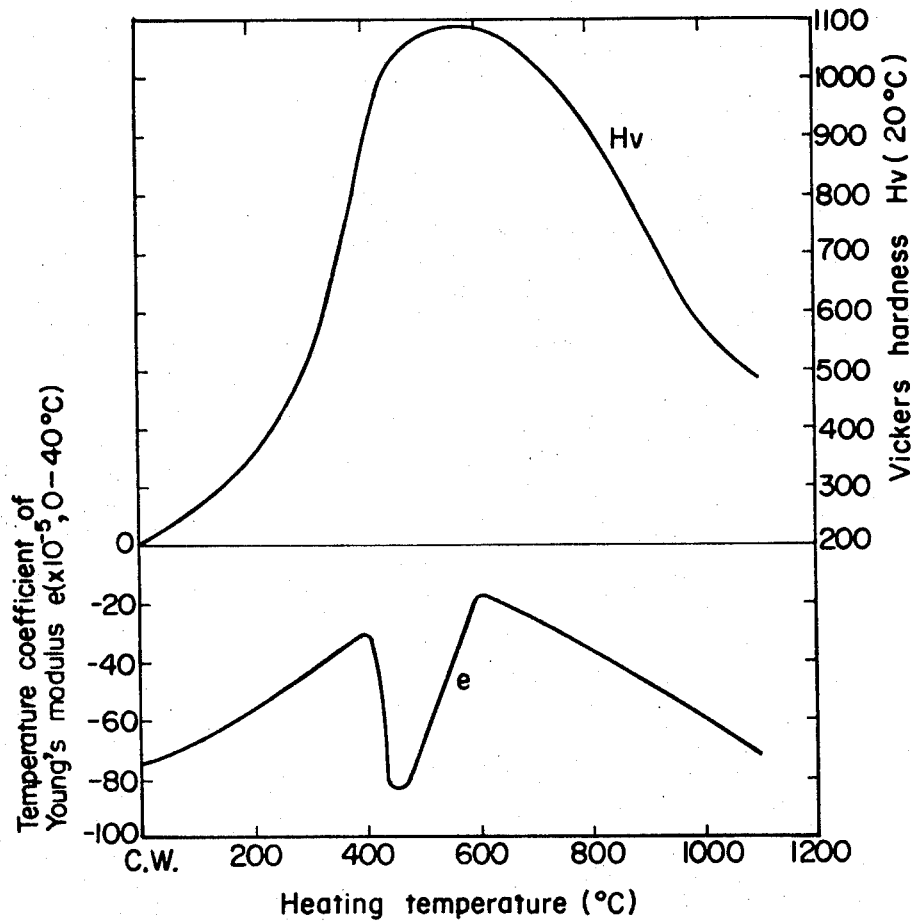

Cu — Mn
66.15% 33.85%

Cu — Mn
61.24% 38.76%

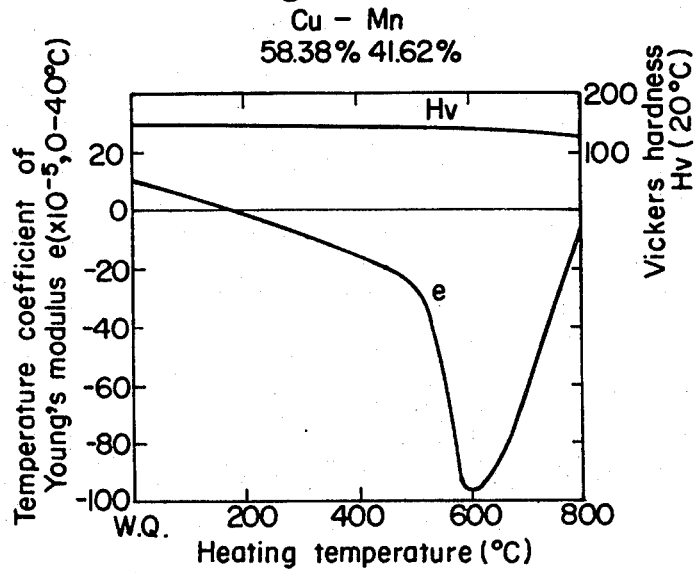
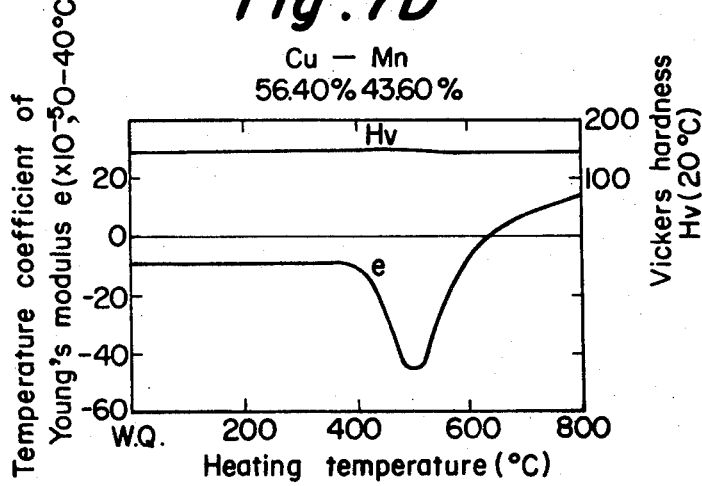

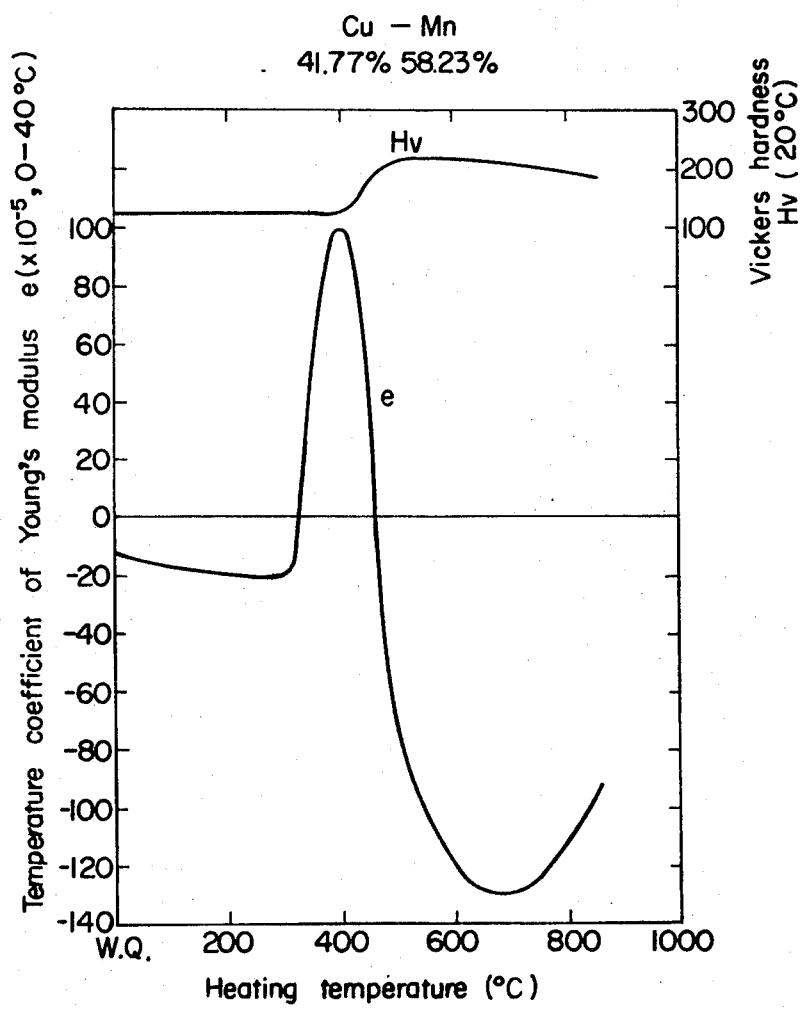

Cu — Mn
32.25% 67.75%

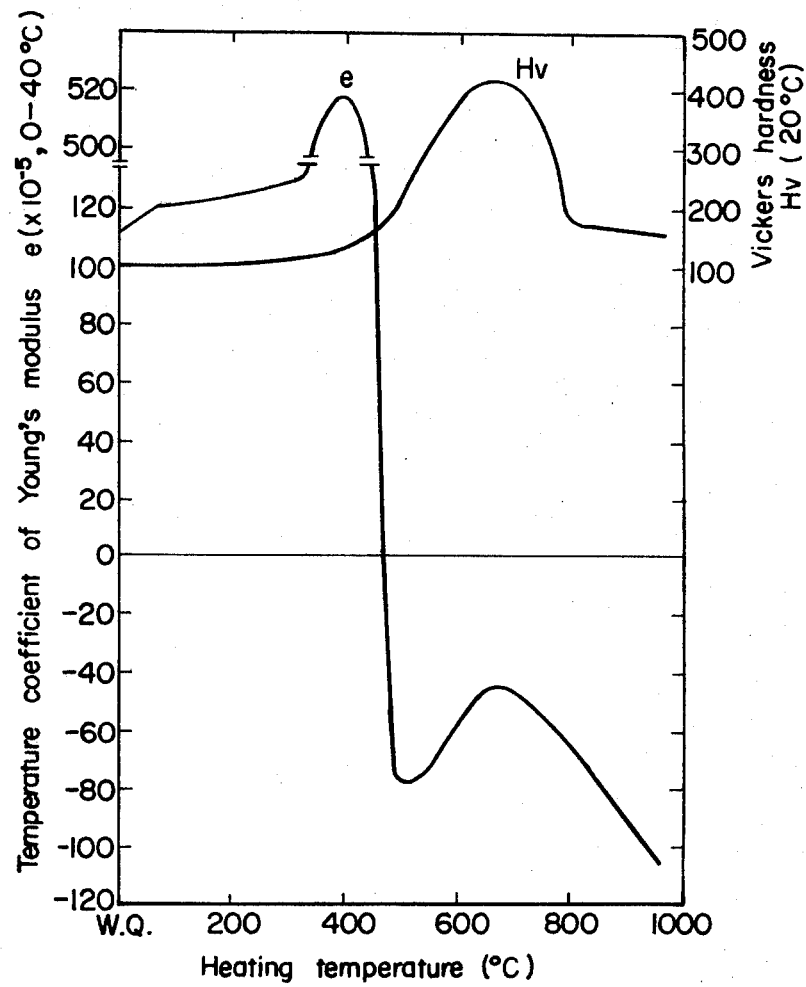

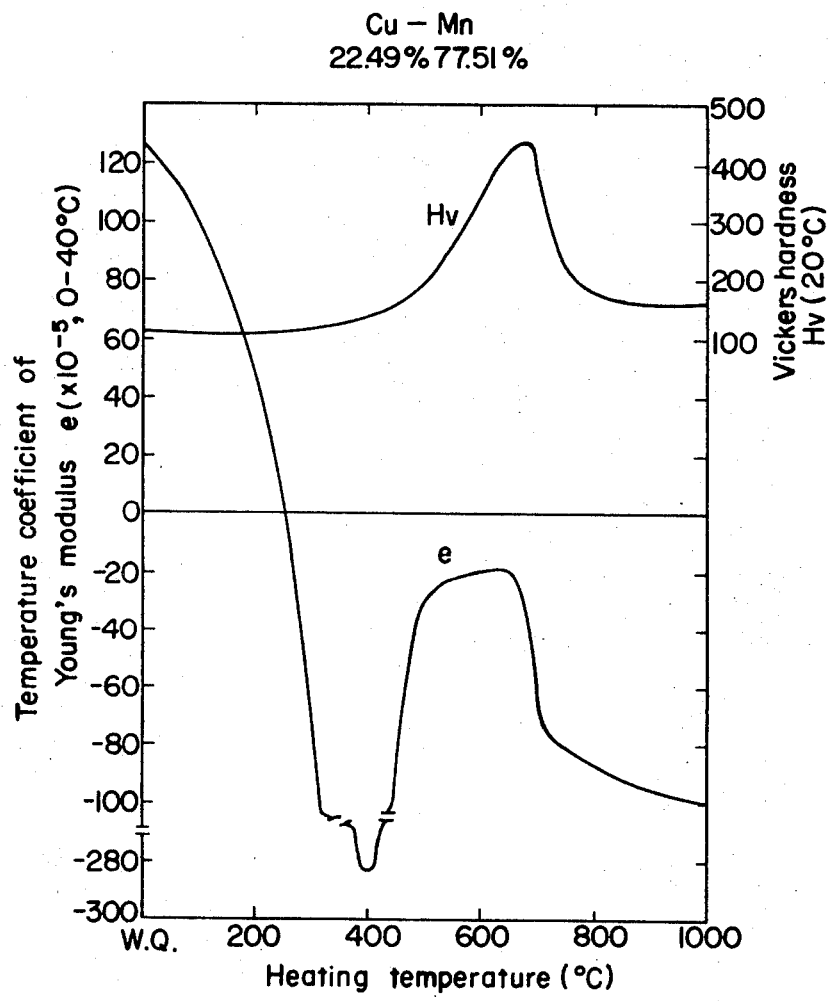

Cu — Mn
17.62% 82.38%

As cold-work with a working rate 96%, after the annealing of Fig. 2A

As tempered by cooling at 100°C/hour after heating at 300°C for 1 hour, following the cold-work of Fig. 8A As tempered by cooling at 100°C/hour after heating at 400°C for 1 hour, following the cold-work of Fig. 8A

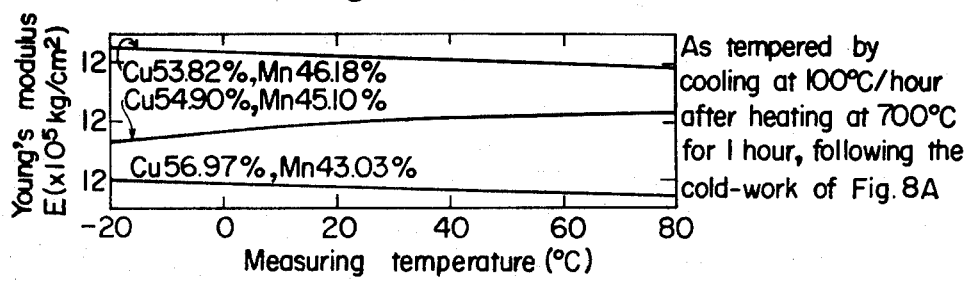
Fig. 8D — As tempered by cooling at 100°C/hour after heating at 700°C for 1 hour, following the cold-work of Fig. 8A
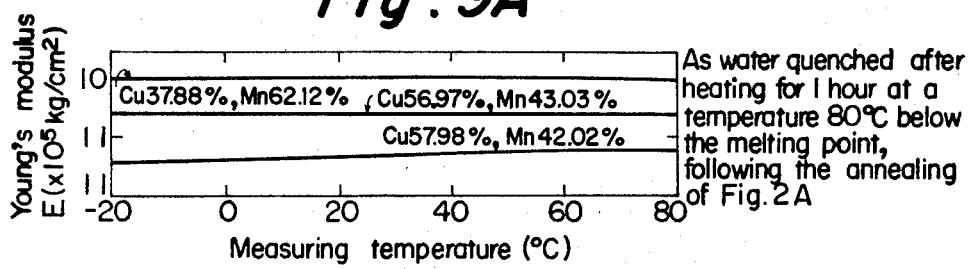
Fig. 9A — As water quenched after heating for 1 hour at a temperature 80°C below the melting point, following the annealing of Fig. 2A
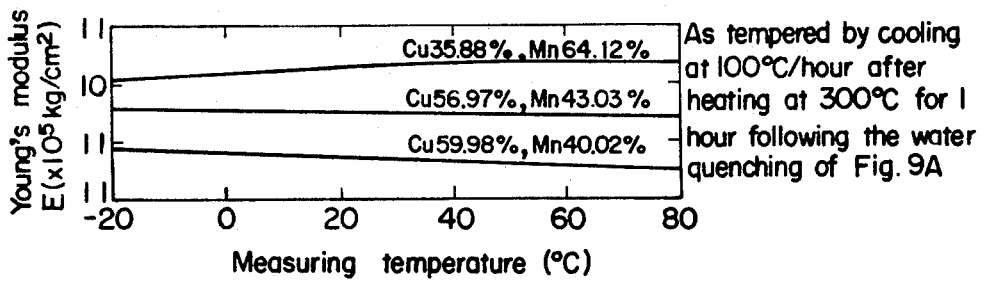
Fig. 9B — As tempered by cooling at 100°C/hour after heating at 300°C for 1 hour following the water quenching of Fig. 9A As annealed by cooling at 100°C/hour after heating at 950°C for 1 hour As cold-worked with a working rate 96% after the annealing of Fig. 10

As tempered by cooling at 100°C/hour after heating at 400°C for 1 hour, following the cold-work of Fig. 11A As tempered by cooling at 100°C/hour after heating at 600°C for 1 hour, following the cold-work of Fig. 11A As tempered by cooling at 100°C/hour after heating at 800°C for 1 hour, following the cold-work of Fig. 11A As water quenched after heating at 950°C for 1 hour, following the annealing of Fig. 10

As tempered by cooling at 100°C/hour after heating at 400°C for 1 hour, following the water quenching of Fig. 12A As tempered by cooling at 100°C/hour after heating at 600°C for 1 hour, following the cold-work of Fig. 12A As tempered by cooling at 100°C/hour after heating at 800°C for 1 hour, following the water quenching of Fig. 12A As cold-worked with a working rate of 96% after the annealing of Fig. 15

As tempered by cooling at 100 °C/hour after heating at 400°C for 1 hour, following the cold-work of Fig. 16A As tempered by cooling at 100°C/ hour after heating at 600°C for 1 hour, following the cold-work of Fig. 16A As tempered by cooling at 100°C/ hour after heating at 800°C for 1 hour, following the cold-work of Fig. 16A As water quenched after heating at 950°C for 1 hour, following the annealing of Fig. 15

As tempered by cooling at 100°C/hour after heating at 400°C for 1 hour, following the water quenching of Fig. 17A As tempered by cooling at 100°C/hour after heating at 600°C for 1 hour, following the water quenching of Fig.17A As tempered by cooling at 100°C/hour after heating at 800°C for 1 hour, following the water quenching of Fig. 17A As annealed by cooling at 100°C/hour after heating at 950°C for 1 hour As cold-worked with a working rate 96% after the annealing of Fig.18

As tempered by cooling at 100°C/hour after heating at 400°C for 1 hour, following the cold-work of Fig. 19A As tempered by cooling at 100°C/hour after heating at 600°C for 1 hour, following the cold-work of Fig. 19A As water quenched after heating at 950°C for 1 hour, following the annealing of Fig. 18

As tempered by cooling at 100°C/hour after heating at 400°C for 1 hour, following the water quenching of Fig. 20A As tempered by cooling at 100°C/hour after heating at 600°C for 1 hour, following the water quenching of Fig. 20A As annealed by cooling at 100°C/hour after heating at 950°C for 1 hour As cold-worked with a working rate 96% after the annealing of Fig. 23

As tempered by cooling at 100°C/ hour after heating at 400°C for 1 hour, following the cold-work of Fig. 24A As tempered by cooling at 100°C/hour after heating at 600°C for 1 hour, following the cold-work of Fig. 24A As water quenched after heating at 950°C for 1 hour As tempered by cooling at 100°C/hour after heating at 400°C for 1 hour, following the water quenching of Fig.25A As tempered by cooling at 100°C/hour after heating at 600°C for 1 hour, following the water quenching of Fig. 25A Mn-Cu-Fe ternary alloys as annealed by cooling at 100 °C/ hour after heating at 900°C for 1 hour Mn-Cu-Co ternary alloys as annealed by cooling at 100 °C/ hour after heating at 900°C for 1 hour Mn–Cu–Fe ternary alloys as cold-worked with a working rate 96%, following the annealing of Fig. 26A Mn–Cu–Fe ternary alloys as tempered by cooling at 100 °C/hour after heating at 200 °C for 1 hour, following the cold-work of Fig. 27A Mn-Cu-Fe ternary alloys as tempered by cooling at 100 °C/hour after heating at 400°C for 1 hour, following the cold-work of Fig. 27A Mn-Cu-Fe ternary alloys as tempered by cooling at 100 °C/hour after heating at 600°C for 1 hour, following the cold-work of Fig. 27A Mn-Cu-Fe ternary alloys as tempered by cooling at 100°C/hour after heating at 800°C for 1 hour, following the cold-work of Fig. 27A Mn-Cu-Co ternary alloys as cold-worked with a working rate 96%, following the annealing of Fig. 26B Mn-Cu-Co ternary alloys as tempered by cooling at 100 °C/hour after heating at 200°C for 1 hour, following the cold-work of Fig. 28A Mn-Cu-Co ternary alloys as tempered by cooling at 100 °C/hour after heating at 400°C for 1 hour, following the cold-work of Fig. 28A Mn-Cu-Co ternary alloys as tempered by cooling at 100 °C/hour after heating at 600 °C for 1 hour, following the cold-work of Fig. 28A Mn-Cu-Co ternary alloys as tempered by cooling at 100 °C/hour after heating at 800°C for 1 hour, following the cold-work of Fig. 28A Mn-Cu-Fe ternary alloys as water quenched after heating at 900°C for 1 hour, following the annealing of Fig. 26A Mn-Cu-Fe ternary alloys as tempered by cooling at 100°C/hour after heating at 200°C for 1 hour, following the water quenching of Fig 29A Mn-Cu-Fe ternary alloys as tempered by cooling at 100 °C/hour after heating at 400°C for 1 hour, following the water quenching of Fig. 29A Mn-Cu-Fe ternary alloys as tempered by cooling at 100°C/hour after heating at 600°C for 1 hour, following the water quenching of Fig. 29A Mn-Cu-Fe ternary alloys as tempered by cooling at 100 °C/hour after heating at 800°C for 1 hour, following the water quenching of Fig. 29A Mn-Cu-Co ternary alloys as water quenched after heating at 900°C for 1 hour, following the annealing of Fig. 26B Mn-Cu-Co ternary alloys as tempered by cooling at 100°C/hour after heating at 200°C for 1 hour, following the quenching of Fig. 30A Mn-Cu-Co ternary alloys as tempered by cooling at 100°C/hour after heating at 400°C for 1 hour, following the quenching of Fig. 30A Mn-Cu-Co ternary alloys as tempered by cooling at 100 °C/hour after heating at 600°C for 1 hour, following the water quenching of Fig. 30A Mn-Cu-Co ternary alloys as tempered by cooling at 100 °C/hour after heating at 800°C for 1 hour, following the quenching of Fig. 30A

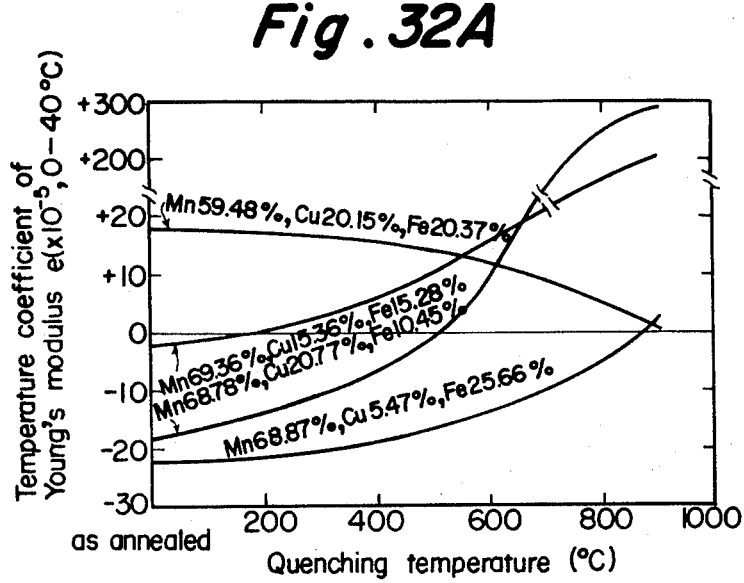
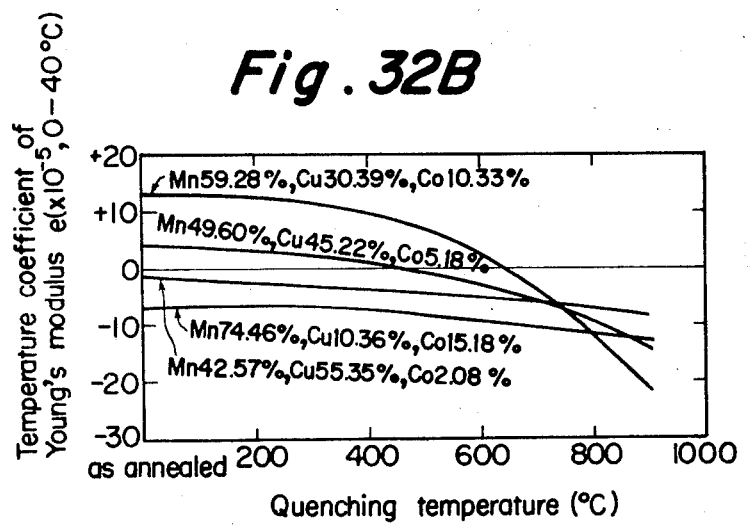

Mn-Cu-Fe ternary alloys as annealed by cooling at 100°C/ hour after heating at 900°C for 1 hour Mn-Cu-Co ternary alloys as annealed by cooling at 100°C/ hour after heating at 900°C for 1 hour Mn-Cu-Fe ternary alloys as cold-worked with a working rate 96%, after the annealing of Fig. 33A Mn-Cu-Fe ternary alloys as tempered by cooling at 100°C/hour after heating at 200°C for 1 hour, following the cold-work of Fig. 34A Mn-Cu-Fe ternary alloys as tempered by cooling at 100°C/hour after heating at 400°C for 1 hour, following the cold-work of Fig. 34A Mn-Cu-Fe ternary alloys as tempered by cooling at 100°C/hour after heating at 600°C for 1 hour, following the cold-work of Fig. 34A Mn-Cu-Fe ternary alloys as tempered by cooling at 100°C/hour after heating at 800°C for 1 hour, following the cold-work of Fig. 34A Mn-Cu-Co ternary alloys as cold-worked with a working rate 96%, after the annealing of Fig. 33B Mn-Cu-Co ternary alloys as tempered by cooling at 100°C/hour after heating at 200°C for 1 hour, following the cold-work of Fig. 35A Mn-Cu-Co ternary alloys as tempered by cooling at 100°C/hour after heating at 400°C for 1 hour, following the cold-work of Fig. 35A Mn-Cu-Co ternary alloys as tempered by cooling at 100°C/hour after heating at 600°C for 1 hour, following the cold-work of Fig. 35A Mn-Cu-Co ternary alloys as tempered by cooling at 100°C/hour after heating at 800°C for 1 hour, following the cold-work of Fig. 35A Mn-Cu-Fe ternary alloys as water quenched after heating at 900°C for 1 hour, following the annealing of Fig. 26A Mn-Cu-Fe ternary alloys as tempered by cooling at 100°C/hour after heating at 200°C for 1 hour, following the quenching of Fig. 36A Mn-Cu-Fe ternary alloys as tempered by cooling at 100°C/hour after heating at 400°C for 1 hour, following the quenching of Fig. 36A Mn-Cu-Fe ternary alloys as tempered by cooling at 100°C/hour after heating at 600°C for 1 hour, following the quenching of Fig. 36A Mn-Cu-Fe ternary alloys as tempered by cooling at 100°C/hour after heating at 800°C for 1 hour, following the quenching of Fig. 36A Mn-Cu-Co ternary alloys as water quenched after heating at 900°C for 1 hour, following the annealing of Fig. 26B Mn-Cu-Co ternary alloys as tempered by cooling at 100°C/hour after heating at 200°C for 1 hour, following the quenching of Fig. 37A Mn-Cu-Co ternary alloys as tempered by cooling at 100°C/hour after heating at 400°C for 1 hour, following the quenching of Fig. 37A Mn-Cu-Co ternary alloys as tempered by cooling at 100°C/hour after heating at 600°C for 1 hour, following the quenching of Fig.37A Mn-Cu-Co ternary alloys as tempered by cooling at 100°C/hour after heating at 800°C for 1 hour, following the quenching of Fig.37A Mn-Cu-Mo alloys as annealed by cooling at 100°C/ hour after heating at 900°C for 1 hour Mn-Cu-W alloys as annealed by cooling at 100°C/hour after heating at 900°C for 1 hour Mn-Cu-Mo alloys as cold-worked with a working rate 96%, following the annealing of Fig. 38A Mn-Cu-Mo alloys as tempered by cooling at 100°C/hour after heating at 200°C for 1 hour, following the cold-work of Fig.39A Mn-Cu-Mo alloys as tempered by cooling at 100°C/hour after heating at 400°C for 1 hour, following the cold-work of Fig.39A Mn−Cu−Mo alloys as tempered by cooling at 100 °C/hour after heating at 600°C for 1 hour, following the cold-work of Fig. 39A Mn−Cu−Mo alloys as tempered by cooling at 100 °C/hour after heating at 800°C for 1 hour, following the cold-work of Fig. 39A Mn-Cu-W alloys as cold-worked with a working rate 96%, following the annealing of Fig. 38B Mn-Cu-W alloys as tempered by cooling at 100°C/hour after heating at 200°C for 1 hour, following the cold-work of Fig. 40A Mn-Cu-W alloys as tempered by cooling at 100°C/hour after heating at 400°C for 1 hour, following the cold-work of Fig. 40A Mn-Cu-W alloys as tempered by cooling at 100°C/hour after heating at 600°C for 1 hour, following the cold-work of Fig. 40A Mn-Cu-W alloys as tempered by cooling at 100°C/hour after heating at 800°C for 1 hour, following the cold-work of Fig. 40A Mn-Cu-Mo alloys as water quenched after heating at 900°C for 1 hour, following the annealing of Fig. 38A Mn-Cu-Mo alloys as tempered by cooling at 100°C/hour after heating at 200°C for 1 hour, following the water quenching of Fig. 41A Mn-Cu-Mo alloys as tempered by cooling at 100°C/hour after heating at 400°C for 1 hour, following the water quenching of Fig.41A Mn-Cu-Mo alloys as tempered by cooling at 100°C/hour after heating at 600°C for 1 hour, following the water quenching of Fig.41A Mn-Cu-Mo alloys as tempered by cooling at 100°C/hour after heating at 800°C for 1 hour, following the water quenching of Fig.41A Mn-Cu-W alloys as water quenched after heating at 900°C for 1 hour, following the annealing of Fig. 38B Mn-Cu-W alloys as tempered by cooling at 100°C/hour after heating at 200°C for 1 hour, following the water quenching of Fig.42A Mn-Cu-W alloys as tempered by cooling at 100°C/hour after heating at 400°C for 1 hour, following the water quenching of Fig. 42A Mn-Cu-W alloys as tempered by cooling at 100°C/hour after heating at 600°C for 1 hour, following the water quenching of Fig. 42A Mn-Cu-W alloys as tempered by cooling at 100°C/hour after heating at 800°C for 1 hour, following the water quenching of Fig. 42A Mn-Cu-Mo ternary alloys as annealed by cooling at 100°C/ hour after heating at 900°C for 1 hour Mn-Cu-W ternary alloys as annealed by cooling at 100°C/ hour after heating at 900°C for 1 hour Mn-Cu-Mo alloys as cold-worked at a working rate 96% after the annealing of Fig. 38A Mn-Cu-Mo alloys as tempered by cooling at 100°C/hour after heating at 200°C for 1 hour, following the cold-work of Fig. 46A Mn−Cu−Mo alloys as tempered by cooling at 100°C/hour after heating at 400°C for 1 hour, following the cold-work of Fig. 46A Mn−Cu−Mo alloys as tempered by cooling at 100°C/hour after heating at 600°C for 1 hour, following the cold-work of Fig. 46A Mn−Cu−Mo alloys as tempered by cooling at 100°C/hour after heating at 800°C for 1 hour, following the cold-work of Fig. 46A Mn-Cu-W alloys as cold-worked at a working rate 96% after the annealing of Fig. 38B Mn-Cu-W alloys as tempered by cooling at 100°C/hour after heating at 200°C for 1 hour, following the cold-work of Fig. 47A Mn-Cu-W alloys as tempered by cooling at 100°C/hour after heating at 400°C for 1 hour, following the cold-work of Fig. 47A Mn-Cu-W alloys as tempered by cooling at 100°C/hour after heating at 600°C for 1 hour, following the cold-work of Fig. 47A Mn-Cu-W alloys as tempered by cooling at 100°C/hour after heating at 800°C for 1 hour, following the cold-work of Fig. 47A Mn-Cu-Mo alloys as water quenched after heating at 900°C for 1 hour Mn-Cu-Mo alloys as tempered by cooling at 100°C/hour after heating at 200°C for 1 hour, following the water quenching of Fig. 48A Mn-Cu-Mo alloys as tempered by cooling at 100°C/hour after heating at 400°C for 1 hour, following the water quenching of Fig. 48A Mn-Cu-Mo alloys as tempered by cooling at 100°C/hour after heating at 600°C for 1 hour, following the water quenching of Fig.48A Mn-Cu-Mo alloys as tempered by cooling at 100°C/hour after heating at 800°C for 1 hour, following the water quenching of Fig.48A Mn-Cu-W alloys as water quenched after heating at 900°C for 1 hour Mn-Cu-W alloys as tempered by cooling at 100°C/hour after heating at 200°C for 1 hour, following the water quenching of Fig. 49A Mn-Cu-W alloys as tempered by cooling at 100°C/hour after heating at 400°C for 1 hour, following the water quenching of Fig. 49A Mn–Cu–W alloys as tempered by cooling at 100°C/hour after heating at 600°C for 1 hour, following the water quenching of Fig.49A Mn–Cu–W alloys as tempered by cooling at 100°C/hour after heating at 800°C for 1 hour, following the water quenching of Fig.49A United States Patent Office 3,725,052
Patented Apr. 3, 1973

3,725,052
NON-MAGNETIC RESILIENT MANGANESE-COPPER ALLOY HAVING A SUBSTANTIALLY TEMPERATURE-FREE ELASTIC MODULUS
Hakaru Masumoto, Shohachi Sawaya, and Michio Kikuchi, Sendai, Japan, assignors to The Foundation: The Research Institute of Electric and Magnetic Alloys, Sendai, Japan
Filed Sept. 10, 1970, Ser. No. 71,189
Claims priority, application Japan, Sept. 13, 1969, 44/72,548, 44/72,549; Mar. 13, 1970, 45/20,805; Aug. 18, 1970, 45/71,724
Int. Cl. C22c *33/00, 39/00*
U.S. Cl. 75—134 M    24 Claims

ABSTRACT OF THE DISCLOSURE

Non-magnetic resilient manganese-copper alloys having a temperature coefficient of Young's modulus in a range of $-20 \times 10^{-5}$ to $+20 \times 10^{-5}$, essentially consisting of 30 to 95 wt. percent of manganese, less than 70 wt. percent of copper, and 0 to 38 wt. percent of one or more optional sub-ingredients selected from the group consisting of 0 to 38 wt. percent of iron, molybdenum, tungsten, indium, and titanium, 0 to 30 wt. percent of nickel, 0 to 27 wt. percent of vanadium, gold, silver, and tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron.

---

This invention relates to non-magnetic resilient manganese-copper alloys having a substantially temperature-free Young's modulus, which can be used as excellent materials for inexpensive resilient members, such as watch springs, with a constant resiliency independent of foreseeable variations of ambient temperature.

Resilient members, whose resiliency is substantially constant independently of ambient temperature variation, have heretofore been made by using Elinvar alloys (about 37.5% of nickel, about 12% of chromium, about 50.5% of iron) and Coelinvar alloys (about 58% of cobalt, about 10% of chromium, about 32% of iron). Such known alloys have shortcomings in that they are expensive due to the large content of nickel or cobalt and they are ferromagnetic and susceptible to magnetization.

In order to obviate such difficulties of the known alloys, the inventors have carried out a series of studies, and succeeded in producing non-magnetic resilient manganese-copper alloys having a very small temperature coefficient of Young's modulus (or modulus of rigidity). Furthermore, the value of the elastic modulus of such manganese-copper alloys can be controlled by comparatively simple mechanical treatment and/or heat treatment.

An object of the present invention is to provide a non-magnetic resilient manganese-copper alloy having a temperature coefficient of $-20 \times 10^{-5}$ to $+20 \times 10^{-5}$ for elastic modulus in a temperature range of $-200°$ C. to $350°$ C., the temperature coefficient being $-5 \times 10^{-5}$ to $+5 \times 10^{-5}$ in a temperature range of $-50°$ C. to $80°$ C., which alloy essentially consists of 30 to 95 wt. percent of manganese, less than 70 wt. percent of copper, and 0 to 38 wt. percent of at least one optional subingredient selected from the group consisting of 38 wt. percent of iron, molybdenum, tungsten, indium, and titanium, 0 to 30 wt. percent of nickel, 0 to 27 wt. percent of vanadium, gold, silver, and tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron.

The alloy of the invention is less expensive than known Elinvar and Coelinvar. Furthermore, the non-magnetic properties of the alloys of the invention mitigate the aforesaid difficulty of the conventional Elinvar and Coelinvar alloy.

In the manganese-copper alloys of the invention, the manganese content and the copper content are limited to 30 to 95 wt. percent and less than 70 wt. percent, respectively, because compositions outside of the aforesaid range do not provide a sufficiently small temperature coefficient of elastic modulus (or rigidity modulus) necessary for constant elasticity of desired resilient members.

The quantity of the element or elements to be added to the basic manganese-copper composition is limited to 0 to 38 wt. percent of one or more optional subingredients selected from the group consisting of 0 to 38 wt. percent of iron, molybdenum, tungsten, indium, and titanium, 0 to 30 wt. percent of nickel, 0 to 27 wt. percent of vanadium, gold, silver, and tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron, because the addition of such element or elements at a concentration outside of the aforesaid range does not give the desired small temperature coefficient of Young's modulus.

Generally speaking, the hardness of an alloy increases with the manganese content therein. The addition of nickel tends to improve the workability of the alloy, while the addition of chromium, nickel, and/or cobalt tends to improve the corrosion resistivity of the alloy.

Both the non-magnetic properties and the temperature coefficient of elastic modulus (or rigidity modulus) of the alloy of the present invention can be controlled at a desired level by means of the following treatment.

PROCESS (A)

The alloy may be heated at a temperature above the solid solution line (line $\overline{abc}$ of FIG. 1) or at 600° C. or higher but below its melting point for at least one minute, preferably 5 minutes to 500 hours, for the sake of solution treatment, and annealed by gradually cooling at a speed slower than 1° C./sec.

PROCESS (B)

After the annealing of the process (A), the alloy may be cold-worked with a working rate of 1% or more. What is meant by the working rate is the percentage of the deformation caused by the cold-work, in terms of the cross sectional areas of the article before and after the cold-work.

PROCESS (C)

After the annealing of the process (A), the alloy may be heated at a temperature above the solid solution line or at 600° C. or higher but below its melting point for at least one minute, preferably for 5 minutes to 500 hours, and quenched by quickly cooling it at a rate faster than 1° C./sec., preferably 10° C./sec. to 500° C./sec.

PROCESS (D)

After the quenching of the process (C), the alloy may be cold-worked with a working rate of 1% or more, as defined in the process (B).

PROCESS (B')

After the cold-work of the process (B), the alloy may be heated at a comparatively low temperature below the aforesaid solid solution line for at least one minute, preferably 5 minutes to 500 hours, and tempered by gradually cooling at a rate slower than 1° C./sec.

PROCESS (C')

After the quenching of the process (C), the alloy may be heated at a comparatively low temperature below the aforesaid solid solution line for at least one minute, preferably 5 minutes to 500 hours, and tempered by gradually cooling at a rate slower than 1° C./sec.

PROCESS (D')

After the cold-work of the process (D), the alloy may be heated at a comparatively low temperature below the aforesaid solid solution line for at least one minute, preferably 5 minutes to 500 hours, and tempered by gradually cooling at a rate slower than 1° C./sec.

The alloys of the present invention and articles consisting of such alloys can be made in the following manner. In the desired alloy, if the total content of nickel, cobalt, and/or iron therein amounts to 10% or more of the entire alloy composition, such nickel, cobalt, and/or iron are melted together in a furnace at the beginning. On the other hand, if the total content of nickel, cobalt, and/or iron is less than 10% of the entire alloy composition, manganese is melted in a furnace at the beginning, rather than the last mentioned nickel, cobalt, and/or iron. The remaining elements of the alloy are then added in the molten metal or metals thus prepared. The molten alloy is thoroughly agitated for providing a homogeneous molten alloy. The molten alloy is then poured into a mould to produce an ingot, which is then forged, rolled, or swaged at room temperature or higher but below its melting point. Thus, a body of desired shape is provided.

The body thus obtained is then heat-treated by one of the above referred processes, so as to produce a desired resilient member having a substantially constant elastic modulus independent of variation of the ambient temperature. The above cold-work of the process (B) or (D) can, of course, be used for shaping the ingot into the desired shape.

For a better understanding of the invention, reference is made to the accompanying drawings, in which:

FIG. 1 is an equilibrium diagram of manganese-copper binary alloy system;

FIGS. 2A and 2B are graphs illustrating the relation between the manganese concentration in the manganese-copper alloy and physical properties of the alloy, i.e., the Vickers hardness, the Young's modulus, the density at 20° C., the mean coefficient of the linear expansion $\alpha$ between 0° C. and 40° C., and the mean temperature coefficient of Young's modulus $e$ between 0° C. and 40° C., for the state as annealed, as cold-worked, and as tempered at different temperatures;

FIGS. 6A to 6J and FIGS. 7A to 7K are graphs showing the relation of the temperature coefficient of Young's modulus $e$, 0° C. to 40° C., and Vickers hardness of the alloys of the invention with the heating temperature for tempering, which tempering being effected after either cold-work with a working rate 96% or water quenching, respectively;

FIGS. 8A to 8D and FIGS. 9A and 9D show the Young's modulus of the alloys of the invention at different temperatures, which alloys are tempered after either cold-work with a working rate 96% or water quenching, respectively;

FIGS. 32A and 32B are graphs showing the relation between the mean temperature coefficient of Young's modulus $e$, 0° C. to 40° C., of ternary alloys of the invention and the quenching temperature of the water quenching applied thereto, for manganese-copper-iron and manganese-copper-cobalt systems, four specimens each, respectively;

Figure 1:
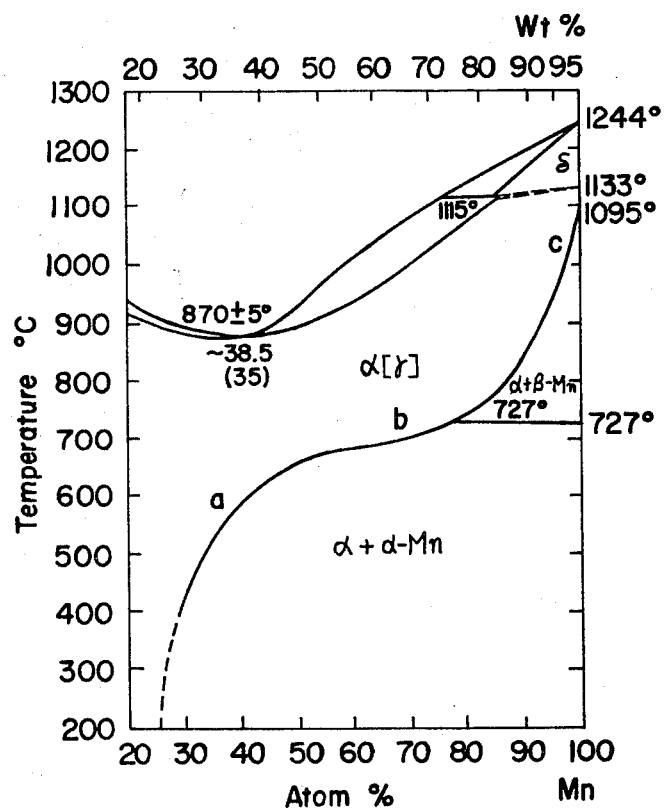

FIGS. 46A to 46E and FIGS. 47A to 47E illustrate the Young's moduli of manganese-copper-molybdenum ternary alloys and manganese-copper-tungsten ternary alloys, respectively, for the state as cold-worked with a working rate of 96% after the annealing and the state as tempered under different conditions after the cold-work; and FIGS. 48A to 48E and FIGS. 49A to 49E illustrate the Young's moduli of manganese-copper-molybdenum ternary alloys and manganese-copper-tungsten ternary alloys, respectively, for the state as water quenched after the annealing and for the state as tempered under different conditions after the water quenching.

The invention will now be described in detail, by referring to examples.

EXAMPLE 1

Ingredients of different samples (each sample weighing about 500 grams) of manganese-copper binary alloys consisting of 0 to 100 wt. percent of manganese and 0 to 100 wt. percent of copper were melted in alumina crucibles, which were disposed in a high-frequency induction furnace or an electric resistance furnace, while passing argon gas therethrough. The molten ingredients were thoroughly agitated, and poured into iron moulds, for producing cylindrical ingots of about 10 mm. dia.

The ingots thus produced were heat at temperatures which are 80° C. below their melting points, respectively, for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens which were used for the measurement of the effects of the aforesaid cold-work of the process (B).

Some of the about 11 cm. long specimens of about 2 mm. dia were heated at temperatures which are 80° C. below their melting points, respectively, for 1 hour. It is known to those skilled in the art that, as far as the resiliency of alloys is concerned, such heating at a solution treatment temperature (for instance, slightly below the melting point) for 1 hour brings the alloy structure to a condition prior to the cold-work of the process (B).

Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at the aforesaid temperature which is 80° C. below the melting point. The first group specimens were annealed by cooling at a speed of 100° C./hour, which were used for the measurement of the effect of the aforesaid annealing of the process (A). The second group specimens were water quenched for the measurement of the effects of the aforesaid water quenching of the process (C).

Some of the aforesaid specimens subjected to cold-work of the process (B) and the quenching of the process (C) were again heated at various temperatures below 600° C. for 1 hour, and cooled at a speed of 100° C./hour, so as to provide specimens for the measurement of the effects

TABLE 1.—PROPERTIES OF MANGANESE-COPPER ALLOYS

| Alloy composition | | (A) After heating at a temperature 80° C. below the melting point for 1 hour, annealed by cooling at 100° C./hour | | | | (C) After the annealing, reheated at a temperature 80° C. below the melting point for 1 hour and water quenched | | | | (B) After the annealing, cold-worked with a working rate of 96% | | | |
|---|---|---|---|---|---|---|---|---|---|---|---|---|---|
| Cu (percent) | Mn (percent) | Young's modulus (kg./cm.², 20° C.) | Modulus of rigidity (kg./cm.², 20° C.) | Temperature coefficient of Young's modulus $e$ (0–40° C.) | Temperature coefficient of modulus of rigidity (0–40° C.) | Vickers hardness (20° C.) | Young's modulus (kg./cm.², 20° C.) | Modulus of rigidity (kg./cm.², 20° C.) | Temperature coefficient of Young's modulus $e$ (0–40° C.) | Temperature coefficient of modulus of rigidity (0–40° C.) | Vickers hardness (20° C.) | Young's modulus (kg./cm.², 20° C.) | Modulus of rigidity (kg./cm.², 20° C.) | Temperature coefficient of Young's modulus $e$ (0–40° C.) | Temperature coefficient of modulus of rigidity (0–40° C.) | Vickers hardness (20° C.) |
| 57.46 | 42.54 | 12.5×10⁵ | 5.0×10⁵ | +5.0×10⁻⁵ | +4.4×10⁻⁵ | 130 | | | | | | | | | | |
| 56.40 | 43.60 | 12.7×10⁵ | 5.0×10⁵ | +14.7×10⁻⁵ | +13.5×10⁻⁵ | 132 | | | | | | | | | | |
| 56.30 | 43.70 | 12.8×10⁵ | 5.1×10⁵ | −3.0×10⁻⁵ | −4.0×10⁻⁵ | 132 | | | | | | | | | | |
| 57.98 | 42.02 | | | | | | 11.5×10⁵ | 4.3×10⁵ | +10.1×10⁻⁵ | +9.5×10⁻⁵ | 130 | | | | |
| 56.97 | 43.03 | | | | | | 11.4×10⁵ | 4.3×10⁵ | +0.3×10⁻⁵ | −0.9×10⁻⁵ | 131 | | | | |
| 57.88 | 42.12 | | | | | | 10.2×10⁵ | 4.2×10⁵ | +0.5×10⁻⁵ | +0.1×10⁻⁵ | 113 | | | | |
| 37.90 | 62.10 | | | | | | | | | | | 8.9×10⁵ | 4.1×10⁵ | −17.1×10⁻⁵ | −18.2×10⁻⁵ | 196 |
| 36.02 | 63.98 | | | | | | | | | | | 8.8×10⁵ | 4.1×10⁵ | +0.2×10⁻⁵ | −0.5×10⁻⁵ | 195 |
| 28.99 | 71.01 | | | | | | | | | | | 8.6×10⁵ | 4.1×10⁵ | −1.0×10⁻⁵ | +0.5×10⁻⁵ | 182 |

(C') After the water quenching, heated at 300° C. for 1 hour and cooled at 100° C./hour (B') After cold-worked, heated at 300° C. for 1 hour and cooled at 100° C./hour

| 59.98 | 40.02 | | | | | | 11.7×10⁵ | 4.4×10⁵ | −7.5×10⁻⁵ | −8.5×10⁻⁵ | 122 | | | | |
| 56.97 | 43.03 | | | | | | 11.6×10⁵ | 4.4×10⁵ | −7.0×10⁻⁵ | −8.0×10⁻⁵ | 123 | | | | |
| 35.88 | 64.10 | | | | | | 10.3×10⁵ | 4.3×10⁵ | +11.2×10⁻⁵ | +10.5×10⁻⁵ | 117 | | | | |
| 38.90 | 61.10 | | | | | | | | | | | 9.1×10⁵ | 4.2×10⁵ | −9.6×10⁻⁵ | −9.0×10⁻⁵ | 195 |
| 35.23 | 64.77 | | | | | | | | | | | 8.9×10⁵ | 4.2×10⁵ | +7.5×10⁻⁵ | +7.1×10⁻⁵ | 185 |
| 30.65 | 69.35 | | | | | | | | | | | 8.8×10⁵ | 4.2×10⁵ | +0.5×10⁻⁵ | +0.3×10⁻⁵ | 195 |

(C') After the water quenching, heated at 400° C. for 1 hour and cooled at 100° C./hour (B') After cold-worked, heated at 400° C. for 1 hour and cooled at 100° C./hour

| 55.90 | 44.10 | | | | | | 11.7×10⁵ | 4.5×10⁵ | −9.0×10⁻⁵ | −9.4×10⁻⁵ | 129 | | | | |
| 54.87 | 45.13 | | | | | | 11.4×10⁵ | 4.5×10⁵ | −4.5×10⁻⁵ | −4.8×10⁻⁵ | 130 | | | | |
| 52.87 | 47.13 | | | | | | 11.4×10⁵ | 4.5×10⁵ | +6.2×10⁻⁵ | +5.8×10⁻⁵ | 130 | | | | |
| 57.89 | 42.11 | | | | | | | | | | | 10.5×10⁵ | 4.3×10⁵ | −12.0×10⁻⁵ | −12.5×10⁻⁵ | 222 |
| 46.68 | 53.32 | | | | | | | | | | | 9.5×10⁵ | 4.3×10⁵ | +3.5×10⁻⁵ | +3.0×10⁻⁵ | 211 |
| 30.92 | 69.08 | | | | | | | | | | | 9.1×10⁵ | 4.3×10⁵ | −7.5×10⁻⁵ | −8.0×10⁻⁵ | 236 |

(C') After the water quenching, heated at 600° C. for 1 hour and cooled at 100° C./hour (B') After cold-worked, heated at 600° C. for 1 hour and cooled at 100° C./hour

| 57.00 | 43.00 | | | | | | 11.8×10⁵ | 4.8×10⁵ | −10.5×10⁻⁵ | −10.8×10⁻⁵ | 135 | | | | |
| 56.49 | 43.51 | | | | | | 11.8×10⁵ | 4.8×10⁵ | −3.1×10⁻⁵ | −3.6×10⁻⁵ | 136 | | | | |
| 55.98 | 44.02 | | | | | | 11.8×10⁵ | 4.8×10⁵ | −13.6×10⁻⁵ | −13.3×10⁻⁵ | 138 | | | | |
| 6.00 | 94.00 | | | | | | 14.7×10⁵ | 5.2×10⁵ | −15.6×10⁻⁵ | −16.0×10⁻⁵ | 1,153 | | | | |
| | | | | | | | | | | | | 15.6×10⁵ | 5.5×10⁵ | −19.0×10⁻⁵ | −19.3×10⁻⁵ | 1,085 |

(B') After cold-worked, heated at 700° C. for 1 hour and cooled at 100° C./hour

| 56.97 | 43.03 | | | | | | | | | | | 12.0×10⁵ | 4.6×10⁵ | −2.5×10⁻⁵ | −2.8×10⁻⁵ | 133 |
| 54.90 | 45.10 | | | | | | | | | | | 12.2×10⁵ | 4.6×10⁵ | +14.6×10⁻⁵ | +14.0×10⁻⁵ | 142 |
| 53.82 | 46.18 | | | | | | | | | | | 12.3×10⁵ | 4.7×10⁵ | −5.0×10⁻⁵ | −5.8×10⁻⁵ | 165 | of the aforesaid tempering of the processes (B') and (C'), respectively.

The Young's modulus of the specimens was determined by measuring the resonant frequency thereof by a device having a sensitive electrostatic capacitor, and calculating the value of the Young's modulus from the resonant frequency thus measured.

The coefficient of linear expansion $\alpha$ of the specimens in the proximity of room temperature was measured by using a precision linear dilatometer of vertical type.

FIG. 1 is an equilibrium diagram of Mn-Cu alloy, based on Hansen's equilibrium diagram of binary alloys.

Figure 2A:
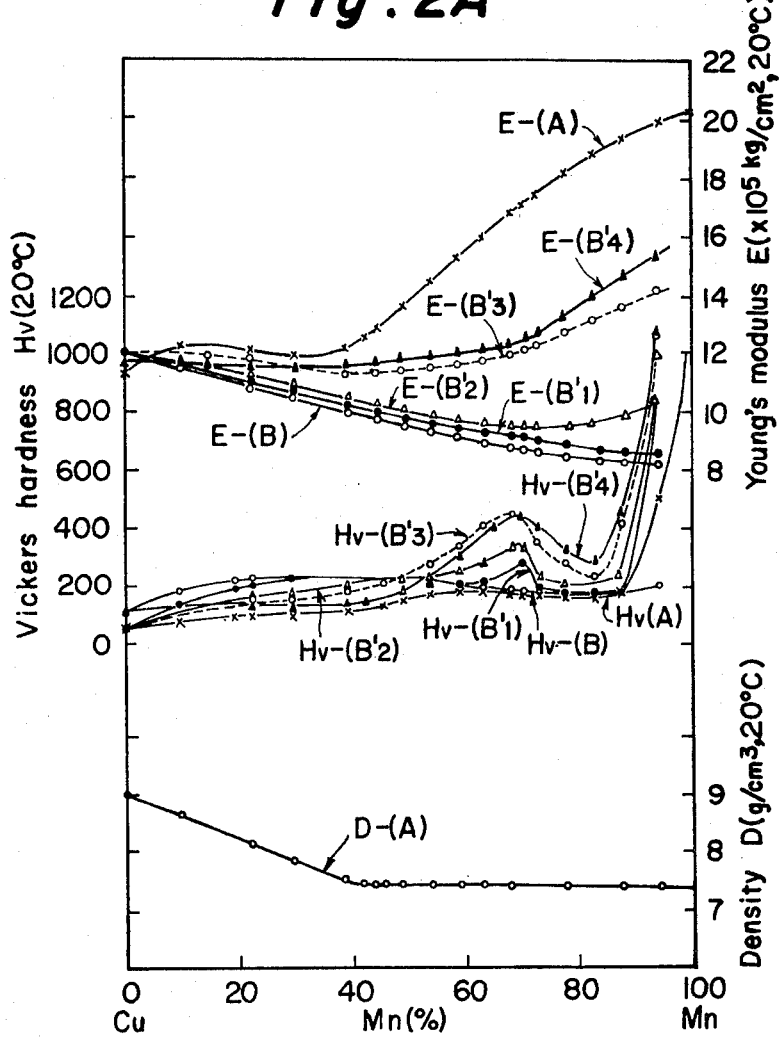
Figure 2B:
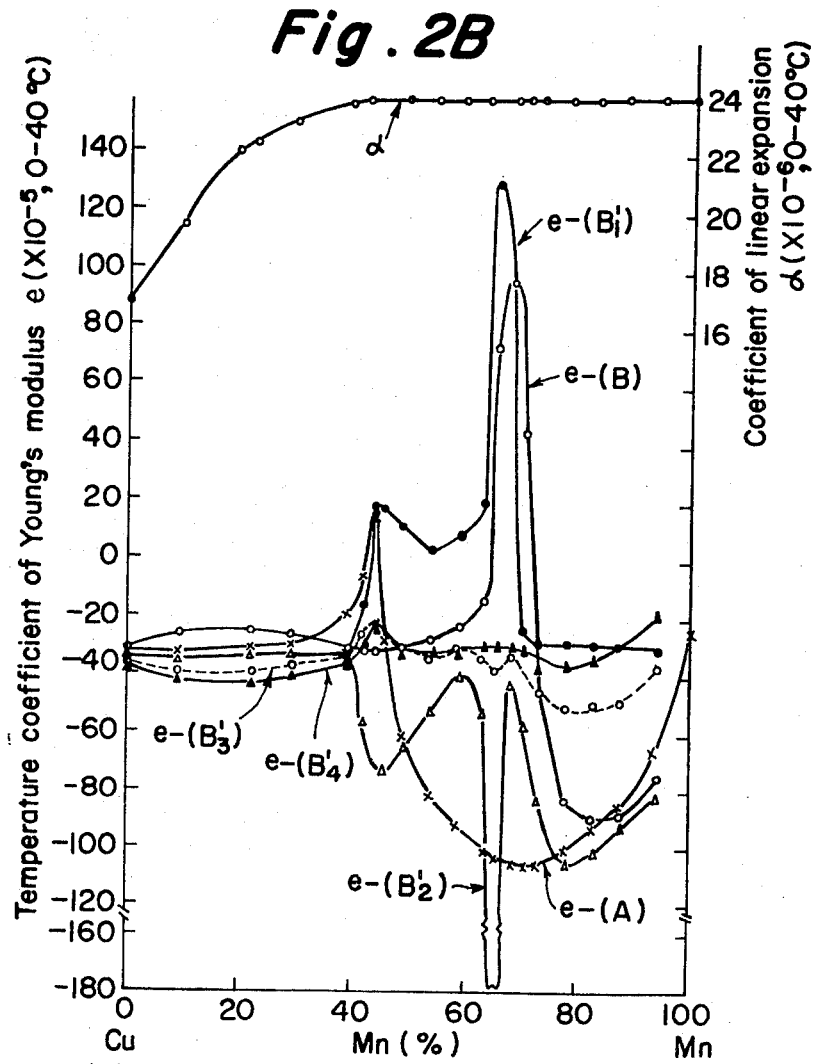

FIG. 2A and 2B illustrate physical properties of Mn-Cu alloys of different compositions, under the conditions as annealed (A), as cold-worked (B), and as tempered, ($B_1'$) to ($B_4'$); the properties illustrated include the density, Young's modulus, and Vickers hardness at 20° C., and the mean coefficient of linear expansion and the mean temperature coefficient of Young's modulus between 0° C. and 40° C.

Figure 3A:
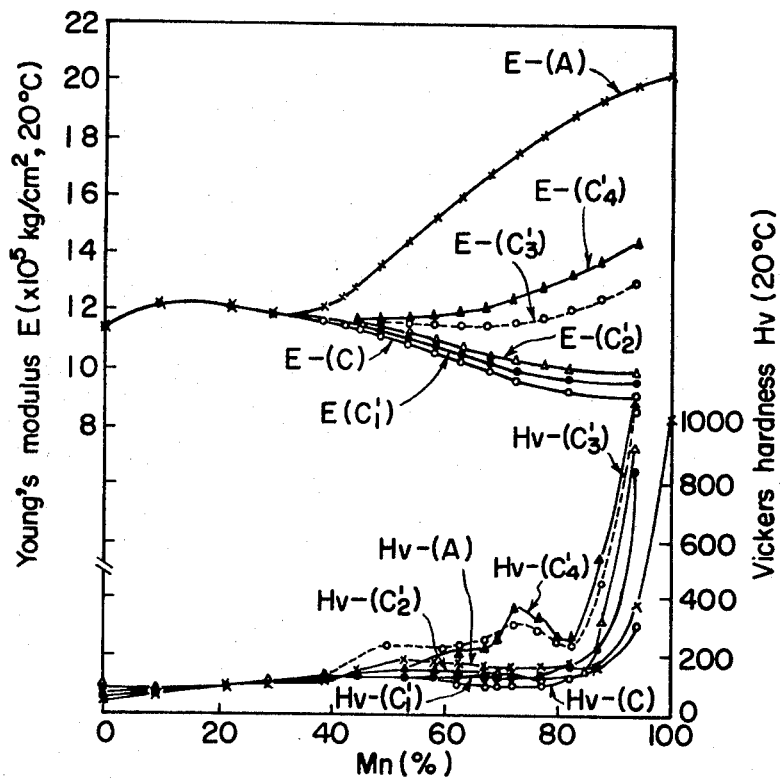
FIGS. 3A and 3B are graphs similar to FIGS. 2A and 2B, respectively, except that the above referred properties of the alloy are shown for the state as water quenched and as tempered at different temperatures.
Figure 3B:
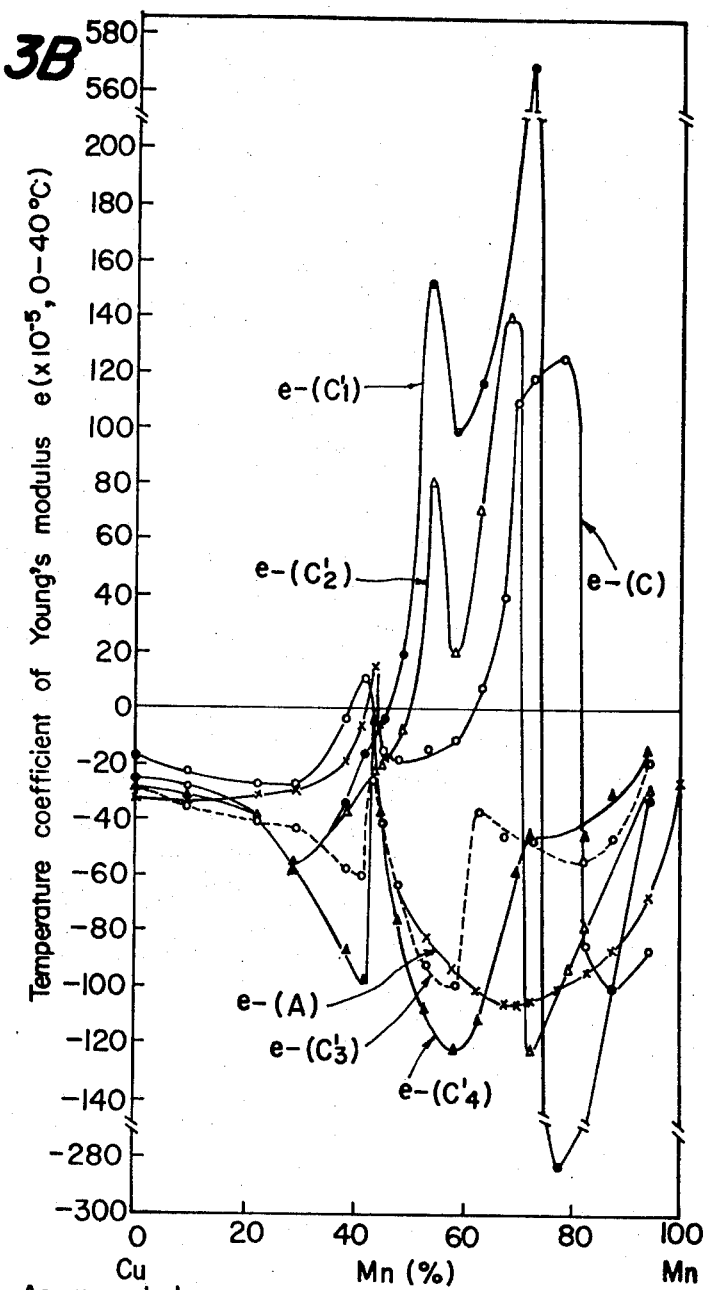

Similarly, FIGS. 3A and 3B illustrate properties of Mn-Cu of different compositions, under the conditions as annealed (A), as water quenched (C), and as tempered ($C_1'$) to ($C_4'$). FIGS. 3A and 3B show the similar physical properties as FIGS. 2A and 2B, except that the former do not show the density and the coefficient of linear expansion.

Table 1 shows typical values of the physical properties, inclusive of Vickers hardness, of the binary alloys with a composition falling in the range of the present invention.

Figure 4:
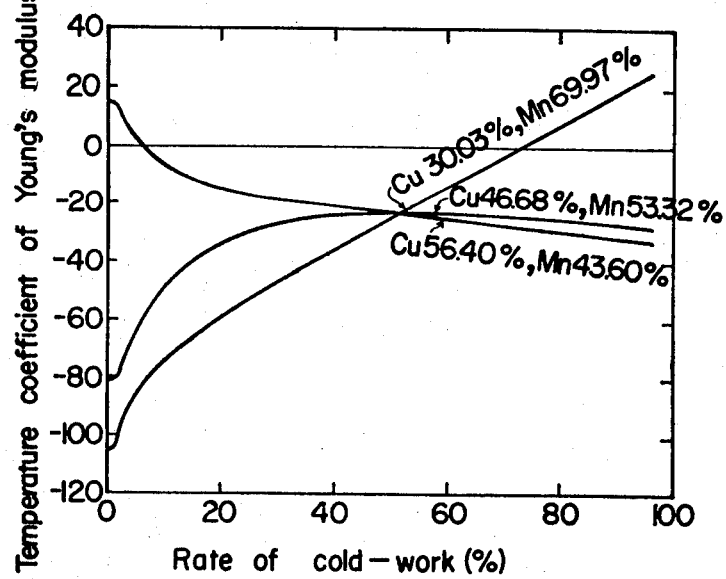
FIG. 4 is a graph illustrating the relation between the working rate of the cold-work on the alloy of the invention and its mean temperature coefficient of Young's modulus $e$, between 0° C. and 40° C.

FIG. 4 shows the relation between the Young's modulus and the working rate, for three different binary alloys of the invention. Table 2 shows the temperature coefficient of Young's modulus of the alloys of FIG. 4, for different cooling speeds.

subjected to cold-work with a working rate of 96%, after the annealing as described hereinbefore by referring to FIGS. 2A and 2B, and then heated for 1 hour at different temperatures, as shown in FIGS. 6A to 6J, before being cooled at a speed of 100° C./hour.

FIGS. 7A to 7K show the effects of the heating temperature for tempering (C') after the water quenching (C) on the mean temperature coefficient of Young's modulus $e$ and the Vickers hardness Hv for different binary alloys of the invention. The alloys of the figures were annealed and water quenched, as described hereinbefore by referring to FIGS. 3A and 3B, and then heated for 1 hour at different temperatures, as indicated in FIGS. 7A to 7K, before being cooled at a speed of 100° C./hour.

In FIGS. 6A to 6J and 7A to 7K, the mean temperature coefficients of Young's modulus $e$ refer to the values between 0° C. and 40° C., and the Vickers hardness indicates the values at room temperature.

Figure 8A:
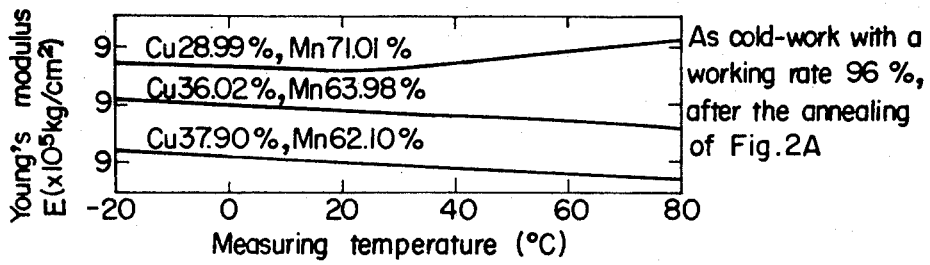
Figure 8B:
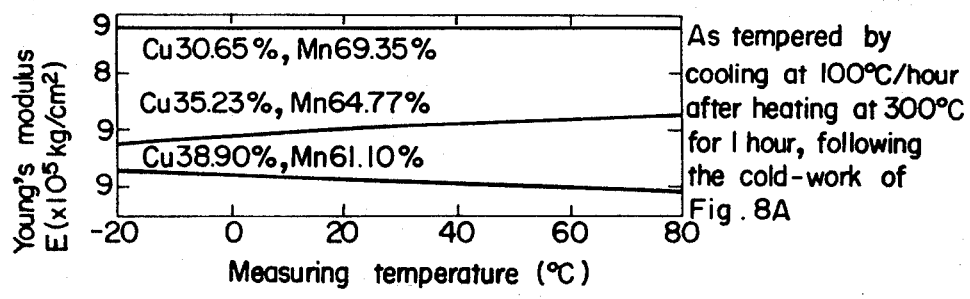
Figure 8C:
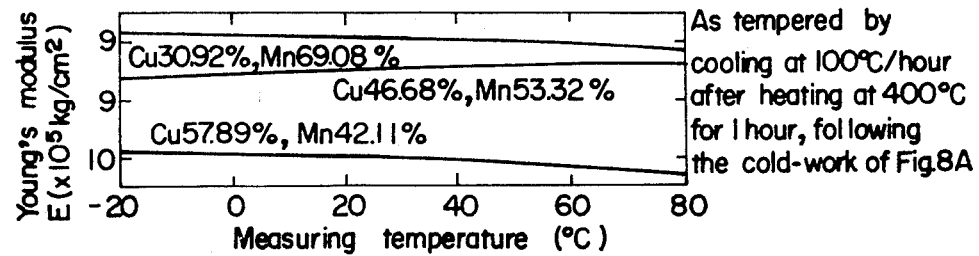
Figure 9C:
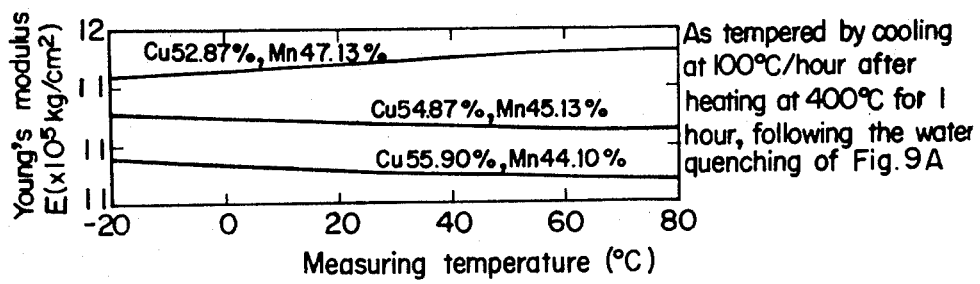
Figure 9D:
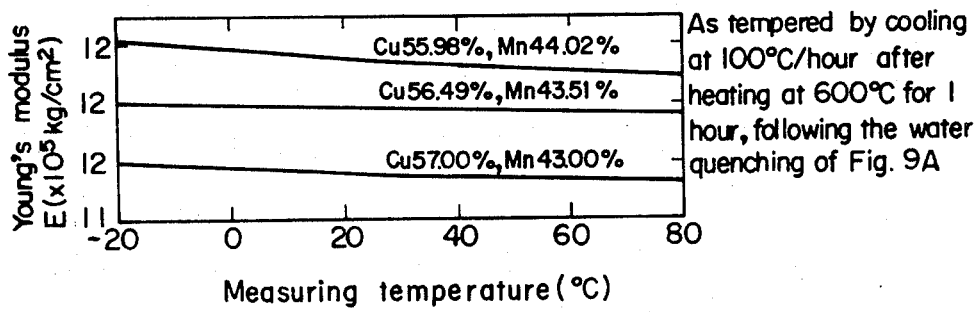

FIG. 8A shows the values of Young's modulus of three different binary alloys of the invention, for the state as cold-worked (B) with a working rate of 96% after the aforesaid annealing (A), which annealing was carried out by heating the alloy for 1 hour at a temperature 80° C. below the melting point and cooling at a speed of 100° C./hour. FIGS. 8B to 8D show the values of Young's modulus of the same alloys for the state as tempered (B') following the last referred cold-work (B); namely, the alloys were reheated at the specified temperatures for 1 hour and then cooled at a speed of 100° C./hour.

FIGS. 9A to 9D illustrate the values of Young's modulus of three different binary alloys of the invention at different temperatures. FIGS. 9A to 9D refer to four different states of the alloys; namely, as water quenched

TABLE 2

[Relation between mean temperature coefficient of Young's modulus $e$, 0° C. to 40° C. and cooling speed for Mn-Cu alloy]

| Alloy composition | | Cooling speed after heating at a temperature 80° C. below the melting point for 1 hour | | | |
|---|---|---|---|---|---|
| Mn (wt. percent) | Cu (wt. percent) | 170° C./sec. (water quenched) | 9° C./sec. (air quenched) | 500° C./hour (annealed) | 100° C./hour (annealed) |
| 43.60 | 56.40 | $-9.0 \times 10^{-5}$ | $+0.2 \times 10^{-5}$ | $+11.1 \times 10^{-5}$ | $+14.7 \times 10^{-5}$ |
| 53.32 | 46.68 | $-15.0 \times 10^{-5}$ | $-40.1 \times 10^{-5}$ | $-71.5 \times 10^{-5}$ | $-82.0 \times 10^{-5}$ |
| 69.97 | 30.03 | $+109.0 \times 10^{-5}$ | $+29.2 \times 10^{-5}$ | $-70.0 \times 10^{-5}$ | $-106.0 \times 10^{-5}$ |

Figure 5:
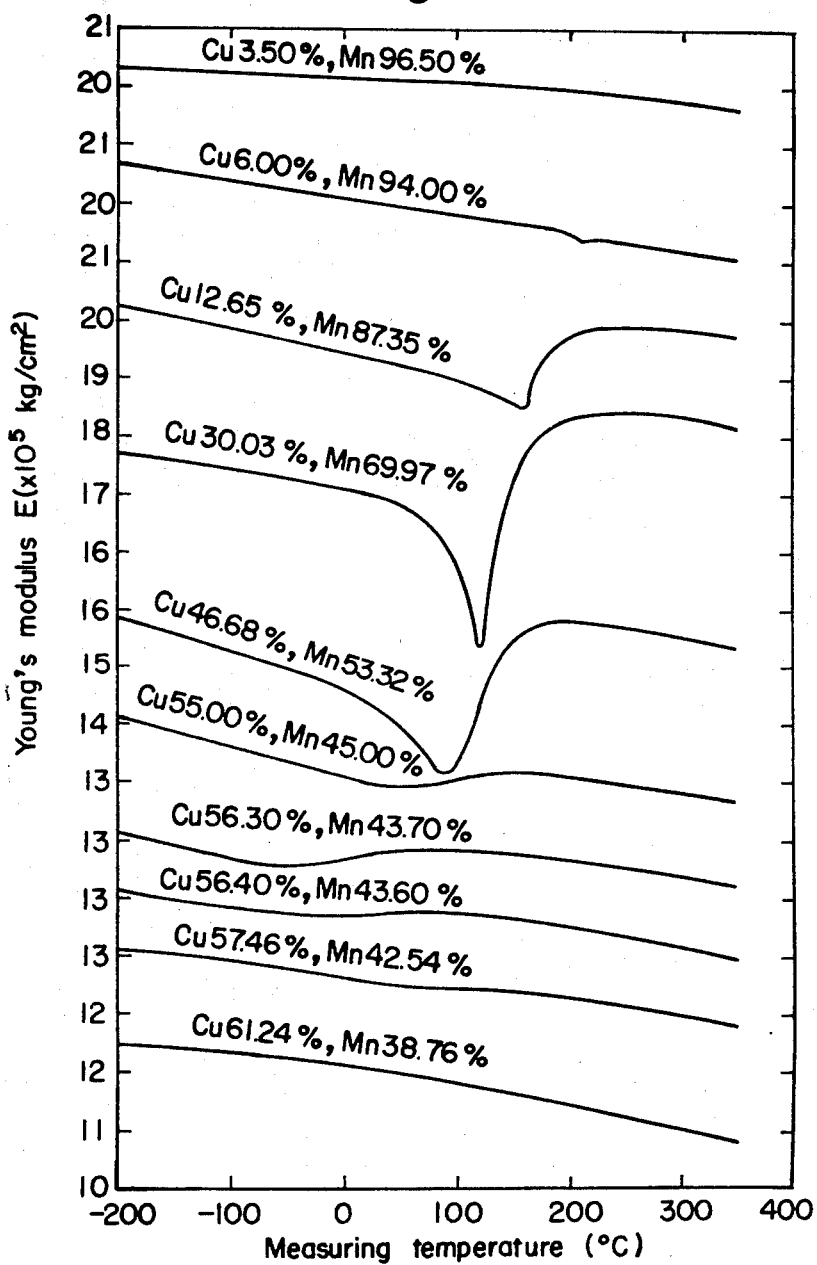
FIG. 5 is a graph showing the values of Young's modulus of ten different alloys of the invention at different temperatures between −200° C. and 350° C., which alloys are slowly cooled after heating at a temperature which is 80° C. below the melting point.
Figure 6C:
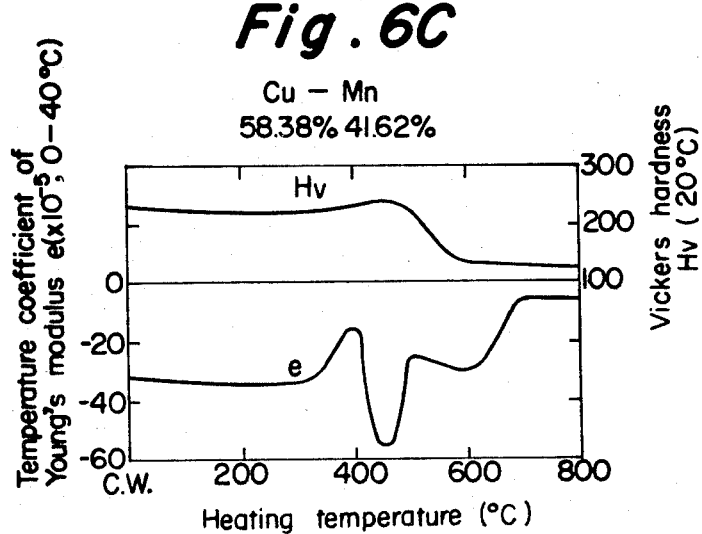
Figure 6D:
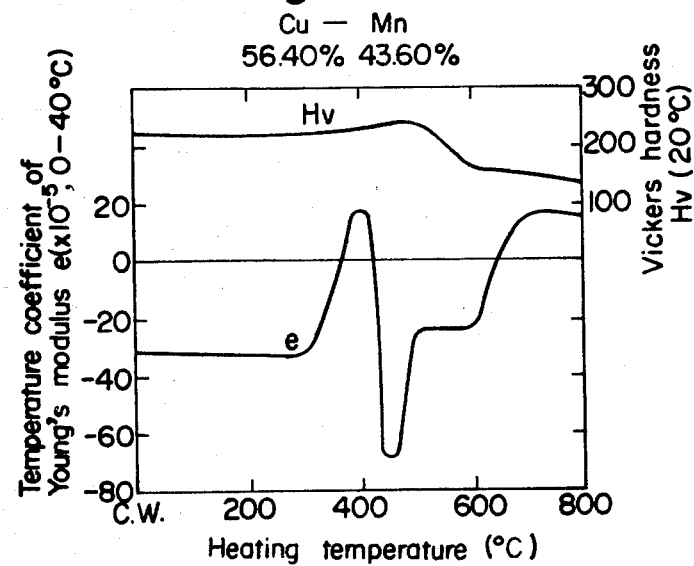
Figure 6E:
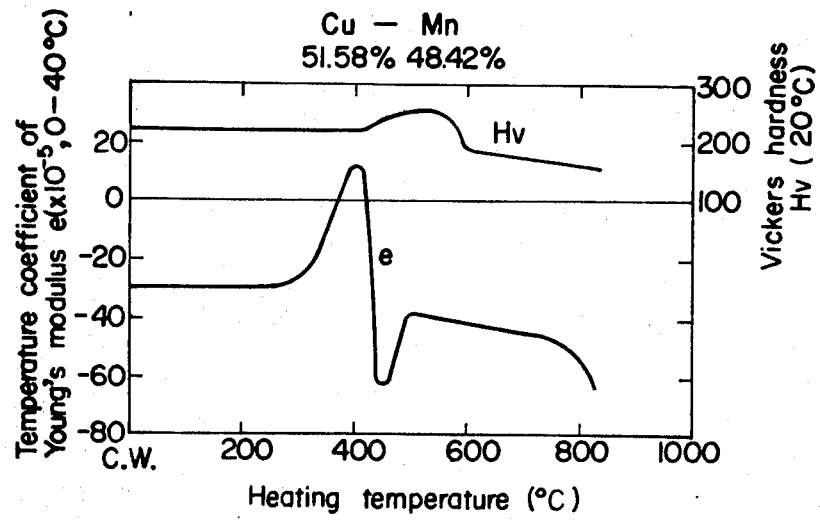
Figure 6F:
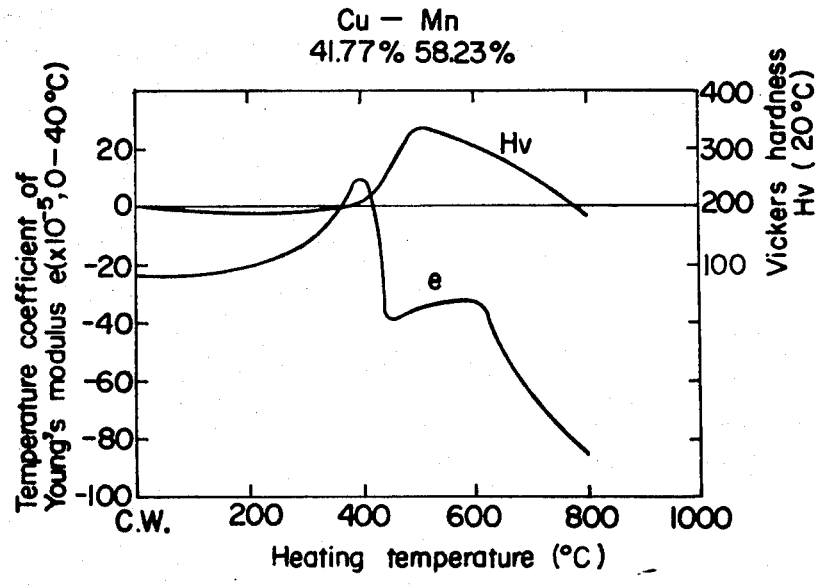
Figure 6I:
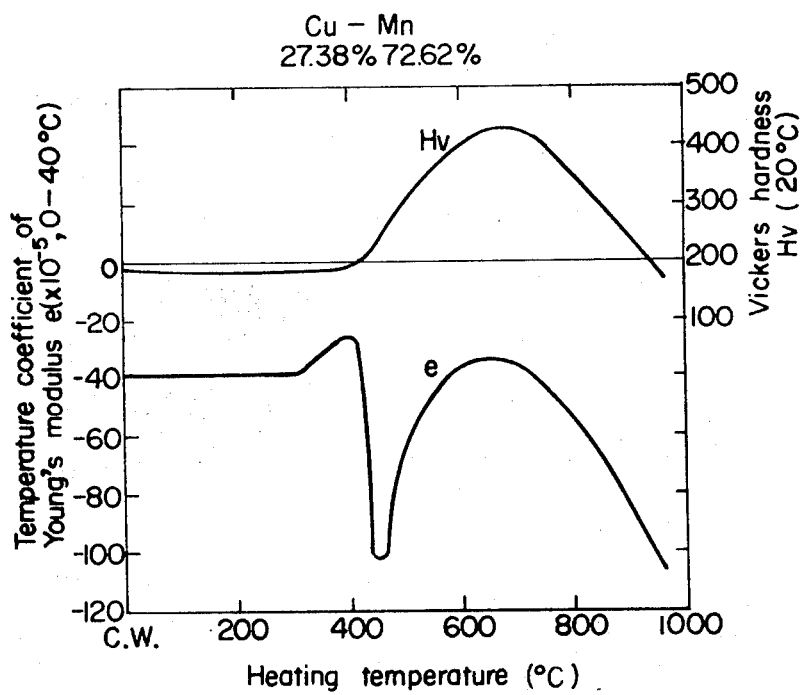
Figure 7A:
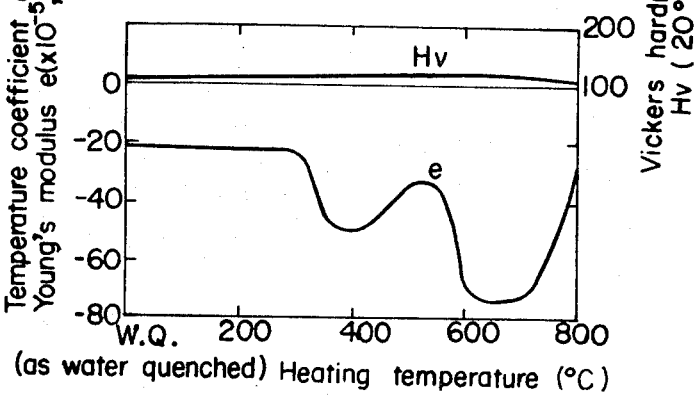
Figure 7B:
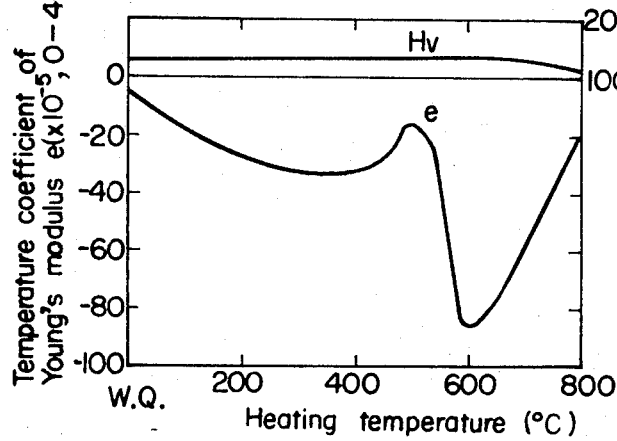
Figure 7E:
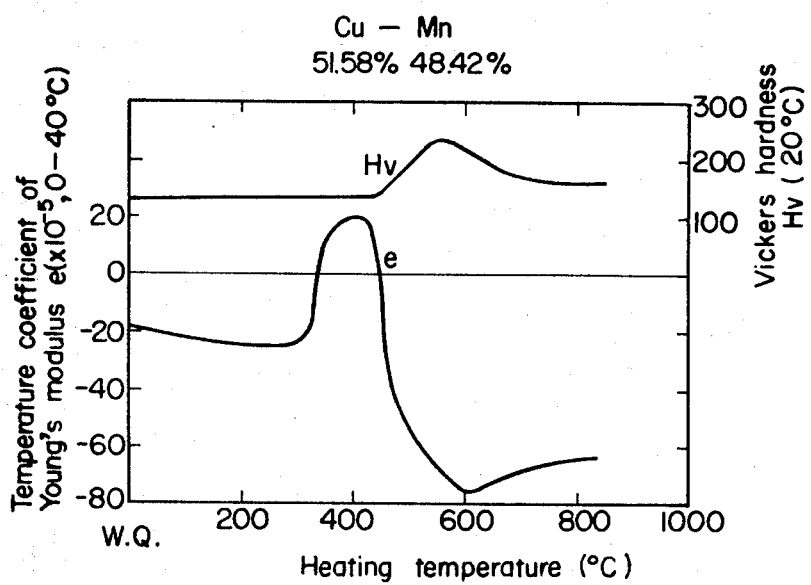
Figure 7G:
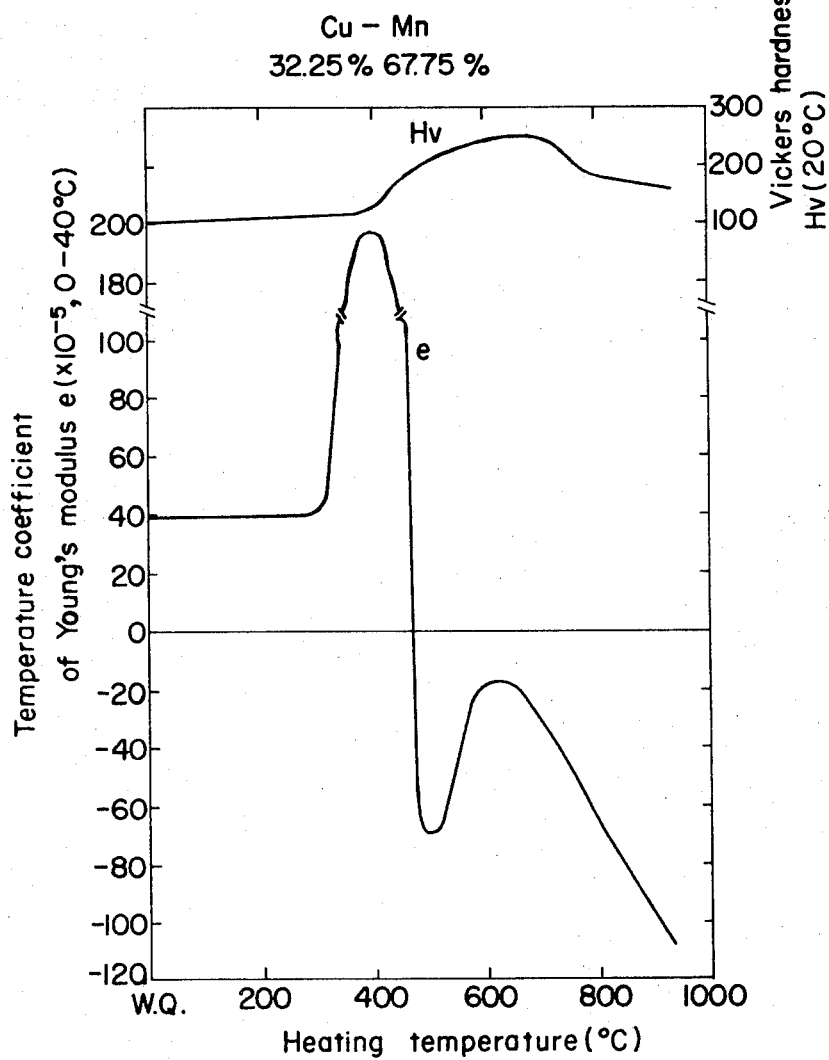
Figure 7J:
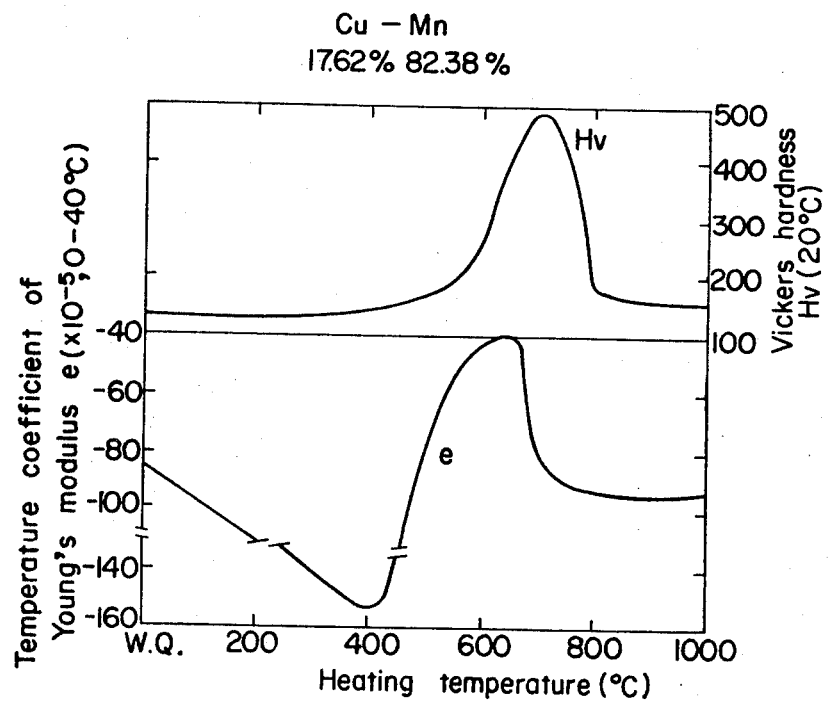
Figure 7K:
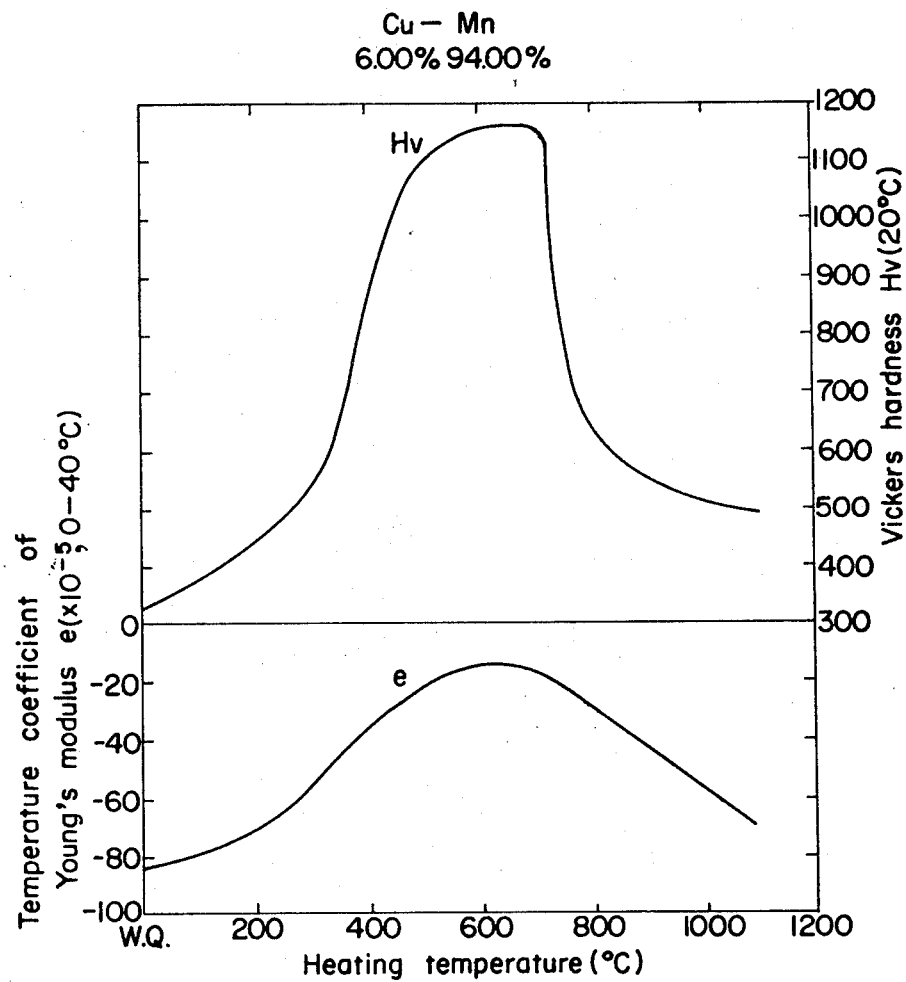

FIG. 5 illustrates the Young's modulus of ten different binary alloys of the invention at different temperatures, for the state as annealed (A) by cooling at 100° C./hour after heating at a temperature 80° C. below the melting point for 1 hour.

Table 3 shows the temperature coefficient of Young's modulus $e$ of the alloys of FIG. 6, as determined from the values of Young's modulus in the figure. Table 3 shows only those temperature coefficients, which fall in a range between $-20 \times 10^{-5}$ to $+20 \times 10^{-5}$, together with temperature ranges wherein the temperature coefficents are valid.

(C) after being annealed (A) by cooling at a speed of 100° C./hour upon completion of heating for 1 hour at a temperature 80° C. below the melting point, as tempered (C') by reheating the alloys of the state (C) at three different temperatures, i.e., 300° C., 400° C., and 600° C., respectively, for 1 hour and cooling at a speed of 100° C./hour.

As can be seen from FIGS. 2A and 2B, manganese-copper binary alloys consisting of 30 to 95 wt. percent of manganese and less than 70 wt. percent of copper have temperature coefficients of Young's modulus $e$ ranging from a comparatively large negative value to a compara-

TABLE 3

| Mn (percent) | Cu (percent) | Temperature coefficient of Young's modulus $e$ ($\times 10^{-5}$) (temperature range) | | | | | |
|---|---|---|---|---|---|---|---|
| 38.76 | 61.24 | $-19.2$ (0°–40° C.) | | | | | |
| 42.54 | 57.46 | $-9.2$ (0°–50° C.) | $-8.7$ (50°–100° C.) | $-15.0$ (100°–150° C.) | | | |
| 43.60 | 56.40 | $-1.2$ (−50°–0° C.) | $+1.1$ (0°–75° C.) | $-10.5$ (75°–125° C.) | | | |
| 43.70 | 56.30 | $-11.0$ (−105°-−75° C.) | $-0.3$ (−75°-−25° C.) | $+14.1$ (−25°–25° C.) | $+14.4$ (30°–80° C.) | $+0.3$ (80°–120° C.) | $-11.2$ (120°–170° C.) |
| 45.00 | 55.00 | $-18.2$ (40°–50° C.) | $+3.8$ (50°–80° C.) | $+19.3$ (80°–90° C.) | $+19.2$ (120°–130° C.) | $+2.6$ (130°–17.)° C.) | $-15.6$ (170°–220° C.) |
| 53.32 | 46.68 | | $+5.5$ (93°–97° C.) | | | $+4.5$ (180°–220° C.) | $-19.3$ (220°–240° C.) |
| 69.97 | 40.03 | | $+5.8$ (123°–125° C.) | | | $-0.5$ (225°–275° C.) | $-18.4$ (275°–300° C.) |
| 87.35 | 12.65 | | $-5.7$ (160°–163° C.) | | | $+6.5$ (230°–265° C.) | $-17.6$ (280°–330° C.) |
| 94.00 | 6.00 | | $-4.5$ (190°–200° C.) | | | $-3.5$ (220°–230° C.) | $-18.1$ (230°–250° C.) |

FIGS. 6A to 6J show the effects of the heating temperature for tempering (B') after the cold-work (B) on the mean temperature coefficient of Young's modulus $e$ and the Vickers hardness Hv, for different binary alloys of the present invention. The alloys of the figures were tively large positive value, depending on the composition of the alloys, in any of the states as annealed (A), as cold-worked (B) with a working rate of 96% after the annealing, and as tempered (B') after the cold-work. Accordingly, those Mn-Cu alloys, whose temperature coefficient of Young's modulus $e$ falls in a narrow range crossing the zero line between a negative value domain and a positive value domain, have the so-called Elinvar characteristics or temperature-independent elasticity.

FIGS. 2A and 2B also show that both the Young's modulus E and the modulus of rigidity of such binary alloys vary considerably extensively depending on the heat treatment applied thereto.

FIGS. 3A and 3B show that the water quenching (C) and the tempering (C') after the water quenching also cause a considerably extensive variation of the physical properties of the manganese-copper binary alloys consisting of 35 to 94 wt. percent of manganese and 6 to 65 wt. percent of copper, which physical properties include the temperature coefficient of Young's modulus $e$, the Young's modulus E per se, and the Vickers hardness Hv. Such variation also includes the so-called Elinvar characteristics over a wide range of the composition of the binary alloys.

In the case of FIGS. 2A and 2B, the working rate for the cold-work process was 96%. FIG. 4 illustrates the effects of different working rates, or different degrees of cold-work, on the temperature coefficient of Young's modulus $e$, for three different binary alloys of the invention. As can be seen from the figure, the temperature coefficient $e$ of the alloys of the invention can be improved by cold-work, even by slight cold-work with a working rate as small as 1%.

In the case of the heat treatments of FIGS. 3A and 3B, the annealing was carried out by cooling the alloys to room temperature at a speed of 100° C./hour after heating for 1 hour at a temperature 80° C. below the melting point (see FIG. 1). The quenching was effected by using water. Table 2 shows how the temperature coefficient of Young's modulus $e$ is affected by variation of the cooling speed, for three different alloys of the invention. It is apparent from Table 2 that the temperature coefficient $e$ is greatly affected by the cooling speed.

Since the physical properties of the alloys of the invention are greatly affected by the working rate of cold-work and the cooling speed, the shape of the curves of FIGS. 2A and 2B and FIGS. 3A and 3B may well be greatly changed if the working rate and/or the cooling speed are changed from those on which the curves of the figures are based.

EXAMPLE 2

Ingredients of different samples (each weighing about 500 grams) of manganese-copper-nickel ternary alloys of the invention, consisting of 67 wt. percent or less of copper, 27 wt. percent or less of nickel, and 33 to 91 wt. percent of manganese, were melted in alumina crucibles, which were disposed in a high-frequency induction furnace or an electric resistance furnace, while passing argon gas therethrough. The molten ingredients were thoroughly agitated, and poured into iron moulds, for producing cylindrical ingots of about 10 mm. dia.

The ingots thus produced were heated at 950° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 950° C. for 1 hour. It is known to those skilled in the art that, as far as the resiliency of alloys is concerned, such heating at a solution treatment temperature (e.g., 950° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 950° C. The first group specimens were annealed by cooling at a speed of 100° C./hour, which were used for the measurement of the effects of the aforesaid annealing of the process (A). The second group specimens were water quenched for the measurement of the effects of the aforesaid water quenching of the process (C).

Some of the aforesaid specimens subjected to cold-work of the process (B) and the quenching of the process (C) were again heated at various temperatures below 950° C. for 1 hour, and cooled at a speed of 100° C./hour, so as to provide specimens for the measurement of the effects of the tempering of the processes (B') and (C'), respectively.

The Young's modulus of the specimens was determined by measuring the resonant frequency thereof by a device having a sensitive electrostatic capacitor, and calculating the Young's modulus from the resonant frequency thus measured.

The coefficient of linear expansion $\alpha$ of the specimens in the proximity of room temperature was measured by using a precision linear dilatometer of vertical type.

Figure 10:
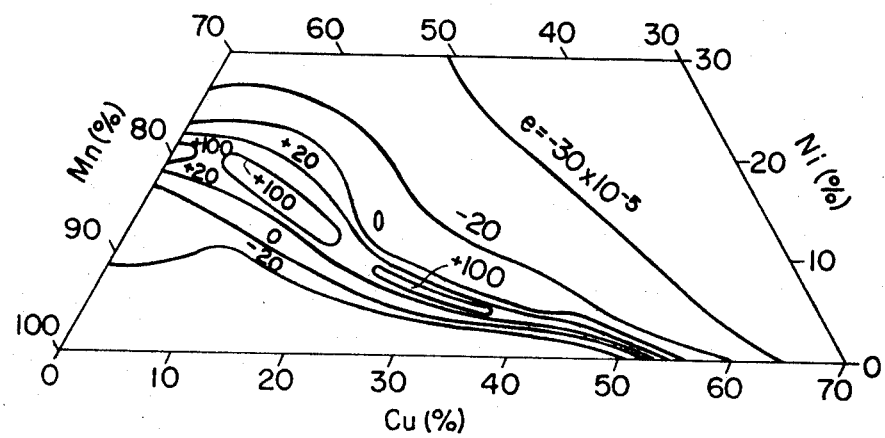
FIG. 10 is a diagram illustrating the relation between the mean temperature coefficient, 0° C. to 40° C., of manganese-copper-nickel alloys of the invention and their composition, for the state as annealed.

FIG. 10 shows the relation between the composition of the manganese-copper-nickel ternary alloy and the mean temperature coefficient of Young's modulus $e$ thereof between 0° C. and 40° C. in the state as annealed by the process (A).

Figure 11A:
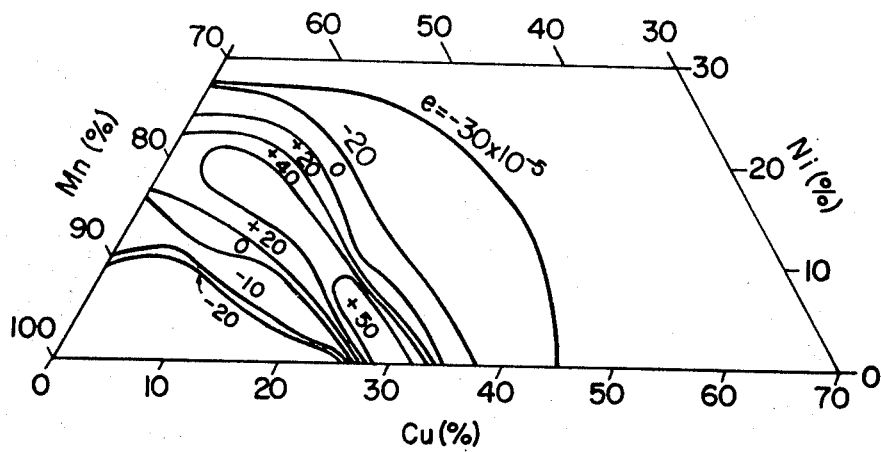
FIGS. 11A to 11D are diagrams similar to FIG. 10, illustrating the relation between the mean temperature coefficient, 0° C. to 40° C., of manganese-copper-nickel alloys of the invention and their composition, for the state as cold-worked and for the state as tempered by heating at different temperatures after the cold-work.
Figure 11B:
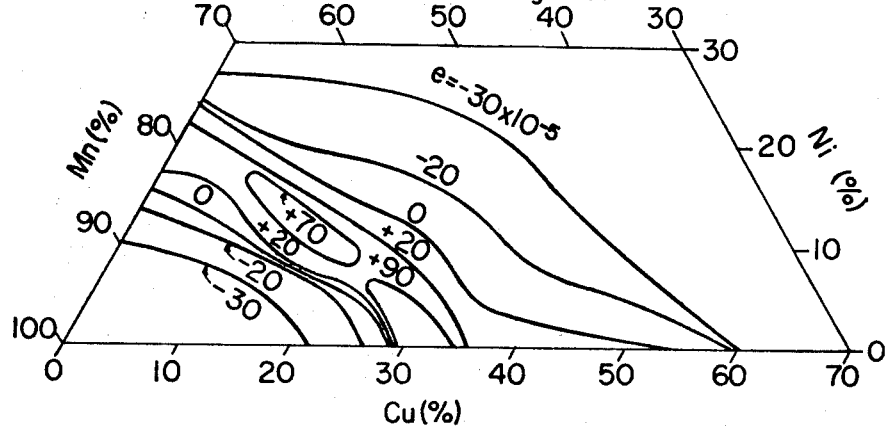
Figure 11C:
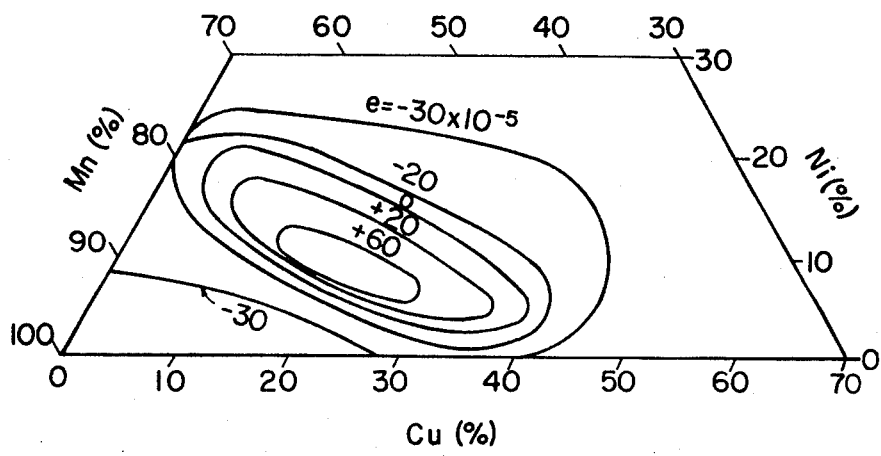
Figure 11D:
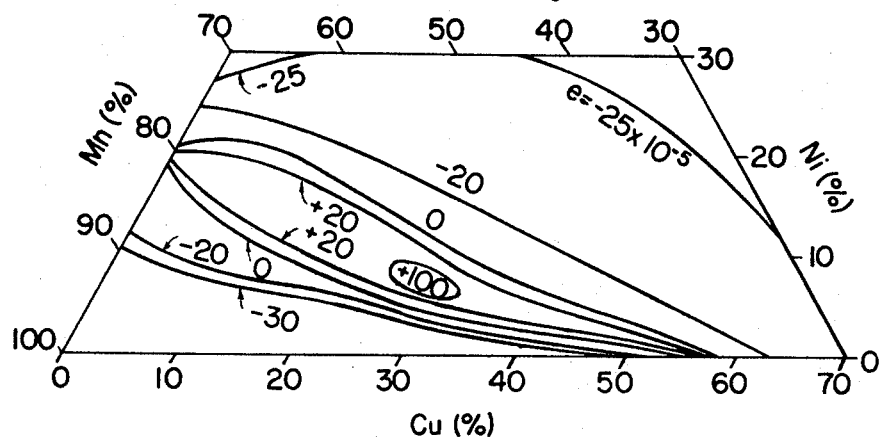

FIG. 11A shows the relation between the composition of the manganese-copper-nickel ternary alloy and the mean temperature coefficient of Young's modulus $e$ thereof, 0° C. to 40° C., for the state as cold-worked (B) after the annealing. FIGS. 11B and 11D show similar relations for the same alloy for the states as tempered (B') by cooling at a speed of 100° C./hour after heating at different temperatures for one hour, respectively.

Figure 12A:
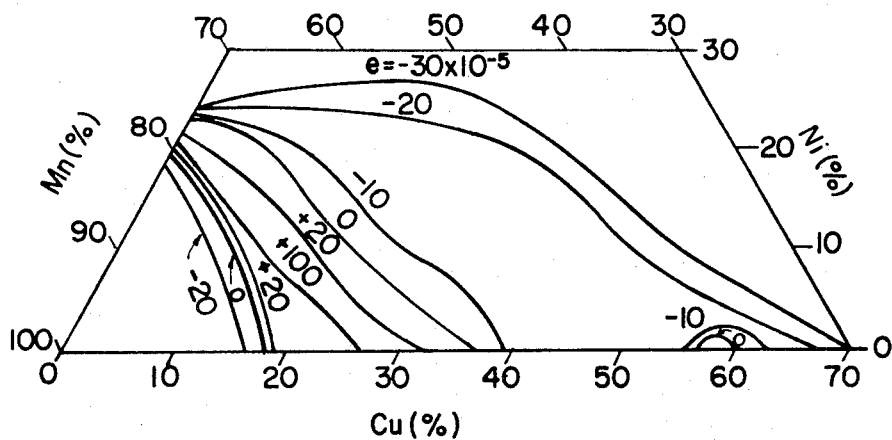
FIGS. 12A to 12D are diagrams illustrating the relation between the mean temperature coefficient, 0° C. to 40° C., of manganese-copper-nickel alloys of the invention and their composition, for the state as water quenched and for the state as tempered by heating at different temperatures after the water quenching.
Figure 12B:
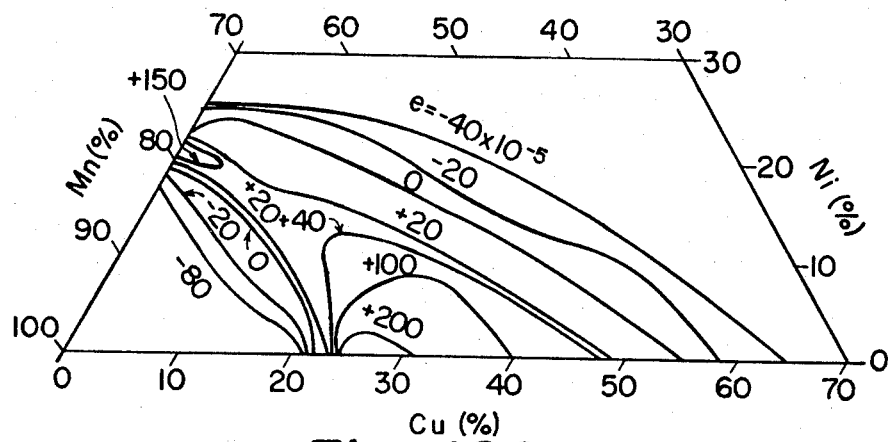
Figure 12C:
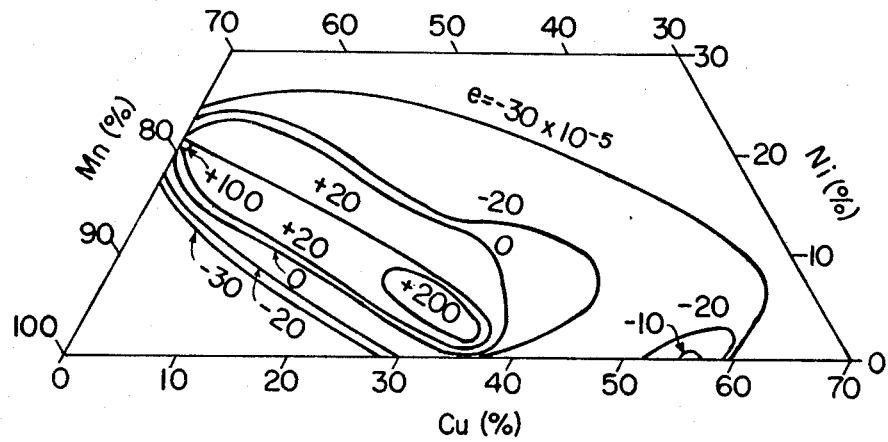
Figure 12D:
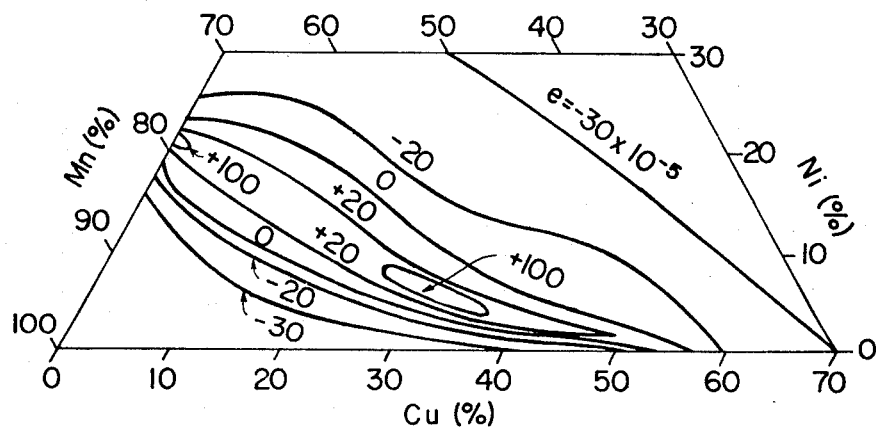

FIG. 12A shows the similar relation for the same manganese-copper-nickel ternary alloy for the state as water quenched (C) after the annealing. FIGS. 12B to 12D show similar relations for the same alloy for the states as tempered (C') by cooling at a speed of 100° C./hour after heating for one hour at different temperatures, respectively.

Tables 4, 5, and 6 summarize typical measured values of physical properties, inclusive of Vickers hardness, of the manganese-copper-nickel ternary alloys having compositions of the present invention.

TABLE 4

[Properties of Mn-Cu-Ni alloys as annealed by cooling at a speed of 100° C./hour after heating at 950° C. for hour]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Ni (percent) | | | | | |
| 88.83 | 1.01 | 10.16 | 12.40×10⁵ | −19.21×10⁻⁵ | 4.50×10⁵ | −19.65×10⁻⁵ | 880 |
| 82.84 | 1.01 | 16.15 | 10.54×10⁵ | −1.12×10⁻⁵ | 4.35×10⁵ | −1.33×10⁻⁵ | 110 |
| 72.77 | 1.01 | 26.22 | 12.60×10⁵ | −18.11×10⁻⁵ | 4.53×10⁵ | −18.27×10⁻⁵ | 132 |
| 69.68 | 10.12 | 20.20 | 15.25×10⁵ | +10.15×10⁻⁵ | 4.65×10⁵ | +12.49×10⁻⁵ | 129 |
| 67.67 | 10.10 | 22.23 | 15.70×10⁵ | +0.55×10⁻⁵ | 4.72×10⁵ | +0.61×10⁻⁵ | 131 |
| 71.70 | 20.22 | 8.08 | 14.40×10⁵ | +10.51×10⁻⁵ | 4.63×10⁵ | +10.74×10⁻⁵ | 125 |
| 66.69 | 20.20 | 13.11 | 14.70×10⁵ | +0.21×10⁻⁵ | 4.64×10⁵ | +0.29×10⁻⁵ | 125 |
| 66.67 | 28.28 | 5.05 | 16.60×10⁴ | −10.15×10⁻⁵ | 4.81×10⁵ | −10.80×10⁻⁵ | 144 |
| 61.54 | 28.28 | 10.18 | 15.65×10⁵ | −11.02×10⁻⁵ | 4.70×10⁵ | −11.65×10⁻⁵ | 146 |
| 55.66 | 38.27 | 6.07 | 13.50×10⁵ | −15.17×10⁻⁵ | 4.60×10⁵ | −16.73×10⁻⁵ | 148 |
| 50.54 | 47.45 | 2.01 | 11.50×10⁵ | +9.20×10⁻⁵ | 4.47×10⁵ | +10.17×10⁻⁵ | 140 |
| 46.38 | 52.60 | 1.02 | 11.30×10⁵ | −1.13×10⁻⁵ | 4.46×10⁵ | −2.91×10⁻⁵ | 123 |

TABLE 5
[Properties of Mn-Cu-Ni alloys, as water quenched and as tempered after water quenching]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Ni (percent) | | | | | |
| As water quenched after heating at 950° C. for 1 hour after annealing of Table 4 | | | | | | | |
| 80.83 | 1.01 | 18.16 | $9.50 \times 10^5$ | $-10.01 \times 10^{-5}$ | $4.22 \times 10^5$ | $-11.12 \times 10^{-5}$ | 150 |
| 76.77 | 1.00 | 22.23 | $11.20 \times 10^5$ | $+10.12 \times 10^{-5}$ | $4.34 \times 10^5$ | $+9.08 \times 10^{-5}$ | 150 |
| 70.68 | 5.05 | 24.27 | $13.55 \times 10^5$ | $-18.36 \times 10^{-5}$ | $4.55 \times 10^5$ | $-18.77 \times 10^{-5}$ | 160 |
| 79.70 | 10.14 | 10.16 | $11.80 \times 10^5$ | $+0.18 \times 10^{-5}$ | $4.36 \times 10^5$ | $+0.33 \times 10^{-5}$ | 145 |
| 69.68 | 10.12 | 20.20 | $14.80 \times 10^5$ | $-0.03 \times 10^{-5}$ | $4.47 \times 10^5$ | $-0.14 \times 10^{-5}$ | 140 |
| 81.79 | 17.19 | 1.02 | $9.43 \times 10^5$ | $-0.51 \times 10^{-5}$ | $4.21 \times 10^5$ | $-0.72 \times 10^{-5}$ | 141 |
| 69.64 | 20.21 | 10.15 | $12.93 \times 10^5$ | $+10.22 \times 10^{-5}$ | $4.38 \times 10^5$ | $+10.68 \times 10^{-5}$ | 149 |
| 59.49 | 20.26 | 20.25 | $15.55 \times 10^5$ | $-16.32 \times 10^{-5}$ | $4.55 \times 10^5$ | $-16.96 \times 10^{-5}$ | 155 |
| 64.61 | 30.33 | 5.06 | $11.47 \times 10^5$ | $-7.98 \times 10^{-5}$ | $4.40 \times 10^5$ | $-8.37 \times 10^{-5}$ | 135 |
| 63.61 | 35.36 | 1.03 | $10.30 \times 10^5$ | $+0.07 \times 10^{-5}$ | $4.31 \times 10^5$ | $+0.15 \times 10^{-5}$ | 133 |
| 49.45 | 40.39 | 10.16 | $13.57 \times 10^5$ | $-13.78 \times 10^{-5}$ | $4.56 \times 10^5$ | $-14.26 \times 10^{-5}$ | 166 |
| 40.81 | 58.11 | 1.08 | $11.50 \times 10^5$ | $+0.25 \times 10^{-5}$ | $4.41 \times 10^5$ | $+0.28 \times 10^{-5}$ | 132 |
| As tempered by cooling at 100° C./hr. after heating at 400° C. for 1 hr. following the above referred water quenching | | | | | | | |
| 80.83 | 1.01 | 18.16 | $9.40 \times 10^5$ | $-5.13 \times 10^{-5}$ | $4.20 \times 10^5$ | $-6.52 \times 10^{-5}$ | 116 |
| 76.77 | 1.00 | 22.23 | $10.50 \times 10^5$ | $+10.02 \times 10^{-5}$ | $4.36 \times 10^5$ | $+9.95 \times 10^{-5}$ | 121 |
| 89.60 | 10.14 | 10.16 | $10.40 \times 10^5$ | $-15.11 \times 10^{-5}$ | $4.33 \times 10^5$ | $-16.12 \times 10^{-5}$ | 132 |
| 69.68 | 10.12 | 20.20 | $14.25 \times 10^5$ | $+3.96 \times 10^{-5}$ | $4.40 \times 10^5$ | $+4.16 \times 10^{-5}$ | 138 |
| 75.80 | 19.03 | 5.17 | $11.20 \times 10^5$ | $+10.16 \times 10^{-5}$ | $4.33 \times 10^5$ | $+11.22 \times 10^{-5}$ | 136 |
| 60.72 | 20.21 | 19.07 | $17.60 \times 10^5$ | $=15.76 \times 10^{-5}$ | $5.15 \times 10^5$ | $-16.52 \times 10^{-5}$ | 133 |
| 69.62 | 30.33 | 10.25 | $14.35 \times 10^5$ | $+17.63 \times 10^{-5}$ | $4.45 \times 10^5$ | $+16.51 \times 10^{-5}$ | 131 |
| 49.45 | 40.39 | 10.16 | $13.58 \times 10^5$ | $-1.12 \times 10^{-5}$ | $4.55 \times 10^5$ | $-1.65 \times 10^{-5}$ | 125 |
| 49.62 | 45.02 | 5.36 | $12.50 \times 10^5$ | $+5.39 \times 10^{-5}$ | $4.36 \times 10^5$ | $+6.29 \times 10^{-5}$ | 137 |
| 47.01 | 51.98 | 1.01 | $11.60 \times 10^5$ | $+0.18 \times 10^{-5}$ | $4.35 \times 10^5$ | $+0.65 \times 10^{-5}$ | 142 |
| As tempered by cooling at 100° C./hr. after heating at 600° C. for 1 hr. following the above referred water quenching | | | | | | | |
| 80.83 | 1.01 | 18.16 | $9.50 \times 10^5$ | $+3.12 \times 10^{-5}$ | $4.23 \times 10^5$ | $+3.32 \times 10^{-5}$ | 125 |
| 76.77 | 1.00 | 22.23 | $10.60 \times 10^5$ | $+11.65 \times 10^{-5}$ | $4.32 \times 10^5$ | $+12.58 \times 10^{-5}$ | 128 |
| 77.52 | 10.15 | 12.33 | $11.45 \times 10^5$ | $-5.18 \times 10^{-5}$ | $4.42 \times 10^5$ | $-6.27 \times 10^{-5}$ | 152 |
| 69.68 | 10.12 | 20.20 | $14.35 \times 10^5$ | $+7.88 \times 10^{-5}$ | $4.72 \times 10^5$ | $+9.55 \times 10^{-5}$ | 148 |
| 72.72 | 20.22 | 7.06 | $12.40 \times 10^5$ | $-6.56 \times 10^{-5}$ | $4.57 \times 10^5$ | $-8.82 \times 10^{-5}$ | 162 |
| 62.13 | 20.21 | 17.66 | $13.70 \times 10^5$ | $+11.74 \times 10^{-5}$ | $4.61 \times 10^5$ | $-11.90 \times 10^{-5}$ | 147 |
| 67.65 | 30.13 | 2.22 | $10.70 \times 10^5$ | $+0.11 \times 10^{-5}$ | $4.36 \times 10^5$ | $+0.22 \times 10^{-5}$ | 185 |
| 69.62 | 30.33 | 10.25 | $14.44 \times 10^5$ | $+7.43 \times 10^{-5}$ | $4.75 \times 10^5$ | $+6.98 \times 10^{-5}$ | 141 |
| 49.45 | 40.39 | 10.16 | $13.65 \times 10^5$ | $-5.55 \times 10^{-5}$ | $4.63 \times 10^5$ | $-6.22 \times 10^{-5}$ | 146 |
| 43.96 | 54.98 | 1.06 | $11.70 \times 10^5$ | $-10.27 \times 10^{-5}$ | $4.45 \times 10^5$ | $-10.67 \times 10^{-5}$ | 148 |
| As tempered by cooling at 100° C./hr. after heating at 800° C. for 1 hr. following the above referred water quenching | | | | | | | |
| 81.89 | 1.03 | 17.08 | $9.45 \times 10^5$ | $-19.25 \times 10^{-5}$ | $4.20 \times 10^5$ | $-19.28 \times 10^{-5}$ | 135 |
| 75.68 | 1.01 | 23.31 | $11.50 \times 10^5$ | $+0.11 \times 10^{-5}$ | $4.45 \times 10^5$ | $+0.16 \times 10^{-5}$ | 124 |
| 77.52 | 10.15 | 12.33 | $12.40 \times 10^5$ | $-0.16 \times 10^{-5}$ | $4.57 \times 10^5$ | $-0.92 \times 10^{-5}$ | 128 |
| 69.68 | 10.12 | 20.20 | $15.00 \times 10^1$ | $+9.34 \times 10^{-4}$ | $4.78 \times 10^5$ | $+10.01 \times 10^{-5}$ | 135 |
| 67.57 | 20.06 | 12.37 | $14.50 \times 10^5$ | $-16.55 \times 10^{-5}$ | $4.63 \times 10^5$ | $-16.87 \times 10^{-5}$ | 135 |
| 61.53 | 20.11 | 18.36 | $15.50 \times 10^5$ | $-19.95 \times 10^{-5}$ | $4.73 \times 10^5$ | $-20.00 \times 10^{-5}$ | 142 |
| 65.44 | 30.55 | 4.01 | $16.50 \times 10^5$ | $-7.66 \times 10^{-5}$ | $4.86 \times 10^5$ | $-7.76 \times 10^{-5}$ | 170 |
| 69.62 | 30.33 | 10.25 | $15.65 \times 10^5$ | $-1.07 \times 10^{-5}$ | $4.72 \times 10^5$ | $-1.68 \times 10^{-5}$ | 153 |
| 49.45 | 40.39 | 10.16 | $13.50 \times 10^5$ | $-15.11 \times 10^{-5}$ | $4.66 \times 10^5$ | $-16.29 \times 10^{-5}$ | 137 |
| 57.58 | 40.35 | 2.07 | $11.35 \times 10^5$ | $-1.00 \times 10^{-5}$ | $4.41 \times 10^5$ | $-2.11 \times 10^{-5}$ | 177 |
| 48.00 | 50.01 | 1.99 | $11.60 \times 10^5$ | $+7.65 \times 10^{-5}$ | $4.46 \times 10^5$ | $+7.88 \times 10^{-5}$ | 145 |

TABLE 6
[Properties of Mn-Cu-Ni alloys, as cold-worked and as tempered after cold-work]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Ni (percent) | | | | | |
| As cold-worked with a working rate of 96% after annealing of Table 4 | | | | | | | |
| 88.83 | 1.01 | 10.16 | $12.15 \times 10^5$ | $-19.12 \times 10^{-5}$ | $4.33 \times 10^5$ | $-19.65 \times 10^{-5}$ | 190 |
| 83.85 | 1.01 | 15.14 | $9.40 \times 10^5$ | $+0.12 \times 10^{-5}$ | $4.20 \times 10^5$ | $+0.62 \times 10^{-5}$ | 200 |
| 64.83 | 1.01 | 24.16 | $9.70 \times 10^5$ | $-0.16 \times 10^{-5}$ | $4.23 \times 10^5$ | $-0.35 \times 10^{-5}$ | 238 |
| 79.68 | 10.16 | 10.16 | $10.25 \times 10^5$ | $-6.02 \times 10^{-5}$ | $4.32 \times 10^5$ | $-6.04 \times 10^{-5}$ | 199 |
| 68.64 | 10.13 | 21.23 | $13.80 \times 10^5$ | $+10.22 \times 10^{-5}$ | $4.52 \times 10^5$ | $+11.28 \times 10^{-5}$ | 231 |
| 66.68 | 10.08 | 23.24 | $14.00 \times 10^5$ | $-6.22 \times 10^{-5}$ | $4.63 \times 10^5$ | $-6.47 \times 10^{-5}$ | 245 |
| 74.69 | 20.25 | 5.06 | $9.50 \times 10^5$ | $+0.13 \times 10^{-5}$ | $4.22 \times 10^5$ | $+0.36 \times 10^{-5}$ | 184 |
| 64.60 | 20.23 | 15.17 | $13.55 \times 10^5$ | $-19.21 \times 10^{-5}$ | $4.53 \times 10^5$ | $-19.11 \times 10^{-5}$ | 240 |
| 65.67 | 24.26 | 10.17 | $12.40 \times 10^5$ | $-8.46 \times 10^{-5}$ | $4.46 \times 10^5$ | $-8.91 \times 10^{-5}$ | 224 |
| 73.74 | 25.24 | 1.02 | $12.50 \times 10^5$ | $-10.37 \times 10^{-5}$ | $4.47 \times 10^5$ | $-10.53 \times 10^{-5}$ | 185 |
| 65.69 | 28.27 | 6.04 | $10.50 \times 10^5$ | $+0.39 \times 10^{-5}$ | $4.34 \times 10^5$ | $+0.40 \times 10^{-5}$ | 223 |
| 64.62 | 34.35 | 1.03 | $8.90 \times 10^5$ | $-5.08 \times 10^{-5}$ | $4.16 \times 10^5$ | $-5.17 \times 10^{-5}$ | 195 |
| As tempered by cooling at 100° C./hr. after heating at 400° C. for 1 hr., following the above cold-work | | | | | | | |
| 83.85 | 1.01 | 15.14 | $9.50 \times 10^5$ | $-15.23 \times 10^{-5}$ | $4.25 \times 10^5$ | $-16.53 \times 10^{-5}$ | 440 |
| 79.62 | 5.36 | 15.02 | $10.45 \times 10^5$ | $+2.19 \times 10^{-5}$ | $4.33 \times 10^5$ | $+3.18 \times 10^{-5}$ | 240 |
| 74.73 | 5.16 | 20.11 | $13.52 \times 10^5$ | $+13.15 \times 10^{-5}$ | $4.53 \times 10^5$ | $+14.25 \times 10^{-5}$ | 242 |
| 78.63 | 10.15 | 11.22 | $10.65 \times 10^5$ | $+0.10 \times 10^{-5}$ | $4.34 \times 10^5$ | $+0.20 \times 10^{-5}$ | 182 |
| 64.60 | 20.23 | 15.17 | $13.60 \times 10^5$ | $-1.27 \times 10^{-5}$ | $4.56 \times 10^5$ | $-2.37 \times 10^{-5}$ | 232 |
| 65.57 | 24.26 | 10.17 | $12.84 \times 10^5$ | $+1.18 \times 10^{-5}$ | $4.47 \times 10^5$ | $+2.19 \times 10^{-5}$ | 217 |
| 70.45 | 25.36 | 4.19 | $10.63 \times 10^5$ | $+10.08 \times 10^{-5}$ | $4.36 \times 10^5$ | $+12.22 \times 10^{-5}$ | 235 |
| 69.62 | 30.33 | 10.25 | $14.40 \times 10^5$ | $-3.08 \times 10^{-5}$ | $4.67 \times 10^5$ | $-4.08 \times 10^{-5}$ | 210 |
| 64.88 | 34.11 | 1.01 | $10.70 \times 10^5$ | $+15.65 \times 10^{-5}$ | $4.35 \times 10^5$ | $+16.55 \times 10^{-5}$ | 350 |
| 52.09 | 45.55 | 2.36 | $11.50 \times 10^5$ | $-2.00 \times 10^{-5}$ | $4.41 \times 10^5$ | $-3.08 \times 10^{-5}$ | 220 |

TABLE 6—Continued

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
| --- | --- | --- | --- | --- | --- | --- | --- |
| Mn (percent) | Cu (percent) | Ni (percent) | | | | | |
| As tempered by cooling at 100° C./hr. after heating at 600° C. for 1 hr., following the above cold-work | | | | | | | |
| 79.77 | 1.00 | 19.23 | $8.70 \times 10^5$ | $-16.02 \times 10^{-5}$ | $4.14 \times 10^5$ | $-17.26 \times 10^{-5}$ | 330 |
| 79.62 | 5.36 | 15.02 | $10.55 \times 10^5$ | $0.00 \times 10^{-5}$ | $4.35 \times 10^5$ | $+2.52 \times 10^{-5}$ | 260 |
| 73.69 | 5.13 | 21.18 | $12.00 \times 10^5$ | $-10.92 \times 10^{-5}$ | $4.40 \times 10^5$ | $-11.85 \times 10^{-5}$ | 255 |
| 75.27 | 15.65 | 9.08 | $11.45 \times 10^5$ | $-0.55 \times 10^{-5}$ | $4.39 \times 10^5$ | $-1.25 \times 10^{-5}$ | 240 |
| 67.69 | 15.15 | 17.16 | $15.50 \times 10^5$ | $+15.45 \times 10^{-5}$ | $4.88 \times 10^5$ | $+13.28 \times 10^{-5}$ | 260 |
| 60.89 | 25.12 | 13.99 | $14.40 \times 10^5$ | $-5.26 \times 10^{-5}$ | $4.75 \times 10^5$ | $-6.35 \times 10^{-5}$ | 255 |
| 69.15 | 25.16 | 5.69 | $10.35 \times 10^5$ | $+10.21 \times 10^{-5}$ | $4.32 \times 10^5$ | $+10.85 \times 10^{-5}$ | 242 |
| 56.08 | 35.80 | 8.12 | $13.43 \times 10^5$ | $+2.16 \times 10^{-5}$ | $4.63 \times 10^5$ | $+3.26 \times 10^{-5}$ | 223 |
| 62.85 | 35.13 | 2.02 | $11.00 \times 10^5$ | $-15.65 \times 10^{-5}$ | $4.34 \times 10^5$ | $+16.55 \times 10^{-5}$ | 385 |
| 56.62 | 39.16 | 4.22 | $12.50 \times 10^5$ | $+1.21 \times 10^{-5}$ | $4.52 \times 10^5$ | $+2.32 \times 10^{-5}$ | 260 |
| As tempered by cooling at 100° C./hr. after heating at 800° C. for 1 hr., following the above cold-work | | | | | | | |
| 84.55 | 1.01 | 14.44 | $10.55 \times 10^5$ | $-9.12 \times 10^{-5}$ | $4.35 \times 10^5$ | $-10.65 \times 10^{-5}$ | 270 |
| 75.42 | 1.22 | 23.36 | $12.40 \times 10^5$ | $-16.55 \times 10^{-5}$ | $4.51 \times 10^5$ | $-18.65 \times 10^{-5}$ | 148 |
| 76.55 | 10.16 | 13.29 | $14.30 \times 10^4$ | $+10.99 \times 10^{-5}$ | $4.72 \times 10^5$ | $+11.25 \times 10^{-5}$ | 145 |
| 67.69 | 15.15 | 17.16 | $15.55 \times 10^5$ | $+5.95 \times 10^{-5}$ | $4.86 \times 10^5$ | $+6.55 \times 10^{-5}$ | 138 |
| 72.72 | 20.22 | 7.06 | $16.30 \times 10^5$ | $-2.15 \times 10^{-5}$ | $4.93 \times 10^5$ | $-4.25 \times 10^{-5}$ | 126 |
| 59.26 | 25.19 | 15.55 | $14.50 \times 10^5$ | $-11.66 \times 10^{-5}$ | $4.70 \times 10^5$ | $-12.86 \times 10^{-5}$ | 132 |
| 62.60 | 33.33 | 4.07 | $12.50 \times 10^5$ | $+0.17 \times 10^{-5}$ | $4.46 \times 10^5$ | $+1.08 \times 10^{-5}$ | 126 |
| 54.51 | 35.47 | 10.02 | $12.55 \times 10^5$ | $-12.22 \times 10^{-5}$ | $4.47 \times 10^5$ | $-13.23 \times 10^{-5}$ | 126 |
| 53.42 | 44.22 | 2.36 | $11.50 \times 10^5$ | $-0.20 \times 10^{-5}$ | $4.33 \times 10^5$ | $-0.30 \times 10^{-5}$ | 121 |
| 46.41 | 50.19 | 3.40 | $12.00 \times 10^5$ | $-0.22 \times 10^{-5}$ | $4.40 \times 10^5$ | $-0.28 \times 10^{-5}$ | 130 |
| 42.73 | 56.09 | 1.18 | $11.80 \times 10^5$ | $-0.36 \times 10^{-5}$ | $4.38 \times 10^5$ | $-0.46 \times 10^{-5}$ | 125 |

Figure 13:
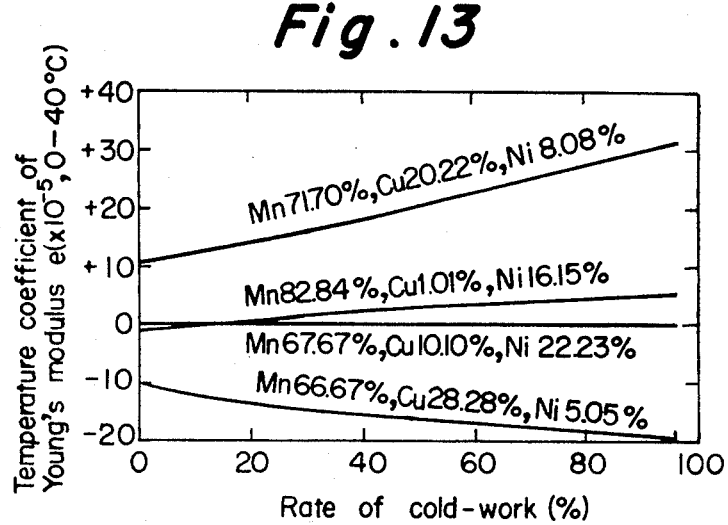
FIG. 13 is a diagram showing the relation between the mean temperature coefficient, 0° C. to 40° C., of the alloys of the invention and the working rate of the cold-work.

FIG. 13 illustrates the relation between the working rate of the cold-work and the temperature coefficient of Young's modulus $e$, for four different Mn-Cu-Ni ternary alloys according to the present invention. Table 7 shows the relation between the cooling speed and the temperature coefficient of Young's modulus $e$, 0° C. to 40° C., for the same four different ternary alloys as FIG. 13.

Figure 14:
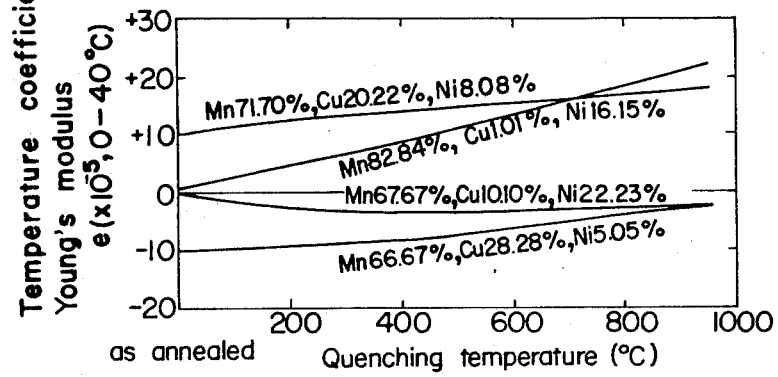
FIG. 14 is a diagram illustrating the relation between the mean temperature coefficient, 0° C. to 40° C., of the alloys of the invention and the quenching temperature thereof.

Similarly, FIG. 14 shows the relation between the quenching temperature and the temperature coefficient of Young's modulus $e$, for the same four different alloys of the invention as FIG. 13.

Figure 15:
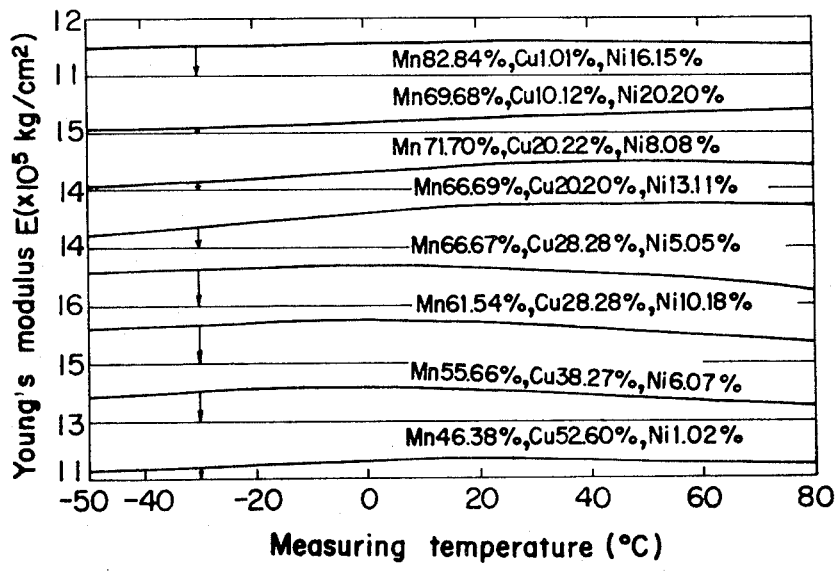
FIG. 15 is a graph showing the Young's modulus of manganese-copper-nickel alloys at different temperatures, for the state as annealed, by cooling at 100° C./hour after heating at 950° C. for 1 hour.
Figure 16A:
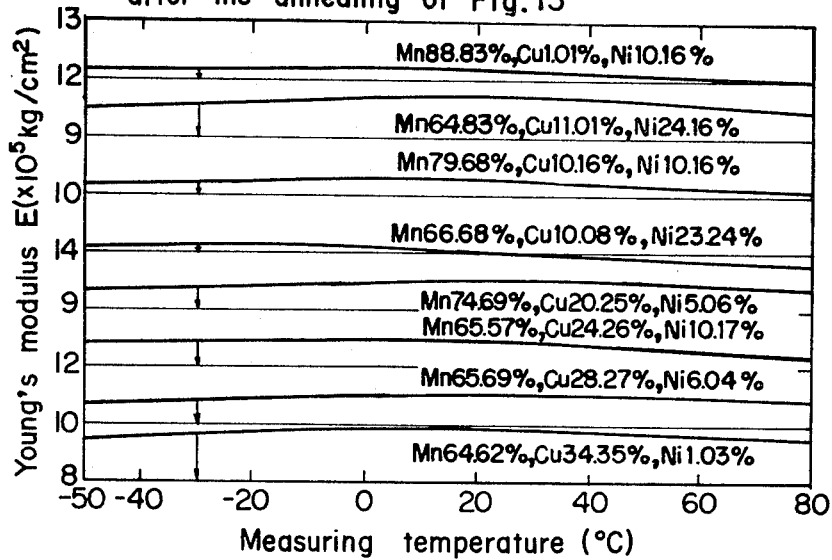
FIGS. 16A to 16D are graphs similar to FIG. 15, for the state as cold-worked with a working rate 96% following the annealing, and for the state as tempered by cooling at 100° C./hour after heating at different temperatures for 1 hour following the cold-work, respectively.
Figure 16B:
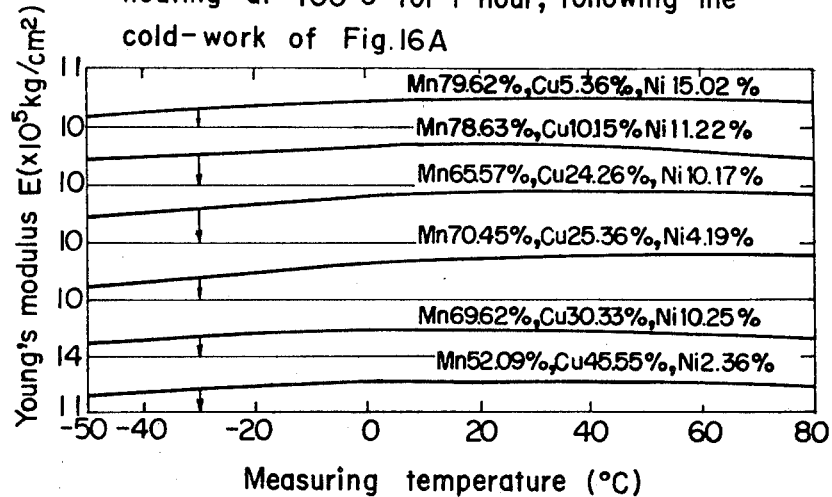
Figure 16C:
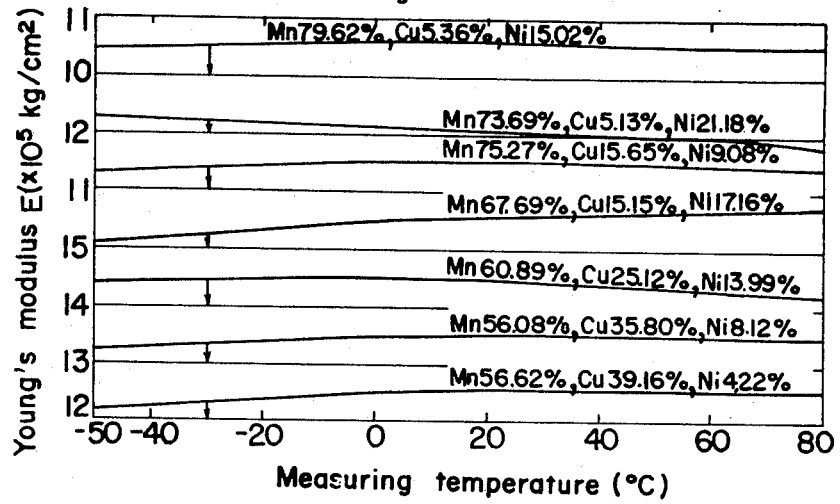
Figure 16D:
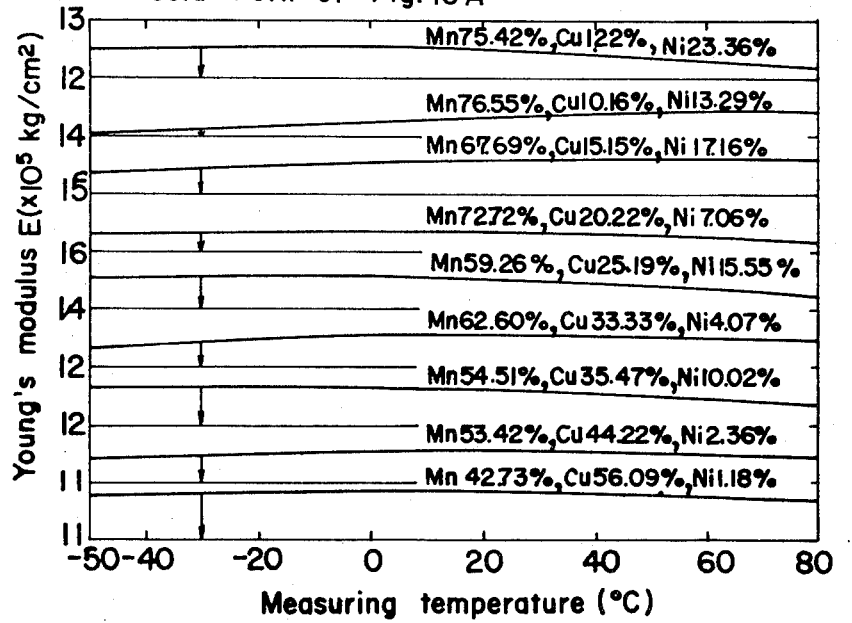
Figure 17A:
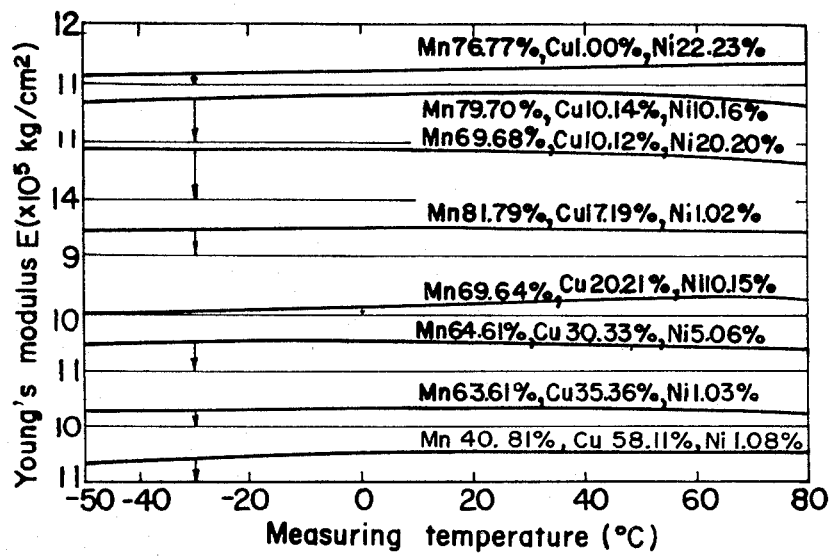
FIGS. 17A to 17D are graphs similar to FIG. 15, for the state as water quenched after heating at 950° C. for 1 hour and for the state as tempered by cooling at 100° C./hour after heating at different temperatures following the water quenching, respectively.
Figure 17B:
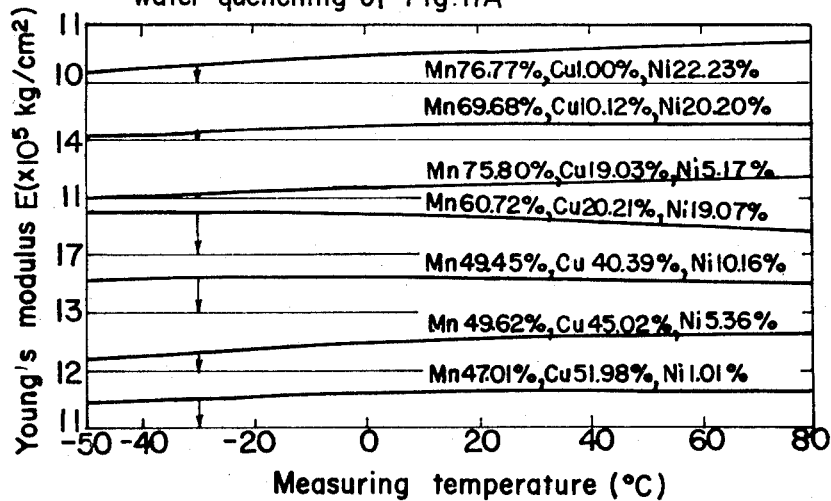
Figure 17C:
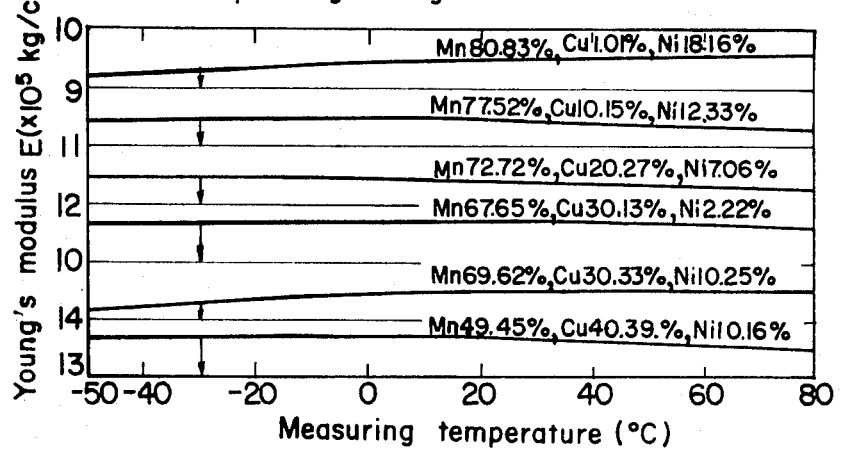
Figure 17D:
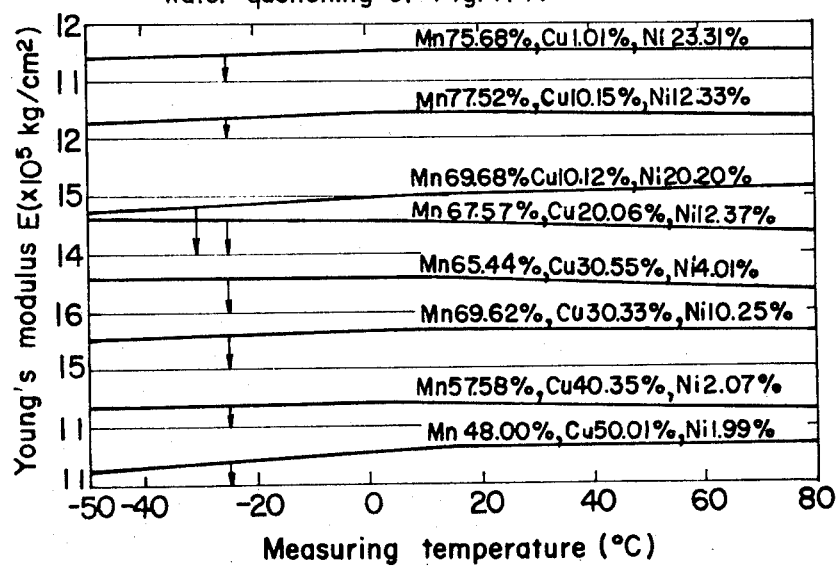

FIG. 15 illustrates the values of Young's modulus at various temperatures from —50° C. to 80° C., for different Mn-Cu-Ni ternary alloys of the invention in the state as annealed by cooling at a speed of 100° C./hour after heating at 950° C. for 1 hour.

FIGS. 16A to 16D show the values of Young's modulus at various temperatures from —50° C. to 80° C., for different Mn-Cu-Ni ternary alloys of the invention in the state as cold-worked with a working rate of 96% after the annealing of FIG. 15 and in the states as tempered by cooling at a speed of 100° C./hour after heating at different temperatures for 1 hour following the above referred cold-work, respectively.

FIGS. 17A to 17D show the values of Young's modulus at various temperatures from —50° C. to 80° C., for different Mn-Cu-Ni ternary alloys of the invention in the state as water quenched after the annealing of FIG. 15 and in the states as tempered by cooling at a speed of 100° C./hour after heating at different temperatures for 1 hour following the above referred water quenching, respectively.

As can be seen from FIG. 10 and FIGS. 11A to 11D, the manganese-copper-nickel ternary alloys consisting of up to 67 wt. percent of copper, up to 27 wt. percent of nickel, and 33 to 91 wt. percent of manganese have temperature coefficients of Young's modulus $e$ ranging from a comparatively large negative value to a comparatively large positive value, depending on the composition of the alloys, in any of the states as annealed (A), as cold-worked (B) with a working rate of 96% after the annealing, and as tempered (B') after the cold-work. Accordingly, those Mn-Cu-Ni alloys, whose temperature coefficient of Young's modulus $e$ falls in a narrow range crossing the zero line between a negative value domain and a positive value domain, have the so-called Elinvar characteristics or temperature-independent elasticity.

As can be seen from FIGS. 12A to 12D, the manganese-copper-nickel alloys, consisting of up to 67 wt. percent of copper, up to 27 wt. percent of nickel, and 33 to 91 wt. percent of manganese, have temperature coefficients of Young's modulus $e$, which vary greatly depending on the composition of the alloys in any of the states as water quenched (C) after the annealing, and as tempered (C') after the water quenching. Accordingly, the manganese-copper-nickel ternary alloys as water quenched (C) and as tempered (C') can also have the so-called Elinvar characteristics, as in the case of FIGS. 11A to 11D. In the case of FIG. 11A, the working rate for the cold-work process was 96%. FIG. 13 illustrates the effects of different working rates, or different degrees of cold-work, on the temperature coefficient of Young's modulus $e$, for four different ternary alloys of the invention. As can be seen from the figure, the temperature coefficient $e$ of the alloys of the invention can be improved by cold-work, even by slight cold-work with a working rate as small as 1%.

In the case of the heat treatments of FIGS. 10 and 12A, the annealing is carried out by cooling at a speed of 100° C./hour after heating at 950° C. for 1 hour, while the quenching is effected by water cooling from 950° C. to room temperature. Table 7 and FIG. 14 show that the temperature coefficient of Young's modulus $e$ is affected by variation of the cooling speed and the quench-

TABLE 7

[Relation between cooling speed and temperature coefficient of Young's modulus $e$, 0° C. to 40° C, for Mn-Cu-Ni alloys]

| Alloy composition | | | Cooling speed after heating at 950° C. for 1 hour | | | | |
| --- | --- | --- | --- | --- | --- | --- | --- |
| Mn (percent) | Cu (percent) | Ni (percent) | 170° C./sec. (water quenched) | 9° C./sec. (air quenched) | 500° C./hour (annealed) | 100° C./hour (annealed) | 10° C./hour (annealed) |
| 82.84 | 1.01 | 16.15 | $+22.20 \times 10^{-5}$ | $+12.00 \times 10^{-5}$ | $+3.30 \times 10^{-5}$ | $-1.12 \times 10^{-5}$ | $-0.10 \times 10^{-5}$ |
| 67.67 | 10.10 | 22.23 | $-2.20 \times 10^{-5}$ | $-2.20 \times 10^{-5}$ | $-0.60 \times 10^{-5}$ | $+0.55 \times 10^{-5}$ | $+0.60 \times 10^{-5}$ |
| 71.70 | 20.22 | 8.08 | $+18.50 \times 10^{-5}$ | $+14.60 \times 10^{-5}$ | $+11.50 \times 10^{-5}$ | $+10.51 \times 10^{-5}$ | $+0.40 \times 10^{-5}$ |
| 66.67 | 28.28 | 5.05 | $-2.50 \times 10^{-5}$ | $-6.20 \times 10^{-5}$ | $-9.50 \times 10^{-5}$ | $-10.15 \times 10^{-5}$ | $+11.00 \times 10^{-5}$ | ing temperature. It is apparent from Table 7 and FIG. 14 that the temperature coefficient $e$ is greatly affected by the cooling speed and the quenching temperature.

Since the physical properties of the alloys of the invention are greatly affected by the working rate of cold-work, the quenching temperature, and the cooling speed, the shape of the curves of FIGS. 11A to 11D and FIGS. 12A to 12D may well be greatly changed if the working rate, quenching temperature, and/or the cooling speed are changed from those on which the curves of the figures are based.

EXAMPLE 3

Ingredients of different samples (each weighing about 500 grams) of manganese - copper - chromium ternary alloys of the invention, consisting of 70 wt. percent of less of copper, 24 wt. percent or less of chromium, and 30 to 95 wt. percent of manganese, were melted in alumina crucibles, which were disposed in a high-frequency induction furnace or an electric resistance furnace, while passing argon gas therethrough. The molten ingredients were thoroughly agitated, and poured into iron moulds for producing cylindrical ingots of about 10 mm. dia.

The ingots thus produced were heated at 950° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 950° C. for 1 hour. It is known to those skilled in the art that, as far as the resiliency of alloys is concerned, such heating at a solution treatment temperature (e.g., 950° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 950° C. The first group specimens were annealed by cooling at a speed of 100° C./hour, which were used for the measurement of the effects of the aforesaid annealing of the process (A). The second group specimens were water quenched for the measurement of the effects of the aforesaid water quenching of the process (C).

Some of the aforesaid specimens subjected to the cold-work of the process (B) and the quenching of the process (C) were again heated at various temperatures below 950° C. for 1 hour, and cooled at a speed of 100° C./hour, so as to provide specimens for the measurement of the effects of the tempering of the processes (B') and (C'), respectively.

The Young's modulus of the specimens was determined by measuring the resonant frequency thereof by a device having a sensitive electrostatic capacitor, and calculating the Young's modulus from the resonant frequency thus measured.

The coefficient of linear expansion $\alpha$ of the specimens in the proximity of room temperature was measured by using a precision linear dilatometer of vertical type.

Figure 18:
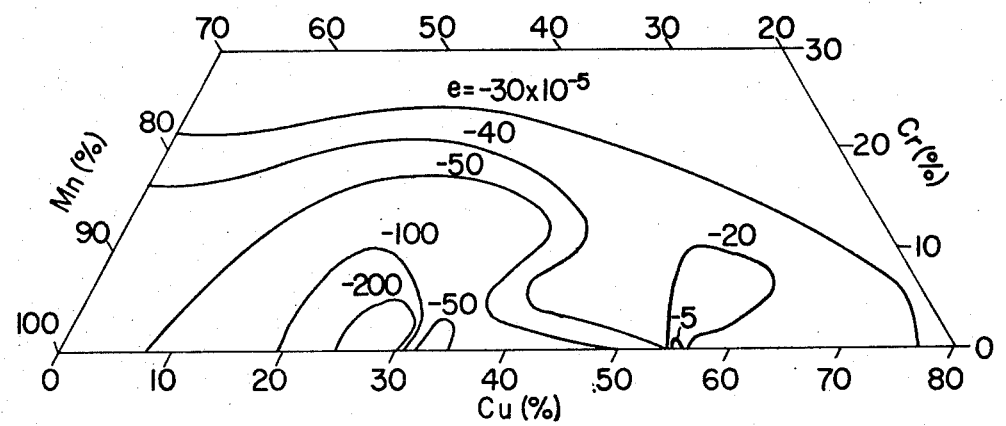
FIG. 18 is a diagram showing the relation between the compositions of manganese-copper-chromium ternary alloys of the invention and mean temperature coefficients of Young's modulus $e$ thereof between 0° C. and 40° C., for the state as annealed.

FIG. 18 shows the relation between the composition of the manganese-copper-chromium ternary alloy and the mean temperature coefficient of Young's modulus $e$ thereof between 0° C. to 40° C. in the state as annealed by the process (A).

Figure 19A:
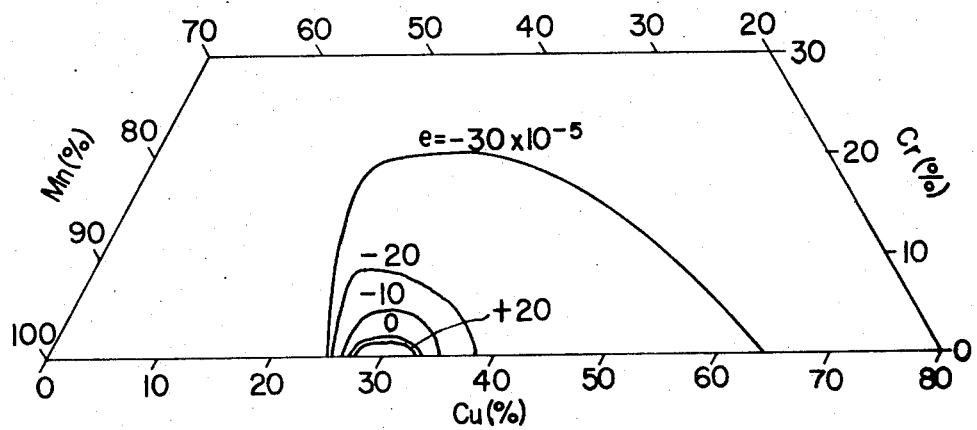
FIGS. 19A to 19C are diagrams similar to FIG. 18, showing the relation between the compositions of manganese-copper-chromium ternary alloys of the invention and mean temperature coefficients of Young's modulus $e$ thereof between 0° C. and 40° C., for the state as cold-worked and for the state as tempered under different conditions after the cold-work.
Figure 19B:
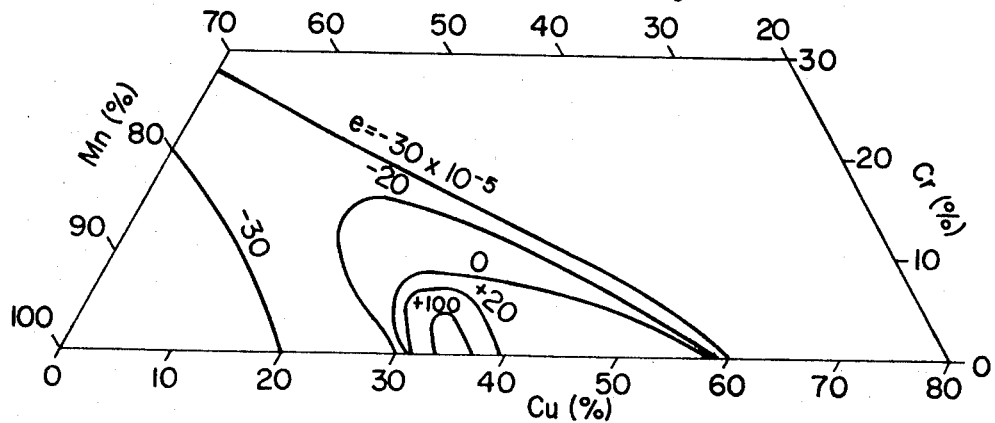
Figure 19C:
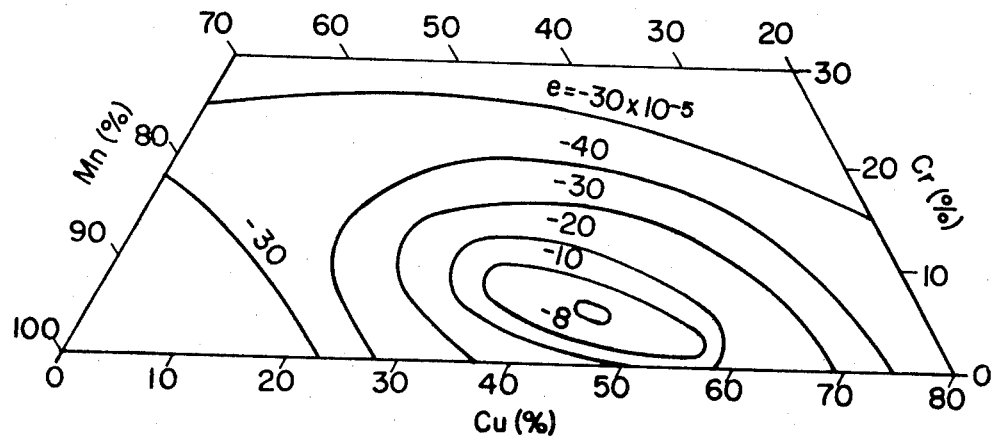

FIG. 19A shows the relation between the composition of the manganese-copper-chromium ternary alloy and the mean temperature coefficient of Young's modulus $e$ thereof, 0° C. to 40° C., for the state as cold-worked (B) after the annealing. FIGS. 19B and 19C show similar relations for the same alloy for the states as tempered (B') by cooling at a speed of 100° C./hour after heating at different temperatures for one hour, respectively.

Figure 20A:
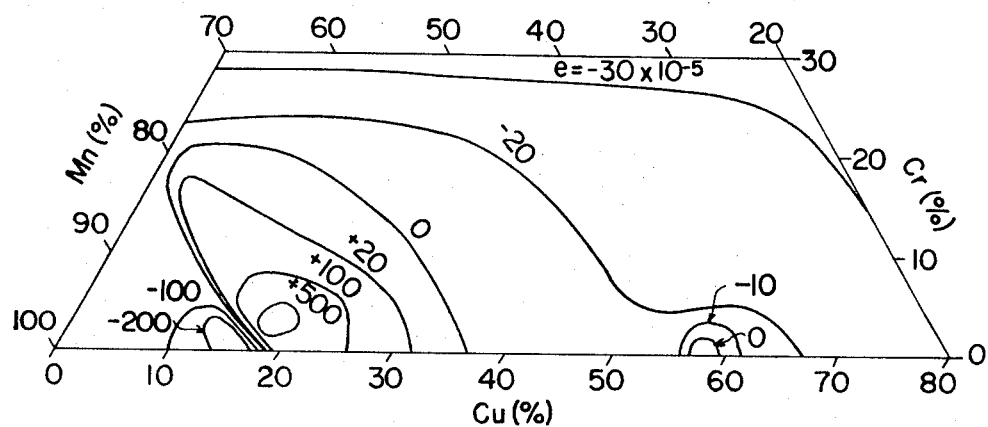
FIGS. 20A to 20C are diagrams similar to FIG. 18, showing the relation between the compositions of manganese-copper-chromium ternary alloys of the invention and the mean temperature coefficients of Young's modulus thereof, for the state as water quenched and for the state as tempered under different conditions after the water quenching.
Figure 20B:
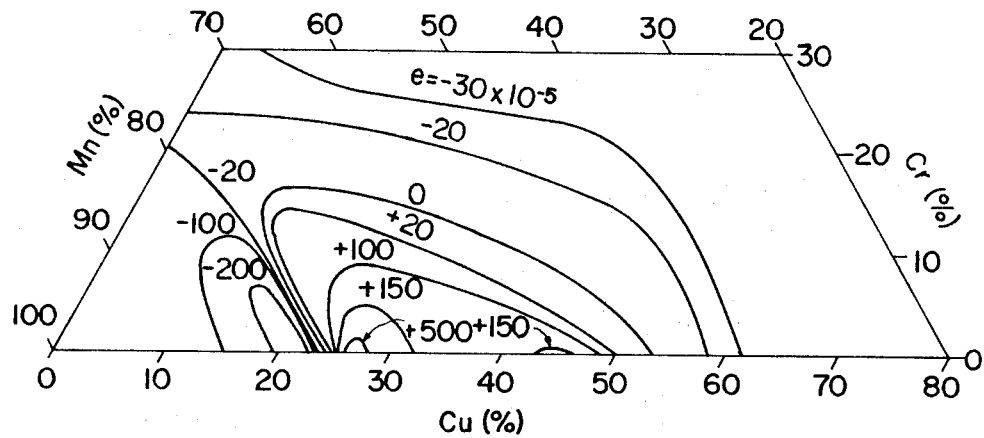
Figure 20C:
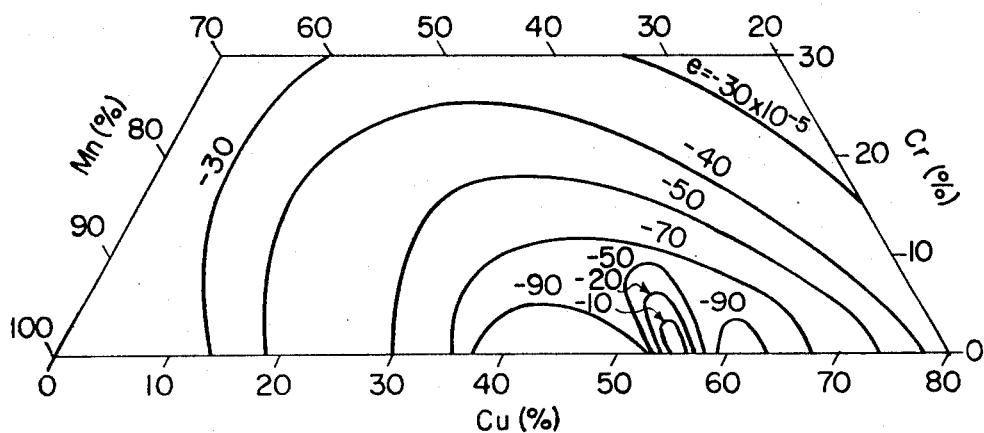

FIG. 20A shows the similar relation for the same manganese-copper-chromium ternary alloy for the state as water quenched (C) after the annealing. FIGS. 20B and 20C show similar relations for the same alloy for the states as tempered (C') by cooling at a speed of 100° C./hour after heating for one hour at different temperatures, respectively.

Tables 8, 9 and 10 summarize typical measured values of physical properties, inclusive of Vickers hardness of the manganese-copper-chromium alloys having compositions of the present invention.

TABLE 8

[Properties of Mn-Cu-Cr alloys as annealed by cooling at a speed of 100° C/hour after heating at 950° C. for 1 hour]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Cr (percent) | | | | | |
| 44.20 | 55.00 | 0.80 | 13.50×10⁵ | −5.00×10⁻⁵ | 5.13×10⁵ | −6.52×10⁻⁵ | 145 |
| 36.30 | 55.20 | 8.50 | 13.85×10⁵ | −17.90×10⁻⁵ | 5.18×10⁵ | −18.02×10⁻⁵ | 152 |
| 41.70 | 53.00 | 5.30 | 13.77×10⁵ | −18.50×10⁻⁵ | 5.15×10⁵ | −18.99×10⁻⁵ | 151 |
| 35.30 | 59.50 | 5.20 | 12.82×10⁵ | −19.20×10⁻⁵ | 5.09×10⁵ | −19.53×10⁻⁵ | 140 |

TABLE 9

[Properties of Mn-Cu-Cr alloys, as water quenched and as tempered after water quenching]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Cr (percent) | | | | | |
| As water quenched after heating at 950° C. for 1 hr. after annealing of Table 8 | | | | | | | |
| 79.49 | 1.01 | 19.50 | 12.55×10⁵ | −0.30×10⁻⁵ | 5.35×10⁵ | −0.56×10⁻⁵ | 675 |
| 74.50 | 4.00 | 21.50 | 12.65×10⁵ | +0.53×10⁻⁵ | 5.38×10⁵ | +0.55×10⁻⁵ | 603 |
| 82.90 | 7.00 | 10.10 | 11.55×10⁵ | +0.80×10⁻⁵ | 5.33×10⁵ | +0.95×10⁻⁵ | 480 |
| 70.00 | 10.20 | 19.80 | 10.89×10⁵ | +1.50×10⁻⁵ | 5.26×10⁵ | +2.03×10⁻⁵ | 475 |
| 59.40 | 20.50 | 20.10 | 10.95×10⁵ | +18.50×10⁻⁵ | 5.27×10⁵ | +19.55×10⁻⁵ | 502 |
| 60.70 | 20.20 | 19.10 | 11.00×10⁵ | +2.50×10⁻⁵ | 5.31×10⁵ | +3.56×10⁻⁵ | 485 |
| 62.50 | 30.20 | 7.30 | 10.85×10⁵ | +0.55×10⁻⁵ | 5.29×10⁵ | +0.67×10⁻⁵ | 180 |
| 49.50 | 35.20 | 15.30 | 11.50×10⁵ | −19.50×10⁻⁵ | 5.25×10⁵ | −16.55×10⁻⁵ | 230 |
| 40.95 | 57.50 | 1.55 | 11.58×10⁵ | +0.30×10⁻⁵ | 5.26×10⁵ | +0.29×10⁻⁵ | 172 |
| 35.35 | 60.15 | 4.50 | 10.83×10⁵ | −18.50×10⁻⁵ | 5.13×10⁵ | −19.02×10⁻⁵ | 133 |

TABLE 9—Continued

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
| --- | --- | --- | --- | --- | --- | --- | --- |
| Mn (percent) | Cu (percent) | Cr (percent) | | | | | |
| As tempered by cooling at 100° C./hr. after heating at 400° C. for 1 hr., following the above referred water quenching | | | | | | | |
| 76.83 | 2.02 | 21.15 | 12.95×10⁵ | −16.50×10⁻⁵ | 5.66×10⁵ | −17.21×10⁻⁵ | 702 |
| 72.62 | 11.15 | 16.23 | 12.87×10⁵ | −1.22×10⁻⁵ | 5.64×10⁵ | −3.25×10⁻⁵ | 600 |
| 74.86 | 15.02 | 10.12 | 12.66×10⁵ | +18.55×10⁻⁵ | 5.57×10⁵ | +16.22×10⁻⁵ | 415 |
| [63.64 | 15.02 | 21.34 | 13.15×10⁵ | −16.55×10⁻⁵ | 5.98×10⁵ | −17.21×10⁻⁵ | 598 |
| 64.42 | 20.15 | 15.43 | 13.06×10⁵ | +1.52×10⁻⁵ | 5.92×10⁵ | +1.99×10⁻⁵ | 445 |
| 58.82 | 30.25 | 10.93 | 12.85×10⁵ | +14.25×10⁻⁵ | 5.67×10⁵ | +13.26×10⁻⁵ | 220 |
| 52.53 | 30.22 | 17.25 | 12.63×10⁵ | −15.65×10⁻⁵ | 5.63×10⁵ | −16.25×10⁻⁵ | 235 |
| 55.12 | 34.98 | 9.90 | 12.53×10⁵ | +1.67×10⁻⁵ | 5.61×10⁵ | +2.33×10⁻⁵ | 220 |
| 49.56 | 45.55 | 4.89 | 12.06×10⁵ | +5.66×10⁻⁵ | 5.58×10⁵ | +6.76×10⁻⁵ | 169 |
| 49.75 | 48.23 | 2.02 | 11.33×10⁵ | +16.57×10⁻⁵ | 5.43×10⁵ | +18.25×10⁻⁵ | 133 |
| 41.70 | 53.22 | 5.08 | 11.34×10⁵ | −15.55×10⁻⁵ | 5.36×10⁵ | −16.24×10⁻⁵ | 160 |
| As tempered by cooling at 100° C./hr. after heating at 600° C. for 1 hr., following the above referred water quenching | | | | | | | |
| 42.85 | 51.12 | 6.03 | 12.25×10⁵ | −16.22×10⁻⁵ | 5.31×10⁵ | −16.85×10⁻⁵ | 230 |
| 44.83 | 52.13 | 3.04 | 12.13×10⁵ | −18.25×10⁻⁵ | 5.34×10⁵ | −18.77×10⁻⁵ | 240 |
| 43.77 | 54.02 | 2.21 | 12.16×10⁵ | −6.24×10⁻⁵ | 5.36×10⁵ | −7.03×10⁻⁵ | 210 |
| 42.88 | 56.11 | 1.01 | 12.11×10⁵ | −10.12×10⁻⁵ | 5.33×10⁵ | −11.25×10⁻⁵ | 190 |

TABLE 10

[Properties of Mn-Cu-Cr alloys, as cold-worked and as tempered after cold-work]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
| --- | --- | --- | --- | --- | --- | --- | --- |
| Mn (percent) | Cu (percent) | Cr (percent) | | | | | |
| As cold-worked with a working rate of 96% after annealing of Table 8 | | | | | | | |
| 69.50 | 25.30 | 5.20 | 9.23×10⁵ | −17.50×10⁻⁵ | 4.66×10⁵ | −18.25×10⁻⁵ | 205 |
| 70.10 | 28.00 | 1.90 | 9.16×10⁵ | +0.55×10⁻⁵ | 4.63×10⁵ | +0.63×10⁻⁵ | 180 |
| 62.37 | 30.53 | 7.10 | 9.65×10⁵ | −19.50×10⁻⁵ | 4.82×10⁵ | −19.76×10⁻⁵ | 275 |
| 61.40 | 35.10 | 3.50 | 9.52×10⁵ | −19.00×10⁻⁵ | 4.77×10⁵ | −19.55×10⁻⁵ | 239 |
| As tempered by cooling at 100° C./hr. after heating at 400° C. for 1 hr., following the above cold-work | | | | | | | |
| 69.42 | 20.50 | 10.08 | 10.02×10⁵ | −19.00×10⁻⁵ | 4.79×10⁵ | −19.55×10⁻⁵ | 400 |
| 59.18 | 27.00 | 13.82 | 11.25×10⁵ | −18.91×10⁻⁵ | 4.83×10⁵ | −19.21×10⁻⁵ | 405 |
| 66.50 | 27.10 | 6.40 | 9.89×10⁵ | +0.55×10⁻⁵ | 4.66×10⁵ | +0.68×10⁻⁵ | 390 |
| 57.30 | 35.20 | 7.50 | 10.00×10⁵ | −0.83×10⁻⁵ | 4.76×10⁵ | −0.99×10⁻⁵ | 383 |
| 53.33 | 40.12 | 6.55 | 9.65×10⁵ | +1.62×10⁻⁵ | 4.63×10⁵ | +2.35×10⁻⁵ | 310 |
| 46.20 | 50.30 | 3.50 | 9.66×10⁵ | +2.54×10⁻⁵ | 4.63×10⁵ | +3.25×10⁻⁵ | 315 |
| 59.83 | 35.20 | 4.97 | 11.33×10⁵ | +19.58×10⁻⁵ | 4.86×10⁵ | +16.55×10⁻⁵ | 402 |
| 54.90 | 42.00 | 3.10 | 11.02×10⁵ | +15.57×10⁻⁵ | 4.77×10⁵ | +16.67×10⁻⁵ | 305 |
| As tempered by cooling at 100° C./hr. after heating at 600° C. for 1 hr., following the above cold-work | | | | | | | |
| 59.40 | 30.50 | 10.10 | 12.95×10⁵ | −19.51×10⁻⁵ | 5.36×10⁵ | −19.66×10⁻⁵ | 445 |
| 52.40 | 35.10 | 12.50 | 12.77×10⁵ | −19.02×10⁻⁵ | 5.34×10⁵ | −19.83×10⁻⁵ | 395 |
| 66.30 | 24.50 | 9.20 | 13.63×10⁵ | −9.55×10⁻⁵ | 5.76×10⁵ | −10.02×10⁻⁵ | 525 |
| 55.70 | 40.10 | 4.20 | 12.63×10⁵ | −9.85×10⁻⁵ | 5.29×10⁵ | −9.96×10⁻⁵ | 365 |
| 52.01 | 42.50 | 5.49 | 11.87×10⁵ | −8.00×10⁻⁵ | 5.18×10⁵ | −9.25×10⁻⁵ | 300 |
| 53.82 | 45.15 | 1.03 | 11.88×10⁵ | −19.62×10⁻⁵ | 5.18×10⁵ | −19.39×10⁻⁵ | 313 |
| 47.70 | 45.10 | 7.20 | 10.65×10⁵ | −9.50×10⁻⁵ | 5.06×10⁵ | −10.03×10⁻⁵ | 255 |
| 49.75 | 46.15 | 4.10 | 10.23×10⁵ | −7.91×10⁻⁵ | 5.01×10⁵ | −8.21×10⁻⁵ | 230 |
| 42.03 | 50.20 | 7.77 | 10.28×10⁵ | −19.62×10⁻⁵ | 5.03×10⁵ | −19.26×10⁻⁵ | 237 |
| 39.61 | 58.15 | 2.34 | 10.33×10⁵ | −19.82×10⁻⁵ | 5.03×10⁵ | −19.79×10⁻⁵ | 230 |

Figure 21:
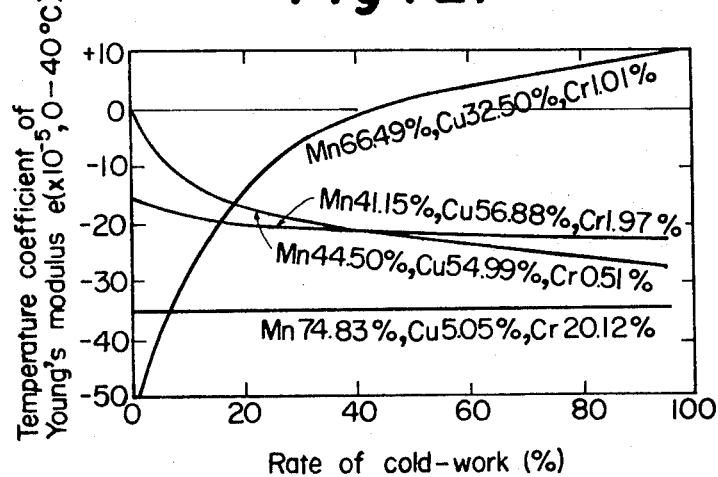
FIG. 21 is a graph illustrating the relation between the mean temperature coefficient of Young's modulus, from 0° C. to 40° C., of four different ternary alloys of the invention and the working rate of cold-work applied thereto.

FIG. 21 illustrates the relation between the working rate of the cold-work and the temperature coefficient of Young's modulus $e$, for four different Mn-Cu-Cr ternary alloys according to the present invention. Table 11 shows the relation between the cooling speed and the temperature coefficient of Young's modulus $e$, 0° C. to 40° C., for the same four different ternary alloys as FIG. 21.

Figure 22:
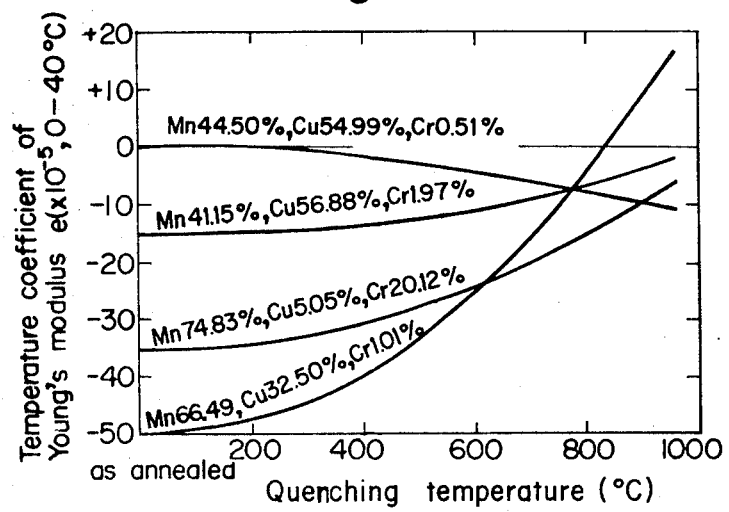
FIG. 22 is a graph illustrating the relation between the mean temperature coefficient of Young's modulus, from 0° C. to 40° C., of four different ternary alloys of the invention and the quenching temperature thereof.

Similarly, FIG. 22 shows the relation between the quenching temperature and the temperature coefficient of Young's modulus $e$, for the same four different alloys of the invention as FIG. 21.

Figure 23:
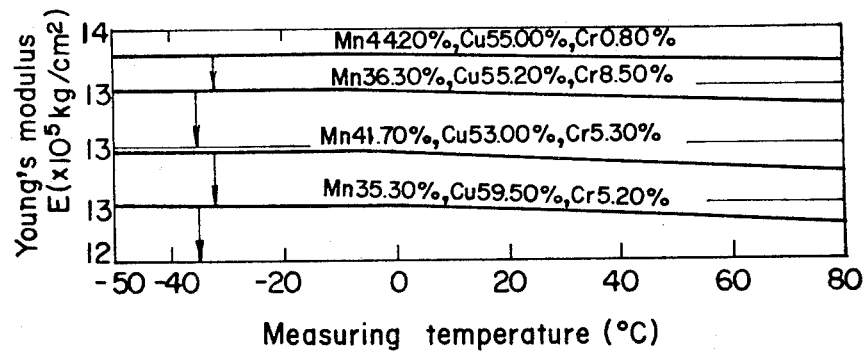
FIG. 23 is a graph showing the Young's modulus of the manganese-copper-chromium ternary alloys of the invention at different temperatures, with the composition of the ternary alloy as a parameter, for the state as annealed.

FIG. 23 illustrates the values of Young's modulus at various temperatures from −50° C. to 80° C., for different Mn-Cu-Cr ternary alloys of the invention in the state as annealed by cooling at a speed of 100° C./hour after heating at 950° C. for 1 hour.

Figure 24A:
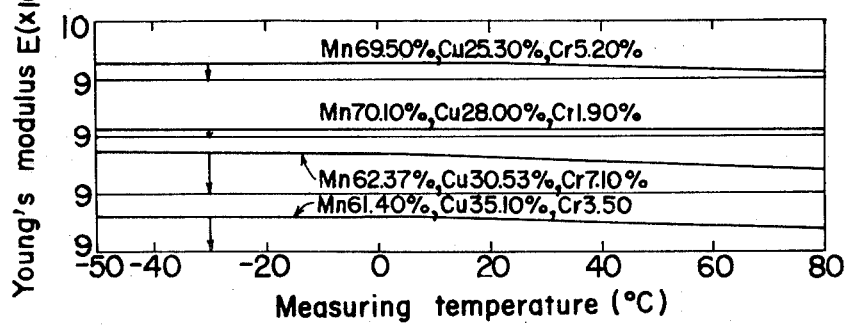
FIGS. 24A to 24C are graphis similar to FIG. 23, illustrating the Young's modulus of the ternary alloys at different temperatures, for the state as cold-worked with a working rate 96% and for the state as tempered under different conditions after the cold-work.
Figure 24B:
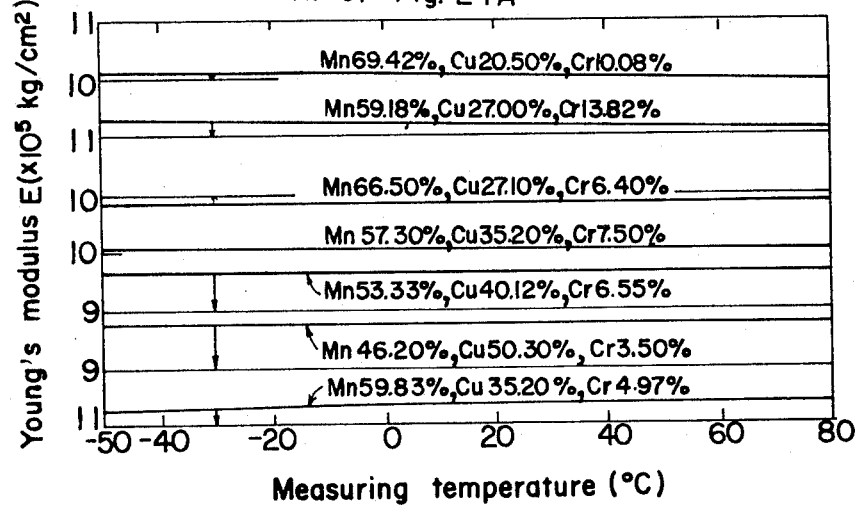
Figure 24C:
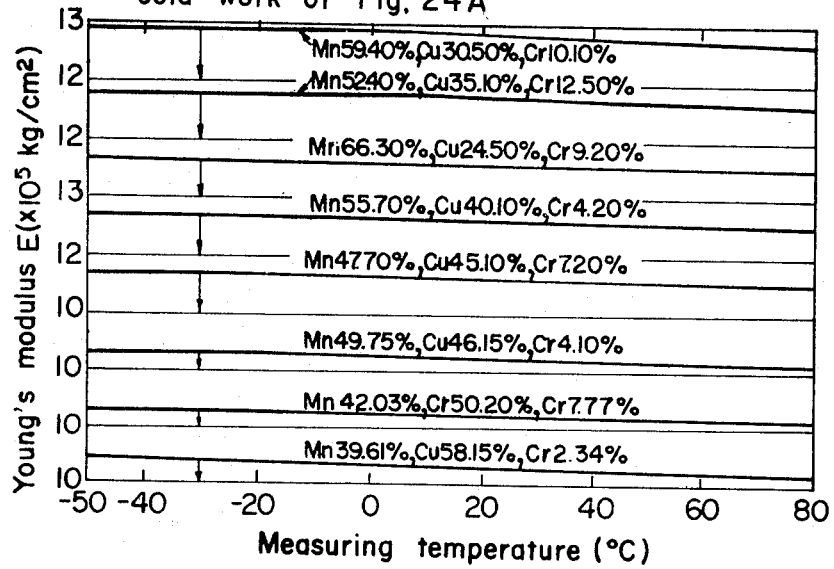

FIGS. 24A to 24C show the values of Young's modulus at various temperatures from −50° C. to 80° C., for different Mn-Cu-Cr ternary alloys of the invention in the state as cold-worked with a working rate of 96% after the annealing of FIG. 23 and in the states as tempered by cooling at a speed of 100° C./hour after heating at

TABLE 11

[Relation between cooling speed and temperature coefficient of Young's modulus $e$, 0° C. to 40° C., for Mn-Cu-Cr alloys]

| Alloy composition | | | Cooling speed after heating at 950° C. for 1 hour | | | | |
| --- | --- | --- | --- | --- | --- | --- | --- |
| Mn (percent) | Cu (percent) | Cr (percent) | 170° C./sec. (water quenched) | 9° C./sec. (air quenched) | 500° C./hour (annealed) | 100° C./hour (annealed) | 10° C./hour (annealed) |
| 66.49 | 32.50 | 1.01 | +10.22×10⁻⁵ | −5.45×10⁻⁵ | −32.33×10⁻⁵ | −35.12×10⁻⁵ | −50.50×10⁻⁵ |
| 74.83 | 5.05 | 20.12 | +5.31×10⁻⁵ | −8.20×10⁻⁵ | −32.11×10⁻⁵ | −35.36×10⁻⁵ | −46.33×10⁻⁵ |
| 44.50 | 54.99 | 0.51 | −12.12×10⁻⁵ | −8.18×10⁻⁵ | −0.85×10⁻⁵ | +0.11×10⁻⁵ | +4.18×10⁻⁵ |
| 41.15 | 56.88 | 1.97 | +0.13×10⁻⁵ | −5.54×10⁻⁵ | −14.51×10⁻⁵ | −15.65×10⁻⁵ | −20.19×10⁻⁵ | different temperatures for 1 hour following the above referred cold-work, respectively.

Figure 25A:
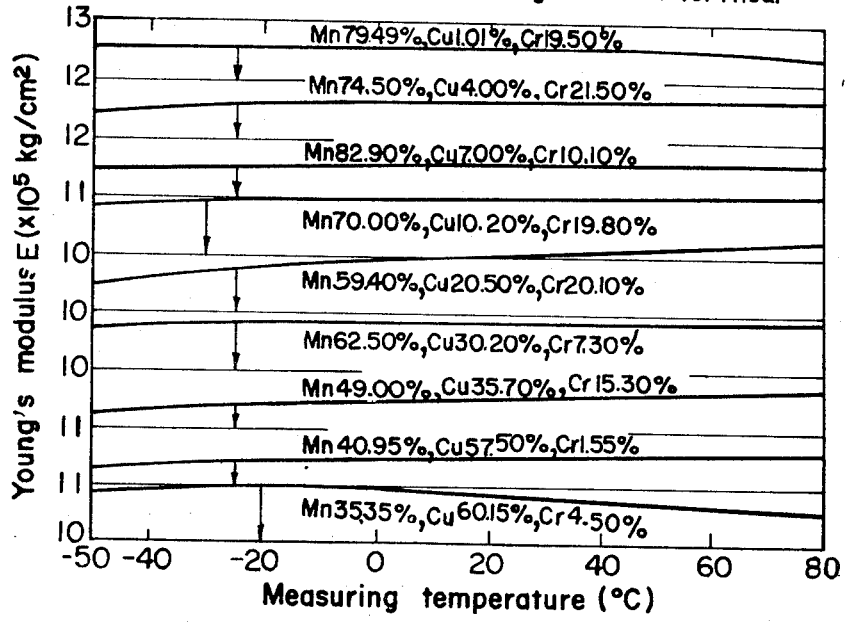
FIGS. 25A to 25C are graphs similar to FIGS. 24A to 24C, respectively, illustrating the Young's modulus of the ternary alloys at different temperatures, for the state as water quenched and for the state as tempered under different conditions after the water quenching.
Figure 25B:
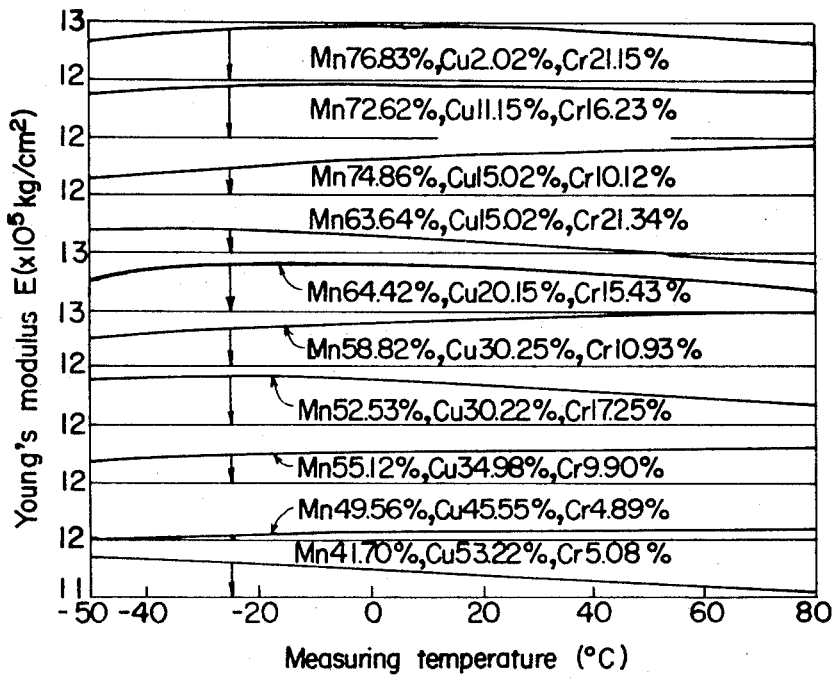
Figure 25C:
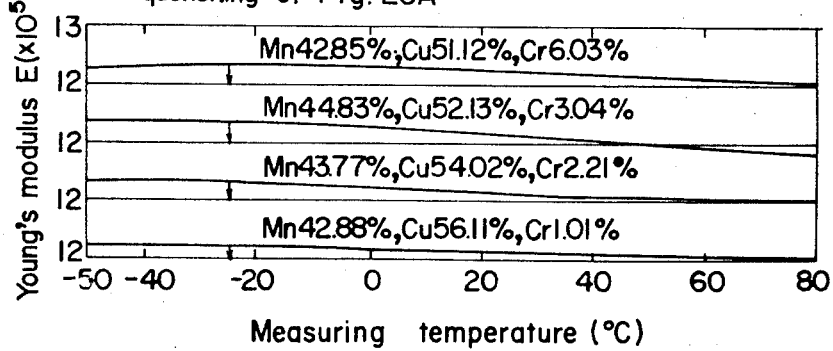

FIGS. 25A to 25C show the values of Young's modulus at various temperatures from −50° C. to 80° C., for different Mn-Cu-Cr ternary alloys of the invention in the states as water quenched after the annealing of FIG. 23 and in the states as tempered by cooling at a speed of 100° C./hour after heating at different temperatures for 1 hour following the above referred water quenching, respectively.

As can be seen from FIG. 18 and FIGS. 19A to 19C, manganese-copper-chromium ternary alloys consisting of up to 70 wt. percent of copper, up to 24 wt. percent of chromium, and 30 to 95 wt. percent of manganese have temperature coefficients of Young's modulus $e$ ranging from a comparatively large negative value to a comparatively large positive value, depending on the composition of the alloys, in any of the states as annealed (A), as cold-worked (B) with a working rate of 96% after the annealing, and as tempered (B′) after the cold-work. Accordingly, those Mn-Cu-Cr alloys, whose temperature coefficient of Young's modulus $e$ falls in a narrow range crossing the zero line between a negative value domain and a positive value domain, have the so-called Elinvar characteristics or temperature-independent elasticity.

As can be seen from FIGS. 20A to 20C, the manganese-copper-chromium alloys, consisting of up to 70 wt. percent of copper, up to 24 wt. percent of chromium, and 30 to 95 wt. percent of manganese, have temperature coefficients of Young's modulus $e$, which vary greatly depending on the composition of the alloys in any of the states as water quenched (C) after the annealing, and as tempered (C′) after the water quenching. Accordingly, the manganese-copper-chromium ternary alloys as water quenched (C) and as tempered (C′) can also have the so-called Elinvar characteristics, as in the case of FIGS. 19A to 19C.

In the case of FIG. 19A, the working rate for the cold-work process was 96%. FIG. 21 illustrates the effects of different working rates, or different degrees of cold-work, on the temperature coefficient of Young's modulus $e$, for four different ternary alloys of the invention. As can be seen from the figure, the temperature coefficient $e$ of the alloys of the invention can be improved by cold-work, even by slight cold-work with a working rate as small as 1%.

In the case of the heat treatments of FIGS. 18 and 20A, the annealing is carried out by cooling at a speed of 100° C./hour after heating at 950° C. for 1 hour, while the quenching is effected by water cooling from 950° C. to room temperature. Table 11 and FIG. 22 show how the temperature coefficient of Young's modulus $e$ is affected by variation of the cooling speed and the quenching temperature. It is apparent from Table 11 and FIG. 22 that the temperature coefficient $e$ is greatly affected by the cooling speed and the quenching temperature.

Since the physical properties of the alloys of the invention are greatly affected by the working rate of cold-work, the quenching temperature, and the cooling speed, the shape of the curves of FIGS. 19A to 19C and FIGS. 20A to 20C may well be greatly changed if the working rate, quenching temperature, and/or the cooling speed are changed from those on which the curves of the figures are based.

EXAMPLE 4

Ingredients of different samples (each weighing about 500 grams) of manganese-copper-iron and maganese-copper-cobalt ternary alloys of the invention, consisting of 30 to 88 wt. percent of manganese, 0.1 to 67 wt. percent of copper, and either 0.1 to 38 wt. percent of iron or 0.1 to 25 wt. percent of cobalt (for instance, as shown in Table 12), were melted in alumina crucibles, which were disposed in a high-frequency induction furnace or an electric resistance furnace, while passing argon gas therethrough. The molten ingredients were thoroughly agitated, and poured into iron moulds, for producing cylindrical ingots of about 100 mm. dia.

The ingots thus produced were heated at 900° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 900° C. for 1 hour. It is known to those skilled in the art that, as far as the resiliency of alloys is concerned, such heating at a solution treatment temperature (e.g., 900° C.) for 1 hour brings the alloy structure to a condition prior to the cold-work of the process (B). Accordingly, the ensuing slow cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 900° C. The first group specimens were annealed by cooling at a speed of 100° C./hour, which were used for the measurement of the effects of the aforesaid anealing of the process (A). The second group specimens were water quenched for the measurement of the effects of the aforesaid water quenching of the process (C).

Some of the aforesaid specimens subjected to the cold-work of the process (B) and the quenching of the process (C) were again heated at various temperatures below 800° C. for 1 hour, and cooled at a speed of 100° C./hour, so as to provide specimens for the measurement of the effects of the tempering of the processes (B′) and (C′), respectively.

The Young's modulus of the specimens was determined by measuring the resonant frequency thereof by a device having a sensitive electrostatic capacitor, and calculating the Young's modulus from the resonant frequency thus measured.

The cofficient of linear expansion $\alpha$ of the specimens in the proximity of room temperature was measured by using a precision linear dilatometer of vertical type.

The results of the measurements are shown in FIGS. 26A to 37E.

Figure 26A:
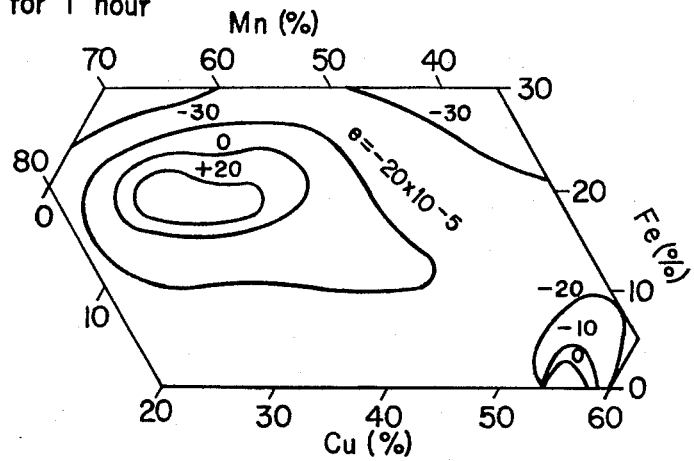
FIGS. 26A and 26B are diagrams illustrating the relations between the composition of ternary alloys of the invention and the mean temperature coefficient of Young's modulus $e$ thereof, 0° C. to 40° C., for manganese-copper-iron and manganese-copper-cobalt systems in the state as annealed, respectively.
Figure 26B:
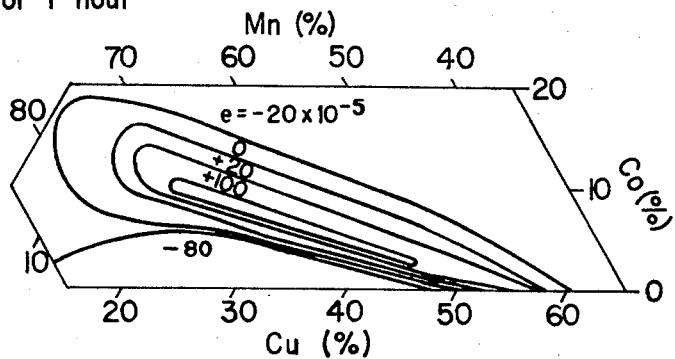

FIGS. 26A and 26B show the relation between the composition of the manganese-copper-iron and manganese-copper-cobalt ternary alloys and the mean temperature coefficient of Young's modulus $e$ thereof between 0° C. and 40° C. in the state as annealed by the process (A), respectively.

Figure 27A:
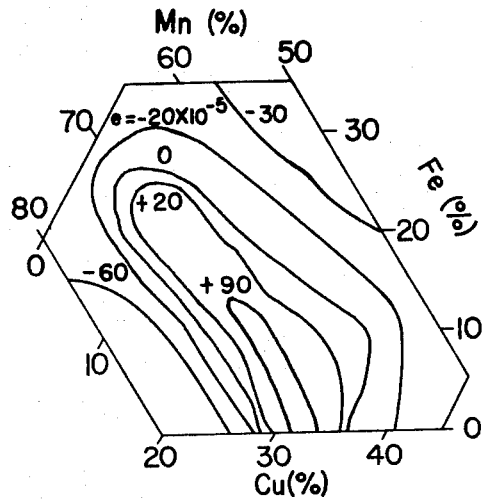
FIGS. 27A to 27E are diagrams similar to FIG. 26A, illustrating similar relations for the manganese-copper-iron ternary alloys of the invention, for the state as cold-worked and for the state as tempered under different conditions after the cold-work.
Figure 27B:
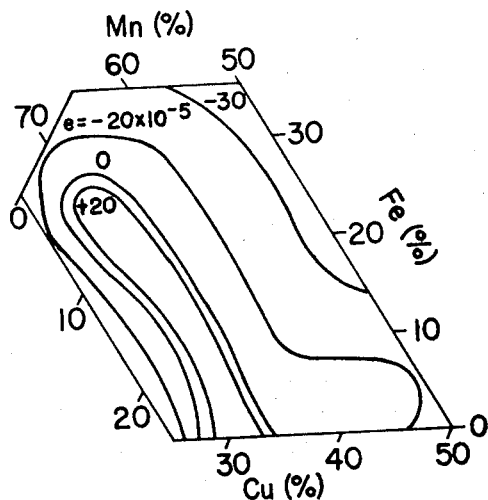
Figure 27C:
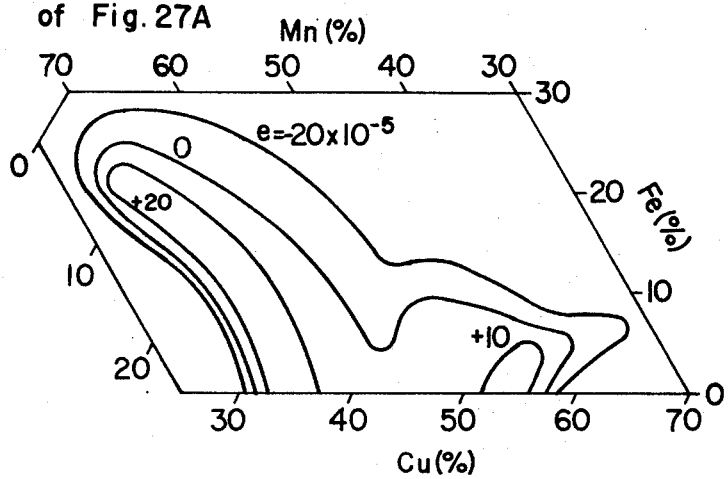
Figure 27D:
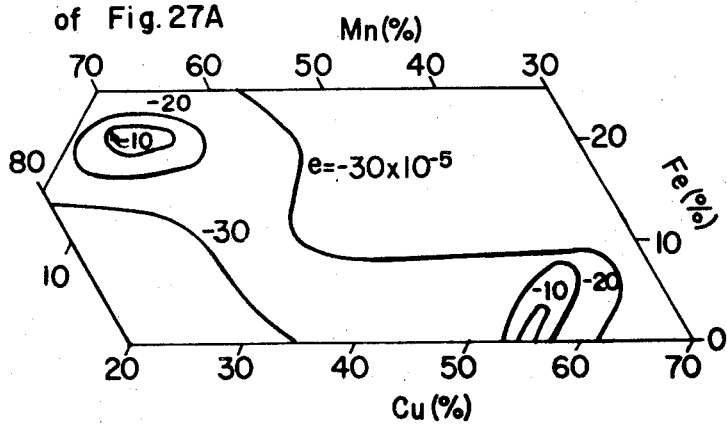
Figure 27E:
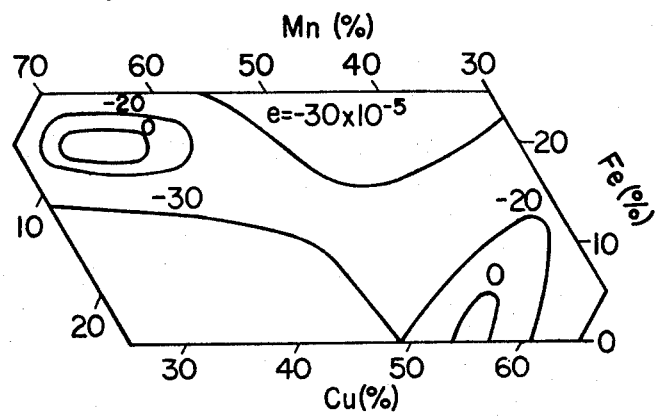
Figure 28A:
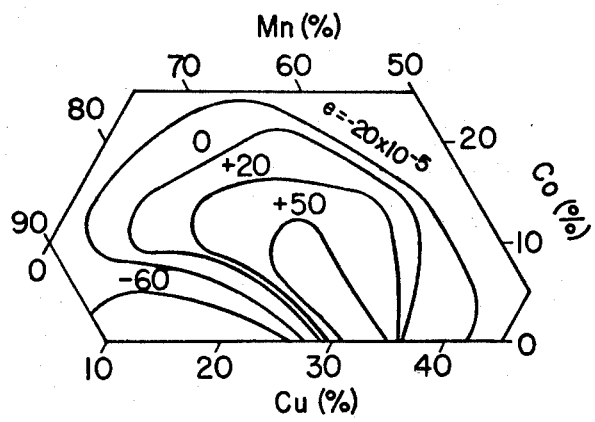
FIGS. 28A to 28E are diagrams similar to FIG. 26B, illustrating similar relations for the manganese-copper-cobalt ternary alloys of the invention, for the state as cold-worked and for the state as tempered under different conditions after the cold-work.
Figure 28B:
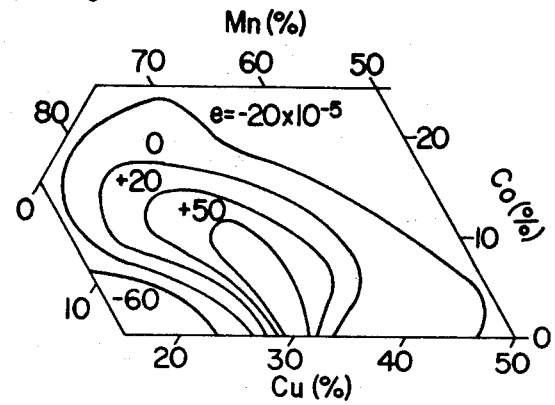
Figure 28C:
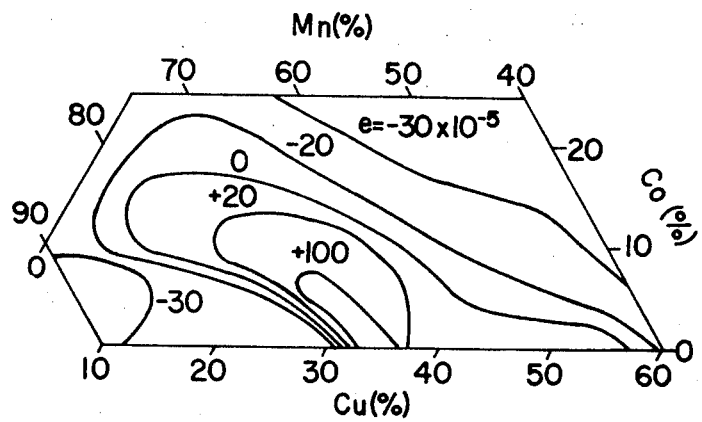
Figure 28D:
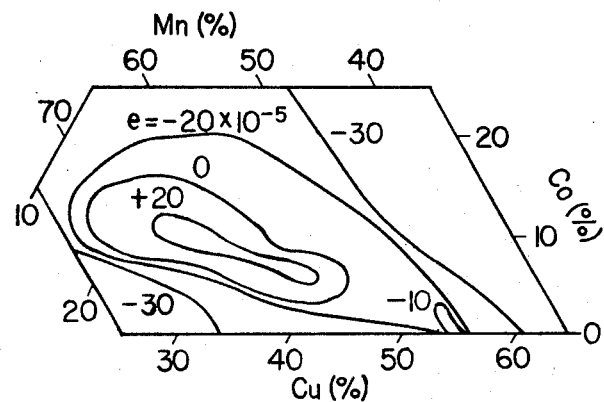
Figure 28E:
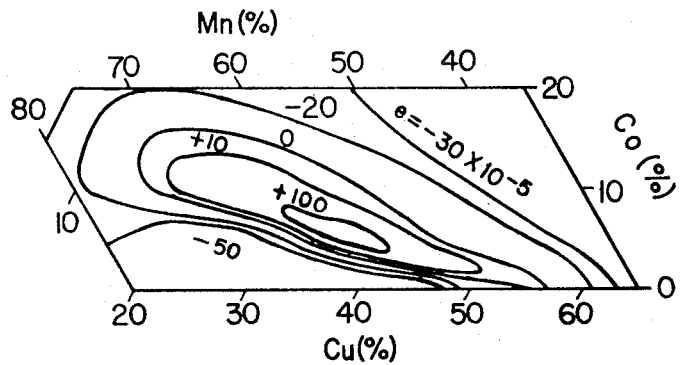

FIGS. 27A and 28A show the relations between the composition of the manganese-copper-iron and manganese-copper-cobalt ternary alloys and the mean temperature coefficient of Young's modulus $e$ thereof, 0° C. to 40° C., for the state as cold-worked (B) after the annealing, respectively. FIGS. 27B to 27E and FIGS. 28B to 28E show similar relations for the same alloy, respectively, for the state as tempered (B′) by cooling at a speed of 100° C./hour after heating at different temperatures for one hour.

Figure 29A:
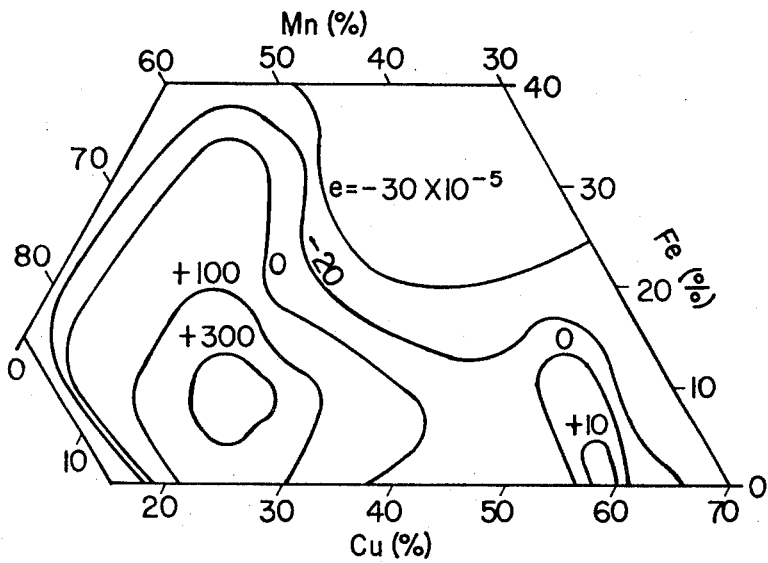
FIGS. 29A to 29E are diagrams similar to FIGS. 27A to 27E, respectively, illustrating similar relation for the manganese-copper-iron ternary alloys of the invention, for the state as water quenched and for the state as tempered under different conditions after the water quenching.
Figure 29B:
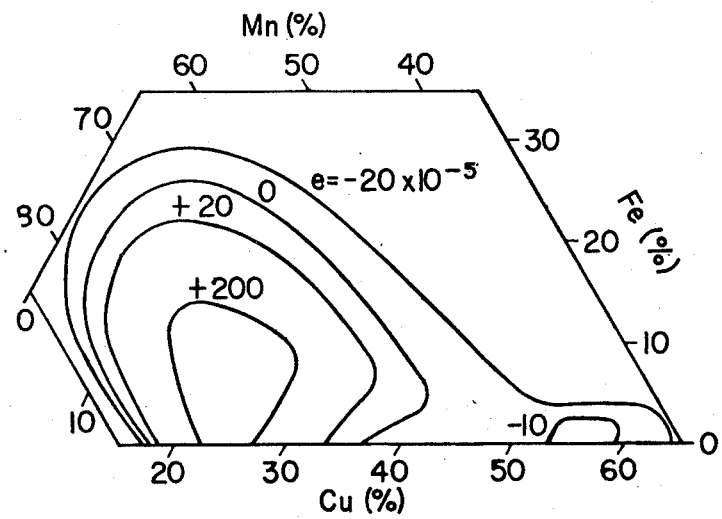
Figure 29C:
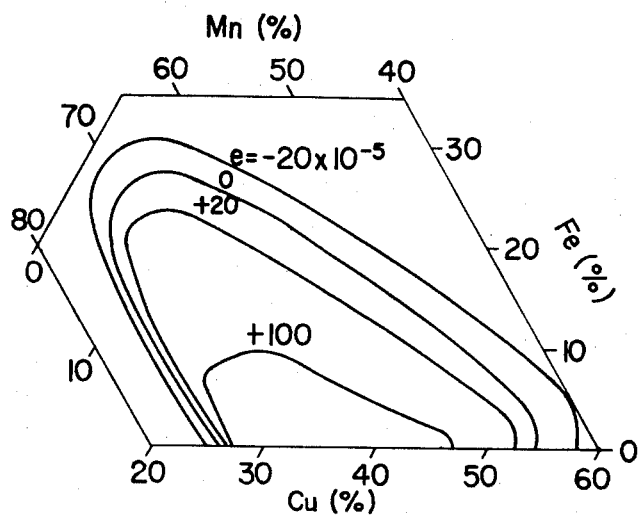
Figure 29D:
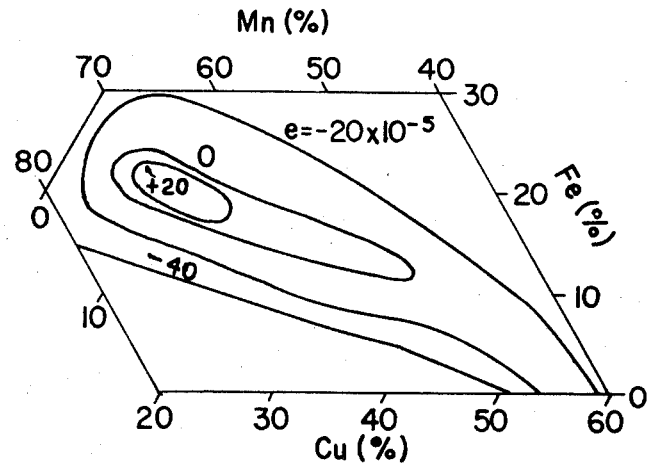
Figure 29E:
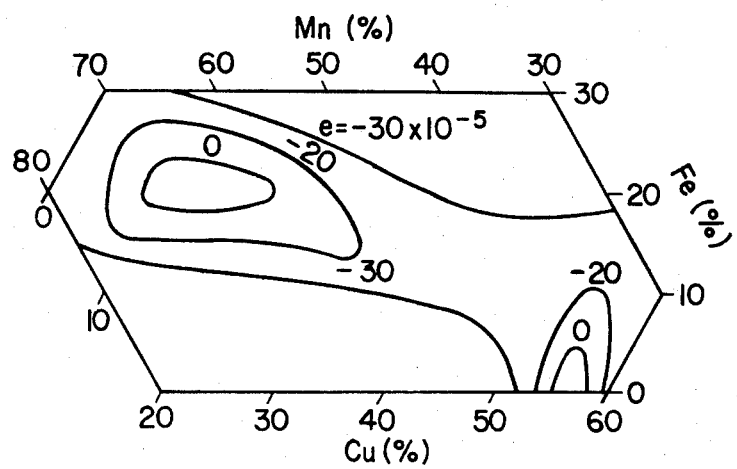
Figure 30A:
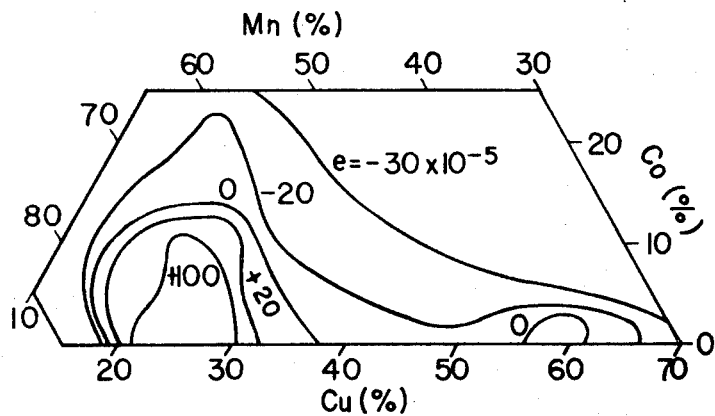
FIGS. 30A to 30E are diagrams similar to FIGS. 28A to 28E, respectively, illustrating similar relations for the manganese-copper-cobalt ternary alloys of the invention, for the state as water quenched and for the state as tempered at different temperatures after the water quenching.
Figure 30B:
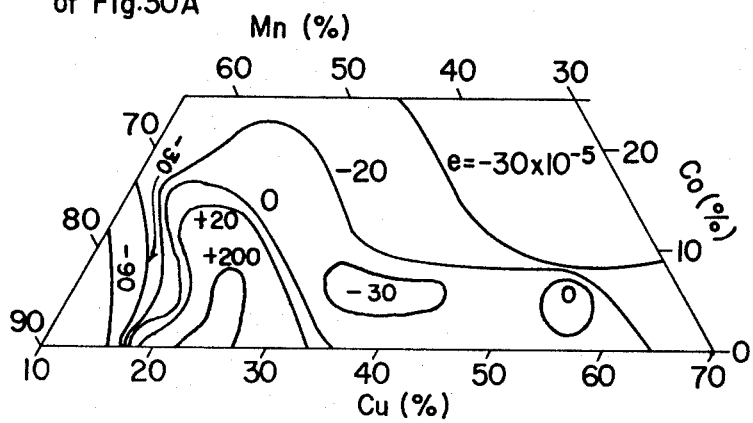
Figure 30C:
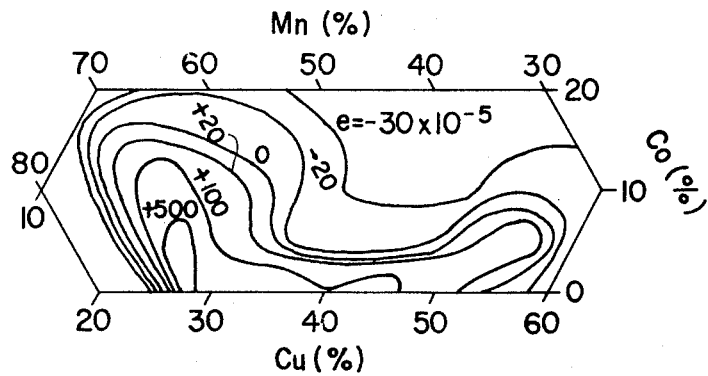
Figure 30D:
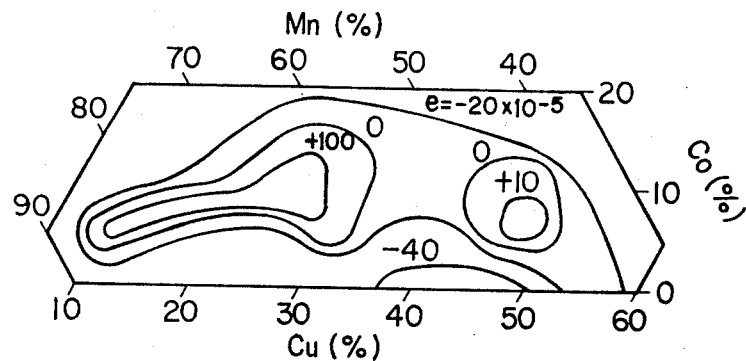
Figure 30E:
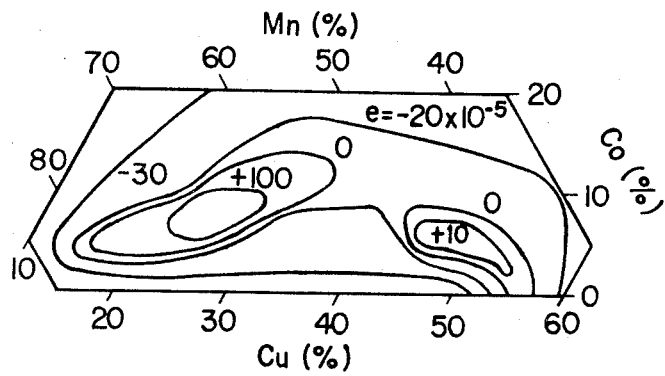

FIGS. 29A and 30A show the similar relations for the same manganese-copper-iron and manganese-copper-cobalt ternary alloys, respectively, for the state as water quenched (C) after the annealing. FIGS. 29B to 29E and FIGS. 30B to 30E show similar relations for the same alloys, respectively, for the state as tempered (C′) by cooling at a speed of 100° C./hour after heating for one hour at different temperatures.

Tables 12, 13A, 13B, 14A, and 14B summarize typical measured values of physical properties, inclusive of Vickers hardness, of manganese-copper-iron and manganesecopper-cobalt ternary alloys having compositions of the present invention.

Figure 31A:
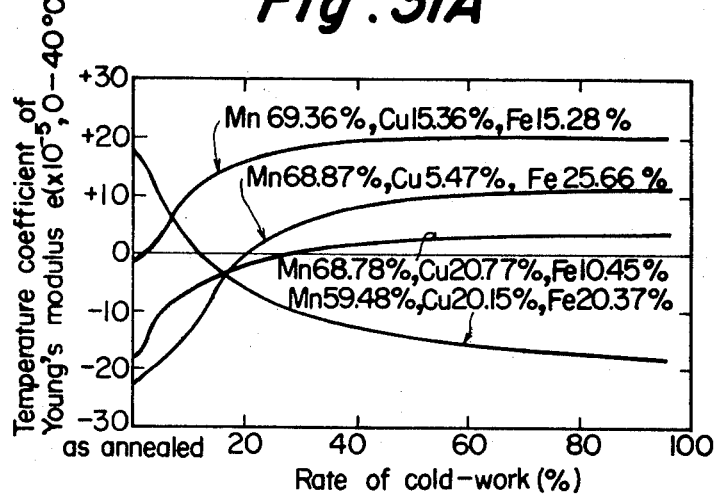
FIGS. 31A and 31B are graphs showing the relations between the mean temperature coefficient of Young's modulus $e$, 0° C. to 40° C., of ternary alloys of the invention and the working rate of cold-work applied thereto, for manganese-copper-iron and manganese-copper-cobalt systems, four specimens each, respectively.
Figure 31B:
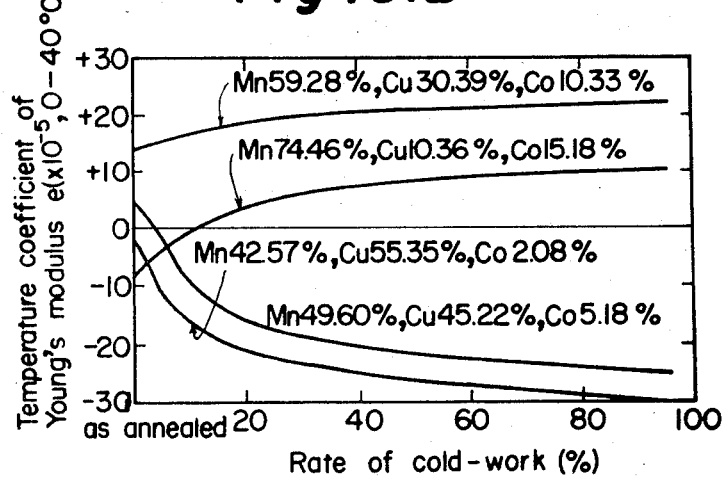

FIGS. 31A and 31B illustrate the relation between the working rate for the cold-work and the temperature coefficient of Young's modulus $e$ 0° C. to 40° C., for four manganese-copper-iron alloys and four manganese-copper-cobalt alloys, respectively.

Table 15 shows the relation between the cooling speed and the temperature coefficient of Young's modulus $e$, 0° C. to 40° C., for the same manganese-copper-iron alloys and manganese-copper-cobalt alloys as those of FIGS. 31A and 31B four specimens each.

Similarly, FIGS. 32A and 32B show the relation between the quenching temperature and the temperature coefficient of Young's modulus $e$, 0° C. to 40° C., for the same ternary alloys according to the invention as those of FIGS. 31A and 31B, respectively.

Figure 33A:
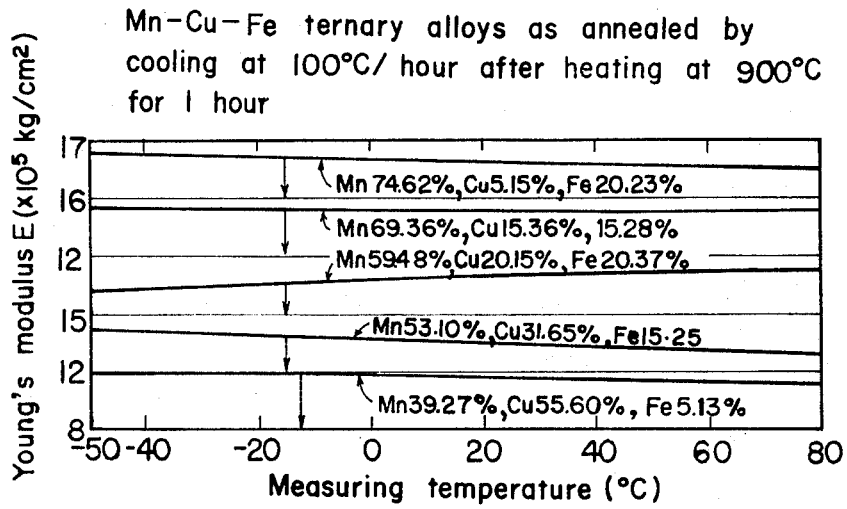
FIGS. 33A and 33B are graphs showing the Young's modulus of ternary alloys of the invention at different temperatures after being annealed by cooling at a speed of 100° C./hour after heating at 950° C. for one hour, for manganese-copper-iron and manganese-copper-cobalt systems, four specimens each, respectively.
Figure 33B:
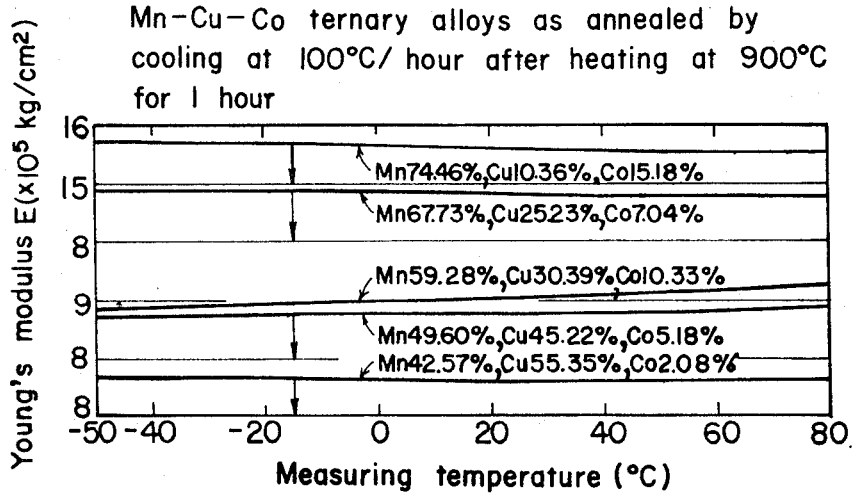
Figure 34A:
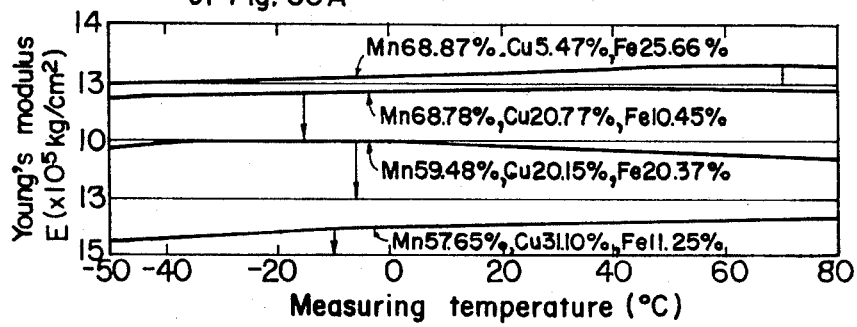
FIGS. 34A to 34E and FIGS. 35A to 35E illustrate the Young's moduli of manganese-copper-iron ternary alloys and manganese-copper-cobalt ternary alloys, respectively, for the state as cold-work with a working rate of 96% after the annealing and for the state as tempered under different conditions after the cold-work.
Figure 34B:
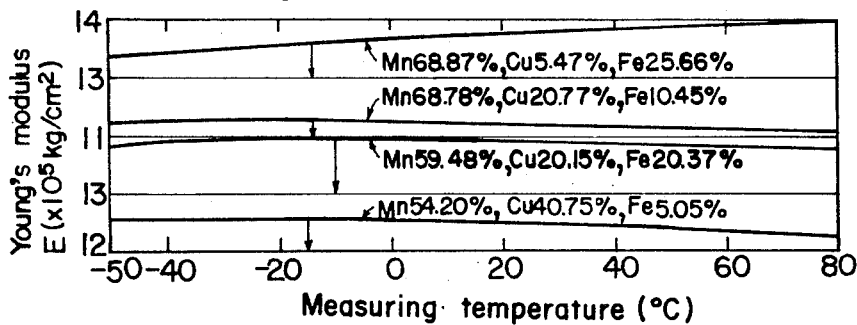
Figure 34C:
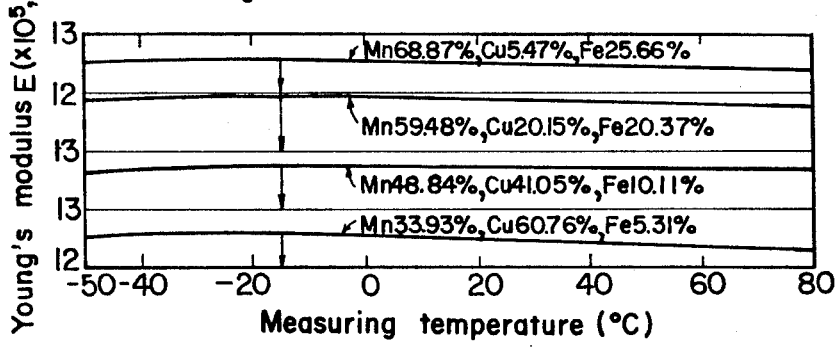
Figure 34D:
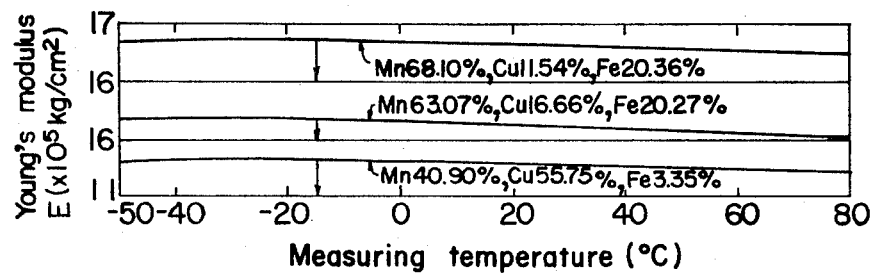
Figure 34E:
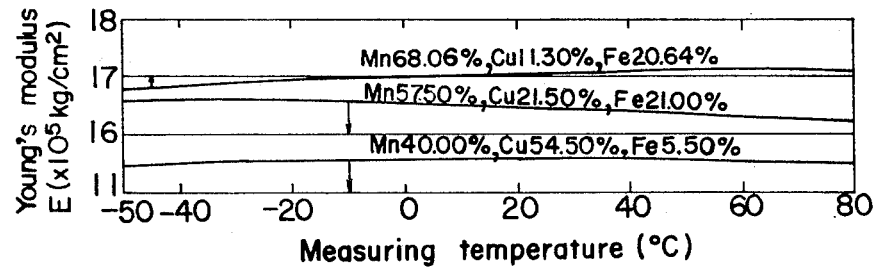
Figure 35A:
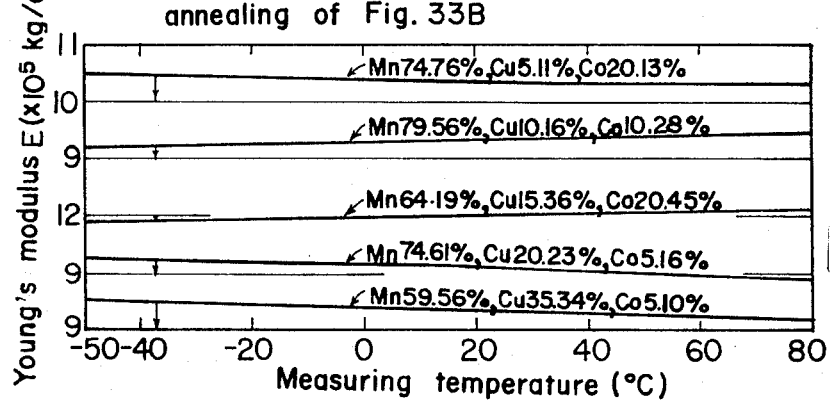
Figure 35B:
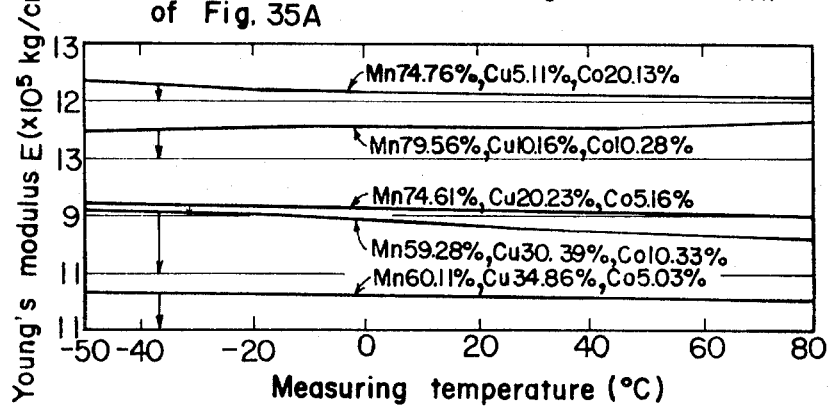
Figure 35C:
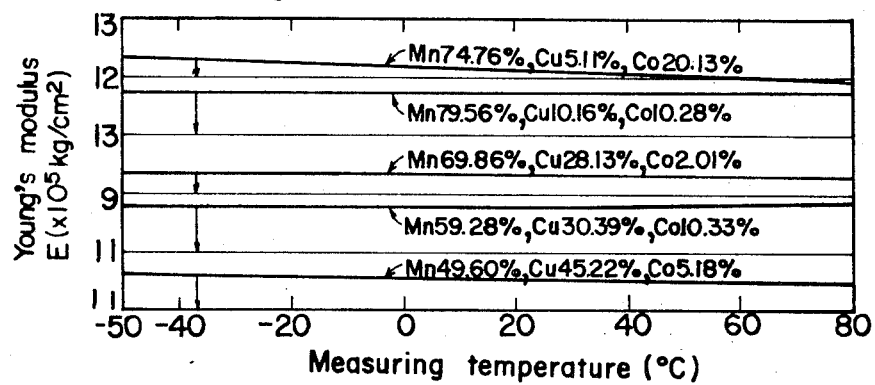
Figure 35D:
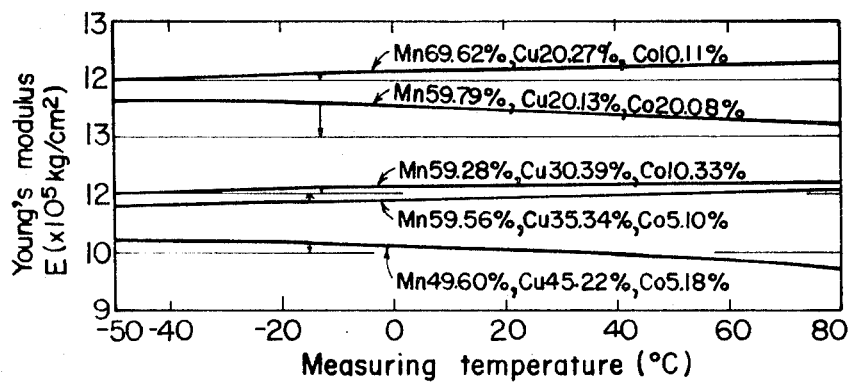
Figure 35E:
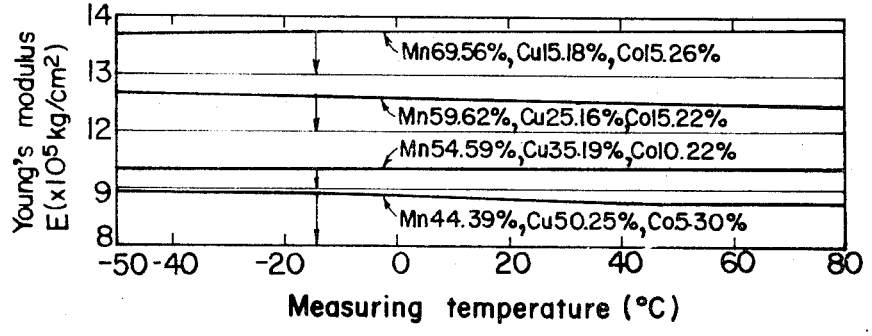
Figure 36A:
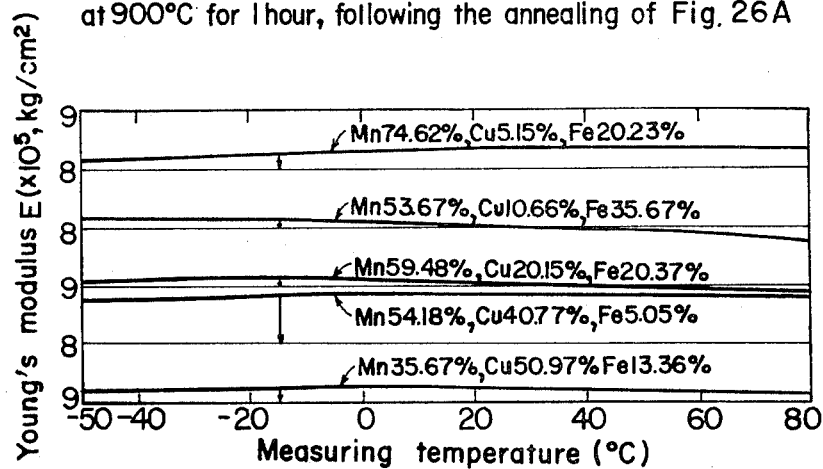
FIGS. 36A to 36E and FIGS. 37A to 37E illustrate the Young's moduli of manganese-copper-iron ternary alloys and manganese-copper-cobalt ternary alloys, respectively, for the state as water quenched after the annealing and for the state as tempered under different conditions after the water quenching.
Figure 36B:
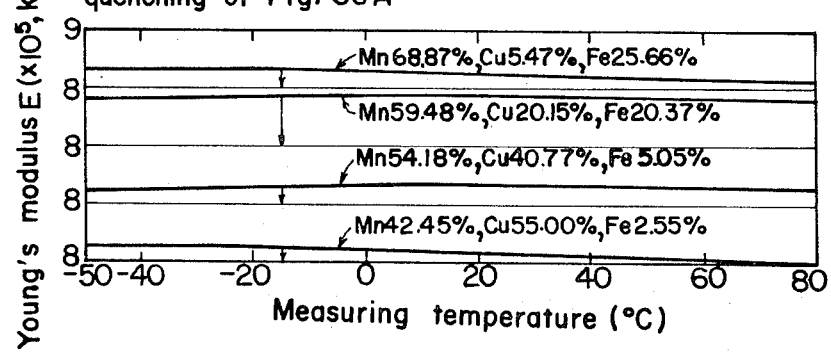
Figure 36C:
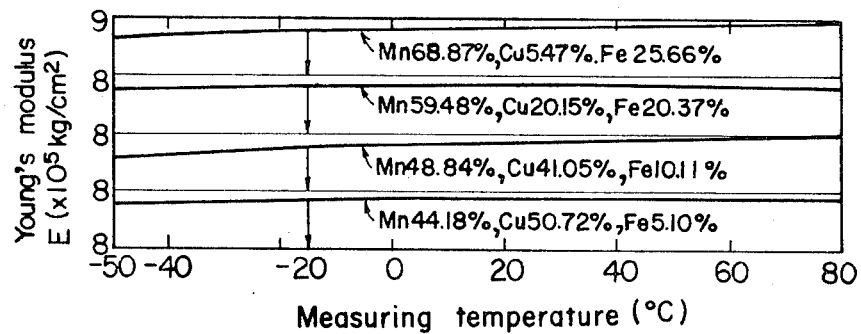
Figure 36D:
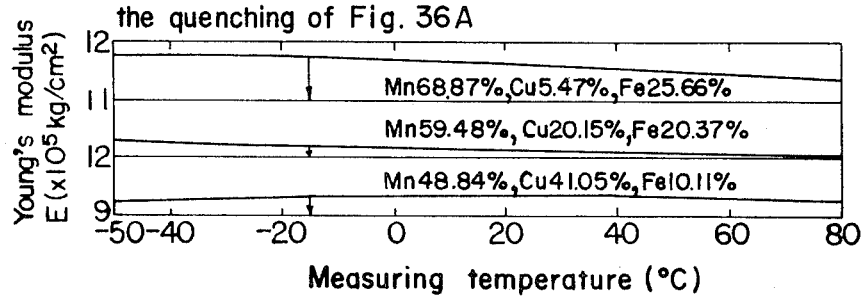
Figure 36E:
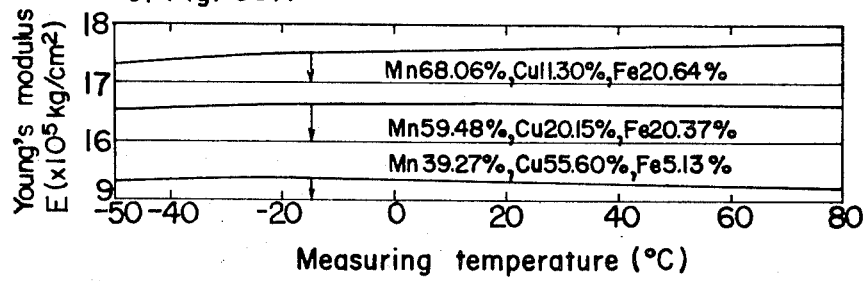
Figure 37A:
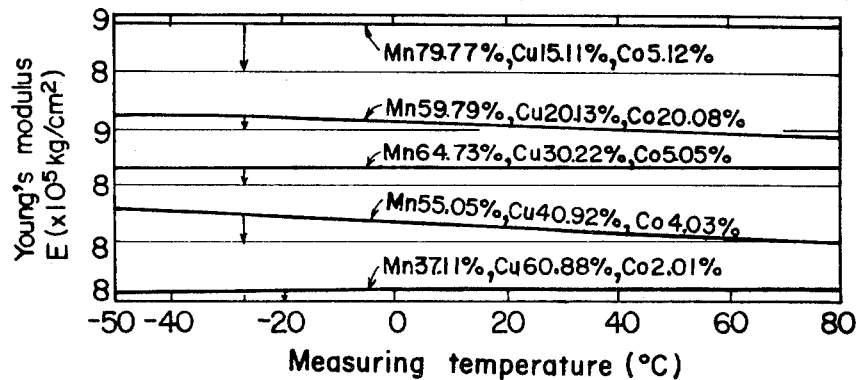
Figure 37B:
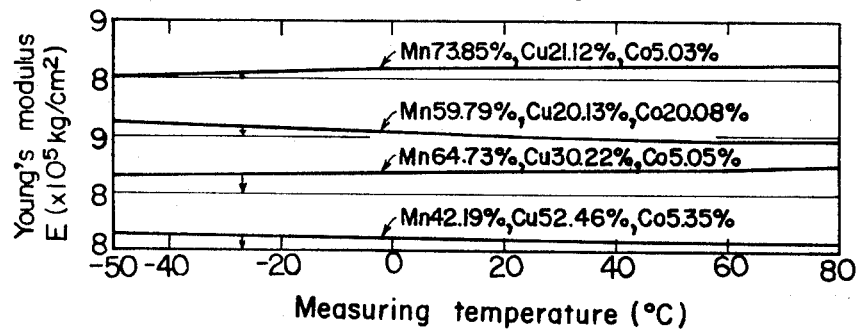
Figure 37C:
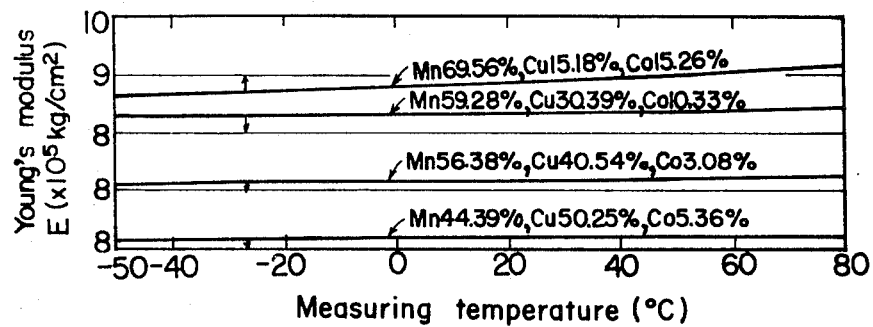
Figure 37D:
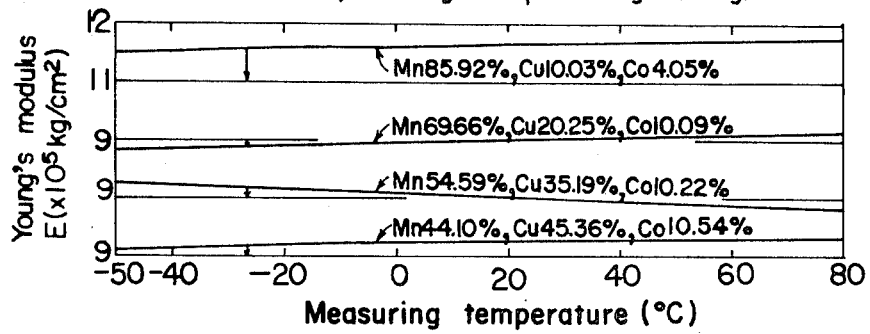
Figure 37E:
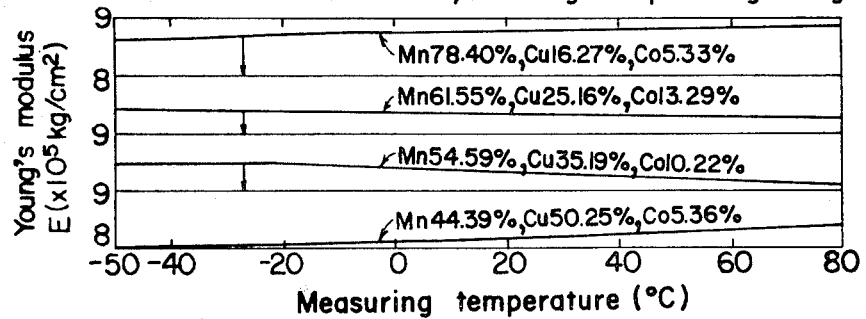

FIGS. 33A and 33B illustrate the values of Young's modulus at various temperatures from −50° C. to 80° C., for different Mn-Cu-Fe and Mn-Cu-Co ternary alloys of the invention, respectively, in the state as annealed by cooling at a speed of 100° C./hour after heating at 900° C. for 1 hour.

FIGS. 34A to 34E and FIGS. 35A to 35E show the values of Young's modulus at various temperatures from −50° C. to 80° C., for different Mn-Cu-Fe and Mn-Cu-Co ternary alloys of the invention, respectively, in the state as cold-worked with a working rate of 96% after the annealing of FIGS. 33A and 33B, respectively, and in the states as tempered by cooling at a speed of 100° C./hour after heating at different temperatures for 1 hour following the above referred cold-work, respectively.

FIGS. 36A to 36E and FIGS. 37A to 37E show the values of Young's moduls at various temperatures from −50° C. to 80° C., for different Mn-Cu-Fe and Mn-Cu-Co ternary alloys of the invention, respectively, in the state as water quenched after the annealing of FIGS. 33A and 33B, repsectively, and in the states as tempered by cooling at a speed of 100° C./hour after heating at different temperatures for 1 hour following the above referred water quenching.

TABLE 12

[Physical properties of Mn-Cu-Fe alloys and Mn-Cu-Co alloys as annealed by cooling at a speed of 100° C./hour after heating at 950° C. for 1 hour]

| Alloy composition | | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|---|
| Mn (percent) | Cu (percent) | Fe (percent) | Co (percent) | | | | | |
| 74.62 | 5.15 | 20.23 | | 16.65×10⁵ | −15.37×10⁻⁵ | 6.53×10⁵ | −16.25×10⁻⁵ | 620 |
| 69.36 | 15.36 | 15.28 | | 12.75×10⁵ | −2.21×10⁻⁵ | 5.33×10⁵ | −4.45×10⁻⁵ | 280 |
| 59.48 | 20.15 | 20.37 | | 15.62×10⁵ | +17.66×10⁻⁵ | 6.22×10⁵ | +15.65×10⁻⁵ | 409 |
| 53.10 | 31.65 | 15.25 | | 12.52×10⁵ | −15.14×10⁻⁵ | 5.25×10⁵ | −16.37×10⁻⁵ | 245 |
| 39.27 | 55.60 | 5.13 | | 8.90×10⁵ | −13.25×10⁻⁵ | 4.14×10⁵ | −14.66×10⁻⁵ | 175 |
| 74.46 | 10.36 | | 15.18 | 15.66×10⁵ | −7.00×10⁻⁵ | 6.25×10⁵ | −9.13×10⁻⁵ | 402 |
| 67.73 | 25.23 | | 7.04 | 8.85×10⁵ | −1.25×10⁻⁵ | 4.13×10⁵ | −2.65×10⁻⁵ | 167 |
| 59.28 | 30.39 | | 10.33 | 9.02×10⁵ | +13.01×10⁻⁵ | 4.18×10⁵ | +12.47×10⁻⁵ | 205 |
| 49.60 | 45.22 | | 5.18 | 8.80×10⁵ | +4.05×10⁻⁵ | 4.10×10⁵ | +2.66×10⁻⁵ | 163 |
| 42.57 | 55.35 | | 2.08 | 8.66×10⁵ | −1.11×10⁻⁵ | 4.10×10⁵ | −2.57×10⁻⁵ | 135 |

TABLE 13A

[Physical properties of Mn-Cu-Fe alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Fe (percent) | | | | | |
| As cold-worked with a working rate of 96%, after annealing of Table 12 | | | | | | | |
| 68.87 | 5.47 | 25.66 | 13.15×10⁵ | +11.25×10⁻⁵ | 5.45×10⁵ | +9.26×10⁻⁵ | 245 |
| 68.78 | 20.77 | 10.45 | 10.90×10⁵ | +3.58×10⁻⁵ | 4.75×10⁵ | +2.21×10⁻⁵ | 210 |
| 59.48 | 20.15 | 20.37 | 13.95×10⁵ | −18.38×10⁻⁵ | 5.70×10⁵ | −19.36×10⁻⁵ | 256 |
| 57.65 | 31.10 | 11.25 | 12.52×10⁵ | +13.92×10⁻⁵ | 5.26×10⁵ | +11.25×10⁻⁵ | 246 |
| Tempered by cooling at 100° C./hr. after heating at 200° C. for 1 hr., following the above referred cold-work | | | | | | | |
| 68.87 | 5.47 | 25.66 | 13.75×10⁵ | +18.25×10⁻⁵ | 5.64×10⁵ | +17.77×10⁻⁵ | 250 |
| 68.78 | 20.77 | 10.45 | 11.22×10⁵ | −2.84×10⁻⁵ | 4.85×10⁵ | −5.16×10⁻⁵ | 215 |
| 59.48 | 20.15 | 20.37 | 13.94×10⁵ | −12.20×10⁻⁵ | 5.71×10⁵ | −13.45×10⁻⁵ | 255 |
| 54.20 | 40.75 | 5.05 | 12.50×10⁵ | −9.76×10⁻⁵ | 5.25×10⁵ | −11.20×10⁻⁵ | 240 |
| Tempered by cooling at 100° C./hr. after heating at 400° C. for 1 hr., following the above referred cold-work | | | | | | | |
| 68.87 | 5.47 | 25.66 | 12.51×10⁵ | −11.36×10⁻⁵ | 5.25×10⁵ | −13.11×10⁻⁵ | 242 |
| 59.48 | 20.15 | 20.37 | 13.93×10⁵ | −4.55×10⁻⁵ | 5.71×10⁵ | −7.21×10⁻⁵ | 255 |
| 48.84 | 41.05 | 10.11 | 13.75×10⁵ | −0.97×10⁻⁵ | 5.64×10⁵ | −2.00×10⁻⁵ | 250 |
| 33.93 | 60.76 | 5.31 | 12.51×10⁵ | −10.24×10⁻⁵ | 5.25×10⁵ | −12.14×10⁻⁵ | 242 |
| Tempered by cooling at 100° C./hr. after heating at 600° C. for 1 hr., following the above referred cold-work | | | | | | | |
| 68.10 | 11.54 | 20.36 | 16.65×10⁵ | −10.15×10⁻⁵ | 6.54×10⁵ | −12.23×10⁻⁵ | 621 |
| 63.07 | 16.66 | 20.27 | 16.25×10⁵ | −17.55×10⁻⁵ | 6.41×10⁵ | −18.36×10⁻⁵ | 505 |
| 40.90 | 55.75 | 3.35 | 11.61×10⁵ | −9.62×10⁻⁵ | 4.97×10⁵ | −10.74×10⁻⁵ | 233 |
| Tempered by cooling at 100° C./hr. after heating at 800° C. for 1 hr., following the above referred cold-work | | | | | | | |
| 68.06 | 11.30 | 20.64 | 17.00×10⁵ | +7.22×10⁻⁵ | 6.65×10⁵ | +5.36×10⁻⁵ | 750 |
| 57.50 | 21.50 | 21.00 | 16.44×10⁵ | −14.27×10⁻⁵ | 6.47×10⁵ | −15.56×10⁻⁵ | 636 |
| 40.00 | 54.50 | 5.50 | 11.55×10⁵ | −2.36×10⁻⁵ | 4.96×10⁵ | −4.10×10⁻⁵ | 224 |

TABLE 13B

[Physical properties of Mn-Cu-Co alloys]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Co (percent) | | | | | |
| As cold-worked with a working rate of 96%, after annealing of Table 12 ||||||||
| 74.76 | 5.11 | 20.13 | $10.35 \times 10^5$ | $-16.25 \times 10^{-5}$ | $4.58 \times 10^5$ | $-17.11 \times 10^{-5}$ | 260 |
| 79.56 | 10.16 | 10.28 | $9.30 \times 10^5$ | $-11.97 \times 10^{-5}$ | $4.26 \times 10^5$ | $+10.10 \times 10^{-5}$ | 206 |
| 64.19 | 15.36 | 20.45 | $12.00 \times 10^5$ | $+2.57 \times 10^{-5}$ | $5.10 \times 10^5$ | $+2.00 \times 10^{-5}$ | 263 |
| 74.61 | 20.23 | 5.16 | $9.10 \times 10^5$ | $-3.89 \times 10^{-5}$ | $4.20 \times 10^5$ | $-5.65 \times 10^{-5}$ | 191 |
| 59.56 | 35.34 | 5.10 | $9.31 \times 10^5$ | $-11.75 \times 10^{-5}$ | $4.26 \times 10^5$ | $-13.18 \times 10^{-5}$ | 217 |
| Tempered by cooling at 100° C./hr. after heating at 200° C. for 1 hour, following the above referred cold-work ||||||||
| 74.76 | 5.11 | 20.13 | $12.13 \times 10^5$ | $-11.40 \times 10^{-5}$ | $5.13 \times 10^5$ | $-13.74 \times 10^{-5}$ | 262 |
| 79.56 | 10.16 | 10.28 | $13.56 \times 10^5$ | $+10.25 \times 10^{-5}$ | $5.58 \times 10^5$ | $+8.77 \times 10^{-5}$ | 339 |
| 74.61 | 20.23 | 5.16 | $9.12 \times 10^5$ | $-3.22 \times 10^{-5}$ | $4.22 \times 10^5$ | $-5.34 \times 10^{-5}$ | 190 |
| 59.28 | 30.39 | 10.33 | $11.87 \times 10^5$ | $-11.71 \times 10^{-5}$ | $4.82 \times 10^5$ | $-14.12 \times 10^{-5}$ | 245 |
| 60.11 | 34.86 | 5.03 | $11.63 \times 10^5$ | $-1.15 \times 10^{-5}$ | $5.11 \times 10^5$ | $-2.85 \times 10^{-5}$ | 235 |
| Tempered by cooling at 100° C./hr. after heating at 400° C. for 1 hr., following the above referred cold-work ||||||||
| 74.76 | 5.11 | 20.13 | $12.16 \times 10^5$ | $-14.25 \times 10^{-5}$ | $5.14 \times 10^5$ | $-16.36 \times 10^{-5}$ | 265 |
| 79.56 | 10.16 | 10.28 | $13.72 \times 10^5$ | $+0.55 \times 10^{-5}$ | $5.63 \times 10^5$ | $+0.11 \times 10^{-5}$ | 345 |
| 69.86 | 28.13 | 2.01 | $9.33 \times 10^5$ | $-2.54 \times 10^{-5}$ | $4.27 \times 10^5$ | $-4.13 \times 10^{-5}$ | 209 |
| 59.28 | 30.39 | 10.33 | $11.81 \times 10^5$ | $+1.40 \times 10^{-5}$ | $5.15 \times 10^5$ | $+0.97 \times 10^{-5}$ | 241 |
| 49.60 | 45.22 | 5.18 | $11.54 \times 10^5$ | $-4.34 \times 10^{-5}$ | $4.95 \times 10^5$ | $-5.54 \times 10^{-5}$ | 226 |
| Tempered by cooling at 100° C./hr. after heating at 600° C. for 1 hr., following the above referred cold-work ||||||||
| 69.62 | 20.27 | 10.11 | $12.18 \times 10^5$ | $+9.77 \times 10^{-5}$ | $5.13 \times 10^5$ | $+6.97 \times 10^{-5}$ | 266 |
| 59.79 | 20.13 | 20.08 | $13.44 \times 10^5$ | $-16.17 \times 10^{-5}$ | $5.55 \times 10^5$ | $-18.22 \times 10^{-5}$ | 324 |
| 59.28 | 30.39 | 10.33 | $12.13 \times 10^5$ | $+6.52 \times 10^{-5}$ | $5.14 \times 10^5$ | $+4.77 \times 10^{-5}$ | 261 |
| 59.56 | 35.34 | 5.10 | $11.96 \times 10^5$ | $+7.71 \times 10^{-5}$ | $5.18 \times 10^5$ | $+5.26 \times 10^{-5}$ | 251 |
| 49.60 | 45.22 | 5.18 | $10.03 \times 10^5$ | $-15.55 \times 10^{-5}$ | $4.48 \times 10^5$ | $-17.15 \times 10^{-5}$ | 217 |
| Tempered by cooling at 100° C./hr. after heating at 800° C. for 1 hr., following the above referred cold-work ||||||||
| 69.56 | 15.18 | 15.26 | $13.75 \times 10^5$ | $+5.50 \times 10^{-5}$ | $5.66 \times 10^5$ | $+4.35 \times 10^{-5}$ | 335 |
| 59.62 | 25.16 | 15.22 | $12.56 \times 10^5$ | $-6.25 \times 10^{-5}$ | $5.27 \times 10^5$ | $-8.22 \times 10^{-5}$ | 282 |
| 54.59 | 35.19 | 10.22 | $9.34 \times 10^5$ | $+1.42 \times 10^{-5}$ | $4.27 \times 10^5$ | $+0.95 \times 10^{-5}$ | 210 |
| 44.39 | 50.25 | 5.36 | $8.82 \times 10^5$ | $-11.07 \times 10^{-5}$ | $4.11 \times 10^5$ | $-13.10 \times 10^{-5}$ | 163 |

TABLE 14A

[Physical properties of Mn-Cu-Fe alloys]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Fe (percent) | | | | | |
| As water quenched after heating at 900° C. for 1 hr., following the annealing of Table 12 ||||||||
| 74.62 | 5.15 | 20.23 | $8.31 \times 10^5$ | $+11.02 \times 10^{-5}$ | $3.96 \times 10^5$ | $+9.11 \times 10^{-5}$ | 151 |
| 53.67 | 10.66 | 35.67 | $9.00 \times 10^5$ | $-12.66 \times 10^{-5}$ | $4.17 \times 10^5$ | $-14.35 \times 10^{-5}$ | 185 |
| 59.48 | 20.15 | 20.37 | $9.01 \times 10^5$ | $-0.48 \times 10^{-5}$ | $4.17 \times 10^5$ | $-2.26 \times 10^{-5}$ | 202 |
| 54.18 | 40.77 | 5.05 | $8.85 \times 10^5$ | $+0.28 \times 10^{-5}$ | $4.13 \times 10^5$ | $+1.17 \times 10^{-5}$ | 170 |
| 35.67 | 50.97 | 13.36 | $9.21 \times 10^5$ | $-5.00 \times 10^{-5}$ | $4.22 \times 10^5$ | $-7.10 \times 10^{-5}$ | 185 |
| Tempered by cooling at 100° C./hr. after heating at 200° C. for 1 hr., following the above referred water quenching ||||||||
| 68.87 | 5.47 | 25.66 | $8.26 \times 10^5$ | $-2.01 \times 10^{-5}$ | $3.93 \times 10^5$ | $-4.55 \times 10^{-5}$ | 150 |
| 59.48 | 20.15 | 20.37 | $8.89 \times 10^5$ | $+0.86 \times 10^{-5}$ | $4.16 \times 10^5$ | $+0.55 \times 10^{-5}$ | 182 |
| 54.18 | 40.77 | 5.05 | $8.30 \times 10^5$ | $+0.74 \times 10^{-5}$ | $3.95 \times 10^5$ | $+0.50 \times 10^{-5}$ | 150 |
| 42.45 | 55.00 | 2.55 | $8.17 \times 10^5$ | $-10.22 \times 10^{-5}$ | $3.91 \times 10^5$ | $-11.16 \times 10^{-5}$ | 137 |
| Tempered by cooling at 100° C./hr. after hearing at 400° C. for 1 hr., following the above referred water quenching ||||||||
| 68.87 | 5.47 | 25.66 | $8.85 \times 10^5$ | $+11.55 \times 10^{-5}$ | $4.10 \times 10^5$ | $+9.25 \times 10^{-5}$ | 165 |
| 59.48 | 20.15 | 20.37 | $8.85 \times 10^5$ | $+7.90 \times 10^{-5}$ | $4.11 \times 10^5$ | $+8.44 \times 10^{-5}$ | 168 |
| 48.84 | 41.05 | 10.11 | $8.85 \times 10^5$ | $+18.01 \times 10^{-5}$ | $4.11 \times 10^5$ | $+15.13 \times 10^{-5}$ | 166 |
| 44.18 | 50.72 | 5.10 | $8.87 \times 10^5$ | $+0.70 \times 10^{-5}$ | $4.12 \times 10^5$ | $+0.35 \times 10^{-5}$ | 181 |
| Tempered by cooling at 100 °C./hr. after heating at 600° C. for 1 hr., following the above referred water quenching ||||||||
| 68.87 | 5.47 | 25.66 | $11.60 \times 10^5$ | $-15.36 \times 10^{-5}$ | $4.97 \times 10^5$ | $-17.21 \times 10^{-5}$ | 231 |
| 59.48 | 20.15 | 20.37 | $12.12 \times 10^5$ | $-13.32 \times 10^{-5}$ | $5.15 \times 10^5$ | $-14.46 \times 10^{-5}$ | 258 |
| 48.84 | 41.05 | 10.11 | $9.31 \times 10^5$ | $-2.20 \times 10^{-5}$ | $4.17 \times 10^5$ | $-5.16 \times 10^{-5}$ | 200 |
| Tempered by cooling at 100° C./hr. after heating at 800° C. for 1 hr., following the above referred water quenching ||||||||
| 68.06 | 11.30 | 20.64 | $17.54 \times 10^5$ | $+12.25 \times 10^{-5}$ | $6.80 \times 10^5$ | $+10.03 \times 10^{-5}$ | 775 |
| 59.48 | 20.15 | 20.37 | $16.65 \times 10^5$ | $+1.13 \times 10^{-5}$ | $6.54 \times 10^5$ | $+0.95 \times 10^{-5}$ | 585 |
| 39.27 | 55.60 | 5.13 | $9.30 \times 10^5$ | $-5.16 \times 10^{-5}$ | $4.20 \times 10^5$ | $-7.21 \times 10^{-5}$ | 192 |

TABLE 14B

[Physical properties of Mn-Cu-Co alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Co (percent) | | | | | |
| As water quenched after heating at 900° C. for 1 hr., following the annealing of Table 12 | | | | | | | |
| 79.77 | 15.11 | 5.12 | $8.85 \times 10^5$ | $-1.15 \times 10^{-5}$ | $4.11 \times 10^5$ | $-2.33 \times 10^{-5}$ | 141 |
| 59.79 | 20.13 | 20.08 | $9.04 \times 10^5$ | $-12.27 \times 10^{-5}$ | $4.17 \times 10^5$ | $-13.65 \times 10^{-5}$ | 208 |
| 64.73 | 30.22 | 5.05 | $8.33 \times 10^5$ | $+8.68 \times 10^{-5}$ | $3.95 \times 10^5$ | $+6.21 \times 10^{-5}$ | 152 |
| 55.05 | 40.92 | 4.03 | $8.21 \times 10^5$ | $-18.22 \times 10^{-5}$ | $3.92 \times 10^5$ | $-19.66 \times 10^{-5}$ | 140 |
| 37.11 | 60.88 | 2.01 | $8.16 \times 10^5$ | $+1.55 \times 10^{-5}$ | $3.90 \times 10^5$ | $+1.16 \times 10^{-5}$ | 116 |
| Tempered by cooling at 100° C./hr. after heating at 200° C. for 1 hr., following the above referred water quenching | | | | | | | |
| 73.85 | 21.12 | 5.03 | $8.22 \times 10^5$ | $+15.50 \times 10^{-5}$ | $3.92 \times 10^5$ | $+13.25 \times 10^{-5}$ | 140 |
| 59.79 | 20.13 | 20.08 | $9.00 \times 10^5$ | $-12.06 \times 10^{-5}$ | $4.18 \times 10^5$ | $-13.72 \times 10^{-5}$ | 182 |
| 64.73 | 30.22 | 5.05 | $8.36 \times 10^5$ | $+9.74 \times 10^{-5}$ | $3.97 \times 10^5$ | $+8.22 \times 10^{-5}$ | 154 |
| 42.19 | 52.46 | 5.35 | $8.18 \times 10^5$ | $-2.20 \times 10^{-5}$ | $3.92 \times 10^5$ | $-6.34 \times 10^{-5}$ | 130 |
| Tempered by cooling at 100° C./hr. after heating at 400° C. for 1 hr., following the above referred water quenching | | | | | | | |
| 69.56 | 15.18 | 15.26 | $8.86 \times 10^5$ | $+15.11 \times 10^{-5}$ | $4.11 \times 10^5$ | $+13.64 \times 10^{-5}$ | 170 |
| 59.28 | 30.39 | 10.33 | $8.33 \times 10^5$ | $+5.39 \times 10^{-5}$ | $3.96 \times 10^5$ | $+4.21 \times 10^{-5}$ | 151 |
| 56.38 | 40.54 | 3.08 | $8.15 \times 10^5$ | $+5.51 \times 10^{-5}$ | $3.90 \times 10^5$ | $+4.46 \times 10^{-5}$ | 130 |
| 44.39 | 50.25 | 5.36 | $8.13 \times 10^5$ | $+0.90 \times 10^{-5}$ | $3.90 \times 10^5$ | $+0.25 \times 10^{-5}$ | 127 |
| Tempered by cooling at 100°C./hr. after heating at 600° C. for 1 hr., following the above referred water quenching | | | | | | | |
| 85.92 | 10.03 | 4.05 | $11.61 \times 10^5$ | $+10.00 \times 10^{-5}$ | $4.98 \times 10^5$ | $+8.92 \times 10^{-5}$ | 230 |
| 69.66 | 20.25 | 10.09 | $8.99 \times 10^5$ | $+9.96 \times 10^{-5}$ | $4.15 \times 10^5$ | $+7.76 \times 10^{-5}$ | 180 |
| 54.59 | 35.19 | 10.22 | $9.00 \times 10^5$ | $-11.84 \times 10^{-5}$ | $4.16 \times 10^5$ | $-1_{\cdot\cdot}.15 \times 10^{-5}$ | 202 |
| 44.10 | 45.36 | 10.54 | $9.32 \times 10^5$ | $+9.08 \times 10^{-5}$ | $4.26 \times 10^5$ | $+7.02 \times 10^{-5}$ | 218 |
| Tempered by cooling at 100° C./hr. after heating at 800° C. for 1 hr., following the above referred water quenching | | | | | | | |
| 78.40 | 16.27 | 5.33 | $8.79 \times 10^5$ | $+10.03 \times 10^{-5}$ | $4.10 \times 10^5$ | $+8.29 \times 10^{-5}$ | 195 |
| 61.55 | 25.16 | 13.29 | $9.33 \times 10^5$ | $-2.50 \times 10^{-5}$ | $4.26 \times 10^5$ | $-4.11 \times 10^{-5}$ | 210 |
| 54.59 | 35.19 | 10.22 | $9.33 \times 10^5$ | $-9.74 \times 10^{-5}$ | $4.26 \times 10^5$ | $-13.64 \times 10^{-5}$ | 212 |
| 44.39 | 50.25 | 5.36 | $8.17 \times 10^5$ | $+14.67 \times 10^{-5}$ | $3.90 \times 10^5$ | $+12.19 \times 10^{-5}$ | 135 |

TABLE 15

[Relation between cooling speed and temperature coefficient of Young's modulus $e$, 0° C.-40° C., for Mn-Cu-Fe and Mn-Cu-Co alloys]

| Alloy composition | | | | Cooling speed after heating at 900° C. for 1 hour | | | | |
|---|---|---|---|---|---|---|---|---|
| Mn (percent) | Cu (percent) | Fe (percent) | Co (percent) | 170° C./sec. (water quenched) | 90° C./sec. (air quenched) | 500° C./hour (annealed) | 100° C./hour (annealed) | 10° C./hour (annealed) |
| 68.87 | 5.47 | 25.66 | | $+2.50 \times 10^{-5}$ | $-6.25 \times 10^{-5}$ | $-17.25 \times 10^{-5}$ | $-22.51 \times 10^{-5}$ | $-25.11 \times 10^{-5}$ |
| 69.36 | 15.36 | 15.28 | | $+201.11 \times 10^{-5}$ | $+127.44 \times 10^{-5}$ | $+39.22 \times 10^{-5}$ | $-2.21 \times 10^{-5}$ | $-25.15 \times 10^{-5}$ |
| 68.78 | 20.77 | 10.45 | | $+295.36 \times 10^{-5}$ | $+182.11 \times 10^{-5}$ | $+43.25 \times 10^{-5}$ | $-18.50 \times 10^{-5}$ | $-57.47 \times 10^{-5}$ |
| 59.48 | 20.15 | 20.37 | | $-0.48 \times 10^{-5}$ | $+6.00 \times 10^{-5}$ | $+14.06 \times 10^{-5}$ | $+17.66 \times 10^{-5}$ | $+19.77 \times 10^{-5}$ |
| 74.46 | 10.36 | | 15.18 | $+12.55 \times 10^{-5}$ | $-10.06 \times 10^{-5}$ | $-8.02 \times 10^{-5}$ | $-7.00 \times 10^{-5}$ | $-6.06 \times 10^{-5}$ |
| 59.28 | 30.39 | | 10.33 | $-21.05 \times 10^{-5}$ | $-8.78 \times 10^{-5}$ | $+6.50 \times 10^{-5}$ | $+13.01 \times 10^{-5}$ | $+17.21 \times 10^{-5}$ |
| 49.60 | 45.22 | | 5.18 | $-13.45 \times 10^{-5}$ | $-7.10 \times 10^{-5}$ | $+0.91 \times 10^{-5}$ | $+4.05 \times 10^{-5}$ | $+6.50 \times 10^{-5}$ |
| 42.57 | 55.35 | | 2.08 | $-7.96 \times 10^{-5}$ | $-5.11 \times 10^{-5}$ | $-2.55 \times 10^{-5}$ | $-1.11 \times 10^{-5}$ | $-0.05 \times 10^{-5}$ |

As can be seen from FIGS. 26A, 26B, 27A to 27E, and 28A to 28E, manganese-copper-iron and manganese-copper-cobalt alloys, consisting of 30 to 88 wt. percent of manganese, 0.1 to 67 wt. percent of copper, and either 0.1 to 38 wt. percent of iron or 0.1 to 25 wt. percent of cobalt, respectively, have temperature coefficient of Young's modulus $e$ ranging from a comparatively large negative value to a comparatively large positive value, depending on the composition of the alloys, in any of the states as annealed (A), as cold-worked (B) with a working rate of 96% after the annealing, and as tempered (B') after the cold-work. Accordingly, those Mn-Cu-Fe and Mn-Cu-Co alloys, whose temperature coefficient of Young's modulus $e$ falls in a range crossing the zero line between a negative value domain and a positive value domain, have the so-called Elinvar characteristics or temperature-independent elasticity.

As can be seen from FIGS. 29A to 29E and FIGS. 30A to 30E, the manganese-copper-iron and manganese-copper-cobalt ternary alloys, consisting of 30 to 88 wt. percent of manganese, 0.1 to 67 wt. percent of copper, and either 0.1 to 38 wt. percent of iron or 0.1 to 25 wt. percent of cobalt, respectively, have temperature coefficient of Young's modulus $e$, which varies greatly depending on the composition of the alloys in any of the states as water quenched (C) after the annealing, and as tempered (C') after the water quenching. Accordingly, the manganese-copper-iron and manganese-copper-cobalt ternary alloys as water quenched (C) and as tempered (C') can also have the so-called Elinvar characteristics.

In the case of FIGS. 27A and 28A, the working rate for the cold-work process was 96%. FIGS. 31A and 31B illustrate the effects of different working rates, or different degrees of cold-work, on the temperature coefficient of Young's modulus $e$, for the four different Mn-Cu-Fe ternary alloys and four different Mn-Cu-Co ternary alloys of the invention. As can be seen from the figures, the temperature coefficient $e$ of the alloys of the invention can be improved by cold-work, even by slight cold-work with a working rate as small as 1%.

In the case of the heat treatments of FIGS. 26A, 26B, 29A, and 30A, the annealing was carried out by cooling at a speed of 100° C./hour after heating at 900° C. for 1 hour, while the quenching was effected by water cooling from 900° C. Table 15 and FIGS. 32A and 32B show how the temperature coefficient of Young's modulus $e$ is affected by variation of the cooling speed and the quenching temperature. It is apparent from Table 15 and FIGS. 32A and 32B that the temperature coefficient $e$ is greatly affected by the cooling speed and the quenching temperature.

The inventors have confirmed by experiments that manganese-copper-iron-cobalt quaternary alloys give similar results with the aforedescribed manganese-copper-iron or manganese-copper-cobalt ternary alloys.

Since the physical properties of the alloys of the invention are greatly affected by the working rate of cold-work, the quenching temperature, and the cooling speed, the shape of the curves of FIGS. 27A to 27E, 28A to 28E, 29A to 29E, and 30A to 30E may well be greatly changed if the working rate, quenching temperature, and/or the cooling speed are changed from those on which the curves of the figures are based.

EXAMPLE 5

Ingredients of different samples (each weighing about 500 grams) of various alloys of the invention consisting of 30 to 91 wt. percent of manganeses, 0 to 67 wt. percent of copper, and at least one of the optional subingredients (for instance, as shown in Table 16), were melted in alumina crucibles, which were disposed in a high-frequency induction furnace or an electric resistance furnace, while passing argon gas therethrough. The molten ingredients were thoroughly agitated, and poured into iron moulds, for producing cylindrical ingots of about 100 mm. dia.

The ingots thus produced were heated at 900° C. for 1 hour and cooled at a speed of 100° C./hour, and swaged at room temperature into round rods of about 2 mm. dia. with a working rate of 96%, i.e., the cross sectional area of the ingots was reduced by 96%. The round rods were cut into about 11 cm. long specimens, which were used for the measurement of the effects of the aforesaid cold-work of the process (B).

Some of the about 11 cm. long specimens of about 2 mm. dia. were heated at 900° C. for 1 hour. It is known to those skilled in the art that, as far as the resiliency of alloys is concerned, such heating at a solution treatment temperature (e.g., 900° C.) for 1 hour brings the alloy structure to a condition prior to the cold-work of the process (B). Accordingly, the ensuing cooling of the metal thus heated may result in the aforesaid annealing of the process (A), and the ensuing quick water cooling of the metal thus heated may result in the aforesaid water quenching of the process (C).

Thus, the about 11 cm. long specimens of about 2 mm. dia. were divided into two groups after the heating at 900° C. The first group specimens were annealed by cooling at a speed of 100° C./hour, which were used for the measurement of the effects of the aforesaid annealing of the process (A). The second group specimens were water quenched for the measurement of the effects of the aforesaid water quenching of the process (C).

Some of the aforesaid specimens subjected to the cold-work of the process (B) and the quenching of the process (C) were again heated at various temperatures below 800° C. for 1 hour, and cooled at a speed of 100° C./hour, so as to provide specimens for the measurement of the effects of the tempering of the processes (B') and (C'), respectively.

The Young's modulus of the specimens was determined by measuring the resonant frequency of the specimen bars by a device having a sensitive electrostatic capacitor, and calculating the Young's modulus from the resonant frequency thus measured. The modulus of rigidity was measured by a commonly used torsion pendulum.

The coefficient of linear expansion $\alpha$ of the specimens in the proximity of room temperature was measured by using a precision linear dilatometer of vertical type.

The results of the measurements are shown in FIGS. 38A to 49E.

Figure 38A:
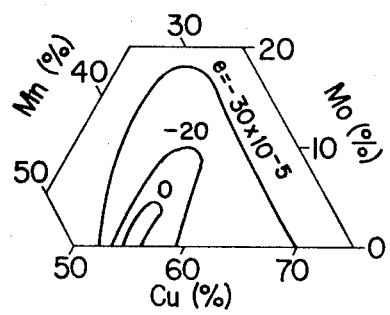
FIGS. 38A and 38B are diagrams illustrating the relations between the composition of ternary alloys of the invention and the mean temperature coefficient of Young's modulus $e$ thereof, 0° C. to 40° C., for manganese-copper-molybdenum and manganese-copper-tungsten systems in the state as annealed, respectively.
Figure 38B:
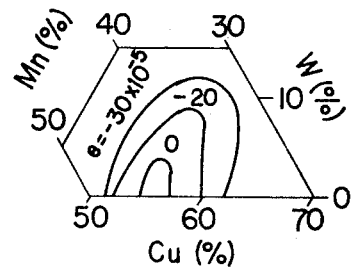

FIGS. 38A and 38B show the relation between the composition of the manganese-copper-molybdenum and manganese-copper-tungsten ternary alloys and the mean temperature coefficient of Young's modulus $e$ thereof between 0° C. and 40° C. in the state as annealed by the process (A), respectively.

Figure 39A:
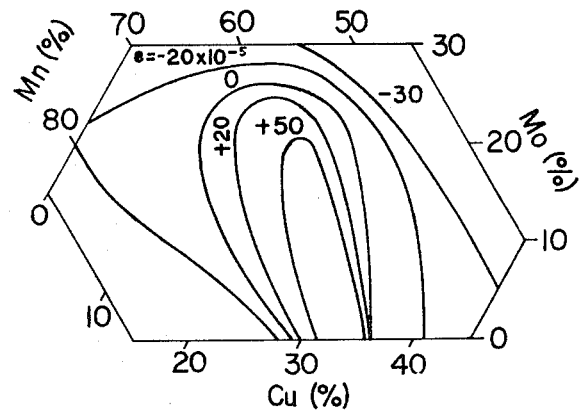
FIGS. 39A to 39E are diagrams similar to FIG. 38A, illustrating similar relations for the manganese-copper-molybdenum ternary alloys of the invention, for the state as cold-work and for the state as tempered under different conditions after the cold-work.
Figure 39B:
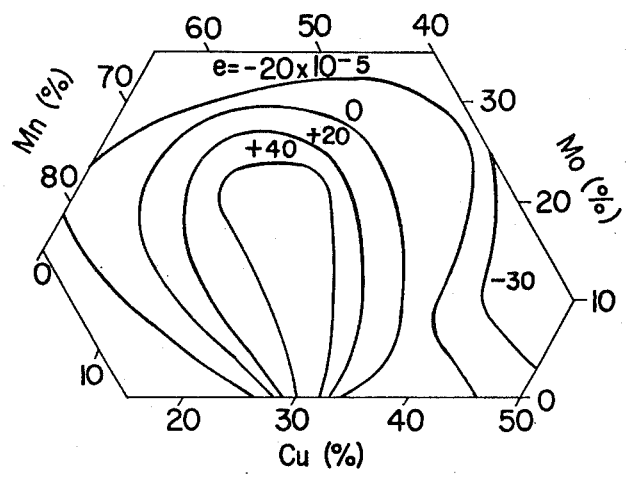
Figure 39C:
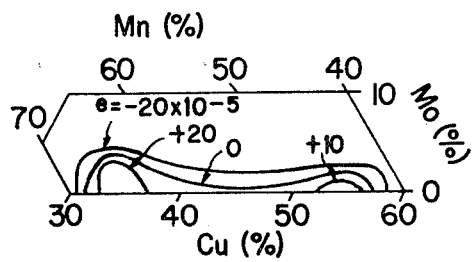
Figure 39D:
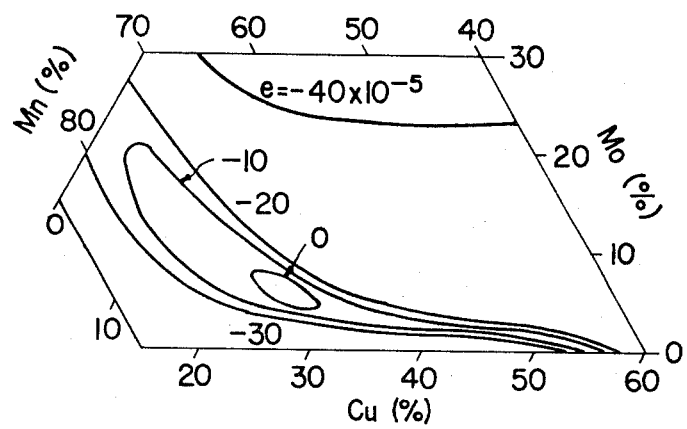
Figure 39E:
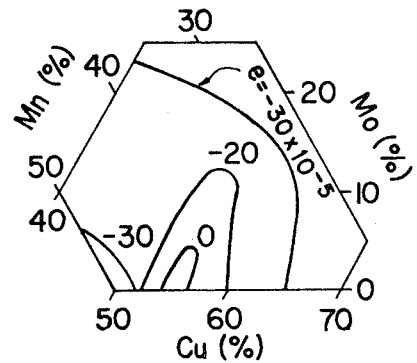
Figure 40A:
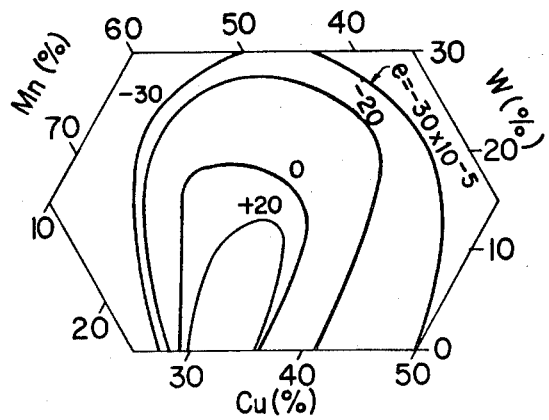
FIGS. 40A to 40E are diagrams similar to FIG. 38B, illustrating similar relations for the manganese-copper-tungsten ternary alloys of the invention, for the state as cold-work and for the state as tempered under different conditions after the cold-work.
Figure 40B:
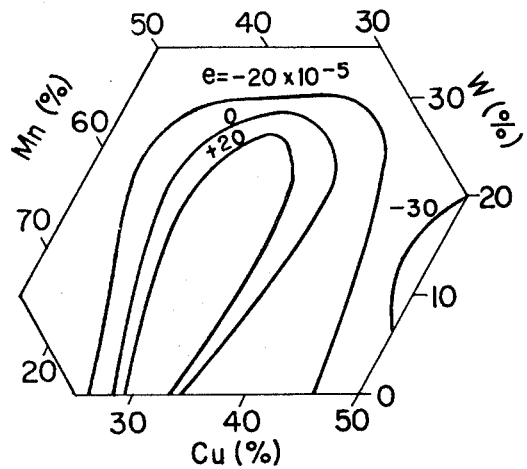
Figure 40C:
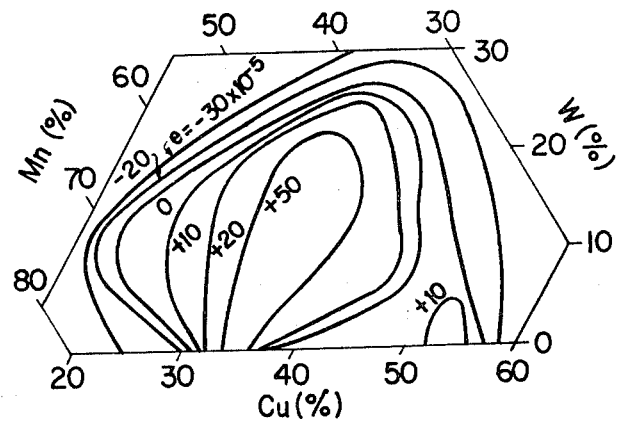
Figure 40D:
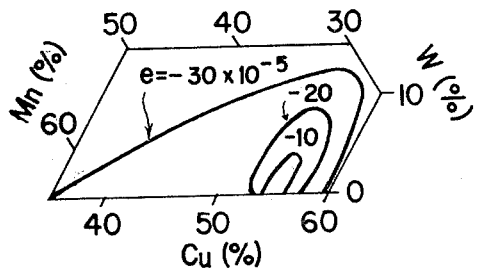
Figure 40E:
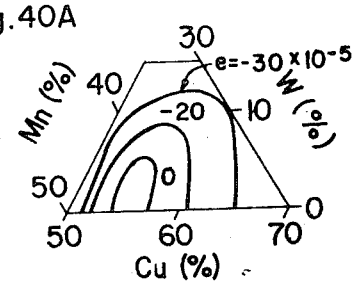

FIGS. 39A and 40A show the relations between the composition of the manganese-copper-molybdenum and manganese-copper-tungsten ternary alloys and the mean temperature coefficient of Young's modulus $e$ thereof, 0° C. to 40° C., for the state as cold-worked (B) after the annealing, respectively. FIGS. 39B to 39E and FIGS. 40B to 40E show similar relations for the same alloy, respectively, for the state as tempered (B') by cooling at a speed of 100° C./hour after heating at different temperatures for one hour.

Figure 41A:
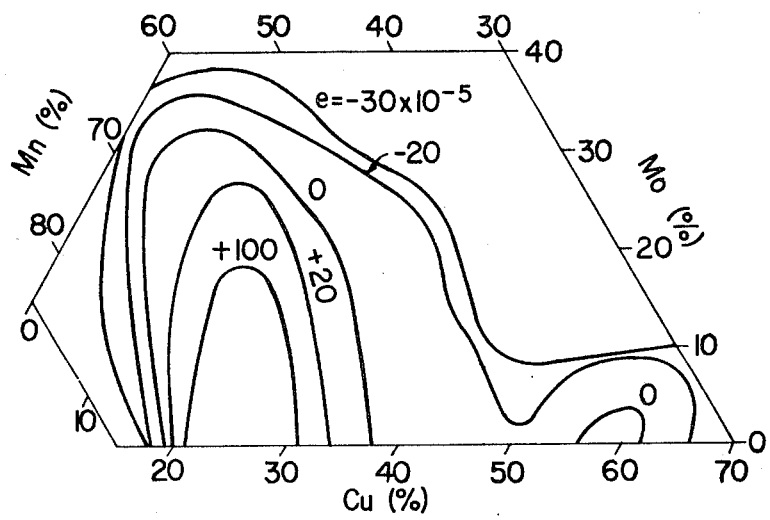
FIGS. 41A to 41E are diagrams similar to FIGS. 39A to 39E, respectively, illustrating similar relations for the manganese-copper-molybdenum ternary alloys of the invention, for the state as water quenched and for the state as tempered under different conditions after the water quenching.
Figure 41B:
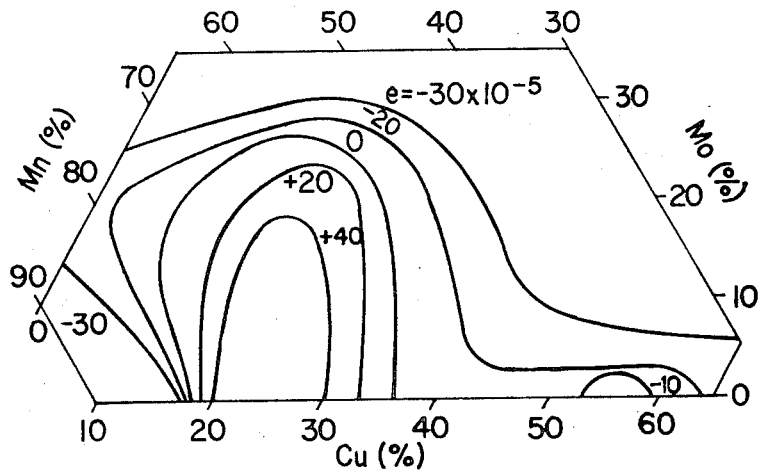
Figure 41C:
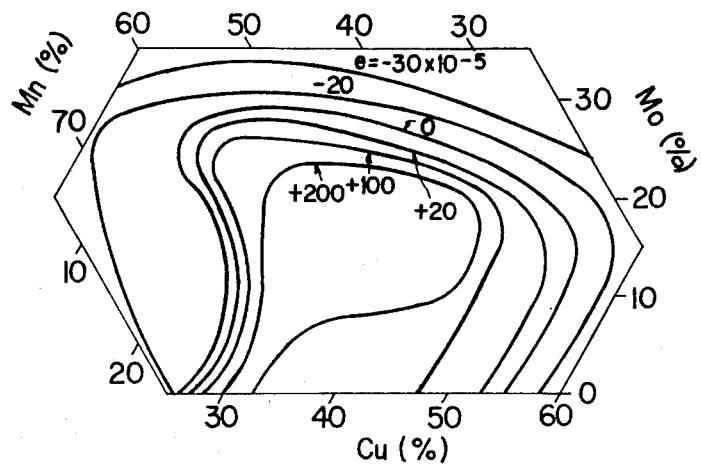
Figure 41D:
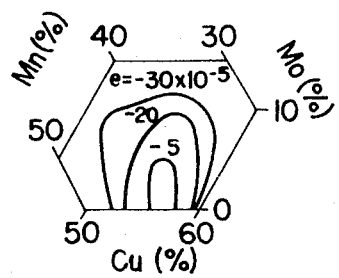
Figure 41E:
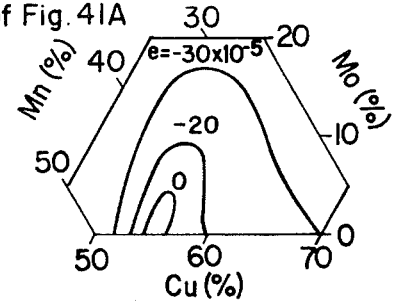
Figure 42A:
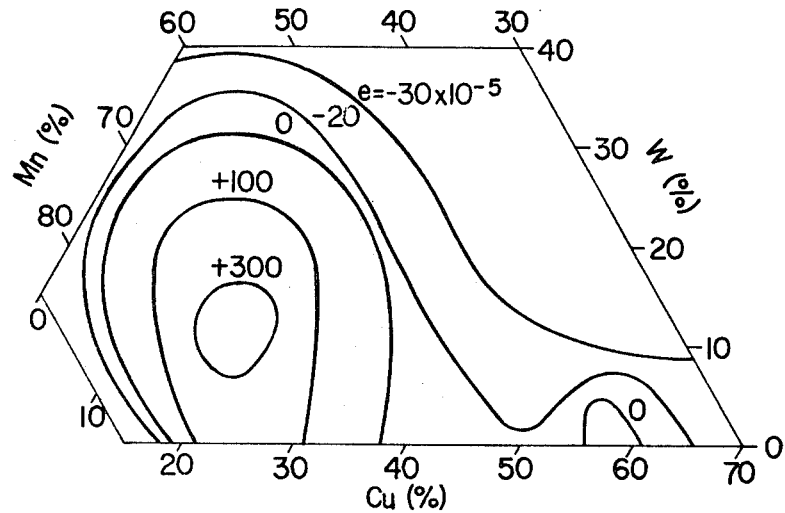
FIGS. 42A to 42E are diagrams similar to FIGS. 40A to 40E, respectively, illustrating similar relation for the manganese-copper-tungsten ternary alloys of the invention, for the state as water quenched and for the state as tempered at different temperatures after the water quenching.
Figure 42B:
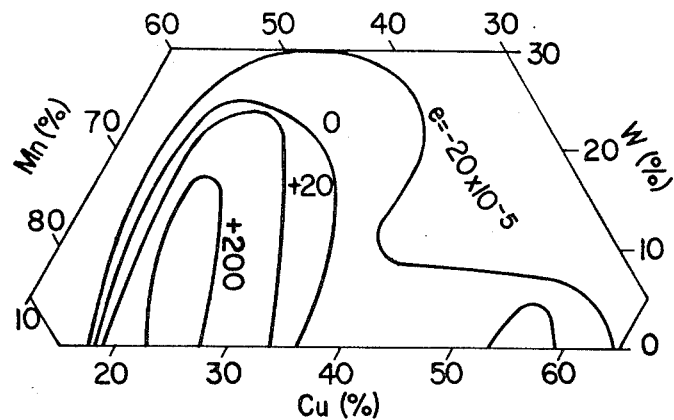
Figure 42C:
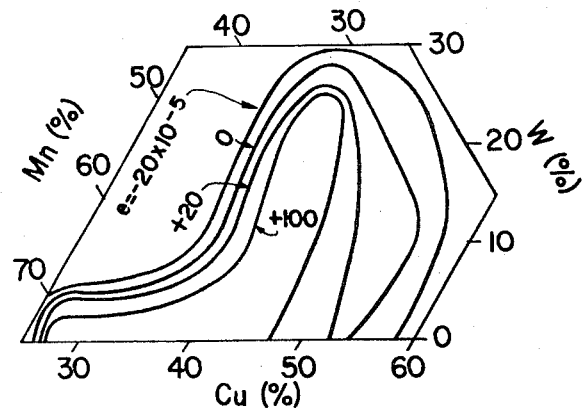
Figure 42D:
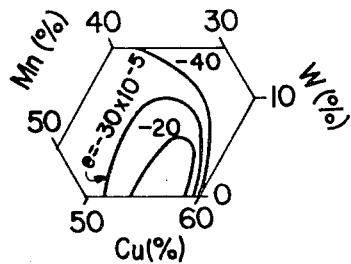
Figure 42E:
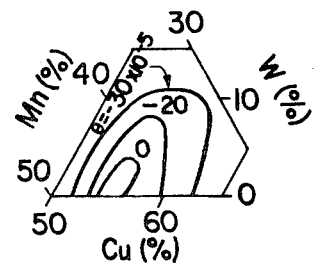

FIGS. 41A and 42A show the similar relations for the same manganese-copper-molybdenum and manganese-copper-tungsten ternary alloys, respectively, for the state as water quenched (C) after the annealing. FIGS. 41B to 41E and FIGS. 42B to 42E show similar relations for the same alloys, respectively, for the state as tempered (C') by cooling at a speed of 100° C./hour after heating for one hour at different temperatures.

Tables 16, 17, and 18 summarize typical measured values of physical properties, inclusive of Vickers hardness, of manganese-copper-molybdenum and manganese-copper-tungsten ternary alloys and manganese-copper-molybdenum-tungsten quaternary alloys, all having compositions of the present invention.

Figure 43A:
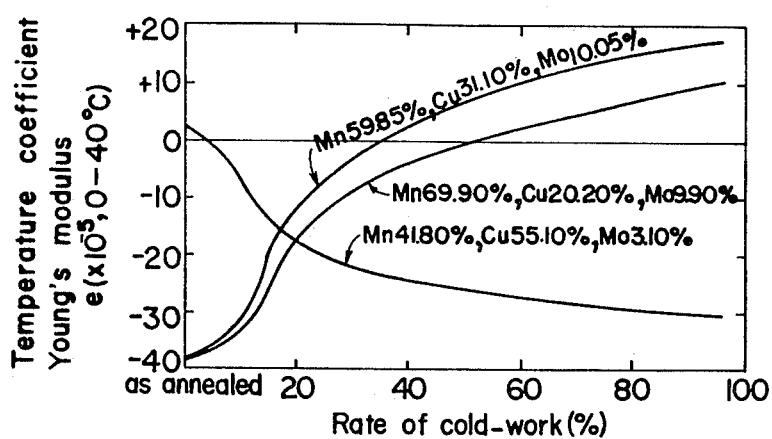
FIGS. 43A and 43B are graphs showing the relations between the mean temperature coefficient of Young's modulus $e$, 0° C. to 40° C., of the ternary alloys of the invention and the working rate of cold-work applied thereto, for manganese-copper-molybdenum and manganese-copper-tungsten systems, four specimens each, respectively.
Figure 43B:
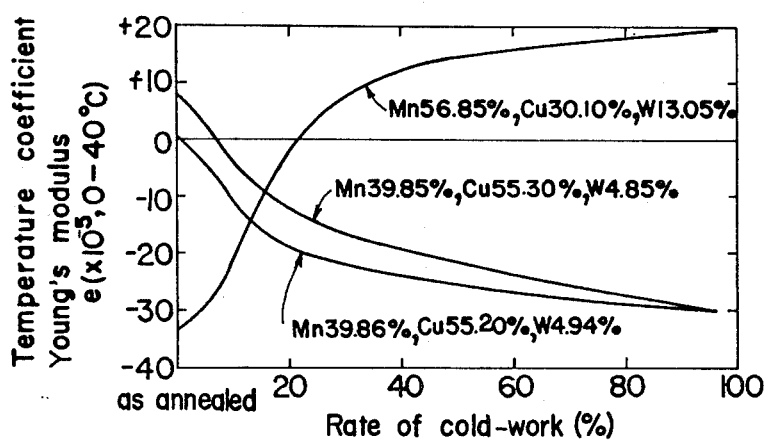

FIGS. 43A and 43B illustrate the relation between the working rate for the cold-work and the temperature coefficient of Young's modulus $e$, 0° C. to 40° C., for four manganese-copper-molybdenum alloys and four manganese-copper-tungsten alloys, respectively.

Table 19 shows the relation between the cooling speed and the temperature coefficient of Young's modulus $e$, 0° C. to 40° C., for eight samples representing the manganese-copper-molybdenum and manganese-copper-tungsten ternary alloys and manganese-copper-molybdenum-tungsten quarternary alloys.

Tables 20, 21A to 21W, and 22A to 22W show the variation of different physical properties of the alloys of the invention consisting of the manganese-copper base composition plus a third element other than molybdenum and tungsten, for the state as annealed, as water quenched after the annealing, as tempered after the quenching, as cold-worked after the annealing, and as tempered after the cold-work.

Figure 44A:
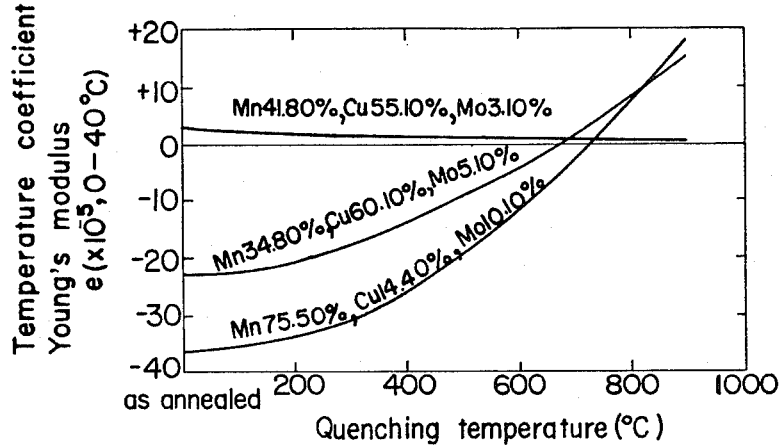
FIGS. 44A and 44B are graphs showing the relation between the mean temperature coefficient of Young's modulus $e$, 0° C. to 40° C., of the ternary alloys of the invention and the quenching temperature of the water quenching applied thereto, for manganese-copper-molybdenum and manganese-copper-tungsten systems, four specimens each, respectively.
Figure 44B:
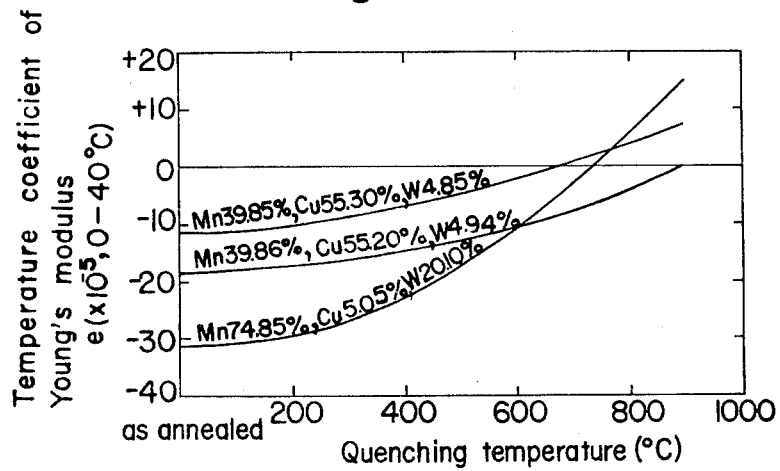

Similarly, FIGS. 44A and 44B show the relation between the quenching temperature and the temperature coefficient of Young's modulus $e$, 0° C. to 40° C., for the manganese-copper-molybdenum and manganese-copper-tungsten ternary alloys according to the invention, three samples each.

Figure 45A:
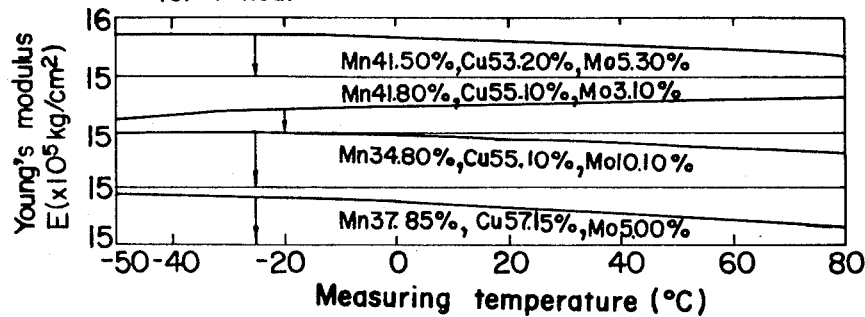
FIGS. 45A and 45B are graphs showing the Young's modulus of ternary alloys of the invention at different temperatures after being annealed by cooling at a speed of 100° C./hour after heating at 900° C. for one hour, for manganese-copper-molybdenum and manganese-copper-tungsten systems, four specimens, each, respectively.
Figure 45B:
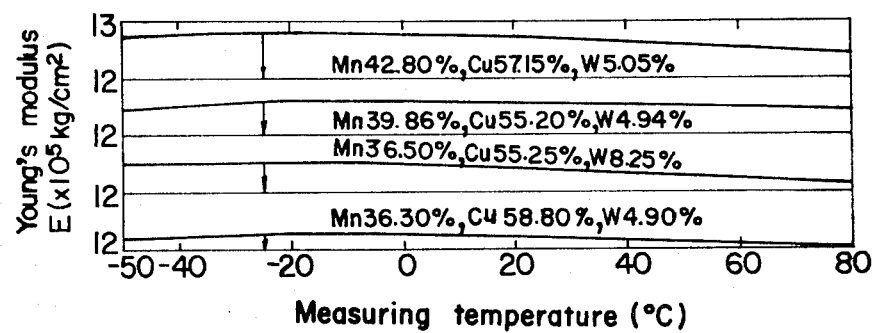
Figure 46A:
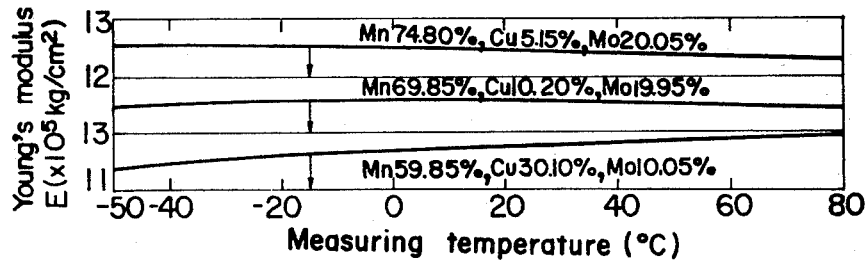
Figure 46B:
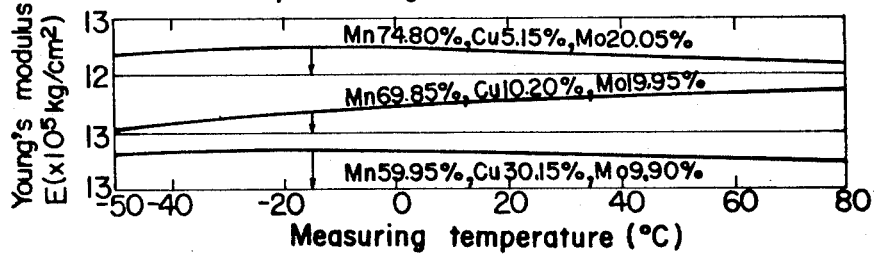
Figure 46C:
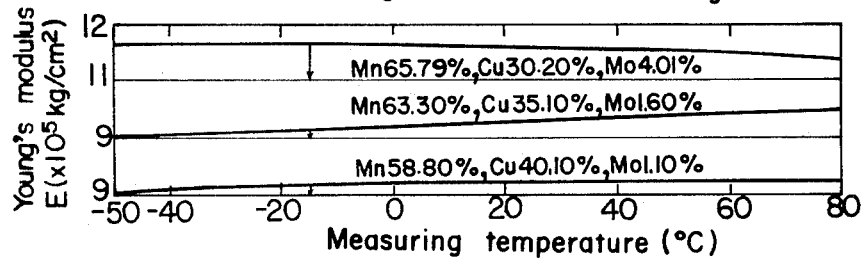
Figure 46D:
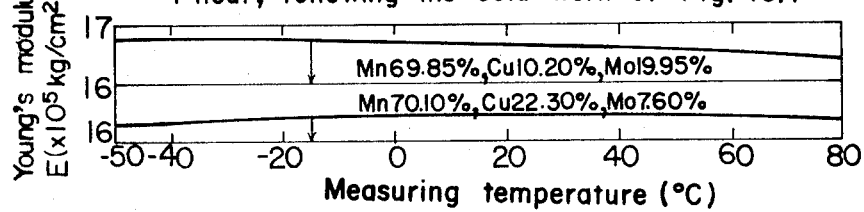
Figure 46E:
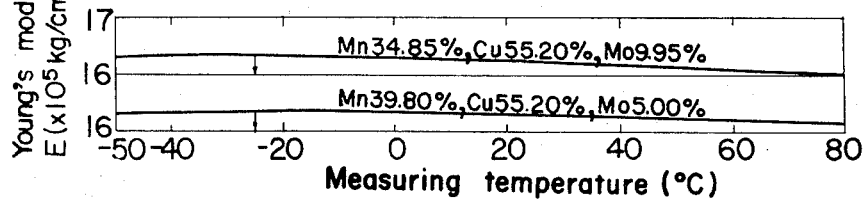
Figure 47A:
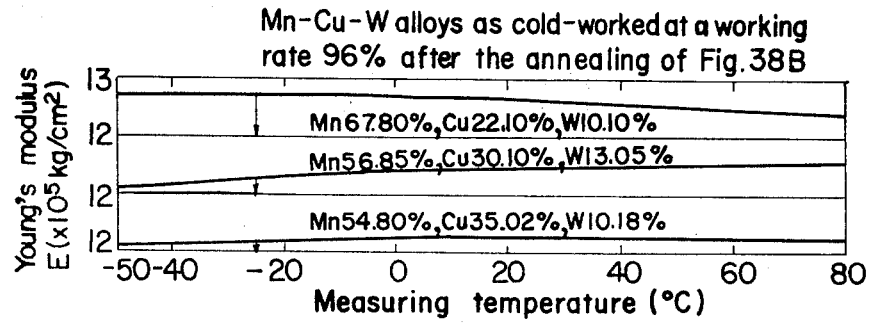
Figure 47B:
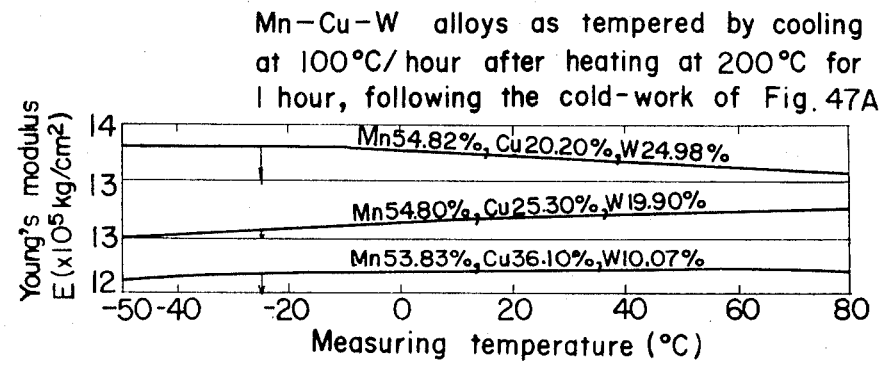
Figure 47C:
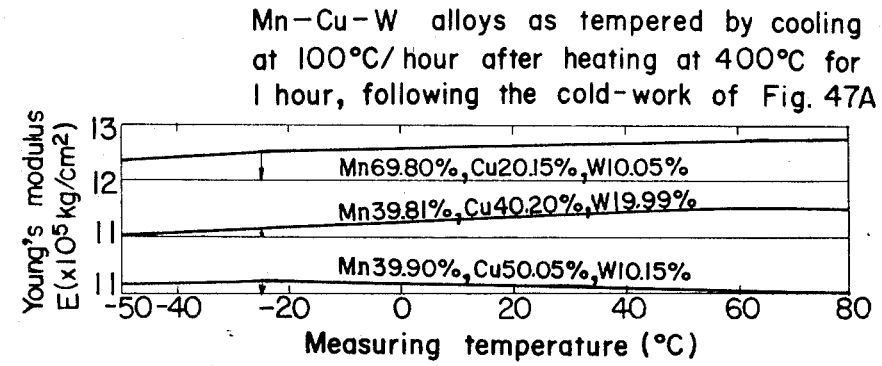
Figure 47D:
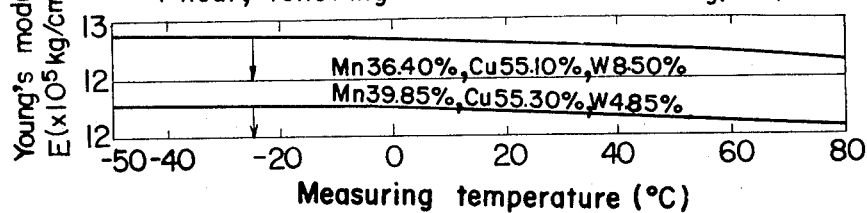
Figure 47E:
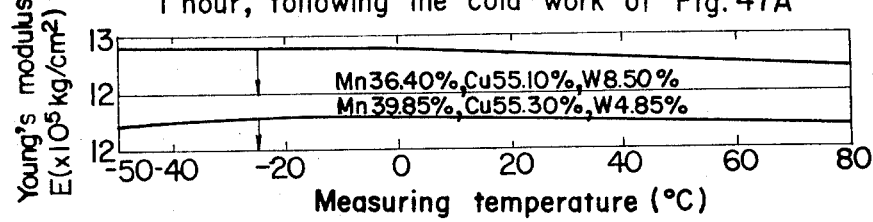
Figure 48A:
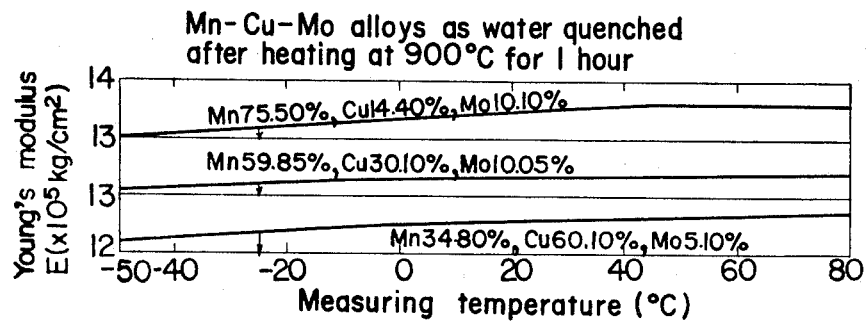
Figure 48B:
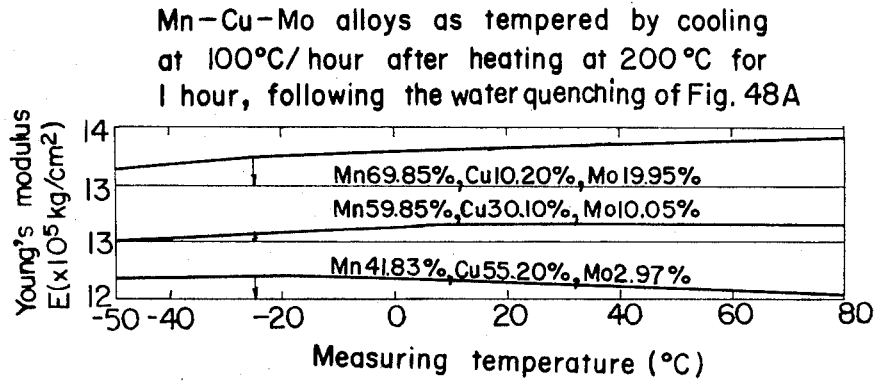
Figure 48C:
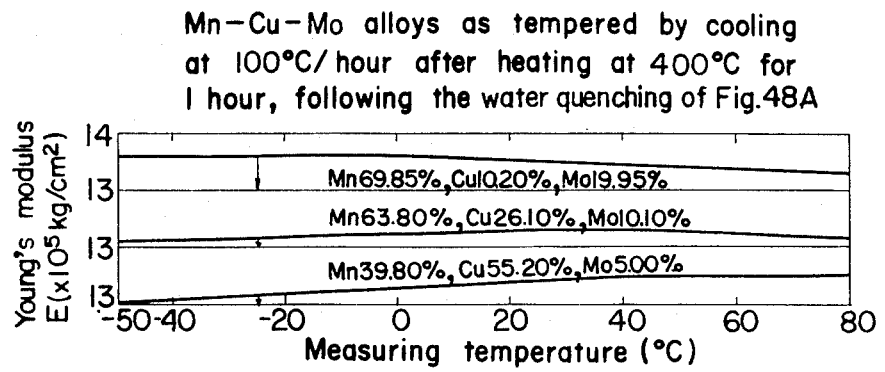
Figure 48D:
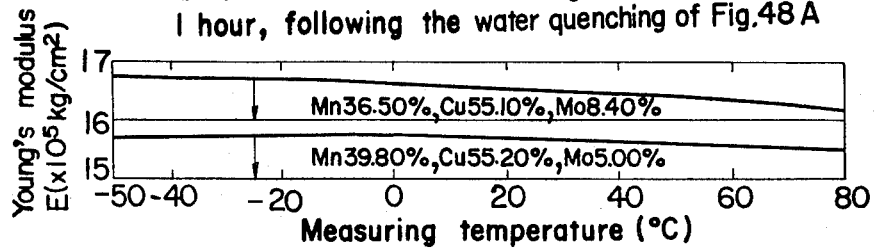
Figure 48E:
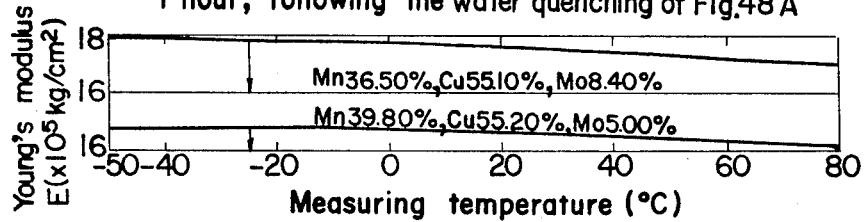
Figure 49A:
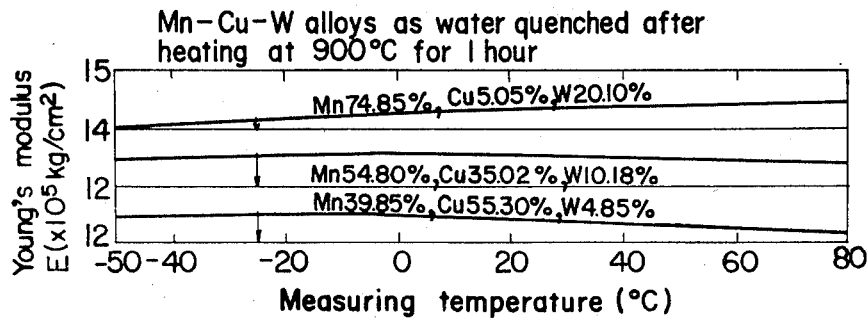
Figure 49B:
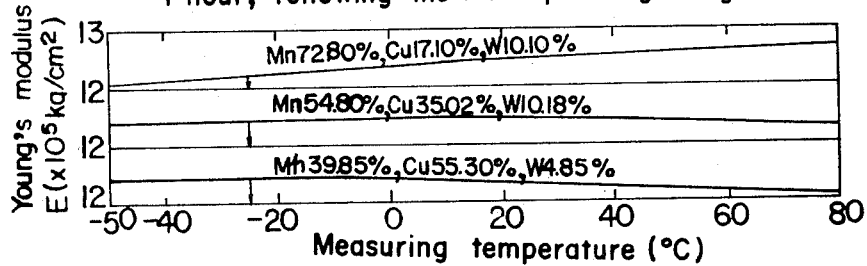
Figure 49C:
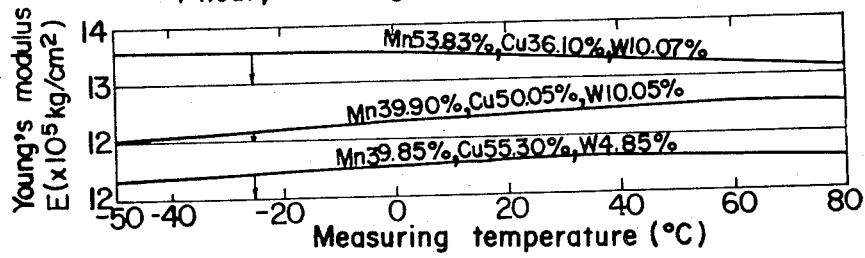
Figure 49D:
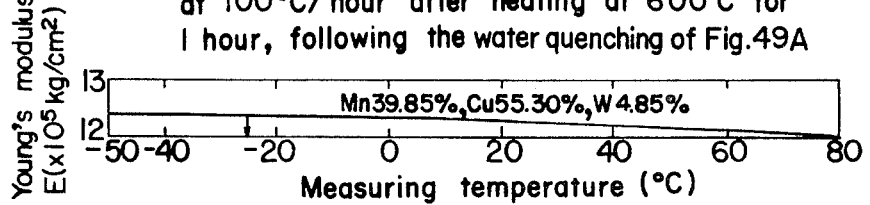
Figure 49E:
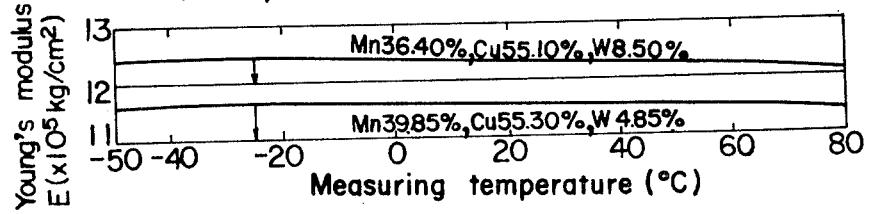

FIGS. 45A and 45B illustrate the values of Young's modulus at various temperatures from —50° C. to 80° C., for different Mn-Cu-Mo and Mn-Cu-W tenary alloys of the invention, respectively, in the state as annealed by cooling at a speed of 100° C./hour after heating at 900° C. for 1 hour.

FIGS. 46A to 46E and FIGS. 47A to 47E show the values of Young's modulus at various temperatures from —50° C. to 80° C., for different Mn-Cu-Mo and Mn-Cu-W ternary alloys of the invention, respectively, in the state as cold-worked with a working rate of 96% after the annealing of FIGS. 45A and 45B, respectively, and in the states as tempered by cooling at a speed of 100° C./hour after heating at different temperatures for 1 hour following the above referred cold-work, respectively.

FIGS. 48A to 48E and FIGS. 49A to 49E show the values of Young's modulus at various temperatures from —50° C. to 80° C., for different Mn-Cu-Mo and Mn-Cu-W ternary alloys of the invention, respectively, in the state as water quenched after the annealing of FIGS. 45A and 45B, respectively, and in the states as tempered by cooling at a speed of 100° C./hour after heating at different temperatures for 1 hour following the above referred water quenching.

TABLE 16

[Physical properties of Mn-Cu-Mo alloys, Mn-Cu-W alloys and Mn-Cu-Mo-W alloys as annealed by cooling at a speed of 100° C./hour after heating at 900° C. for 1 hour]

| Alloy composition | | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|---|
| Mn (percent) | Cu (percent) | Mo (percent) | W (percent) | | | | | |
| 41.50 | 53.20 | 5.30 | | $15.58 \times 10^5$ | $-12.50 \times 10^{-5}$ | $6.95 \times 10^5$ | $-13.40 \times 10^{-5}$ | 148 |
| 41.80 | 55.10 | 3.10 | | $15.50 \times 10^5$ | $+2.30 \times 10^{-5}$ | $6.90 \times 10^5$ | $+1.88 \times 10^{-5}$ | 149 |
| 34.80 | 55.10 | 10.00 | | $15.90 \times 10^5$ | $-18.60 \times 10^{-5}$ | $6.25 \times 10^5$ | $-19.20 \times 10^{-5}$ | 148 |
| 37.85 | 57.15 | 5.00 | | $15.60 \times 10^5$ | $-15.25 \times 10^{-5}$ | $6.21 \times 10^5$ | $-16.10 \times 10^{-5}$ | 150 |
| 42.80 | 52.15 | | 5.05 | $12.70 \times 10^5$ | $-18.40 \times 10^{-5}$ | $5.31 \times 10^5$ | $-18.90 \times 10^{-5}$ | 185 |
| 39.86 | 55.20 | | 4.94 | $12.53 \times 10^5$ | $-2.30 \times 10^{-5}$ | $5.26 \times 10^5$ | $-2.80 \times 10^{-5}$ | 160 |
| 36.50 | 55.25 | | 8.25 | $12.40 \times 10^5$ | $-18.55 \times 10^{-5}$ | $5.22 \times 10^5$ | $-18.95 \times 10^{-5}$ | 190 |
| 36.30 | 58.80 | | 4.90 | $12.20 \times 10^5$ | $-16.90 \times 10^{-5}$ | $5.15 \times 10^5$ | $-17.30 \times 10^{-5}$ | 140 |
| 37.85 | 57.05 | 3.00 | 2.10 | $15.58 \times 10^5$ | $-15.45 \times 10^{-5}$ | $6.15 \times 10^5$ | $-16.80 \times 10^{-5}$ | 148 |
| 36.55 | 55.20 | 4.20 | 4.05 | $12.38 \times 10^5$ | $-18.56 \times 10^{-5}$ | $5.27 \times 10^5$ | $-19.50 \times 10^{-5}$ | 192 |

TABLE 17

[Physical properties of Mn-Cu-Mo, Mn-Cu-W, and Mn-Cu-Mo-W alloys]

| Alloy composition | | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|---|
| Mn (percent) | Cu (percent) | Mo (percent) | W (percent) | | | | | |
| As water quenched after heating at 900° C. for 1 hour, following the annealing of Table 16 | | | | | | | | |
| 75.50 | 14.40 | 10.10 | | $13.50 \times 10^5$ | $+18.50 \times 10^{-5}$ | $5.56 \times 10^5$ | $+17.60 \times 10^{-5}$ | 225 |
| 59.85 | 30.10 | 10.05 | | $13.35 \times 10^5$ | $+4.07 \times 10^{-5}$ | $5.51 \times 10^5$ | $+3.04 \times 10^{-5}$ | 170 |
| 34.80 | 60.10 | 5.10 | | $12.60 \times 10^5$ | $+15.55 \times 10^{-5}$ | $5.28 \times 10^5$ | $+14.43 \times 10^{-5}$ | 165 |
| 74.85 | 5.05 | | 20.10 | $14.35 \times 10^5$ | $+15.30 \times 10^{-5}$ | $5.82 \times 10^5$ | $+14.20 \times 10^{-5}$ | 205 |
| 54.80 | 35.02 | | 10.18 | $12.55 \times 10^5$ | $-2.50 \times 10^{-5}$ | $5.27 \times 10^5$ | $-3.60 \times 10^{-5}$ | 135 |
| 39.85 | 55.30 | | 4.85 | $12.45 \times 10^5$ | $-11.50 \times 10^{-5}$ | $5.23 \times 10^5$ | $-12.40 \times 10^{-5}$ | 118 |
| 74.85 | 5.05 | 10.00 | 10.10 | $14.34 \times 10^5$ | $+15.32 \times 10^{-5}$ | $5.81 \times 10^5$ | $+14.15 \times 10^{-5}$ | 203 |
| 54.80 | 35.02 | 5.10 | 5.08 | $12.53 \times 10^5$ | $-2.45 \times 10^{-5}$ | $5.30 \times 10^5$ | $-3.70 \times 10^{-5}$ | 134 |
| Tempered by cooling at 100° C./hour after heating at 200° C. for 1 hour, following the above referred water quenching | | | | | | | | |
| 69.85 | 10.20 | 19.95 | | $13.70 \times 10^5$ | $+15.50 \times 10^{-5}$ | $5.63 \times 10^5$ | $+14.35 \times 10^{-5}$ | 300 |
| 59.85 | 30.10 | 10.05 | | $13.30 \times 10^5$ | $+1.64 \times 10^{-5}$ | $5.50 \times 10^5$ | $+0.80 \times 10^{-5}$ | 152 |
| 41.83 | 55.20 | 2.97 | | $12.35 \times 10^5$ | $-18.50 \times 10^{-5}$ | $5.20 \times 10^5$ | $-19.40 \times 10^{-5}$ | 130 |
| 72.80 | 17.10 | | 10.10 | $12.45 \times 10^5$ | $+18.60 \times 10^{-5}$ | $5.23 \times 10^5$ | $+17.70 \times 10^{-5}$ | 130 |
| 54.80 | 35.02 | | 10.18 | $12.40 \times 10^5$ | $-2.10 \times 10^{-5}$ | $5.22 \times 10^5$ | $-3.10 \times 10^{-5}$ | 110 |
| 39.85 | 55.30 | | 4.85 | $12.30 \times 10^5$ | $-12.50 \times 10^{-5}$ | $5.19 \times 10^5$ | $-13.45 \times 10^{-5}$ | 139 |
| 72.80 | 17.10 | 5.00 | 5.10 | $12.46 \times 10^5$ | $+18.66 \times 10^{-5}$ | $5.23 \times 10^5$ | $+17.68 \times 10^{-5}$ | 131 |
| 39.85 | 55.30 | 2.80 | 2.05 | $12.30 \times 10^5$ | $-12.48 \times 10^{-5}$ | $5.20 \times 10^5$ | $-13.40 \times 10^{-5}$ | 131 |
| Tempered by cooling at 100° C./hour after heating at 400° C. for 1 hour, following the above referred water quenching | | | | | | | | |
| 69.85 | 10.20 | 19.95 | | $13.53 \times 10^5$ | $-15.70 \times 10^{-5}$ | $5.57 \times 10^5$ | $-16.60 \times 10^{-5}$ | 348 |
| 63.80 | 26.10 | 10.10 | | $13.25 \times 10^5$ | $+2.60 \times 10^{-5}$ | $5.48 \times 10^5$ | $+1.70 \times 10^{-5}$ | 215 |
| 39.80 | 55.20 | 5.00 | | $13.40 \times 10^5$ | $+17.50 \times 10^{-5}$ | $5.53 \times 10^5$ | $+16.63 \times 10^{-5}$ | 130 |
| 53.83 | 36.10 | | 10.07 | $13.40 \times 10^5$ | $-19.50 \times 10^{-5}$ | $5.53 \times 10^5$ | $-19.90 \times 10^{-5}$ | 168 |
| 39.90 | 50.05 | | 10.05 | $12.35 \times 10^5$ | $+18.50 \times 10^{-5}$ | $5.20 \times 10^5$ | $+17.70 \times 10^{-5}$ | 136 |
| 39.85 | 55.30 | | 4.85 | $12.55 \times 10^5$ | $+1.50 \times 10^{-5}$ | $5.26 \times 10^5$ | $+0.65 \times 10^{-5}$ | 133 |
| 53.83 | 36.10 | 5.03 | 5.04 | $13.41 \times 10^5$ | $-19.51 \times 10^{-5}$ | $5.53 \times 10^5$ | $-19.95 \times 10^{-5}$ | 169 |
| 39.85 | 55.30 | 2.05 | 2.80 | $12.50 \times 10^5$ | $+1.55 \times 10^{-5}$ | $5.23 \times 10^5$ | $+0.75 \times 10^{-5}$ | 132 |
| Tempered by cooling at 100° C./hour after heating at 600° C. for 1 hour, following the above referred water quenching | | | | | | | | |
| 36.50 | 55.10 | 8.40 | | $16.52 \times 10^5$ | $-19.30 \times 10^{-5}$ | $6.50 \times 10^5$ | $-19.80 \times 10^{-5}$ | 145 |
| 39.80 | 55.20 | 5.00 | | $15.70 \times 10^5$ | $-5.00 \times 10^{-5}$ | $6.25 \times 10^5$ | $-6.00 \times 10^{-5}$ | 135 |
| 39.85 | 55.30 | | 4.85 | $12.25 \times 10^5$ | $-17.50 \times 10^{-5}$ | $5.17 \times 10^5$ | $-18.45 \times 10^{-5}$ | 135 |
| 36.50 | 55.10 | 4.30 | 4.10 | $16.52 \times 10^5$ | $-19.35 \times 10^{-5}$ | $6.45 \times 10^5$ | $-19.83 \times 10^{-5}$ | 143 |
| 39.85 | 55.30 | 2.05 | 2.80 | $12.24 \times 10^5$ | $-17.48 \times 10^{-5}$ | $5.18 \times 10^5$ | $-18.44 \times 10^{-5}$ | 132 |
| Tempered by cooling at 100° C./hour after heating at 800° C. for 1 hour, following the above referred water quenching | | | | | | | | |
| 36.50 | 55.10 | 8.40 | | $16.80 \times 10^5$ | $-19.30 \times 10^{-5}$ | $6.59 \times 10^5$ | $-19.90 \times 10^{-5}$ | 148 |
| 39.80 | 55.20 | 5.00 | | $16.30 \times 10^5$ | $-5.25 \times 10^{-5}$ | $6.43 \times 10^5$ | $-5.95 \times 10^{-5}$ | 138 |
| 36.40 | 55.10 | | 8.50 | $12.35 \times 10^5$ | $-19.60 \times 10^{-5}$ | $5.20 \times 10^5$ | $-19.80 \times 10^{-5}$ | 155 |
| 39.85 | 55.30 | | 4.85 | $12.60 \times 10^5$ | $-5.60 \times 10^{-5}$ | $5.28 \times 10^5$ | $-6.30 \times 10^{-5}$ | 150 |
| 36.50 | 55.10 | 4.30 | 4.10 | $16.78 \times 10^5$ | $-19.35 \times 10^{-5}$ | $6.58 \times 10^5$ | $-19.93 \times 10^{-5}$ | 149 |
| 39.85 | 55.30 | 2.05 | 2.80 | $12.58 \times 10^5$ | $-5.68 \times 10^{-5}$ | $5.27 \times 10^5$ | $-6.45 \times 10^{-5}$ | 155 |

TABLE 18

[Physical properties of Mn-Cu-Mo, Mn-Cu-W, and Mn-Cu-Mo-W alloys]

| Alloy composition | | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|---|
| Mn (percent) | Cu (percent) | Mo (percent) | W (percent) | | | | | |
| As cold-worked with a working rate of 96%, after annealing of Table 16 | | | | | | | | |
| 74.80 | 5.15 | 20.05 | | $12.45 \times 10^5$ | $-15.30 \times 10^{-5}$ | $5.23 \times 10^5$ | $-16.20 \times 10^{-5}$ | 260 |
| 69.85 | 10.20 | 19.95 | | $13.55 \times 10^5$ | $-5.50 \times 10^{-5}$ | $5.58 \times 10^5$ | $-6.45 \times 10^{-5}$ | 270 |
| 59.85 | 30.10 | 10.05 | | $11.75 \times 10^5$ | $+17.25 \times 10^{-5}$ | $5.10 \times 10^5$ | $+16.17 \times 10^{-5}$ | 214 |
| 67.80 | 22.10 | | 10.10 | $12.65 \times 10^5$ | $-18.50 \times 10^{-5}$ | $5.30 \times 10^5$ | $-19.20 \times 10^{-5}$ | 210 |
| 56.85 | 30.10 | | 13.05 | $12.45 \times 10^5$ | $+19.20 \times 10^{-5}$ | $5.23 \times 10^5$ | $+18.25 \times 10^{-5}$ | 200 |
| 54.80 | 35.02 | | 10.18 | $12.25 \times 10^5$ | $+3.20 \times 10^{-5}$ | $5.17 \times 10^5$ | $+2.50 \times 10^{-5}$ | 202 |
| 67.70 | 22.20 | 5.00 | 5.10 | $12.60 \times 10^5$ | $-18.45 \times 10^{-5}$ | $5.28 \times 10^5$ | $-19.15 \times 10^{-5}$ | 209 |
| 56.90 | 30.05 | 6.05 | 7.00 | $12.44 \times 10^5$ | $+19.10 \times 10^{-5}$ | $5.20 \times 10^5$ | $+18.20 \times 10^{-5}$ | 203 |

TABLE 18—Continued

| Alloy composition | | | | Young's modulus (kg./cm.², 20° C.) | Temperature coefficient of Young's modulus e (0. to 40° C.) | Modulus of rigidity (kg./cm.², 20° C.) | Temperature coefficient of modulus of rigidity (0 to 40° C.) | Vickers hardness (20° C.) |
|---|---|---|---|---|---|---|---|---|
| Mn (percent) | Cu (percent) | Mo (percent) | W (percent) | | | | | |
| Tempered by cooling at 100° C./hour after heating at 200° C. for 1 hour, following the above referred cold-work | | | | | | | | |
| 74.80 | 5.15 | 20.05 | ---------- | 12.40×10⁵ | −12.50×10⁻⁵ | 5.22×10⁵ | −13.60×10⁻⁵ | 365 |
| 69.85 | 10.20 | 19.95 | ---------- | 13.53×10⁵ | +19.50×10⁻⁵ | 5.58×10⁵ | +18.63×10⁻⁵ | 364 |
| 59.95 | 30.15 | 9.90 | ---------- | 13.65×10⁵ | −2.96×10⁻⁵ | 5.61×10⁵ | −3.75×10⁻⁵ | 150 |
| 54.82 | 20.20 | ---------- | 24.98 | 13.50×10⁵ | −19.33×10⁻⁵ | 5.56×10⁵ | −19.90×10⁻⁵ | 151 |
| 54.80 | 25.30 | ---------- | 19.90 | 13.40×10⁵ | +18.60×10⁻⁵ | 5.53×10⁵ | +17.70×10⁻⁵ | 145 |
| 53.83 | 36.10 | ---------- | 10.07 | 12.44×10⁵ | +2.20×10⁻⁵ | 5.22×10⁵ | +1.50×10⁻⁵ | 120 |
| 55.82 | 20.20 | 13.90 | 10.08 | 13.49×10⁵ | −19.30×10⁻⁵ | 5.55×10⁵ | −19.95×10⁻⁵ | 150 |
| 53.93 | 36.00 | 5.00 | 5.07 | 12.43×10⁵ | +2.25×10⁻⁵ | 5.21×10⁵ | +1.60×10⁻⁵ | 121 |
| Tempered by cooling at 100° C./hour after heating at 400° C. for 1 hour, following the above referred cold-work | | | | | | | | |
| 65.79 | 30.20 | 4.01 | ---------- | 11.60×10⁵ | −19.30×10⁻⁵ | 4.97×10⁵ | −19.90×10⁻⁵ | 210 |
| 63.30 | 35.10 | 1.60 | ---------- | 9.30×10⁵ | +19.10×10⁻⁵ | 4.26×10⁵ | +18.20×10⁻⁵ | 200 |
| 58.80 | 40.10 | 1.10 | ---------- | 9.22×10⁵ | +1.50×10⁻⁵ | 4.23×10⁵ | +0.85×10⁻⁵ | 200 |
| 69.80 | 20.15 | ---------- | 10.05 | 12.70×10⁵ | +5.95×10⁻⁵ | 5.31×10⁵ | +4.90×10⁻⁵ | 244 |
| 39.81 | 40.20 | ---------- | 19.99 | 11.40×10⁵ | +19.25×10⁻⁵ | 4.90×10⁵ | +18.55×10⁻⁵ | 216 |
| 39.90 | 50.05 | ---------- | 10.05 | 11.20×10⁵ | −0.15×10⁻⁵ | 4.84×10⁵ | −1.20×10⁻⁵ | 226 |
| 69.85 | 20.10 | 5.02 | 5.03 | 12.65×10⁵ | +5.90×10⁻⁵ | 5.30×10⁵ | +4.93×10⁻⁵ | 243 |
| 39.81 | 40.20 | 10.90 | 9.09 | 11.41×10⁵ | +19.30×10⁻⁵ | 4.91×10⁵ | +18.53×10⁻⁵ | 215 |
| Tempered by cooling at 100° C./hour after heating at 600° C. for 1 hour, following the above referred cold-work | | | | | | | | |
| 69.85 | 10.20 | 19.95 | ---------- | 16.70×10⁵ | −12.33×10⁻⁵ | 6.55×10⁵ | −13.23×10⁻⁵ | 705 |
| 70.10 | 22.30 | 7.60 | ---------- | 16.44×10⁵ | −1.50×10⁻⁵ | 6.47×10⁵ | −2.40×10⁻⁵ | 400 |
| 36.40 | 55.10 | ---------- | 8.50 | 12.60×10⁵ | −18.20×10⁻⁵ | 5.28×10⁵ | −19.10×10⁻⁵ | 140 |
| 39.85 | 55.30 | ---------- | 4.85 | 12.40×10⁵ | −12.20×10⁻⁵ | 5.22×10⁵ | −13.15×10⁻⁵ | 133 |
| 36.40 | 55.10 | 4.30 | 4.20 | 12.58×10⁵ | −18.25×10⁻⁵ | 5.29×10⁵ | −19.20×10⁻⁵ | 141 |
| 39.85 | 55.30 | 2.05 | 2.80 | 12.58×10⁵ | −12.15×10⁻⁵ | 5.20×10⁵ | −13.00×10⁻⁵ | 130 |
| Tempered by cooling at 100° C./hour after heating at 800° C. for 1 hour, following the above referred cold-work | | | | | | | | |
| 34.85 | 55.20 | 9.95 | ---------- | 16.20×10⁵ | −19.40×10⁻⁵ | 6.42×10⁵ | −19.95×10⁻⁵ | 150 |
| 29.80 | 55.20 | 5.00 | ---------- | 16.30×10⁵ | −3.00×10⁻⁵ | 6.43×10⁵ | −4.10×10⁻⁵ | 135 |
| 36.40 | 55.10 | ---------- | 8.50 | 12.70×10⁵ | −19.55×10⁻⁵ | 5.31×10⁵ | −19.98×10⁻⁵ | 175 |
| 39.85 | 55.30 | ---------- | 4.85 | 12.55×10⁵ | −1.50×10⁻⁵ | 5.27×10⁵ | −2.45×10⁻⁵ | 145 |
| 36.40 | 55.10 | 4.30 | 4.20 | 12.65×10⁵ | −19.50×10⁻⁵ | 5.30×10⁵ | −19.90×10⁻⁵ | 174 |
| 39.85 | 55.30 | 2.05 | 2.80 | 12.60×10⁵ | −1.60×10⁻⁵ | 5.30×10⁵ | −2.48×10⁻⁵ | 143 |

TABLE 19

[Relation between cooling speed and temperature coefficient of Young's modulus e, 0° C.–40° C., for Mn-Cu-Mo, Mn-Cu-W, and-Mn-Cu-Mo-W alloys]

| Alloy composition | | | | Cooling speed after heating at 900° C. for 1 hour | | | | |
|---|---|---|---|---|---|---|---|---|
| Mn (percent) | Cu (percent) | Mo (percent) | W (percent) | 170° C./sec. (water quenched) | 9° C./sec. air quenched | 500° C./hour (annealed) | 100° C./hour (annealed) | 10° C./hour (annealed) |
| 75.50 | 14.40 | 10.10 | ---------- | +18.50×10⁻⁵ | +0.50×10⁻⁵ | −22.00×10⁻⁵ | −29.00×10⁻⁵ | −36.50×10⁻⁵ |
| 41.80 | 55.10 | 3.10 | ---------- | +0.50×10⁻⁵ | +1.30×10⁻⁵ | +1.80×10⁻⁵ | +2.30×10⁻⁵ | +2.40×10⁻⁵ |
| 34.80 | 60.10 | 5.10 | ---------- | +15.30×10⁻⁵ | +1.50×10⁻⁵ | −6.00×10⁻⁵ | −21.10×10⁻⁵ | −27.00×10⁻⁵ |
| 74.85 | 5.05 | ---------- | 20.10 | +15.30×10⁻⁵ | −0.50×10⁻⁵ | −18.50×10⁻⁵ | −24.80×10⁻⁵ | −31.10×10⁻⁵ |
| 39.86 | 55.20 | ---------- | 4.94 | −18.50×10⁻⁵ | −11.80×10⁻⁵ | −5.00×10⁻⁵ | −2.30×10⁻⁵ | +0.20×10⁻⁵ |
| 39.85 | 55.30 | ---------- | 4.85 | −11.50×10⁻⁵ | −5.10×10⁻⁵ | +2.00×10⁻⁵ | +4.50×10⁻⁵ | +7.70×10⁻⁵ |
| 74.90 | 5.00 | 10.00 | 10.10 | −14.80×10⁻⁵ | −0.55×10⁻⁵ | −17.60×10⁻⁵ | −23.30×10⁻⁵ | −30.25×10⁻⁵ |
| 39.85 | 55.30 | 2.05 | 2.80 | −11.40×10⁻⁵ | −5.00×10⁻⁵ | +2.10×10⁻⁵ | +4.45×10⁻⁵ | +7.60×10⁻⁵ |

TABLE 20

[Physical properties of ternary alloys consisting of manganese, copper, and a third element, as annealed by cooling at 100° C./hour after heating at 900° C. for 1 hour]

| Alloy composition | | | | Young's modulus (kg./cm.² 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|---|
| Mn (percent) | Cu (percent) | Third element | (percent) | | | | | |
| 37.70 | 55.20 | In | 7.10 | 14.20×10⁵ | −18.30×10⁻⁵ | 5.78×10⁵ | −19.65×10⁻⁵ | 122 |
| 41.90 | 55.10 | In | 3.03 | 13.80×10⁵ | +2.30×10⁻⁵ | 5.65×10⁵ | +0.15×10⁻⁵ | 123 |
| 37.70 | 55.10 | Tl | 7.20 | 13.80×10⁵ | −15.50×10⁻⁵ | 5.65×10⁵ | −17.60×10⁻⁵ | 126 |
| 42.20 | 55.30 | Tl | 2.50 | 13.65×10⁵ | +1.85×10⁻⁵ | 5.61×10⁵ | −0.55×10⁻⁵ | 124 |
| 36.20 | 55.30 | V | 8.50 | 13.46×10⁵ | −17.60×10⁻⁵ | 5.55×10⁵ | −19.55×10⁻⁵ | 135 |
| 41.30 | 55.20 | V | 3.50 | 13.42×10⁵ | +1.55×10⁻⁵ | 5.53×10⁵ | −0.60×10⁻⁵ | 130 |
| 37.85 | 55.15 | Au | 7.00 | 13.44×10⁵ | −16.25×10⁻⁵ | 5.54×10⁵ | −18.35×10⁻⁵ | 120 |
| 41.90 | 55.10 | Au | 3.00 | 13.20×10⁵ | +1.30×10⁻⁵ | 5.47×10⁵ | −0.75×10⁻⁵ | 121 |
| 37.85 | 55.15 | Ag | 7.00 | 13.30×10⁵ | −17.55×10⁻⁵ | 5.50×10⁵ | −19.50×10⁻⁵ | 121 |
| 41.90 | 55.10 | Ag | 3.00 | 13.31×10⁵ | +1.10×10⁻⁵ | 5.50×10⁵ | −1.05×10⁻⁵ | 121 |
| 37.60 | 55.20 | Ta | 7.20 | 13.25×10⁵ | −18.45×10⁻⁵ | 5.48×10⁵ | −19.95×10⁻⁵ | 122 |
| 41.80 | 55.10 | Ta | 3.10 | 13.60×10⁵ | +0.80×10⁻⁵ | 5.60×10⁵ | −1.20×10⁻⁵ | 126 |
| 37.55 | 55.15 | Zr | 7.30 | 14.10×10⁵ | −19.50×10⁻⁵ | 5.76×10⁵ | −19.98×10⁻⁵ | 134 |
| 41.55 | 55.15 | Zr | 3.30 | 14.20×10⁵ | −0.50×10⁻⁵ | 5.78×10⁵ | −2.31×10⁻⁵ | 128 |
| 37.80 | 55.20 | Pd | 7.00 | 13.80×10⁵ | −17.90×10⁻⁵ | 5.66×10⁵ | −19.85×10⁻⁵ | 127 |
| 41.70 | 55.30 | Pd | 3.00 | 13.45×10⁵ | +1.25×10⁻⁵ | 5.55×10⁵ | −1.00×10⁻⁵ | 123 |
| 36.20 | 55.30 | Cd | 8.50 | 13.25×10⁵ | −18.20×10⁻⁵ | 5.48×10⁵ | −19.85×10⁻⁵ | 123 |
| 41.90 | 55.10 | Cd | 3.00 | 13.30×10⁵ | +1.20×10⁻⁵ | 5.50×10⁵ | −0.85×10⁻⁵ | 124 |
| 37.20 | 55.10 | Ge | 7.70 | 13.60×10⁵ | −19.20×10⁻⁵ | 5.60×10⁵ | −29.20×10⁻⁵ | 134 |
| 42.20 | 55.30 | Ge | 2.50 | 13.55×10⁵ | −0.30×10⁻⁵ | 5.58×10⁵ | −2.33×10⁻⁵ | 135 |
| 37.70 | 55.20 | Se | 7.10 | 13.44×10⁵ | −18.85×10⁻⁵ | 5.55×10⁵ | −20.20×10⁻⁵ | 121 |
| 41.75 | 55.15 | Se | 3.10 | 13.56×10⁵ | +1.30×10⁻⁵ | 5.59×10⁵ | −0.76×10⁻⁵ | 123 |
| 38.60 | 55.30 | Bi | 6.10 | 13.42×10⁵ | −17.60×10⁻⁵ | 5.54×10⁵ | −19.40×10⁻⁵ | 120 |
| 42.40 | 55.10 | Bi | 2.50 | 13.41×10⁵ | +0.45×10⁻⁵ | 5.52×10⁵ | −1.56×10⁻⁵ | 123 |

TABLE 20—Continued

[Physical properties of ternary alloys consisting of manganese, copper, and a third element, as annealed by cooling at 100° C./hour after heating at 900° C. for 1 hour]

| Alloy composition | | | | Young's modulus (kg./cm.$^2$, 20° C.) | Temperature coefficient of Young's modulus $e$ (0–40° C.) | Modulus of rigidity (kg./cm.$^2$, 20° C.) | Temperature coefficient of modulus of rigidity (0–40° C.) | Vickers hardness (20° C.) |
|---|---|---|---|---|---|---|---|---|
| Mn (percent) | Cu (percent) | Third element | (percent) | | | | | |
| 37.60 | 55.30 | Sm | 7.10 | 13.60×10$^5$ | −15.50×10$^{-5}$ | 5.60×10$^5$ | −17.45×10$^{-5}$ | 123 |
| 42.90 | 55.10 | Sm | 2.00 | 13.58×10$^5$ | +1.50×10$^{-5}$ | 5.59×10$^5$ | −0.60×10$^{-5}$ | 124 |
| 37.30 | 55.10 | Nb | 7.60 | 14.40×10$^5$ | −18.65×10$^{-5}$ | 5.84×10$^5$ | −20.55×10$^{-5}$ | 135 |
| 41.60 | 55.30 | Nb | 3.10 | 14.35×10$^5$ | +1.63×10$^{-5}$ | 5.83×10$^5$ | −0.45×10$^{-5}$ | 132 |
| 38.25 | 55.20 | Sb | 6.55 | 14.33×10$^5$ | −18.70×10$^{-5}$ | 5.82×10$^5$ | −20.60×10$^{-5}$ | 130 |
| 42.80 | 55.20 | Sb | 2.00 | 14.32×10$^5$ | +1.44×10$^{-5}$ | 5.82×10$^5$ | −0.65×10$^{-3}$ | 128 |
| 38.00 | 55.20 | Al | 6.80 | 14.65×10$^5$ | −18.60×10$^{-5}$ | 5.92×10$^5$ | −19.40×10$^{-5}$ | 137 |
| 41.80 | 55.10 | Al | 3.10 | 14.66×10$^5$ | +1.30×10$^{-5}$ | 5.94×10$^5$ | −0.75×10$^{-5}$ | 134 |
| 39.70 | 55.30 | Si | 5.00 | 14.20×10$^5$ | −17.60×10$^{-5}$ | 5.78×10$^5$ | −19.54×10$^{-5}$ | 131 |
| 41.70 | 55.20 | Si | 3.10 | 14.00×10$^5$ | +1.40×10$^{-5}$ | 5.72×10$^5$ | −0.60×10$^{-5}$ | 127 |
| 37.80 | 55.00 | Sn | 7.20 | 13.65×10$^5$ | −18.80×10$^{-5}$ | 5.61×10$^5$ | −20.10×10$^{-5}$ | 128 |
| 41.90 | 55.10 | Sn | 3.00 | 13.60×10$^5$ | +0.55×10$^{-5}$ | 5.60×10$^5$ | −0.60×10$^{-5}$ | 126 |
| 37.70 | 55.20 | Te | 7.10 | 13.40×10$^5$ | −18.76×10$^{-5}$ | 5.55×10$^5$ | −20.20×10$^{-5}$ | 136 |
| 41.80 | 55.10 | Te | 3.10 | 13.33×10$^5$ | +0.45×10$^{-5}$ | 5.51×10$^5$ | −1.55×10$^{-5}$ | 120 |
| 38.00 | 55.30 | Gd | 6.70 | 13.70×10$^5$ | −19.00×10$^{-5}$ | 5.63×10$^5$ | −20.85×10$^{-5}$ | 122 |
| 41.55 | 55.25 | Gd | 3.20 | 13.65×10$^5$ | +0.85×10$^{-5}$ | 5.61×10$^5$ | −1.20×10$^{-5}$ | 126 |
| 38.80 | 55.10 | Zn | 6.10 | 13.20×10$^5$ | −18.60×10$^{-5}$ | 5.48×10$^5$ | −20.50×10$^{-5}$ | 134 |
| 41.90 | 55.00 | Zn | 3.10 | 12.90×10$^5$ | +0.95×10$^{-5}$ | 5.37×10$^5$ | −1.10×10$^{-5}$ | 120 |
| 38.50 | 55.30 | Be | 6.20 | 13.95×10$^6$ | −16.80×10$^{-5}$ | 5.70×10$^5$ | −18.40×10$^{-5}$ | 247 |
| 42.15 | 55.35 | Be | 2.50 | 13.90×10$^5$ | +1.20×10$^{-5}$ | 5.69×10$^5$ | −0.65×10$^{-5}$ | 249 |
| 44.05 | 55.10 | B | 0.85 | 15.80×10$^5$ | −14.20×10$^{-5}$ | 6.28×10$^5$ | −6.30×10$^{-5}$ | 310 |
| 44.30 | 55.20 | B | 0.50 | 15.60×10$^5$ | +3.20×10$^{-5}$ | 6.21×10$^5$ | +1.50×10$^{-5}$ | 280 |

TABLE 21A

[Physical properties of Mn-Cu-In alloys]

| Alloy composition | | | Young's modulus (kg./cm.$^2$, 20° C.) | Temperature coefficient of Young's modulus $e$ (0–40° C.) | Modulus of rigidity (kg./cm.$^2$, 20° C.) | Temperature coefficient of modulus of rigidity (0–40° C.) | Vickers hardness (20° C.) |
|---|---|---|---|---|---|---|---|
| Mn (percent) | Cu (percent) | In (percent) | | | | | |
| As water quenched after heating at 950° C. for 1 hour, following the annealing of Table 20 | | | | | | | |
| 61.53 | 20.12 | 18.35 | 12.27×10$^5$ | +11.25×10$^{-5}$ | 5.17×10$^5$ | +10.65×10$^{-5}$ | 124 |
| Tempered by cooling at 100° C./hr. after heating at 200° C. for 1 hr., following the above referred water quenching | | | | | | | |
| 61.53 | 20.12 | 18.35 | 12.65×10$^5$ | +16.87×10$^{-5}$ | 5.30×10$^5$ | +15.85×10$^{-5}$ | 128 |
| Tempered by cooling at 100° C./hr. after heating at 400° C. for 1 hr., following the above referred water quenching | | | | | | | |
| 61.53 | 20.12 | 18.35 | 12.77×10$^5$ | +19.45×10$^{-5}$ | 5.33×10$^5$ | +17.20×10$^{-5}$ | 135 |
| Tempered by cooling at 100° C./hr. after heating at 600° C. for 1 hr., following the above referred water quenching | | | | | | | |
| 61.53 | 20.12 | 18.35 | 13.65×10$^5$ | +10.66×10$^{-5}$ | 5.61×10$^5$ | +8.25×10$^{-5}$ | 148 |
| Tempered by cooling at 100° C./hr. after heating at 800° C. for 1 hr., following the above referred water quenching | | | | | | | |
| 61.53 | 20.12 | 18.35 | 14.85×10$^5$ | −5.35×10$^{-5}$ | 5.98×10$^5$ | −5.46×10$^{-5}$ | 256 |

TABLE 21B

[Physical properties of Mn-Cu-Ti alloys]

| Alloy composition | | | Young's modulus (kg./cm.$^2$, 20° C.) | Temperature coefficient of Young's modulus $e$ (0–40° C.) | Modulus of rigidity (kg./cm.$^2$, 20° C.) | Temperature coefficient of modulus of rigidity (0–40° C.) | Vickers hardness (20° C.) |
|---|---|---|---|---|---|---|---|
| Mn (percent) | Cu (percent) | Ti (percent) | | | | | |
| As water quenched after heating at 950° C. for 1 hour, following the annealing of Table 20 | | | | | | | |
| 58.00 | 20.25 | 21.65 | 13.64×10$^5$ | −5.12×10$^{-5}$ | 5.61×10$^5$ | −6.67×10$^{-5}$ | 118 |
| Tempered by cooling at 100° C./hr. after heating at 200° C. for 1 hr., following the above referred water quenching | | | | | | | |
| 58.00 | 20.25 | 21.65 | 13.78×10$^5$ | −5.69×10$^{-5}$ | 5.63×10$^5$ | −6.22×10$^{-5}$ | 125 |
| Tempered by cooling at 100° C./hr. after heating at 400° C. for 1 hr., following the above referred water quenching | | | | | | | |
| 58.00 | 20.25 | 21.65 | 13.80×10$^5$ | −5.00×10$^{-5}$ | 5.66×10$^5$ | −5.45×10$^{-5}$ | 136 |
| Tempered by cooling at 100° C./hr. after heating at 600° C. for 1 hr., following the above referred water quenching | | | | | | | |
| 58.00 | 20.25 | 21.65 | 13.96×10$^5$ | −4.65×10$^{-5}$ | 5.71×10$^5$ | −5.35×10$^{-5}$ | 145 |
| Tempered by cooling at 100° C./hr. after heating at 800° C. for 1 hr., following the above referred water quenching | | | | | | | |
| 58.00 | 20.25 | 21.65 | 14.33×10$^5$ | −5.80×10$^{-5}$ | 5.83×10$^5$ | −6.46×10$^{-5}$ | 249 |

TABLE 21C
[Physical properties of Mn-Cu-V alloys]

| Alloy composition | | | Young's modulus (kg./cm.$^2$, 20° C.) | Temperature coefficient of Young's modulus e (0-40° C.) | Modulus of rigidity (kg./cm.$^3$, 20° C.) | Temperature coefficient of modulus of rigidity (0-40° C.) | Vickers hardness (20° C.) |
|---|---|---|---|---|---|---|---|
| Mn (percent) | Cu (percent) | V (percent) | | | | | |
| As water quenched after heating at 950° C. for 1 hour, following the annealing of Table 20 ||||||||
| 59.99 | 21.35 | 18.66 | 13.45×10$^5$ | +10.75×10$^{-5}$ | 5.55×10$^5$ | +8.66×10$^{-5}$ | 125 |
| Tempered by cooling at 100° C./hr. after heating at 200° C. for 1 hr., following the above referred water quenching ||||||||
| 59.99 | 21.35 | 18.66 | 13.56×10$^5$ | +11.33×10$^{-5}$ | 5.58×10$^5$ | +7.25×10$^{-5}$ | 162 |
| Tempered by cooling at 100° C./hr. after heating at 400° C. for 1 hr., following the above referred water quenching ||||||||
| 59.99 | 21.35 | 18.66 | 13.62×10$^5$ | +12.71×10$^{-5}$ | 5.60×10$^5$ | +10.00×10$^{-5}$ | 188 |
| Tempered by cooling at 100° C./hr. after heating at 600° C. for 1 hr., following the above referred water quenching ||||||||
| 59.99 | 21.35 | 18.66 | 13.85×10$^5$ | +10.64×10$^{-5}$ | 5.67×10$^5$ | +8.35×10$^{-5}$ | 242 |
| Tempered by cooling at 100°C./hr. after heating at 800° C. for 1 hr., following the above referred water quenching ||||||||
| 59.99 | 21.35 | 18.66 | 14.77×10$^5$ | −5.15×10$^{-5}$ | 5.95×10$^5$ | −6.68×10$^{-5}$ | 350 |

TABLE 21D
[Physical properties of Mn-Cu-Au alloys]

| Alloy composition | | | Young's modulus (kg./cm.$^2$, 20° C.) | Temperature coefficient of Young's modulus e (0-40° C.) | Modulus of rigidity (kg./cm.$^2$, 20° C.) | Temperature coefficient of modulus of rigidity (0-40° C.) | Vickers hardness (20° C.) |
|---|---|---|---|---|---|---|---|
| Mn (percent) | Cu (percent) | Au (percent) | | | | | |
| As water quenched after heating at 950° C. for 1 hour, following the annealing of Table 20 ||||||||
| 63.23 | 21.30 | 15.47 | 10.35×10$^5$ | −8.45×10$^{-5}$ | 4.59×10$^5$ | −9.36×10$^{-5}$ | 133 |
| Tempered by cooling at 100° C./hr. after heating at 200° C. for 1 hr., following the above referred water quenching ||||||||
| 63.23 | 21.30 | 15.47 | 10.44×10$^5$ | −7.21×10$^{-5}$ | 4.61×10$^5$ | −8.24×10$^{-5}$ | 139 |
| Tempered by cooling at 100° C./hr. after heating at 400° C. for 1 hr., following the above referred water quenching ||||||||
| 63.23 | 21.30 | 15.47 | 10.63×10$^5$ | −6.35×10$^{-5}$ | 4.67×10$^5$ | −7.37×10$^{-5}$ | 148 |
| Tempered by cooling at 100° C./hr. after heating at 600° C. for 1 hr., following the above referred water quenching ||||||||
| 63.23 | 21.30 | 15.47 | 10.75×10$^5$ | −8.22×10$^{-5}$ | 4.71×10$^5$ | −9.34×10$^{-5}$ | 195 |
| Tempered by cooling at 100° C./hr. after heating at 800° C. for 1 hr., following the above referred water quenching ||||||||
| 63.23 | 21.30 | 15.47 | 11.25×10$^5$ | −10.36×10$^{-5}$ | 4.86×10$^5$ | −11.42×10$^{-5}$ | 292 |

TABLE 21E
[Physical properties of Mn-Cu-Ag alloys]

| Alloy composition | | | Young's modulus (kg./cm.$^2$, 20° C.) | Temperature coefficient of Young's modulus e (0-40° C.) | Modulus of rigidity (kg./cm.$^2$, 20° C.) | Temperature coefficient of modulus of rigidity (0-40° C.) | Vicker hardness (20° C.s) |
|---|---|---|---|---|---|---|---|
| Mn (percent) | Cu (percent) | Ag (percent) | | | | | |
| As water quenched after heating at 950° C. for 1 hour, following the annealing of Table 20 ||||||||
| 67.39 | 18.36 | 14.25 | 9.85×10$^5$ | −6.21×10$^{-5}$ | 4.43×10$^5$ | −8.34×10$^{-5}$ | 122 |
| Tempered by cooling at 100° C./hr. after heating at 200° C. for 1 hr., following the above referred water quenching ||||||||
| 67.39 | 18.36 | 14.25 | 9.90×10$^5$ | −6.33×10$^{-5}$ | 4.45×10$^5$ | −7.11×10$^{-5}$ | 129 |
| Tempered by cooling at 100° C./hr. after heating at 400° C. for 1 hr., following the above referred water quenching ||||||||
| 67.39 | 18.36 | 14.25 | 9.97×10$^5$ | −5.42×10$^{-5}$ | 4.46×10$^5$ | −6.36×10$^{-5}$ | 145 |
| Tempered by cooling at 100° C./hr. after heating at 600° C. for 1 hr., following the above referred water quenching ||||||||
| 67.39 | 18.36 | 14.25 | 10.03×10$^5$ | −6.38×10$^{-5}$ | 4.47×10$^5$ | −7.90×10$^{-5}$ | 188 |
| Tempered by cooling at 100° C./hr. after heating at 800° C. for 1 hr., following the above referred water quenching ||||||||
| 67.39 | 18.36 | 14.25 | 10.82×10$^5$ | −7.29×10$^{-5}$ | 4.73×10$^5$ | −8.35×10$^{-5}$ | 272 |

TABLE 21F
[Physical properties of Mn-Cu-Ta alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Ta (percent) | | | | | |
| *As water quenched after heating at 950° C. for 1 hour, following the annealing of Table 20* | | | | | | | |
| 64.04 | 19.64 | 16.32 | $11.25 \times 10^5$ | $-4.33 \times 10^{-5}$ | $4.86 \times 10^5$ | $-6.34 \times 10^{-5}$ | 160 |
| *Tempered by cooling at 100° C./hr. after heating at 200° C. for 1 hr., following the above referred water quenching* | | | | | | | |
| 64.04 | 19.64 | 16.32 | $11.29 \times 10^5$ | $-4.16 \times 10^{-5}$ | $4.87 \times 10^5$ | $-5.19 \times 10^{-5}$ | 179 |
| *Tempered by cooling at 100° C./hr. after heating at 400° C. for 1 hr., following the above referred water quenching* | | | | | | | |
| 64.04 | 19.64 | 16.32 | $12.36 \times 10^5$ | $-5.00 \times 10^{-5}$ | $5.20 \times 10^5$ | $-4.96 \times 10^{-5}$ | 195 |
| *Tempered by cooling at 100° C./hr. after heating at 600° C. for 1 hr., following the above referred water quenching* | | | | | | | |
| 64.04 | 19.64 | 16.32 | $12.38 \times 10^5$ | $-4.81 \times 10^{-5}$ | $5.21 \times 10^5$ | $-5.11 \times 10^{-5}$ | 245 |
| *Tempered by cooling at 100° C./hr. after heating at 800° C. for 1 hr., following the above referred water quenching* | | | | | | | |
| 64.04 | 19.64 | 16.32 | $13.00 \times 10^5$ | $-6.65 \times 10^{-5}$ | $5.41 \times 10^5$ | $-7.25 \times 10^{-5}$ | 305 |

TABLE 21G
[Physical properties of Mn-Cu-Zr alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Zr (percent) | | | | | |
| *As water quenched after heating at 950° C. for 1 hour, following the annealing of Table 20* | | | | | | | |
| 62.29 | 25.16 | 12.55 | $12.23 \times 10^5$ | $-6.60 \times 10^{-5}$ | $5.17 \times 10^5$ | $-7.13 \times 10^{-5}$ | 140 |
| *Tempered by cooling at 100° C./hr. after heating at 200° C. for 1 hr., following the above referred water quenching* | | | | | | | |
| 62.29 | 25.16 | 12.55 | $12.86 \times 10^5$ | $-6.25 \times 10^{-5}$ | $5.36 \times 10^5$ | $-5.55 \times 10^{-5}$ | 165 |
| *Tempered by cooling at 100° C./hr. after heating at 400° C. for 1 hr., following the above referred water quenching* | | | | | | | |
| 62.29 | 25.16 | 12.55 | $12.95 \times 10^5$ | $-4.45 \times 10^{-5}$ | $5.39 \times 10^5$ | $-3.44 \times 10^{-5}$ | 188 |
| *Tempered by cooling at 100° C./hr. after heating at 600° C. for 1 hr., following the above referred water quenching* | | | | | | | |
| 62.29 | 25.16 | 12.55 | $13.09 \times 10^5$ | $-5.32 \times 10^{-5}$ | $5.43 \times 10^5$ | $-4.18 \times 10^{-5}$ | 262 |
| *Tempered by cooling at 100° C./hr. after heating at 800° C. for 1 hr., following the above referred water quenching* | | | | | | | |
| 62.29 | 25.16 | 12.55 | $13.68 \times 10^5$ | $-6.22 \times 10^{-5}$ | $5.62 \times 10^5$ | $-7.65 \times 10^{-5}$ | 305 |

TABLE 21H
[Physical properties of Mn-Cu-Pd alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Pd (percent) | | | | | |
| *As water quenched after heating at 950° C. for 1 hour, following the annealing of Table 20* | | | | | | | |
| 64.04 | 23.25 | 12.71 | $11.65 \times 10^5$ | $+4.16 \times 10^{-5}$ | $4.98 \times 10^5$ | $+3.23 \times 10^{-5}$ | 180 |
| *Tempered by cooling at 100° C./hr. after heating at 200° C. for 1 hr., following the above referred water quenching* | | | | | | | |
| 64.04 | 23.25 | 12.71 | $11.70 \times 10^5$ | $+6.28 \times 10^{-5}$ | $4.99 \times 10^5$ | $+4.16 \times 10^{-5}$ | 192 |
| *Tempered by cooling at 100° C./hr. after heating at 400° C. for 1 hr., following the above referred water quenching* | | | | | | | |
| 64.04 | 23.25 | 12.71 | $12.38 \times 10^5$ | $+8.28 \times 10^{-5}$ | $5.21 \times 10^5$ | $+7.33 \times 10^{-5}$ | 206 |
| *Tempered by cooling at 100° C./hr. after heating at 600° C. for 1 hr., following the above referred water quenching* | | | | | | | |
| 64.04 | 23.25 | 12.71 | $12.45 \times 10^5$ | $+5.65 \times 10^{-5}$ | $5.23 \times 10^5$ | $+4.46 \times 10^{-5}$ | 255 |
| *Tempered by cooling at 100° C./hr. after heating at 800° C. for 1 hr., following the above referred water quenching* | | | | | | | |
| 64.04 | 23.25 | 12.71 | $13.69 \times 10^5$ | $-6.26 \times 10^{-5}$ | $5.62 \times 10^5$ | $-10.33 \times 10^{-5}$ | 310 |

TABLE 21I

[Physical properties of Mn-Cu-Cd alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Cd (percent) | | | | | |
| As water quenched after heating at 950° C. for 1 hour, following the annealing of Table 20 | | | | | | | |
| 61.73 | 21.66 | 16.61 | $10.15 \times 10^5$ | $-10.33 \times 10^{-5}$ | $4.52 \times 10^5$ | $-11.25 \times 10^{-5}$ | 166 |
| Tempered by cooling at 100° C./hr. after heating at 200° C. for 1 hr., following the above referred water quenching | | | | | | | |
| 61.73 | 21.66 | 16.61 | $10.33 \times 10^5$ | $-11.25 \times 10^{-5}$ | $4.57 \times 10^5$ | $-12.30 \times 10^{-5}$ | 182 |
| Tempered by cooling at 100° C./hr. after heating at 400° C. for 1 hr., following the above referred water quenching | | | | | | | |
| 61.73 | 21.66 | 16.61 | $11.05 \times 10^5$ | $-10.02 \times 10^{-5}$ | $4.79 \times 10^5$ | $-11.03 \times 10^{-5}$ | 190 |
| Tempered by cooling at 100° C./hr. after heating at 600° C. for 1 hr., following the above referred water quenching | | | | | | | |
| 61.73 | 21.66 | 16.61 | $11.48 \times 10^5$ | $-12.39 \times 10^{-5}$ | $4.93 \times 10^5$ | $-13.85 \times 10^{-5}$ | 245 |
| Tempered by cooling at 100° C./hr. after heating at 800° C. for 1 hr., following the above referred water quenching | | | | | | | |
| 61.73 | 21.66 | 16.61 | $12.90 \times 10^5$ | $-14.63 \times 10^{-5}$ | $5.38 \times 10^5$ | $-15.22 \times 10^{-5}$ | 298 |

TABLE 21J

[Physical properties of Mn-Cu-Ge alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Ge (percent) | | | | | |
| As water quenched after heating at 950° C. for 1 hour, following the annealing of Table 20 | | | | | | | |
| 61.56 | 30.19 | 8.25 | $13.66 \times 10^5$ | $-11.22 \times 10^{-5}$ | $5.61 \times 10^5$ | $-12.26 \times 10^{-5}$ | 162 |
| Tempered by cooling at 100° C./hr. after heating at 200° C. for 1 hr., following the above referred water quenching | | | | | | | |
| 61.56 | 30.19 | 8.25 | $14.01 \times 10^5$ | $-10.23 \times 10^{-5}$ | $5.72 \times 10^5$ | $-11.42 \times 10^{-5}$ | 170 |
| Tempered by cooling at 100° C./hr. after heating at 400° C. for 1 hr., following the above referred water quenching | | | | | | | |
| 61.56 | 30.19 | 8.25 | $14.55 \times 10^5$ | $-8.66 \times 10^{-5}$ | $5.89 \times 10^5$ | $-8.91 \times 10^{-5}$ | 195 |
| Tempered by cooling at 100° C./hr. after heating at 600° C. for 1 hr., following the above referred water quenching | | | | | | | |
| 61.56 | 30.19 | 8.25 | $14.62 \times 10^5$ | $-10.45 \times 10^{-5}$ | $5.91 \times 10^5$ | $-11.31 \times 10^{-5}$ | 233 |
| Tempered by cooling at 100° C./hr. after heating at 800° C. for 1 hr., following the above referred water quenching | | | | | | | |
| 61.56 | 30.19 | 8.25 | $15.85 \times 10^5$ | $-12.38 \times 10^{-5}$ | $6.29 \times 10^5$ | $-13.74 \times 10^{-5}$ | 322 |

TABLE 21K

[Physical properties of Mn-Cu-Se alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Se (percent) | | | | | |
| As water quenched after heating at 950° C. for 1 hr., following the annealing of Table 20 | | | | | | | |
| 63.42 | 31.25 | 5.33 | $12.83 \times 10^5$ | $-10.25 \times 10^{-5}$ | $5.35 \times 10^5$ | $-11.00 \times 10^{-5}$ | 150 |
| Tempered by cooling at 100° C./hr. after heating at 200°C. for 1 hr., following the above referred water quenching | | | | | | | |
| 63.42 | 31.25 | 5.33 | $12.89 \times 10^5$ | $-11.36 \times 10^{-5}$ | $5.37 \times 10^5$ | $-12.28 \times 10^{-5}$ | 158 |
| Tempered by cooling at 100°C./hr. after heating at 400° C. for 1 hr., following the above referred water quenching | | | | | | | |
| 63.42 | 31.25 | 5.33 | $13.00 \times 10^5$ | $-12.45 \times 10^{-5}$ | $5.41 \times 10^5$ | $-13.45 \times 10^{-5}$ | 169 |
| Tempered by cooling at 100° C./hr. after heating at 600° C. for 1 hr., following the above referred water quenching | | | | | | | |
| 63.42 | 31.25 | 5.33 | $13.42 \times 10^5$ | $-10.33 \times 10^{-5}$ | $5.53 \times 10^5$ | $-14.22 \times 10^{-5}$ | 220 |
| Tempered by cooling at 100° C./hr. after heating at 800° C. for 1 hr., following the above referred water quenching | | | | | | | |
| 63.42 | 31.25 | 5.33 | $14.04 \times 10^5$ | $-15.25 \times 10^{-5}$ | $5.73 \times 10^5$ | $-15.36 \times 10^{-5}$ | 316 |

TABLE 21L
[Physical properties of Mn-Cu-Bi alloys]

| Alloy composition | | | Young's modulus (kg./cm.$^2$, 20° C.) | Temperature coefficient of Young's modulus $e$ (0–40° C.) | Modulus of rigidity (kg./cm.$^2$, 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Bi (percent) | | | | | |
| As water quenched after heating at 950° C. for 1 hr., following the annealing of Table 20 ||||||||
| 39.53 | 55.10 | 5.37 | 11.66×10$^5$ | −6.25×10$^{-5}$ | 4.88×10$^5$ | −7.39×10$^{-5}$ | 142 |
| Tempered by cooling at 100° C./hr. after heating at 200° C. for 1 hr., following the above referred water quenching ||||||||
| 39.53 | 55.10 | 5.37 | 11.75×10$^5$ | −6.20×10$^{-5}$ | 5.01×10$^5$ | −7.80×10$^{-5}$ | 168 |
| Tempered by cooling at 100° C./hr. after heating at 400° C. for 1 hr., following the above referred water quenching ||||||||
| 39.53 | 55.10 | 5.37 | 11.83×10$^5$ | −5.59×10$^{-5}$ | 5.04×10$^5$ | −6.66×10$^{-5}$ | 195 |
| Tempered by cooling at 100°C./hr. after heating at 600° C. for 1 hr., following the above referred water quenching ||||||||
| 39.53 | 55.10 | 5.37 | 11.96×10$^5$ | −6.48×10$^{-5}$ | 5.07×10$^5$ | −7.95×10$^{-5}$ | 218 |
| Tempered by cooling at 100° C./hr. after heating at 800° C. for 1 hr., following the above referred water quenching ||||||||
| 39.53 | 55.10 | 5.37 | 12.77×10$^5$ | −8.82×10$^{-5}$ | 5.33×10$^5$ | −9.96×10$^{-5}$ | 300 |

TABLE 21M
[Physical properties of Mn-Cu-Sm alloys]

| Alloy composition | | | Young's modulus (kg./cm.$^2$, 20° C.) | Temperature coefficient of Young's modulus $e$ (0–40° C.) | Modulus of rigidity (kg./cm.$^2$, 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Sm (percent) | | | | | |
| As water quenched after heating at 950° C. for 1 hour, following the annealing of Table 20 ||||||||
| 42.57 | 50.75 | 6.68 | 12.24×10$^5$ | −10.00×10$^{-5}$ | 5.17×10$^5$ | −11.62×10$^{-5}$ | 162 |
| Tempered by cooling at 100° C./hr. after heating at 200° C. for 1 hr., following the above referred water quenching ||||||||
| 42.57 | 50.75 | 6.68 | 12.66×10$^5$ | −9.25×10$^{-5}$ | 5.30×10$^5$ | −10.33×10$^{-5}$ | 201 |
| Tempered by cooling at 100° C./hr. after heating at 400° C. for 1 hr., following the above referred water quenching ||||||||
| 42.57 | 50.75 | 6.28 | 13.01×10$^5$ | −9.00×10$^{-5}$ | 5.41×10$^5$ | −10.61×10$^{-5}$ | 225 |
| Tempered by cooling at 100° C./hr. after heating at 600° C. for 1 hr., following the above referred water quenching ||||||||
| 42.57 | 50.75 | 6.68 | 13.83×10$^5$ | −10.63×10$^{-5}$ | 5.67×10$^5$ | −11.23×10$^{-5}$ | 310 |
| Tempered by cooling at 100° C./hr. after heating at 800° C. for 1 hr., following the above referred water quenching ||||||||
| 42.57 | 50.75 | 6.68 | 14.29×10$^5$ | −12.28×10$^{-5}$ | 5.81×10$^5$ | −13.47×10$^{-5}$ | 350 |

TABLE 21N
[Physical properties of Mn-Cu-Nb alloys]

| Alloy composition | | | Young's modulus (kg./cm.$^2$, 20° C.) | Temperature coefficient of Young's modulus $e$ (0–40° C.) | Modulus of rigidity (kg./cm.$^2$, 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Nb (percent) | | | | | |
| As water quenched after heating at 950° C. for 1 hour, following the annealing of Table 20 ||||||||
| 64.00 | 23.74 | 12.26 | 13.30×10$^5$ | −8.87×10$^{-5}$ | 5.50×10$^5$ | −9.73×10$^{-5}$ | 180 |
| Tempered by cooling at 100° C./hr. after heating at 200° C. for 1 hr., following the above referred water quenching ||||||||
| 64.00 | 23.74 | 12.26 | 13.42×10$^5$ | −8.00×10$^{-5}$ | 5.53×10$^5$ | −9.35×10$^{-5}$ | 225 |
| Tempered by cooling at 100° C./hr. after heating at 400° C. for 1 hr., following the above referred water quenching ||||||||
| 64.00 | 23.74 | 12.26 | 13.55×10$^5$ | −7.76×10$^{-5}$ | 5.58×10$^5$ | −8.41×10$^{-5}$ | 295 |
| Tempered by cooling at 100° C./hr. after heating at 600° C. for 1 hr., following the above referred water quenching ||||||||
| 64.00 | 23.74 | 12.26 | 13.87×10$^5$ | −8.93×10$^{-5}$ | 5.68×10$^5$ | −9.60×10$^{-5}$ | 320 |
| Tempered by cooling at 100° C./hr. after heating at 800° C. for 1 hr., following the above referred water quenching ||||||||
| 64.00 | 23.74 | 12.26 | 14.13×10$^5$ | −11.29×10$^{-5}$ | 5.76×10$^5$ | −12.30×10$^{-5}$ | 400 |

TABLE 21O
[Physical properties of Mn-Cu-Sb alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Sb (percent) | | | | | |
| As water quenched after heating at 950° C. for 1 hour, following the annealing of Table 20 | | | | | | | |
| 41.50 | 52.25 | 6.25 | 13.21×10⁵ | −9.93×10⁻⁵ | 5.48×10⁵ | −10.32×10⁻⁵ | 190 |
| Tempered by cooling at 100° C./hr. after heating at 200° C. for 1 hr., following the above referred water quenching | | | | | | | |
| 41.50 | 52.25 | 6.25 | 13.36×10⁵ | −8.77×10⁻⁵ | 5.53×10⁵ | −9.63×10⁻⁵ | 221 |
| Tempered by cooling at 100° C./hr. after heating at 400° C. for 1 hr., following the above referred water quenching | | | | | | | |
| 41.50 | 52.25 | 6.25 | 13.47×10⁵ | −8.00×10⁻⁵ | 5.55×10⁵ | −9.00×10⁻⁵ | 238 |
| Tempered by cooling at 100° C./hr. after heating at 600° C. for 1 hr., following the above referred water quenching | | | | | | | |
| 41.50 | 52.25 | 6.25 | 14.40×10⁵ | −8.78×10⁻⁵ | 5.84×10⁵ | −9.65×10⁻⁵ | 395 |
| Tempered by cooling at 100° C./hr. after heating at 800° C. for 1 hr., following the above referred water quenching | | | | | | | |
| 41.50 | 52.25 | 6.25 | 15.81×10⁵ | −10.61×10⁻⁵ | 6.29×10⁵ | −11.37×10⁻⁵ | 425 |

TABLE 21P
[Physical properties of Mn-Cu-Al alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Al (percent) | | | | | |
| As water quenched after heating at 950° C. for 1 hour, following the annealing of Table 20 | | | | | | | |
| 61.95 | 28.50 | 9.55 | 12.36×10⁵ | −9.35×10⁻⁵ | 5.21×10⁵ | −10.07×10⁻⁵ | 142 |
| Tempered by cooling at 100° C./hr. after heating at 200° C. for 1 hr., following the above referred water quenching | | | | | | | |
| 61.95 | 28.50 | 9.55 | 12.45×10⁵ | −9.00×10⁻⁵ | 5.23×10⁵ | −11.04×10⁻⁵ | 160 |
| Tempered by cooling at 100° C./hr. after heating at 400° C. for 1 hr., following the above referred water quenching | | | | | | | |
| 61.95 | 28.50 | 9.55 | 13.20×10⁵ | −8.22×10⁻⁵ | 5.47×10⁵ | −10.25×10⁻⁵ | 185 |
| Tempered by cooling at 100° C./hr. after heating at 600° C. for 1 hr., following the above referred water quenching | | | | | | | |
| 61.95 | 28.50 | 9.55 | 13.38×10⁵ | −8.84×10⁻⁵ | 5.53×10⁵ | −11.36×10⁻⁵ | 249 |
| Tempered by cooling at 100° C./hr. after heating at 800° C. for 1 hr., following the above referred water quenching | | | | | | | |
| 61.95 | 28.50 | 9.55 | 14.07×10⁵ | −9.60×10⁻⁵ | 5.73×10⁵ | −12.45×10⁻⁵ | 335 |

TABLE 21Q
[Physical properties of Mn-Cu-Si alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Si (percent) | | | | | |
| As water quenched after heating at 950° C. for 1 hour, following the annealing of Table 20 | | | | | | | |
| 44.05 | 50.25 | 5.70 | 13.66×10⁵ | −7.36×10⁻⁵ | 5.62×10⁵ | −8.22×10⁻⁵ | 168 |
| Tempered by cooling at 100° C./hr. after heating at 200° C. for 1 hr., following the above referred water quenching | | | | | | | |
| 44.05 | 50.25 | 5.70 | 13.74×10⁵ | −7.25×10⁻⁵ | 5.64×10⁵ | −7.63×10⁻⁵ | 192 |
| Tempered by cooling at 100° C./hr. after heating at 400° C. for 1 hr., following the above referred water quenching | | | | | | | |
| 44.05 | 50.25 | 5.70 | 13.83×10⁵ | −7.00×10⁻⁵ | 5.67×10⁵ | −7.55×10⁻⁵ | 229 |
| Tempered by cooling at 100° C./hr. after heating at 600° C. for 1 hr., following the above referred water quenching | | | | | | | |
| 44.05 | 50.25 | 5.70 | 14.00×10⁵ | −8.02×10⁻⁵ | 5.72×10⁵ | −8.56×10⁻⁵ | 316 |
| Tempered by cooling at 100° C./hr. after heating at 800° C. for 1 hr., following the above referred water quenching | | | | | | | |
| 44.05 | 50.25 | 5.70 | 14.71×10⁵ | −9.35×10⁻⁵ | 5.94×10⁵ | −10.04×10⁻⁵ | 350 |

TABLE 21R
[Physical properties of Mn-Cu-Sn alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Sn (percent) | | | | | |
| As water quenched after heating at 950° C. for 1 hour, following the annealing of Table 20 ||||||||
| 42.33 | 52.21 | 5.46 | $13.75 \times 10^5$ | $-10.36 \times 10^{-5}$ | $5.65 \times 10^5$ | $-11.00 \times 10^{-5}$ | 171 |
| Tempered by cooling at 100° C./hr. after heating at 200° C. for 1 hr., following the above referred water quenching ||||||||
| 42.33 | 52.21 | 5.46 | $13.80 \times 10^5$ | $-10.00 \times 10^{-5}$ | $5.66 \times 10^5$ | $-10.68 \times 10^{-5}$ | 188 |
| Tempered by cooling at 100° C./hr. after heating at 400° C. for 1 hr., following the above referred water quenching ||||||||
| 42.33 | 52.21 | 5.46 | $13.96 \times 10^5$ | $-9.36 \times 10^{-5}$ | $5.70 \times 10^5$ | $-10.55 \times 10^{-5}$ | 192 |
| Tempered by cooling at 100° C./hr. after heating at 600° C. for 1 hr., following the above referred water quenching ||||||||
| 42.33 | 52.21 | 5.46 | $14.03 \times 10^5$ | $-11.25 \times 10^{-5}$ | $5.73 \times 10^5$ | $-12.04 \times 10^{-5}$ | 205 |
| Tempered by cooling at 100° C./hr. after heating at 800° C. for 1 hr., following the above referred water quenching ||||||||
| 42.33 | 52.21 | 5.46 | $14.45 \times 10^5$ | $-13.61 \times 10^{-5}$ | $5.86 \times 10^5$ | $-14.32 \times 10^{-5}$ | 312 |

TABLE 21S
[Physical properties of Mn-Cu-Te alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Te (percent) | | | | | |
| As water quenched after heating at 950° C. for 1 hour, following the annealing of Table 20 ||||||||
| 44.09 | 48.66 | 7.25 | $13.42 \times 10^5$ | $-7.36 \times 10^{-5}$ | $5.53 \times 10^5$ | $-8.66 \times 10^{-5}$ | 165 |
| Tempered by cooling at 100° C./hr. after heating at 200° C. for 1 hr., following the above referred water quenching ||||||||
| 44.09 | 48.66 | 7.25 | $13.49 \times 10^5$ | $-7.21 \times 10^{-5}$ | $5.55 \times 10^5$ | $-8.45 \times 10^{-5}$ | 180 |
| Tempered by cooling at 100° C./hr. after heating at 400° C. for 1 hr., following the above referred water quenching ||||||||
| 44.09 | 48.66 | 7.25 | $13.68 \times 10^5$ | $-6.88 \times 10^{-5}$ | $5.63 \times 10^5$ | $-7.29 \times 10^{-5}$ | 205 |
| Tempered by cooling at 100° C./hr. after heating at 600° C. for 1 hr., following the above referred water quenching ||||||||
| 44.09 | 48.66 | 7.25 | $13.87 \times 10^5$ | $-7.04 \times 10^{-5}$ | $5.68 \times 10^5$ | $-8.38 \times 10^{-5}$ | 310 |
| Tempered by cooling at 100° C./hr. after heating at 800° C. for 1 hr., following the above referred water quenching ||||||||
| 44.09 | 48.66 | 7.25 | $14.05 \times 10^5$ | $-9.65 \times 10^{-5}$ | $5.73 \times 10^5$ | $-10.25 \times 10^{-5}$ | 350 |

TABLE 21T
[Physical properties of Mn-Cu-Gd alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Gd (percent) | | | | | |
| As water quenched after heating at 950° C. for 1 hour, following the annealing of Table 20 ||||||||
| 35.10 | 54.65 | 10.25 | $13.27 \times 10^5$ | $-8.33 \times 10^{-5}$ | $5.49 \times 10^5$ | $-9.47 \times 10^{-5}$ | 180 |
| Tempered by cooling at 100° C./hr. after heating at 200° C. for 1 hr., following the above referred water quenching ||||||||
| 35.10 | 54.65 | 10.25 | $13.36 \times 10^5$ | $-8.00 \times 10^{-5}$ | $5.52 \times 10^5$ | $-8.86 \times 10^{-5}$ | 225 |
| Tempered by cooling at 100° C./hr. after heating at 400° C. for 1 hr., following the above referred water quenching ||||||||
| 35.10 | 54.65 | 10.25 | $13.85 \times 10^5$ | $-7.25 \times 10^{-5}$ | $5.67 \times 10^5$ | $-7.39 \times 10^{-5}$ | 296 |
| Tempered by cooling at 100° C./hr. after heating at 600° C. for 1 hr., following the above referred water quenching ||||||||
| 35.10 | 54.65 | 10.25 | $14.05 \times 10^5$ | $-8.04 \times 10^{-5}$ | $5.73 \times 10^5$ | $-9.00 \times 10^{-5}$ | 309 |
| Tempered by cooling at 100° C./hr. after heating at 800° C. for 1 hr., following the above referred water quenching ||||||||
| 35.10 | 54.65 | 10.25 | $14.68 \times 10^5$ | $-9.65 \times 10^{-5}$ | $5.93 \times 10^5$ | $-10.07 \times 10^{-5}$ | 365 |

TABLE 21U

[Physical properties of Mn-Cu-Zn alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Zn (percent) | | | | | |
| As water quenched after heating at 950° C. for 1 hour, following the annealing of Table 20 | | | | | | | |
| 39.17 | 55.36 | 5.47 | 12.86×10⁵ | −10.16×10⁻⁵ | 5.36×10⁵ | −11.31×10⁻⁵ | 190 |
| Tempered by cooling at 100° C./hr. after heating at 200° C. for 1 hr., following the above referred water quenching | | | | | | | |
| 39.17 | 55.36 | 5.47 | 12.90×10⁵ | −10.00×10⁻⁵ | 5.37×10⁵ | −11.06×10⁻⁵ | 220 |
| Tempered by cooling at 100° C./hr. after heating at 400° C. for 1 hr., following the above referred water quenching | | | | | | | |
| 39.17 | 55.36 | 5.47 | 13.00×10⁵ | −9.75×10⁻⁵ | 5.41×10⁵ | −10.25×10⁻⁵ | 265 |
| Tempered by cooling at 100° C./hr. after heating at 600° C. for 1 hr., following the above referred water quenching | | | | | | | |
| 39.17 | 55.36 | 5.47 | 13.85×10⁵ | −11.48×10⁻⁵ | 5.69×10⁵ | −12.03×10⁻⁵ | 316 |
| Tempered by cooling at 100° C./hr. after heating at 800° C. for 1 hr., following the above referred water quenching | | | | | | | |
| 39.17 | 55.36 | 5.47 | 14.04×10⁵ | −12.20×10⁻⁵ | 5.73×10⁵ | −13.85×10⁻⁵ | 395 |

TABLE 21V

[Physical properties of Mn-Cu-Be alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Be (percent) | | | | | |
| As water quenched after heating at 950° C. for 1 hour, following the annealing of Table 20 | | | | | | | |
| 39.49 | 55.66 | 4.85 | 14.25×10⁵ | −11.25×10⁻⁵ | 5.80×10⁵ | −12.36×10⁻⁵ | 195 |
| Tempered by cooling at 100° C./hr. after heating at 200° C. for 1 hr., following the above referred water quenching | | | | | | | |
| 39.49 | 55.66 | 4.85 | 14.87×10⁵ | −10.25×10⁻⁵ | 5.98×10⁵ | −11.64×10⁻⁵ | 205 |
| Tempered by cooling at 100° C./hr. after heating at 400° C. for 1 hr., following the above referred water quenching | | | | | | | |
| 39.49 | 55.66 | 4.85 | 15.33×10⁵ | −9.66×10⁻⁵ | 6.13×10⁵ | −10.82×10⁻⁵ | 316 |
| Tempered by cooling at 100° C./hr. after heating at 600° C. for 1 hr., following the above referred water quenching | | | | | | | |
| 39.49 | 55.66 | 4.85 | 15.72×10⁵ | −10.45×10⁻⁵ | 6.25×10⁵ | −11.29×10⁻⁵ | 390 |
| Tempered by cooling at 100° C./hr. after heating at 800° C. for 1 hr., following the above referred water quenching | | | | | | | |
| 39.49 | 55.66 | 4.85 | 16.44×10⁵ | −12.38×10⁻⁵ | 6.47×10⁵ | −13.49×10⁻⁵ | 505 |

TABLE 21W

[Physical properties of Mn-Cu-Be alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Be (percent) | | | | | |
| As water quenched after heating at 950° C. for 1 hour, following the annealing of Table 20 | | | | | | | |
| 42.07 | 57.21 | 0.72 | 14.46×10⁵ | −12.13×10⁻⁵ | 5.86×10⁵ | −13.05×10⁻⁵ | 210 |
| Tempered by cooling at 100° C./hr. after heating at 200° C. for 1 hr., following the above referred water quenching | | | | | | | |
| 42.07 | 57.21 | 0.72 | 14.58×10⁵ | −12.00×10⁻⁵ | 5.89×10⁵ | −13.04×10⁻⁵ | 295 |
| Tempered by cooling at 100° C./hr. after heating at 400° C. for 1 hr., following the above referred water quenching | | | | | | | |
| 42.07 | 57.21 | 0.72 | 14.63×10⁵ | −11.42×10⁻⁵ | 5.91×10⁵ | −12.56×10⁻⁵ | 380 |
| Tempered by cooling at 100° C./hr. after heating at 600° C. for 1 hr., following the above referred water quenching | | | | | | | |
| 42.07 | 57.21 | 0.72 | 15.27×10⁵ | −11.86×10⁻⁵ | 6.10×10⁵ | −12.00×10⁻⁵ | 425 |
| Tempered by cooling at 100° C./hr. after heating at 800° C. for 1 hr., following the above referred water quenching | | | | | | | |
| 42.07 | 57.21 | 0.72 | 17.45×10⁵ | −13.44×10⁻⁵ | 6.79×10⁵ | −14.13×10⁻⁵ | 665 |

TABLE 22A

[Physical properties of Mn-Cu-In alloys]

| Alloy composition | | | Young's modulus (kg./cm.², 20° C.) | Temperature coefficient of Young's modulus e (0–40° C.) | Modulus of rigidity (kg./cm.², 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | In (percent) | | | | | |
| As cold-worked with a working rate of 96%, after annealing of Table 20 | | | | | | | |
| 58.80 | 15.10 | 26.10 | 13.95×10⁵ | +1.50×10⁻⁵ | 5.69×10⁵ | −0.61×10⁻⁵ | 121 |
| Tempered by cooling at 100° C./hr. after heating at 200° C. for 1 hr., following the above referred cold-work | | | | | | | |
| 58.80 | 15.10 | 26.10 | 14.25×10⁵ | +18.55×10⁻⁵ | 5.80×10⁵ | +16.65×10⁻⁵ | 124 |
| Tempered by cooling at 100° C./hr. after heating at 400° C. for 1 hr., following the above referred cold-work | | | | | | | |
| 58.80 | 15.10 | 26.10 | 14.50×10⁵ | −10.60×10⁻⁵ | 5.87×10⁵ | −12.60×10⁻⁵ | 126 |
| Tempered by cooling at 100° C./hr. after heating at 600° C. for 1 hr., following the above referred cold-work | | | | | | | |
| 58.80 | 15.10 | 26.10 | 14.15×10⁵ | −17.60×10⁻⁵ | 5.77×10⁵ | −19.61×10⁻⁵ | 123 |
| Tempered by cooling at 100° C./hr. after heating at 800° C. for 1 hr., following the above referred cold-work | | | | | | | |
| 58.80 | 15.10 | 26.10 | 14.03×10⁵ | −19.50×10⁻⁵ | 5.73×10⁵ | −19.99×10⁻⁵ | 122 |

TABLE 22B

[Physical properties of Mn-Cu-Ti alloys]

| Alloy composition | | | Young's modulus (kg./cm.², 20° C.) | Temperature coefficient of Young's modulus e (0–40° C.) | Modulus of rigidity (kg./cm.², 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | Ti (percent) | | | | | |
| As cold-worked with a working rate of 96%, after annealing of Table 20 | | | | | | | |
| 58.60 | 15.20 | 26.20 | 15.50×10⁵ | +0.50×10⁻⁵ | 6.19×10⁵ | −1.62×10⁻⁵ | 225 |
| Tempered by cooling at 100° C./hr. after heating at 200° C. for 1 hr., following the above referred cold-work | | | | | | | |
| 58.60 | 15.20 | 26.20 | 16.10×10⁵ | +18.70×10⁻⁵ | 6.40×10⁵ | +16.80×10⁻⁵ | 236 |
| Tempered by cooling at 100° C./hr. after heating at 400° C. for 1 hr., following the above referred cold-work | | | | | | | |
| 58.60 | 15.20 | 26.20 | 16.20×10⁵ | −7.80×10⁻⁵ | 6.41×10⁵ | −9.90×10⁻⁵ | 237 |
| Tempered by cooling at 100° C./hr. after heating at 600° C. for 1 hr., following the above referred cold-work | | | | | | | |
| 58.60 | 15.20 | 26.20 | 16.00×10⁵ | −10.50×10⁻⁵ | 6.33×10⁵ | −12.45×10⁻⁵ | 215 |
| Tempered by cooling at 100° C./hr. after heating at 800° C. for 1 hr., following the above referred cold-work | | | | | | | |
| 58.60 | 15.20 | 26.20 | 15.70×10⁵ | −17.70×10⁻⁵ | 6.25×10⁵ | −19.73×10⁻⁵ | 210 |

TABLE 22C

[Physical properties of Mn-Cu-V alloys]

| Alloy composition | | | Young's modulus (kg./cm.², 20° C.) | Temperature coefficient of Young's modulus e (0–40° C.) | Modulus of rigidity (kg./cm.², 20° C.) | Temperature coefficient of modulus of rigidity (0–40° C.) | Vickers hardness (20° C.) |
| --- | --- | --- | --- | --- | --- | --- | --- |
| Mn (percent) | Cu (percent) | V (percent) | | | | | |
| As cold-worked with a working rate of 96%, after annealing of Table 20 | | | | | | | |
| 54.80 | 20.20 | 25.00 | 14.40×10⁵ | −1.50×10⁻⁵ | 5.84×10⁵ | −3.61×10⁻⁵ | 205 |
| Tempered by cooling at 100° C./hr. after heating at 200° C. for 1 hr., following the above referred cold-work | | | | | | | |
| 54.80 | 20.20 | 25.00 | 15.50×10⁵ | +15.30×10⁻⁵ | 6.18×10⁵ | +13.20×10⁻⁵ | 210 |
| Tempered by cooling at 100° C./hr. after heating at 400° C. for 1 hr., following the above referred cold-work | | | | | | | |
| 54.80 | 20.20 | 25.00 | 17.60×10⁵ | −10.50×10⁻⁵ | 6.83×10⁵ | −12.51×10⁻⁵ | 270 |
| Tempered by cooling at 100° C./hr. after heating at 600° C. for 1 hr., following the above referred cold-work | | | | | | | |
| 54.80 | 20.20 | 25.00 | 16.90×10⁵ | −13.70×10⁻⁵ | 6.61×10⁵ | −15.81×10⁻⁵ | 265 |
| Tempered by cooling at 100° C./hr. after heating at 800° C. for 1 hr., following the above referred cold-work | | | | | | | |
| 54.80 | 20.20 | 25.00 | 16.45×10⁵ | −17.60×10⁻⁵ | 6.48×10⁵ | −19.63×10⁻⁵ | 260 |

TABLE 22D
[Physical properties of Mn-Cu-Au alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Au (percent) | | | | | |
| As cold-worked with a working rate of 96%, after annealing of Table 20 | | | | | | | |
| 64.60 | 20.30 | 15.10 | 11.80×10⁵ | −4.50×10⁻⁵ | 5.03×10⁵ | −6.60×10⁻⁵ | 118 |
| Tempered by cooling at 100° C./hr. after heating at 200° C. for 1 hr., following the above referred cold-work | | | | | | | |
| 64.60 | 20.30 | 15.10 | 11.90×10⁵ | −3.50×10⁻⁵ | 5.06×10⁵ | −5.55×10⁻⁵ | 119 |
| Tempered by cooling at 100° C./hr. after heating at 400° C. for 1 hr., following the above referred cold-work | | | | | | | |
| 64.60 | 20.30 | 15.10 | 11.95×10⁵ | −3.55×10⁻⁵ | 5.07×10⁵ | −5.65×10⁻⁵ | 190 |
| Tempered by cooling at 100° C./hr. after heating at 600° C. for 1 hr., following the above referred cold-work | | | | | | | |
| 64.60 | 20.30 | 15.10 | 11.90×10⁵ | −8.90×10⁻⁵ | 5.06×10⁵ | −10.92×10⁻⁵ | 120 |
| Tempered by cooling at 100° C./hr. after heating at 800° C. for 1 hr., following the above referred cold-work | | | | | | | |
| 64.60 | 20.30 | 15.10 | 11.85×10⁵ | −12.60×10⁻⁵ | 5.05×10⁵ | −14.80×10⁻⁵ | 117 |

TABLE 22E
[Physical properties of Mn-Cu-Ag alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Ag (percent) | | | | | |
| As cold-worked with a working rate of 96%, after annealing of Table 20 | | | | | | | |
| 64.70 | 20.10 | 15.20 | 12.30×10⁵ | −12.50×10⁻⁵ | 5.19×10⁵ | −14.60×10⁻⁵ | 125 |
| Tempered by cooling at 100° C./hr. after heating at 200° C. for 1 hr., following the above referred cold-work | | | | | | | |
| 64.70 | 20.10 | 15.20 | 12.40×10⁵ | −8.50×10⁻⁵ | 5.22×10⁵ | −10.55×10⁻⁵ | 126 |
| Tempered by cooling at 100° C./hr. after heating at 400° C. for 1 hr., following the above referred cold-work | | | | | | | |
| 64.70 | 20.10 | 15.20 | 12.45×10⁵ | −7.60×10⁻⁵ | 5.23×10⁵ | −9.63×10⁻⁵ | 126 |
| Tempered by cooling at 100° C./hr. after heating at 600° C. for 1 hr., following the above referred cold-work | | | | | | | |
| 64.70 | 20.10 | 15.20 | 12.30×10⁵ | −10.55×10⁻⁵ | 5.19×10⁵ | −12.60×10⁻⁵ | 124 |
| Tempered by cooling at 100° C./hr. after heating at 800° C. for 1 hr., following the above referred cold-work | | | | | | | |
| 64.70 | 20.10 | 15.20 | 12.10×10⁵ | −16.40×10⁻⁵ | 5.12×10⁵ | −18.50×10⁻⁵ | 124 |

TABLE 22F
[Physical properties of Mn-Cu-Ta alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Ta (percent) | | | | | |
| As cold-worked with a working rate of 96%, after annealing of Table 20 | | | | | | | |
| 64.60 | 20.20 | 15.20 | 13.35×10⁵ | −13.50×10⁻⁵ | 5.20×10⁵ | −15.53×10⁻⁵ | 185 |
| Tempered by cooling at 100° C./hr. after heating at 200° C. for 1 hr., following the above referred cold-work | | | | | | | |
| 64.60 | 20.20 | 15.20 | 12.50×10⁵ | −8.30×10⁻⁵ | 5.25×10⁵ | −10.45×10⁻⁵ | 190 |
| Tempered by cooling at 100° C./hr. after heating at 400° C. for 1 hr., following the above referred cold-work | | | | | | | |
| 64.60 | 20.20 | 15.20 | 13.10×10⁵ | −5.35×10⁻⁵ | 5.43×10⁵ | −7.40×10⁻⁵ | 195 |
| Tempered by cooling at 100° C./hr. after heating at 600° C. for 1 hr., following the above referred cold-work | | | | | | | |
| 64.60 | 20.20 | 15.20 | 12.80×10⁵ | −6.50×10⁻⁵ | 5.34×10⁵ | −8.53×10⁻⁵ | 190 |
| Tempered by cooling at 100° C./hr. after heating at 800° C. for 1 hr., following the above referred cold-work | | | | | | | |
| 64.60 | 20.20 | 15.20 | 12.70×10⁵ | −13.20×10⁻⁵ | 5.31×10⁵ | −15.33×10⁻⁵ | 184 |

TABLE 22G
[Physical properties of Mn-Cu-Zr alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Zr (percent) | | | | | |
| As cold-worked with a working rate of 96%, after annealing of Table 20 | | | | | | | |
| 64.50 | 20.30 | 15.20 | $13.35 \times 10^5$ | $-13.60 \times 10^{-5}$ | $5.52 \times 10^5$ | $-15.58 \times 10^{-5}$ | 195 |
| Tempered by cooling at 100° C./hr. after heating at 200° C. for 1 hr., following the above referred cold-work | | | | | | | |
| 64.50 | 20.30 | 15.20 | $13.95 \times 10^5$ | $-12.00 \times 10^{-5}$ | $5.70 \times 10^5$ | $-14.10 \times 10^{-5}$ | 198 |
| Tempered by cooling at 100° C./hr. after heating at 400° C. for 1 hr., following the above referred cold-work | | | | | | | |
| 64.50 | 20.30 | 15.20 | $13.98 \times 10^5$ | $-10.50 \times 10^{-5}$ | $5.71 \times 10^5$ | $-12.65 \times 10^{-5}$ | 203 |
| Tempered by cooling at 100° C./hr. after heating at 600° C. for 1 hr., following the above referred cold-work | | | | | | | |
| 64.50 | 20.30 | 15.20 | $13.80 \times 10^5$ | $-10.45 \times 10^{-5}$ | $5.65 \times 10^5$ | $-12.44 \times 10^{-5}$ | 202 |
| Tempered by cooling at 100° C./hr. after heating at 800° C. for 1 hr., following the above referred cold-work | | | | | | | |
| 64.50 | 20.30 | 15.20 | $13.40 \times 10^5$ | $-12.40 \times 10^{-5}$ | $5.53 \times 10^5$ | $-14.50 \times 10^{-5}$ | 199 |

TABLE 22H
[Physical properties of Mn-Cu-Pd alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Pd (percent) | | | | | |
| As cold-worked with a working rate of 96%, after annealing of Table 20 | | | | | | | |
| 64.50 | 20.30 | 15.20 | $13.95 \times 10^5$ | $-12.80 \times 10^{-5}$ | $5.70 \times 10^5$ | $-14.90 \times 10^{-5}$ | 225 |
| Tempered by cooling at 100° C./hr. after heating at 200° C. for 1 hr., following the above referred cold-work | | | | | | | |
| 64.50 | 20.30 | 15.20 | $14.15 \times 10^5$ | $-12.95 \times 10^{-5}$ | $5.77 \times 10^5$ | $-14.90 \times 10^{-5}$ | 243 |
| Tempered by cooling at 100° C./hr. after heating at 400° C. for 1 hr., following the above referred cold-work | | | | | | | |
| 64.50 | 20.30 | 15.20 | $14.30 \times 10^5$ | $-13.10 \times 10^{-5}$ | $5.81 \times 10^5$ | $-15.15 \times 10^{-5}$ | 245 |
| Tempered by cooling at 100° C./hr. after heating at 600° C. for 1 hr., following the above referred cold-work | | | | | | | |
| 64.50 | 20.30 | 15.20 | $14.35 \times 10^5$ | $-12.90 \times 10^{-5}$ | $5.83 \times 10^5$ | $-14.93 \times 10^{-5}$ | 240 |
| Tempered by cooling at 100° C./hr. after heating at 800° C. for 1 hr., following the above referred cold-work | | | | | | | |
| 64.50 | 20.30 | 15.20 | $14.20 \times 10^5$ | $-12.85 \times 10^{-5}$ | $5.78 \times 10^5$ | $-14.89 \times 10^{-5}$ | 228 |

TABLE 22I
[Physical properties of Mn-Cu-Cd alloys]

| Alloy composition | | | Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Cd (percent) | | | | | |
| As cold-worked with a working rate of 96%, after annealing of Table 20 | | | | | | | |
| 62.40 | 22.50 | 15.10 | $12.30 \times 10^5$ | $-15.30 \times 10^{-5}$ | $5.19 \times 10^5$ | $-17.35 \times 10^{-5}$ | 155 |
| Tempered by cooling at 100° C./hr. after heating at 200° C. for 1 hr., following the above referred cold-work | | | | | | | |
| 62.40 | 22.50 | 15.10 | $12.45 \times 10^5$ | $-12.15 \times 10^{-5}$ | $5.23 \times 10^5$ | $-14.35 \times 10^{-5}$ | 154 |
| Tempered by cooling at 100° C./hr. after heating at 400° C. for 1 hr., following the above referred cold-work | | | | | | | |
| 62.40 | 22.50 | 15.10 | $12.60 \times 10^5$ | $-8.50 \times 10^{-5}$ | $5.28 \times 10^5$ | $-10.65 \times 10^{-5}$ | 153 |
| Tempered by cooling at 100° C./hr. after heating at 600° C. for 1 hr., following the above referred cold-work | | | | | | | |
| 62.40 | 22.50 | 15.10 | $12.60 \times 10^5$ | $-9.15 \times 10^{-5}$ | $5.28 \times 10^5$ | $-11.35 \times 10^{-5}$ | 152 |
| Tempered by cooling at 100° C./hr. after heating at 800° C. for 1 hr., following the above referred cold-work | | | | | | | |
| 62.40 | 22.50 | 15.10 | $12.55 \times 10^5$ | $-12.40 \times 10^{-5}$ | $5.27 \times 10^5$ | $-14.55 \times 10^{-5}$ | 150 |

TABLE 22J
[Physical properties of Mn-Cu-Ge alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Ge (percent) | | | | | |
| As cold-worked with a working rate of 96%, after annealing of Table 20 ||||||||
| 65.30 | 20.20 | 14.50 | 12.25×10⁵ | −15.50×10⁻⁵ | 5.80×10⁵ | −17.51×10⁻⁵ | 189 |
| Tempered by cooling at 100° C./hr. after heating at 200° C. for 1 hr., following the above referred cold-work ||||||||
| 65.30 | 20.20 | 14.50 | 14.55×10⁵ | −10.00×10⁻⁵ | 5.89×10⁵ | −12.10×10⁻⁵ | 195 |
| Tempered by cooling at 100° C./hr. after heating at 400° C. for 1 hr., following the above referred cold-work ||||||||
| 65.30 | 20.20 | 14.50 | 14.70×10⁵ | −8.90×10⁻⁵ | 5.93×10⁵ | −10.91×10⁻⁵ | 200 |
| Tempered by cooling at 100° C./hr. after heating at 600° C. for 1 hr., following the above referred cold-work ||||||||
| 65.30 | 20.20 | 14.50 | 14.75×⁻⁵ | −8.00×10⁻⁵ | 5.95×10⁵ | −10.20×10⁻⁵ | 201 |
| Tempered by cooling at 100° C./hr. after heating at 800° C. for 1 hr., following the above referred cold-work ||||||||
| 65.30 | 20.20 | 14.50 | 14.70×10⁵ | −10.50×10⁻⁵ | 5.93×10⁵ | −12.54×10⁻⁵ | 195 |

TABLE 22K
[Physical properties of Mn-Cu-Se alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Se (percent) | | | | | |
| As cold-worked with a working rate of 96%, after annealing of Table 20 ||||||||
| 60.40 | 24.50 | 15.10 | 11.85×10⁵ | −15.45×10⁻⁵ | 5.05×10⁵ | −17.40×10⁻⁵ | 164 |
| Tempered by cooling at 100° C./hr. after heating at 200° C. for 1 hr., following the above referred cold-work ||||||||
| 60.40 | 24.50 | 15.10 | 12.00×10⁵ | −12.20×10⁻⁵ | 5.09×10⁵ | −14.25×10⁻⁵ | 168 |
| Tempered by cooling at 100° C./hr. after heating at 400° C. for 1 hr., following the above referred cold-work ||||||||
| 60.40 | 24.50 | 15.10 | 12.50×10⁵ | −10.50×10⁻⁵ | 5.23×10⁻⁵ | −12.50×10⁻⁵ | 170 |
| Tempered by cooling at 100° C./hr. after heating at 600° C. for 1 hr., following the above referred cold-work ||||||||
| 60.40 | 24.50 | 15.10 | 12.80×10⁵ | −10.30×10⁻⁵ | 5.34×10⁵ | −12.35×10⁻⁵ | 171 |
| Tempered by cooling at 100° C./hr. after heating at 800° C. for 1 hr., following the above referred cold-work ||||||||
| 60.40 | 24.50 | 15.10 | 12.60×10⁵ | −12.50×10⁻⁵ | 5.28×10⁻⁵ | −14.55×10⁻⁵ | 167 |

TABLE 22L
[Physical properties of Mn-Cu-Bi alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Bi (percent) | | | | | |
| As cold-worked with a working rate of 96%, after annealing of Table 20 ||||||||
| 65.90 | 22.10 | 12.00 | 13.80×10⁵ | −16.40×10⁻⁵ | 5.65×10⁻⁵ | −18.43×10⁻⁵ | 145 |
| Tempered by cooling at 100° C./hr. after heating at 200° C. for 1 hr., following the above referred cold-work ||||||||
| 65.90 | 22.10 | 12.00 | 13.95×10⁵ | −12.35×10⁻⁵ | 5.70×10⁵ | −14.55×10⁻⁵ | 150 |
| Tempered by cooling at 100° C./hr. after heating at 400° C. for 1 hr., following the above referred cold-work ||||||||
| 65.90 | 22.10 | 12.00 | 14.10×10⁵ | −10.45×10⁻⁵ | 5.75×10⁵ | −12.45×10⁻⁵ | 154 |
| Tempered by cooling at 100° C./hr. after heating at 600° C. for 1 hr., following the above referred cold-work ||||||||
| 65.90 | 22.10 | 12.00 | 14.20×10⁵ | −12.55×10⁻⁵ | 5.78×10⁵ | −14.60×10⁻⁵ | 153 |
| Tempered by cooling at 100° C./hr. after heating at 800° C. for 1 hr., following the above referred cold-work ||||||||
| 65.90 | 22.10 | 12.00 | 14.10×10⁵ | 14.75×10⁻⁵ | 5.75×10⁵ | −16.80×10⁻⁵ | 151 |

TABLE 22M
[Physical properties of Mn-Cu-Sm alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
| --- | --- | --- | --- | --- | --- | --- | --- |
| Mn (percent) | Cu (percent) | Sm (percent) | | | | | |
| As cold-worked with a working rate of 96%, after annealing of Table 20 ||||||||
| 64.70 | 22.20 | 15.10 | $11.10 \times 10^5$ | $-15.30 \times 10^{-5}$ | $4.81 \times 10^5$ | $-17.33 \times 10^{-5}$ | 135 |
| Tempered by cooling at 100° C./hr. after heating at 200° C. for 1 hr., following the above referred cold-work ||||||||
| 64.70 | 20.20 | 15.10 | $11.20 \times 10^5$ | $-15.40 \times 10^{-5}$ | $4.84 \times 10^5$ | $-17.45 \times 10^{-5}$ | 138 |
| Tempered by cooling at 100° C./hr. after heating at 400° C. for 1 hr., following the above referred cold-work ||||||||
| 64.70 | 20.20 | 15.10 | $11.35 \times 10^5$ | $-15.65 \times 10^{-5}$ | $4.89 \times 10^5$ | $-17.66 \times 10^{-5}$ | 140 |
| Tempered by cooling at 100° C./hr. after heating at 600° C. for 1 hr., following the above referred cold-work ||||||||
| 64.70 | 20.20 | 15.10 | $11.45 \times 10^5$ | $-15.20 \times 10^{-5}$ | $4.92 \times 10^5$ | $-17.24 \times 10^{-5}$ | 137 |
| Tempered by cooling at 100° C./hr. after heating at 800° C. for 1 hr., following the above referred cold-work ||||||||
| 64.70 | 20.20 | 15.10 | $11.30 \times 10^5$ | $-14.90 \times 10^{-5}$ | $4.87 \times 10^5$ | $-16.85 \times 10^{-5}$ | 135 |

TABLE 22N
[Physical properties of Mn-Cu-Nb alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
| --- | --- | --- | --- | --- | --- | --- | --- |
| Mn (percent) | Cu (percent) | Nb (percent) | | | | | |
| As cold-worked with a working rate of 96%, after annealing of Table 20 ||||||||
| 61.70 | 25.10 | 13.20 | $15.30 \times 10^5$ | $-16.00 \times 10^{-5}$ | $6.12 \times 10^5$ | $-18.10 \times 10^{-5}$ | 195 |
| Tempered by cooling at 100° C./hr. after heating at 200° C. for 1 hr., following the above referred cold-work ||||||||
| 61.70 | 25.10 | 13.20 | $15.50 \times 10^5$ | $-10.35 \times 10^{-5}$ | $6.19 \times 10^5$ | $-12.36 \times 10^{-5}$ | 200 |
| Tempered by cooling at 100° C./hr. after heating at 400° C. for 1 hr., following the above referred cold-work ||||||||
| 61.70 | 25.10 | 13.20 | $15.85 \times 10^5$ | $-8.30 \times 10^{-5}$ | $6.29 \times 10^5$ | $-10.35 \times 10^{-5}$ | 205 |
| Tempered by cooling at 100° C./hr. after heating at 600° C. for 1 hr., following the above referred cold-work ||||||||
| 61.70 | 25.10 | 13.20 | $16.00 \times 10^5$ | $-7.50 \times 10^{-5}$ | $6.34 \times 10^5$ | $-9.63 \times 10^{-5}$ | 204 |
| Tempered by cooling at 100° C./hr. after heating at 800° C. for 1 hr., following the above referred cold-work ||||||||
| 61.70 | 25.10 | 13.20 | $15.90 \times 10^5$ | $-7.95 \times 10^{-5}$ | $6.31 \times 10^5$ | $-9.98 \times 10^{-5}$ | 196 |

TABLE 22O
[Physical properties of Mn-Cu-Sb alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
| --- | --- | --- | --- | --- | --- | --- | --- |
| Mn (percent) | Cu (percent) | Sb (percent) | | | | | |
| As cold-worked with a working rate of 96%, after annealing of Table 20 ||||||||
| 65.70 | 20.20 | 14.10 | $14.80 \times 10^5$ | $-18.50 \times 10^{-5}$ | $5.96 \times 10^5$ | $-20.55 \times 10^{-5}$ | 185 |
| Tempered by cooling at 100° C./hr. after heating at 200° C. for 1 hr., following the above referred cold-work ||||||||
| 65.70 | 20.20 | 14.10 | $14.95 \times 10^5$ | $-12.10 \times 10^{-5}$ | $6.01 \times 10^5$ | $-14.13 \times 10^{-5}$ | 190 |
| Tempered by cooling at 100° C./hr. after heating at 400° C. for 1 hr., following the above referred cold-work ||||||||
| 65.70 | 20.20 | 14.10 | $15.10 \times 10^5$ | $-10.30 \times 10^{-5}$ | $6.06 \times 10^5$ | $-12.38 \times 10^{-5}$ | 192 |
| Tempered by cooling at 100° C./hr. after heating at 600° C. for 1 hr., following the above referred cold-work ||||||||
| 65.70 | 20.20 | 14.10 | $15.20 \times 10^5$ | $-8.55 \times 10^{-5}$ | $6.09 \times 10^5$ | $-10.57 \times 10^{-5}$ | 188 |
| Tempered by cooling at 100° C./hr. after heating at 800° C. for 1 hr., following the above referred cold-work ||||||||
| 65.70 | 20.20 | 14.10 | $14.90 \times 10^5$ | $-11.50 \times 10^{-5}$ | $6.00 \times 10^5$ | $-13.62 \times 10^{-5}$ | 186 |

TABLE 22P
[Physical properties of Mn-Cu-Al alloys]

| Alloy composition ||| Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Al (percent) | | | | | |
| As cold-worked with a working rate of 96%, after annealing of Table 20 |||||||||
| 66.20 | 23.50 | 10.30 | 15.30×10⁵ | −18.65×10⁻⁵ | 6.12×10⁵ | −20.60×10⁻⁵ | 145 |
| Tempered by cooling at 100° C./hr. after heating at 200° C. for 1 hr., following the above referred cold-work |||||||||
| 66.20 | 23.50 | 10.30 | 15.45×10⁵ | −15.20×10⁻⁵ | 6.17×10⁵ | −17.15×10⁻⁵ | 146 |
| Tempered by cooling at 100° C./hr. after heating at 400° C. for 1 hr., following the above referred cold-work |||||||||
| 66.20 | 23.50 | 10.30 | 15.66×10⁵ | −14.10×10⁻⁵ | 6.23×10⁵ | −16.20×10⁻⁵ | 147 |
| Tempered by cooling at 100° C./hr. after heating at 600° C. for 1 hr., following the above referred cold-work |||||||||
| 66.20 | 23.50 | 10.30 | 15.60×10⁵ | −13.20×10⁻⁵ | 6.21×10⁵ | −15.44×10⁻⁵ | 146 |
| Tempered by cooling at 100° C./hr. after heating at 800° C. for 1 hr., following the above referred cold-work |||||||||
| 66.20 | 23.50 | 10.30 | 15.20×10⁵ | −15.20×10⁻⁵ | 6.09×10⁵ | 17.23×10⁻⁵− | 145 |

TABLE 22Q
[Physical properties of Mn-Cu-Si alloys]

| Alloy composition ||| Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Si (percent) | | | | | |
| As cold-worked with a working rate of 96%, after annealing of Table 20 |||||||||
| 65.70 | 20.15 | 14.15 | 15.10×10⁵ | −18.50×10⁻⁵ | 6.06×10⁵ | −20.53×10⁻⁵ | 165 |
| Tempered by cooling at 100° C./hr. after heating at 200° C. for 1 hr., following the above referred cold-work |||||||||
| 65.70 | 20.15 | 14.15 | 15.20×10⁵ | −10.40×10⁻⁵ | 6.09×10⁵ | −12.44×10⁻⁵ | 163 |
| Tempered by cooling at 100° C./hr. after heating at 400° C. for 1 hr., following the above referred cold-work |||||||||
| 65.70 | 20.15 | 14.15 | 15.40×10⁵ | −8.50×10⁻⁵ | 6.15×10⁵ | −10.65×10⁻⁵ | 165 |
| Tempered by cooling at 100° C./hr. after heating at 600° C. for 1 hr., following the above referred cold-work |||||||||
| 65.70 | 20.15 | 14.15 | 15.60×10⁵ | −7.90×10⁻⁵ | 6.21×10⁵ | −9.93×10⁻⁵ | 166 |
| Tempered by cooling at 100° C./hr. after heating at 800° C. for 1 hr., following the above referred cold-work |||||||||
| 65.70 | 20.15 | 14.15 | 15.10×10⁵ | −12.10×10⁻⁵ | 6.06×10⁵ | −14.20×10⁻⁵ | 160 |

TABLE 22R
[Physical properties of Mn-Cu-Sn alloys]

| Alloy composition ||| Young's modulus (kg./cm.², 20° C.) | Temperature coefficient of Young's modulus $e$ (0–40° C.) | Modulus of rigidity (kg./cm.², 20° C.) | Temperature coefficient of modulus of rigidity (0–40° C.) | Vickers hardness (20° C.) |
|---|---|---|---|---|---|---|---|
| Mn (percent) | Cu (percent) | Sn (percent) | | | | | |
| As cold-worked with a working rate of 96%, after annealing of Table 20 |||||||||
| 65.15 | 24.80 | 10.05 | 14.95×10⁵ | −19.00×10⁻⁵ | 6.01×10⁵ | −21.33×10⁻⁵ | 144 |
| Tempered by cooling at 100° C./hr. after heating at 200° C. for 1 hr., following the above referred cold-work |||||||||
| 65.15 | 24.80 | 10.05 | 15.10×10⁵ | −14.10×10⁻⁵ | 6.06×10⁵ | −16.20×10⁻⁵ | 143 |
| Tempered by cooling at 100° C./hr. after heating at 400° C. for 1 hr., following the above referred cold-work |||||||||
| 65.15 | 24.80 | 10.05 | 15.20×10⁵ | −12.00×10⁻⁵ | 6.09×10⁵ | −14.10×10⁻⁵ | 146 |
| Tempered by cooling at 100° C./hr. after heating at 600° C. for 1 hr., following the above referred cold-work |||||||||
| 65.15 | 24.80 | 10.05 | 15.15×10⁵ | −14.50×10⁻⁵ | 6.07×10⁵ | −16.53×10⁻⁵ | 146 |
| Tempered by cooling at 100° C./hr. after heating at 800° C. for 1 hr., following the above referred cold-work |||||||||
| 65.15 | 24.80 | 10.05 | 15.00×10⁵ | −16.40×10⁻⁵ | 6.03×10⁵ | −13.35×10⁻⁵ | 140 |

TABLE 22S
[Physical properties of Mn-Cu-Te alloys]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Te (percent) | | | | | |
| As cold-worked with a working rate of 96%, after annealing of Table 20 ||||||||
| 64.30 | 20.40 | 15.30 | $13.85 \times 10^5$ | $-18.30 \times 10^{-5}$ | $5.67 \times 10^5$ | $-26.20 \times 10^{-5}$ | 158 |
| Tempered by cooling at 100° C./hr. after heating at 200° C. for 1 hr., following the above referred cold-work ||||||||
| 64.30 | 20.40 | 15.30 | $13.90 \times 10^5$ | $-16.55 \times 10^{-5}$ | $5.55 \times 10^5$ | $-18.65 \times 10^{-5}$ | 160 |
| Tempered by cooling at 100° C./hr. after heating at 400° C. for 1 hr., following the above referred cold-work ||||||||
| 64.30 | 20.40 | 15.30 | $14.10 \times 10^5$ | $-15.00 \times 10^{-5}$ | $5.75 \times 10^5$ | $-17.13 \times 10^{-5}$ | 162 |
| Tempered by cooling at 100° C./hr. after heating at 600° C. for 1 hr., following the above referred cold-work ||||||||
| 64.30 | 20.40 | 15.30 | $14.00 \times 10^5$ | $-14.00 \times 10^{-5}$ | $5.71 \times 10^5$ | $-16.10 \times 10^{-5}$ | 159 |
| Tempered by cooling at 100° C./hr. after heating at 800° C. for 1 hr., following the above referred cold-work ||||||||
| 64.30 | 20.40 | 15.30 | $13.80 \times 10^5$ | $-16.75 \times 10^{-5}$ | $5.65 \times 10^5$ | $-18.80 \times 10^{-5}$ | 153 |

TABLE 22T
[Physical properties of Mn-Cu-Gd alloys]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Gd (percent) | | | | | |
| As cold-worked with a working rate of 96%, after annealing of Table 20 ||||||||
| 60.80 | 25.10 | 14.10 | $14.35 \times 10^5$ | $-16.30 \times 10^{-5}$ | $5.83 \times 10^5$ | $-18.35 \times 10^{-5}$ | 138 |
| Tempered by cooling at 100° C./hr. after heating at 200° C. for 1 hr., following the above referred cold-work ||||||||
| 60.80 | 25.10 | 14.10 | $14.68 \times 10^5$ | $-11.30 \times 10^{-5}$ | $5.93 \times 10^5$ | $-13.20 \times 10^{-5}$ | 140 |
| Tempered by cooling at 100° C./hr. after heating at 400° C. for 1 hr., following the above referred cold-work ||||||||
| 60.80 | 25.10 | 14.10 | $14.70 \times 10^5$ | $-10.50 \times 10^{-5}$ | $5.93 \times 10^5$ | $-11.98 \times 10^{-5}$ | 142 |
| Tempered by cooling at 100° C./hr. after heating at 600° C. for 1 hr., following the above referred cold-work ||||||||
| 60.80 | 25.10 | 14.10 | $14.65 \times 10^5$ | $-12.80 \times 10^{-5}$ | $5.92 \times 10^5$ | $-14.70 \times 10^{-5}$ | 145 |
| Tempered by cooling at 100° C./hr. after heating at 800° C. for 1 hr., following the above referred cold-work ||||||||
| 60.80 | 25.10 | 14.10 | $14.10 \times 10^5$ | $-16.60 \times 10^{-5}$ | $5.75 \times 10^{-5}$ | $-18.55 \times 10^{-5}$ | 140 |

TABLE 22U
[Physical properties of Mn-Cu-Zn alloys]

| Alloy composition | | | Young's modulus (kg./cm.², 20° C.) | Temperature coefficient of Young's modulus e (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Zn (percent) | | | | | |
| As cold-worked with a working rate of 96%, after annealing of Table 20 ||||||||
| 74.70 | 20.20 | 5.10 | $13.20 \times 10^5$ | $-18.65 \times 10^{-5}$ | $5.47 \times 10^5$ | $-20.55 \times 10^{-5}$ | 138 |
| Tempered by cooling at 100° C./hr. after heating at 200° C. for 1 hr., following the above referred cold-work ||||||||
| 74.70 | 20.20 | 5.10 | $13.40 \times 10^5$ | $-13.25 \times 10^{-5}$ | $5.53 \times 10^5$ | $-15.45 \times 10^{-5}$ | 140 |
| Tempered by cooling at 100° C./hr. after heating at 400° C. for 1 hr., following the above referred cold-work ||||||||
| 74.70 | 20.20 | 5.10 | $13.10 \times 10^5$ | $-10.55 \times 10^{-5}$ | $5.43 \times 10^5$ | $-12.56 \times 10^{-5}$ | 141 |
| Tempered by cooling at 100° C./hr. after heating at 600° C. for 1 hr., following the above referred cold-work ||||||||
| 74.70 | 20.20 | 5.10 | $13.00 \times 10^5$ | $-12.20 \times 10^{-5}$ | $5.41 \times 10^5$ | $-14.30 \times 10^{-5}$ | 142 |
| Tempered by cooling at 100° C./hr. after heating at 800° C. for 1 hr., following the above referred cold-work ||||||||
| 74.70 | 20.20 | 5.10 | $12.90 \times 10^5$ | $-13.30 \times 10^{-5}$ | $5.27 \times 10^5$ | $-15.35 \times 10^{-5}$ | 136 |

TABLE 22V
[Physical properties of Mn-Cu-Be alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | Be (percent) | | | | | |
| As cold-worked with a working rate of 96%, after annealing of Table 20 | | | | | | | |
| 74.75 | 20.20 | 5.05 | 14.55×10⁵ | −15.50×10⁻⁵ | 5.89×10⁵ | −17.54×10⁻⁵ | 235 |
| Tempered by cooling at 100° C./hr. after heating at 200° C. for 1 hr., following the above referred cold-work | | | | | | | |
| 74.75 | 20.20 | 5.05 | 14.86×10⁵ | −11.95×10⁻⁵ | 5.98×10⁵ | −13.98×10⁻⁵ | 238 |
| Tempered by cooling at 100° C./hr. after heating at 400° C. for 1 hr., following the above referred cold-work | | | | | | | |
| 74.75 | 20.20 | 5.05 | 14.90×10⁵ | −10.55×10⁻⁵ | 5.99×10⁵ | −12.65×10⁻⁵ | 240 |
| Tempered by cooling at 100° C./hr. after heating at 600° C. for 1 hr., following the above referred cold-work | | | | | | | |
| 74.75 | 20.20 | 5.05 | 14.80×10⁵ | −11.25×10⁻⁵ | 5.96×10⁵ | −13.25×10⁻⁵ | 241 |
| Tempered by cooling at 100° C./hr. after heating at 800° C. for 1 hr., following the above referred cold-work | | | | | | | |
| 74.75 | 20.20 | 5.05 | 14.75×10⁵ | −12.30×10⁻⁵ | 5.95×10⁵ | −13.99×10⁻⁵ | 238 |

TABLE 22W
[Physical properties of Mn-Cu-B alloys]

| Alloy composition | | | Young's modulus (kg./cm.², 20° C.) | Temperature coefficient of Young's modulus $e$ (0-40° C.) | Modulus of rigidity (kg./cm.², 20° C.) | Temperature coefficient of modulus of rigidity (0-40° C.) | Vickers hardness (20° C.) |
|---|---|---|---|---|---|---|---|
| Mn (percent) | Cu (percent) | B (percent) | | | | | |
| As cold-worked with a working rate of 96%, after annealing of Table 20 | | | | | | | |
| 75.15 | 24.30 | 0.55 | 15.80×10⁵ | −18.55×10⁻⁵ | 6.27×10⁵ | −20.60×10⁻⁵ | 294 |
| Tempered by cooling at 100° C./hr. after heating at 200° C. for 1 hr., following the above referred cold-work | | | | | | | |
| 75.15 | 24.30 | 0.55 | 15.95×10⁵ | −15.35×10⁻⁵ | 6.32×10⁵ | −17.40×10⁻⁵ | 297 |
| Tempered by cooling at 100° C./hr. after heating at 400° C. for 1 hr., following the above referred cold-work | | | | | | | |
| 75.15 | 24.30 | 0.55 | 16.00×10⁵ | −12.10×10⁻⁵ | 6.34×10⁵ | −14.23×10⁻⁵ | 300 |
| Tempered by cooling at 100° C./hr. after heating at 600° C. for 1 hr., following the above referred cold-work | | | | | | | |
| 75.15 | 24.30 | 0.55 | 15.95×10⁵ | −13.40×10⁻⁵ | 6.32×10⁵ | −15.41×10⁻⁵ | 302 |
| Tempered by cooling at 100° C./hr. after heating at 800° C. for 1 hr., following the above referred cold-work | | | | | | | |
| 75.15 | 24.30 | 0.55 | 15.70×10⁵ | −14.10×10⁻⁵ | 6.25×10⁵ | −16.20×10⁻⁵ | 293 |

As can be seen from FIGS. 38A, 38B, 39A to 39E, and 40A to 40E, manganese-copper-molybdenum and manganese-copper-tungsten ternary alloys, consisting of 30 to 91 wt. percent of manganese, 0 to 67 wt. percent of copper, and 0 to 38 wt. percent of either molybdenum or tungsten, respectively, have temperature coefficient of Young's modulus E ranging from a comparatively large negative value to a comparatively large positive value, depending on the composition of the alloys, in any of the states as annealed (A), as cold-worked (B) with a working rate of 96% after the annealing, and as tempered (B') after the cold-work. Accordingly, those Mn-Cu-Mo and Mn-Cu-W alloys, whose temperature coefficient of Young's modulus $e$ falls in a range crossing the zero line between a negative value domain and a positive value domain, have the so-called Elinvar characteristics or temperature-independent elasticity.

As can be seen from FIGS. 41A to 41E and FIGS. 42A to 42E, the manganese-copper-molybdenum and manganese-copper-tungsten ternary alloys, consisting of 30 to 91 wt. percent of manganese, 0 to 67 wt. percent of copper, and 0 to 38 wt. percent of either molybdenum or tungsten, respectively, have temperature coefficient of Young's modulus $e$ which varies greatly depending on the composition of the alloys in any of the states as water quenched (C) after the annealing, and as tempered (C') after the water quenching. Accordingly, the manganese-copper-molybdenum and manganese-copper-tungsten ternary alloys as water quenched (C) and as tempered (C') can also have the so-called Elinvar characteristics.

In the case of FIGS. 39A and 40A, the working rate for the cold-work process was 96%. FIGS. 43A and 43B illustrate the effects of different working rates, or different degrees of cold-work, on the temperature coefficient of Young's modulus $e$, for three different Mn-Cu-Mo ternary alloys and three different Mn-Cu-W ternary alloys of the invention. As can be seen from the figures, the temperature coefficient $e$ of the alloys of the invention can be improved by cold-work, even by slight cold-work with a working rate as small as 1%.

In the case of the heat treatments of FIGS. 38A, 38B, 41A, and 42A, the annealing was carried out by cooling at a speed of 100° C./hour after heating at 900° C. for 1 hour, while the quenching was effected by water cooling from 900° C. Table 19 and FIGS. 44A and 44B show how the temperature coefficient of Young's modulus $e$ is affected by variation of the cooling speed and the quenching temperature. It is apparent from Table 19 and FIGS. 44A and 44B that the temperature coefficient $e$ is greatly affected by the cooling speed and the quenching temperature.

The inventors have confirmed by experiments that manganese-copper-molybdenum-tungsten quaternary alloys give similar results with the aforedescribed manganese-copper-molybdenum or manganese-copper-tungsten ternary alloys.

The applicants have also tested the typical physical conditions of plural alloys which consist of the manganese-copper base composition plus a third element selected from the group consisting of indium, titanium, vanadium, gold, silver, tantalum, zirconium, palladium, cadmium, germanium, chromium, selenium, bismuth, samarium, niobium, antimony, aluminum, silicon, tin, tellurium, gadolinium, zinc, beryllium, and boron. The results are shown in Tables 20, 21A to 21W, and 22A to 22W. The physical properties of any of the above referred plural alloys proved to be similar to those of the ternary alloy made by adding either molybdenum or tungsten to the manganese-copper base composition.

Since the physical properties of the alloys of the invention are greatly affected by the working rate of cold-work, the quenching temperature, and the cooling speed, the shape of the curves of FIGS. 39A to 39E, 40A to 40E, 41A to 41E, and 42A to 42E may well be greatly changed if the working rate, quenching temperature, and/or the cooling speed are changed from those on which the curves of the figures are based.

As described in the foregoing disclosure, the manganese-copper alloys according to the present invention, which consists of 30 to 95 wt. percent of manganese, less than 70 wt. percent of copper, and 0 to 38 wt. percent in total of optional subingredient or subingredients selected from the group consisting of 0 to 38 wt. percent of iron, molybdenum, tungsten, indium, and titanium, 0 to 30 wt. percent of nickel 0 to 27 wt. percent of vanadium, gold, silver, and tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron, have a Young's modulus E (or modulus of rigidity) and a temperature coefficient of Young's modulus $e$ and a hardness Hv, which all vary greatly depending on the alloy composition and various treatments, such as annealing, quenching, cold-work, reheating after quenching, reheating after cold-work, etc.

Above all, the temperature coefficient of Young's modulus E, or the similar coefficient of modulus of rigidity, varies between a large negative value to a large positive value. Accordingly, it is possible to achieve alloys having a temperature coefficient of Young's modulus $e$ in a range from $-20 \times 10^{-5}$ to $+20 \times 10^{-5}$, preferably $-5 \times 10^{-5}$ to $+5 \times 10^{-5}$. In fact, any value of the temperature coefficient $e$ can selectively be achieved, as long as it is in the last mentioned range. Instead of the temperature coefficient of Young's modulus, a similar coefficient of modulus of rigidity can also be selectively controlled. Furthermore, with the alloys of the present invention, different values of Young's modulus (modulus of rigidity) and hardness can also be obtained.

In addition to the above feature of variable physical properties, the alloys of the present invention is also characterized in that the alloys, with any of the above defined compositions, are distinctively non-magnetic.

Thus, the alloys of the present invention, in the state as annealed, are suitable for articles requiring comparatively small mechanical strength, such as tuning forks. On the other hand, alloys of the present invention, in the state as quenched, cold-worked, or tempered, are suitable for articles requiring a considerably large mechanical strength, such as coiled springs.

Beside the smallness of the temperature coefficient of Young's modulus $e$ (which generally means the smallness of temperature coefficient of modulus of rigidity), the present invention is featured in that any desired value of the temperature coefficient $e$ in the above range can be achieved by suitable heat treatment and/or cold-work.

As compared with conventional alloys with a temperature-independent elasticity, such as Elinvar and Coelinvar, which are ferromagnetic and contain a large amount expensive nickel and cobalt, the alloys of the present invention are non-magnetic and consist of such elements as manganese, copper, molybdenum, tungsten, titanium, and other above-referred elements. The nonmagnetic properties of the alloys of the invention is particularly important for such application as watch springs, in which the magnetism appreciably affects the accuracy.

Therefore, the present invention provides inexpensive resilient material suitable for those articles and machine elements which allow only a very small deviation of resilient displacement or natural frequency with temperature change while requiring nonmagnetic properties.

In the alloys of the invention, the reasons for limiting the content of manganese to 30 to 95 wt. percent, the content of copper to less than 70 wt. percent, the content of iron, molybdenum, tungsten, indium, and titanium as optional subingredients to 0 to 38 wt. percent, the content of nickel as an optional subingredient to 30 wt. percent, the content of vanadium, gold, silver, and tantalum as optional subingredients to 0 to 27 wt. percent, the content of cobalt as an optional subingredient to 0 to 25 wt. percent, and the content of zirconium, palladium, cadmium, germanium, chromium, selenium, bismuth, samarium, niobium, antimony, aluminum, silicon, tin, tellurium, and gadolinium as optional subingredients to 0 to 24 wt. percent, the content of zinc, beryllium, and boron as optional subingredients to 0 to 10 wt. percent, and the total content of the optional subingredients to 0 to 38 wt. percent are in the fact that the desired small temperature coefficient of Young's modulus as an elastic member cannot be achieved unless the composition of the elastic member is in the aforesaid range, as can be seen from FIGS. 1 to 49E and Tables 1 to 22W.

What is claimed is:

1. Non-magnetic resilient manganese-copper alloy articles having a small temperature variation of elasticity, characterized in that the alloy essentially consists of 30 to 95 wt. percent of manganese, less than 70 wt. percent of copper, and 0 to 38 wt. percent in total of subingredient selected from the group consisting of 0 to 38 wt. percent of iron, molybdenum, tungsten, indium, and titanium, 0 to 27 wt. percent of vanadium, gold, silver, and tantalum, 0 to 25 wt. percent of cobalt, 0 to 24 wt. percent of zirconium, palladium, cadmium, germanium, selenium, bismuth, samarium, niobium, antimony, aluminum, silicon, tin, tellurium, and gadolinium, 0 to 5 wt. percent of chromium, and 0 to 10 wt. percent of zinc, beryllium, and boron, whereby the temperature coefficient of Young's modulus (or modulus of rigidity) of the alloy is in a range of $-20 \times 10^{-5}$ to $+20 \times 10^{-5}$, preferably $-5 \times 10^{-5}$ to $+5 \times 10^{-5}$.

2. Non-magnetic resilient manganese-copper alloy articles having a small temperature variation of elasticity as defined in claim 1, wherein the alloy essentially consists of 33 to 84 wt. percent of manganese, less than 67 wt. percent of copper and 0 to 5 wt. percent of chromium.

3. Non-magnetic resilient manganese-copper alloy articles having a small temperature variation of elasticity as defined in claim 1, wherein the alloy essentially consists of 30 to 88 wt. percent of manganese, 67 to 0.1 wt. percent of copper, and at least one ingredient selected from the group consisting of 0.1 to 38 wt. percent of iron and 0.1 to 25 wt. percent of cobalt.

4. Non-magnetic resilient manganese-copper alloy articles having a small temperature variation of elasticity as defined in claim 1, wherein the alloy essentially consists of 30 to 91 wt. percent of manganese, 67 to 1 wt. percent of copper, and at least one ingredient selected from the group consisting of less than 38 wt. percent of molybdenum and tungsten.

5. Non-magnetic resilient manganese-copper alloy articles having a small temperature variation of elasticity as defined in claim 1, wherein the alloy essentially consists of 30 to 91 wt. percent of manganese, 67 to 1 wt. percent of copper, less than 38 wt. percent of molybdenum and/or tungsten, and less than 38 wt. percent in total of subingredients selected from the group consisting of 0 to 38 wt. percent of iron, indium and titanium, 0 to 27 wt. percent of vanadium, gold, silver, and tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron.

6. Non-magnetic resilient manganese-copper alloy articles having a small temperature variation of elasticity as defined in claim 1, wherein the alloy essentially consists of 30 to 95 wt. percent of manganese, 0.01 to 70 wt. percent of copper, and less than 38 wt. percent in total of subingredients selected from the group consisting of 0 to 25 wt. percent of chromium, 0 to 38 wt. percent of molybdenum, 0 to 38 wt. percent of tungsten, 0 to 38 wt. percent of iron, 0 to 25 wt. percent of cobalt, 0 to 27 wt. percent of silver, tantalum, 0 to 27 wt. percent of palladium, and/or germanium.

7. Method of manufacturing non-magnetic resilient articles having a small temperature variation of elasticity and composed of manganese-copper alloys essentially consisting of 30 to 95 wt. percent of manganese, less than 70 wt. percent of copper, and 0 to 38 wt. percent in total of subingredient selected from the group consisting of 0 to 38 wt. percent of iron, molybdenum, tungsten, indium, and titanium, 0 to 30 wt. percent of nickel, 0 to 27 wt. percent of vanadium, gold, silver, tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron, characterized in that, the alloy is formed into a desired shaped article and heated at higher than 600° C. but below its melting point for at least one minute for the sake of homogenizing treatment, and annealed by gradually cooling at a speed slower than 1° C./sec. whereby the temperature coefficient of Young's modulus (or modulus of rigidity) of the alloy is in a range of $-20 \times 10^{-5}$ to $+20 \times 10^{-5}$, preferably $-5 \times 10^{-5}$ to $+5 \times 10^{-5}$.

8. Method of manufacturing non-magnetic resilient articles composed of manganese-copper alloys having a small temperature variation of elasticity as defined in claim 7, wherein the alloy essentially consists of 30 to 88 wt. percent of manganese, 67 to 0.1 wt. percent of copper, and at least one ingredient selected from the group consisting of 0.1 to 38 wt. percent of iron and 0.1 to 25 wt. percent of cobalt.

9. Method of manufacturing non-magnetic resilient articles composed of manganese-copper alloys having a small temperature variation of elasticity as defined in claim 7, wherein the alloy essentially consists of 30 to 91 wt. percent of manganese, 67 to 1 wt. percent of copper, and at least one ingredient selected from the group consisting of less than 38 wt. percent of molybdenum and tungsten.

10. Method of manufacturing non-magnetic resilient articles composed of manganese-copper alloys having a small temperature variation of elasticity as defined in claim 7, wherein the alloy essentially consists of 30 to 91 wt. percent of manganese, 67 to 1 wt. percent of copper, less than 38 wt. percent of molybdenum and/or tungsten, and less than 38 wt. percent in total of subingredients selected from the group consisting of 0 to 38 wt. percent of iron, indium and titanium, 0 to 27 wt. percent of vanadium, gold silver, and tantalum, 0 to 25 wt. percent of cobalt, 0 to 24 wt. percent of zirconium, palladium, cadmium, germanium, chromium, selenium, bismuth, samarium, niobium, antimony, aluminum, silicon, tin, tellurium, and gadolinium, and 0 to 10 wt. percent of zinc, beryllium, and boron.

11. Method of manufacturing non-magnetic resilient articles having a small temperature variation of elasticity and composed of manganese-copper alloys essentially consisting of 30 to 95 wt. percent of manganese, less than 70 wt. percent of copper, and less than 30 wt. percent of nickel, characterized in that the alloy is formed into a desired shaped article and heated at higher than 600° C. but below its melting point for at least one minute for the sake of homogenizing treatment, and annealed by gradually cooling at a speed slower than 1° C./sec. whereby the temperature coefficient of Young's modulus (or modulus of rigidity) of the alloy is in a range of $-20 \times 10^{-5}$ to $+20 \times 10^{-5}$, preferably $-5 \times 10^{-5}$ to $+5 \times 10^{-5}$.

12. Method of manufacturing non-magnetic resilient articles composed of manganese-copper alloys having a small temperature variation of elasticity as defined in claim 7, and thereafter cold-working the article to change its cross-sectional area by at least 1%.

13. Method of manufacturing non-magnetic resilient articles composed of manganese-copper alloys having a small temperature variation of elasticity as defined in claim 12, and thereafter heating the article at higher than 100° C. but lower than its melting point for at least one minute and tempering the article by gradually cooling the article at a rate slower than 1° C./sec.

14. Method of manufacturing non-magnetic resilient articles composed of manganese-copper alloys having a small temperature variation of elasticity as defined in claim 13, in which the last-named heating is conducted for five minutes to 500 hours.

15. Method of manufacturing non-magnetic resilient articles composed of manganese-copper alloys having a small temperature variation of elasticity as defined in claim 7, and thereafter heating the alloy at higher than 200° C. but lower than its melting point for at least one minute, and thereafter quenching the article at a rate faster than 1° C./sec.

16. Method of manufacturing non-magnetic resilient articles composed of manganese-copper alloys having a small temperature variation of elasticity as defined in claim 15, in which the last-mentioned heating is conducted for 10 minutes to 15 hours.

17. Method of manufacturing non-magnetic resilient articles composed of manganese-copper alloys having a small temperature variation of elasticity as defined in claim 15, in which said quenching is conducted at a rate of 10° C./sec. to 500° C./sec.

18. Method of manufacturing non-magnetic resilient articles composed of manganese-copper alloys having a small temperature variation of elasticity as defined in claim 15, and thereafter cold-working said article to change its cross-sectional area by at least 1%.

19. Method of manufacturing non-magnetic resilient articles composed of manganese-copper alloys having a small temperature variation of elasticity as defined in claim 15, and thereafter heating said article at higher than 100° C. but lower than its melting point for at least one minute, and then tempering the article by gradually cooling at a rate slower than 1° C./sec.

20. Method of manufacturing non-magnetic resilient articles composed of manganese-copper alloys having a small tempearture variation of elasticity as defined in claim 19, in which the last-named heating is conducted for 5 minutes to 500 hours.

21. Method of manufacturing non-magnetic resilient articles composed of manganese-copper alloys having a small temperature variation of elasticity as defined in claim 20, and thereafter heating said article to higher than 100° C. but lower than its melting point.

22. Method of manufacturing non-magnetic resilient articles composed of manganese-copper alloys having a small temperature variation of elasticity as defined in claim 11, and thereafter cold-working the article to change its cross-sectional area by at least 1%.

23. Method of manufacturing non-magnetic resilient articles composed of manganese-copper alloys having a small temperature variation of elasticity as defined in claim 22, and thereafter heating the article at higher than 100° C. but lower than its melting point for at least one minute and tempering the article by gradually cooling it at a rate slower than 1° C./sec.

24. Method of manufacturing non-magnetic resilient articles composed of manganese-copper alloys having a small temperature variation of elasticity as defined in claim 23, in which the last-mentioned heating is conducted for 5 minutes to 500 hours.

References Cited

UNITED STATES PATENTS

| | | | |
|---|---|---|---|
| 943,066 | 12/1909 | Driver | 75—134 M X |
| 2,202,012 | 5/1940 | Long | 75—134 M |
| 2,234,748 | 3/1941 | Dean, et al. | 148—11.5 |
| 2,250,470 | 7/1941 | Dean, et al. | 75—134 M |
| 2,259,459 | 10/1941 | Dean | 148—11.5 |
| 2,310,094 | 2/1943 | Kroll | 75—161 X |
| 2,348,207 | 5/1944 | Dean | 75—134 M |
| 2,403,895 | 7/1946 | Alban | 75—134 M X |

CHARLES N. LOVELL, Primary Examiner

J. E. LEGRU, Assistant Examiner

U.S. Cl. X.R.

75—135; 148—11.5